US011790472B1

(12) United States Patent
Sforzo et al.

(10) Patent No.: US 11,790,472 B1
(45) Date of Patent: Oct. 17, 2023

(54) COMPUTER SYSTEM AND NETWORK FOR ELIMINATING FRAUD IN THE ISSUANCE OF SURETY BONDS

(71) Applicants: Joseph Sforzo, Plainview, NY (US); Joseph M. Sforzo, Jr., Plainview, NY (US)

(72) Inventors: Joseph Sforzo, Plainview, NY (US); Joseph M. Sforzo, Jr., Plainview, NY (US)

( * ) Notice: Subject to any disclaimer, the term of this patent is extended or adjusted under 35 U.S.C. 154(b) by 78 days.

(21) Appl. No.: 17/370,236

(22) Filed: Jul. 8, 2021

Related U.S. Application Data

(60) Provisional application No. 63/052,501, filed on Jul. 16, 2020.

(51) Int. Cl.

| | |
|---|---|
| ***G06Q 30/00*** | (2023.01) |
| ***G06Q 50/26*** | (2012.01) |
| ***G06Q 30/0273*** | (2023.01) |
| ***G06Q 40/06*** | (2012.01) |
| ***G06Q 50/18*** | (2012.01) |

(52) U.S. Cl.

CPC ....... *G06Q 50/265* (2013.01); *G06Q 30/0275* (2013.01); *G06Q 40/06* (2013.01); *G06Q 50/18* (2013.01)

(58) Field of Classification Search

CPC .. G06Q 50/265; G06Q 30/0275; G06Q 40/06; G06Q 50/18; G06Q 30/0185; G06Q 40/00; G06F 21/00474; G06K 19/07349

See application file for complete search history.

(56) References Cited

U.S. PATENT DOCUMENTS

| | | | |
|---|---|---|---|
| 4,567,359 | A | 1/1986 | Lockwood |
| 5,655,085 | A | 8/1997 | Ryan et al. |
| 5,987,434 | A | 11/1999 | Libman |
| 6,009,402 | A | 12/1999 | Whitworth |
| 6,347,302 | B1 | 2/2002 | Joao |

(Continued)

OTHER PUBLICATIONS

Dennis Flatness; The State of the Surety Agency, American Agent & Broker; Jul. 1994, pp. 66-67.

(Continued)

*Primary Examiner* — Alvin L Brown

(74) *Attorney, Agent, or Firm* — Thomas A. O'Rourke; James Bongiorno

(57) ABSTRACT

A system provides for digital issuance of surety bonds and corresponding powers of attorney to eliminate fraud using multiple security layers, and includes a server communicating with client devices of: surety companies, agents, contractors, and obligees. A surety company accesses a GUI to grant power of attorney to an agent; the agent accesses a GUI to prepare a digital bond for the contractor. The draft bond is signed digitally by the agent and contractor in the closed system. The server generates and subsequently displays a unique identifier on both the executed bond and associated power of attorney, to act as a digital stapler to prevent subsequent fraudulent use of the power of attorney independent of that executed bond. An audit trail provided by the executed bond includes hyperlinks to: time-date stamps of the digital signatures; and IP Addresses of the client devices used for the digital signatures.

18 Claims, 141 Drawing Sheets

(56) References Cited

U.S. PATENT DOCUMENTS

| | | | | |
|---|---|---|---|---|
| 7,430,516 | B1 * | 9/2008 | Blair | G06Q 40/08 705/35 |
| 7,644,019 | B2 | 1/2010 | Woda et al. | |
| 8,155,984 | B2 | 4/2012 | Sforzo | |
| 8,571,898 | B2 | 10/2013 | Sforzo | |
| 2013/0151437 | A1 * | 6/2013 | Vance | G06Q 40/06 705/36 R |

OTHER PUBLICATIONS

Reliance Group Providing On-Line Access to Worker's Comp, Auto, Surety, Professional Liability Coverages: E-Commerce to Exceed $100 Million in 1999, Business Wire, Dec. 1998.
Stephanie Shroeder; Risk Management, v46n6, Jun. 1999.

* cited by examiner

FIG. 119
Search
View
Add-ins
Help
All
Unread
By Date
Today
Surety Team
Bond Execution Confirmation
Surety Team
To: Federal Insurance Company
Bond PDF.pdf
Dear Federal Insurance Company,
Bond number SNY202782 has been executed successfully
Kind regards,
The Surety2000 Team

FIG. 132
Surety2000
SEAL OF AUTHENTICITY

FIG. 133

Surety

Bid Bond in Accordance with Contract Specifications

| | |
|---|---|
| SFL02021193 | Bohbo Inc. |
| Bond Number | Principal Name |

| | |
|---|---|
| One Geoffrey Way, Wayne, NJ, 07470, US | John Smith |
| Principal Address | Principal Signature |
| Florida Department of Transportation | 605 Suwanee Street, MS 55 room B1, Tallahassee, FL, 32399, US |
| Owner/Obligee Name | Owner/Obligee Address |

Bond Information

| | | |
|---|---|---|
| 03-17-2021 | Federal Insurance Company | BUSINESS8364129 |
| Bid Date | Surety | Contractor Vendor ID Number |

TX1-523625

Contract ID Number

Re-asphalting of 119th and Long View Rd.

Description of Job

| | | |
|---|---|---|
| Ten Percent of Amount Bid | | 10 |
| Amount of Bid Security | Bid Security Maximum | Bid Security Percentage |

| | |
|---|---|
| John A Hancock Attorney-in-Fact | Vanguard Coverage Corp. |
| Bond Entered and Executed By | Primary Agency |
| John Hancock | |
| Attorney-In-Fact Signature | |

*Know all men by these presents that* Federal Insurance Company*, a Corporation duly organized under the laws of the State of* FL*, are held and firmly bound unto the above owner/oblige by the transmission. The surety agrees to waive the statute of Fraud defense and further agrees that the owner/oblige is a third party beneficiary of the waiver for the purposes of enforcing this bid bond.*

SFL02021193

CHUBB

Power of Attorney

Federal Insurance Company | Vigilant Insurance Company | Pacific Indemnity Company Know All by These Presents, That FEDERAL INSURANCE COMPANY, an Indiana corporation, VIGILANT INSURANCE COMPANY, a New York corporation, and PACIFIC INDEMNITY COMPANY, a Wisconsin corporation, do each hereby constitute and appoint Blake S. Bohlig, Kelly Nicole Bruggeman, Brian D. Carpenter, Heather R. Goedtel, Michelle Halter, Jessica Hoff, Nicole Langer and Craig Olmstead of Minneapolis, Minnesota each as their true and lawful Attorney-in-Fact to execute under such designation in their names and to affix their corporate seals to and deliver for and on their behalf as surety thereon or otherwise, bonds and undertakings and other writings obligatory in the nature thereof (other than bail bonds) given or executed in the course of business, and any instruments amending or altering the same, and consents to the modification or alteration of any instrument referred to in said bonds or obligations.

In Witness Whereof, said FEDERAL INSURANCE COMPANY, VIGILANT INSURANCE COMPANY, and PACIFIC INDEMNITY COMPANY have each executed and attested these presents and affixed their corporate seals on this 13th day of February, 2019.

Dawn M. Chloros, Assistant Secretary

Stephen M. Haney, Vice President

STATE OF NEW JERSEY

County of Hunterdon ss. John A Hancock Unlimited

On this 13th day of February, 2019, before me, a Notary Public of New Jersey, personally came Dawn M. Chloros, to me known to be Assistant Secretary of FEDERAL INSURANCE COMPANY, VIGILANT INSURANCE COMPANY, and PACIFIC INDEMNITY COMPANY, the companies which executed the foregoing Power of Attorney, and the said Dawn M. Chloros, being by me duly sworn, did depose and say that she is Assistant Secretary of FEDERAL INSURANCE COMPANY, VIGILANT INSURANCE COMPANY, and PACIFIC INDEMNITY COMPANY and knows the corporate seals thereof, that the seals affixed to the foregoing Power of Attorney are such corporate seals and were thereto affixed by authority of said Companies; and that she signed said Power of Attorney as Assistant Secretary of said Companies by like authority; and that she is acquainted with Stephen M. Haney, and knows him to be Vice President of said Companies; and that the signature of Stephen M. Haney, subscribed to said Power of Attorney is in the genuine handwriting of Stephen M. Haney, and was thereto subscribed by authority of said Companies and in deponent's presence.

Notarial Seal

ROSE CURTIS
NOTARY PUBLIC OF NEW JERSEY
No. [illegible]
Commission Expires [illegible]

Notary Public

CERTIFICATION

Resolutions adopted by the Boards of Directors of FEDERAL INSURANCE COMPANY, VIGILANT INSURANCE COMPANY, and PACIFIC INDEMNITY COMPANY on August 30, 2016:

"RESOLVED, that the following authorizations relate to the execution, for and on behalf of the Company, of bonds, undertakings, recognizances, contracts and other written commitments of the Company entered into in the ordinary course of business (each a "Written Commitment"):

(1) Each of the Chairman, the President and the Vice Presidents of the Company is hereby authorized to execute any Written Commitment for and on behalf of the Company, under the seal of the Company or otherwise.

(2) Each duly appointed attorney-in-fact of the Company is hereby authorized to execute any Written Commitment for and on behalf of the Company, under the seal of the Company or otherwise, to the extent that such action is authorized by the grant of powers provided for in such person's written appointment as such attorney-in-fact.

(3) Each of the Chairman, the President and the Vice Presidents of the Company is hereby authorized, for and on behalf of the Company, to appoint in writing any person the attorney-in-fact of the Company with full power and authority to execute, for and on behalf of the Company, under the seal of the Company or otherwise, such Written Commitments of the Company as may be specified in such written appointment, which specification may be by general type or class of Written Commitments or by specification of one or more particular Written Commitments.

(4) Each of the Chairman, the President and the Vice Presidents of the Company is hereby authorized, for and on behalf of the Company, to delegate in writing to any other officer of the Company the authority to execute, for and on behalf of the Company, under the Company's seal or otherwise, such Written Commitments of the Company as are specified in such written delegation, which specification may be by general type or class of Written Commitments or by specification of one or more particular Written Commitments.

(5) The signature of any officer or other person executing any Written Commitment or appointment or delegation pursuant to this Resolution, and the seal of the Company, may be affixed by facsimile on such Written Commitment or written appointment or delegation.

FURTHER RESOLVED, that the foregoing Resolution shall not be deemed to be an exclusive statement of the powers and authority of officers, employees and other persons to act for and on behalf of the Company, and such Resolution shall not limit or otherwise affect the exercise of any such power or authority otherwise validly granted or vested."

I, Dawn M. Chloros, Assistant Secretary of FEDERAL INSURANCE COMPANY, VIGILANT INSURANCE COMPANY, and PACIFIC INDEMNITY COMPANY (the "Companies") do hereby certify that (i) the foregoing Resolutions adopted by the Board of Directors of the Companies are true, correct and in full force and effect, (ii) the foregoing Power of Attorney is true, correct and in full force and effect.

Given under my hand and seals of said Companies at Whitehouse Station, NJ, this January 13, 2021.

Dawn M. Chloros, Assistant Secretary

IN THE EVENT YOU WISH TO VERIFY THE AUTHENTICITY OF THIS BOND OR NOTIFY US OF ANY OTHER MATTER, PLEASE CONTACT US AT:
Telephone [illegible] Fax [illegible] email: surety@chubb.com FED-VIG-PI (rev. 08-18)

SFL02021193

S2K0 [illegible]

COMPUTER SYSTEM AND NETWORK FOR ELIMINATING FRAUD IN THE ISSUANCE OF SURETY BONDS

CROSS REFERENCES TO RELATED APPLICATIONS

This application claims priority on U.S. Provisional Application Ser. No. 63/052,501, filed on Jul. 16, 2020, the disclosures of which are incorporated herein by reference.

FIELD OF THE INVENTION

The subject technology relates generally to improvements in apparatus, methods, and systems for issuing surety bonds, and more particularly to a computer system and network configured for the reduction of fraud in the issuance of surety bonds online.

BACKGROUND OF THE INVENTION

The term "surety bond" generally means a bond issued by an insurance company or other company. A surety bond is essentially a contract between three parties—an oblige who seeks to contract with someone for performance of a job or other act (i.e., the person or business entity that requires the purchase of a bond to ensure compliant performance), the principal who contracts to perform the task or other act (i.e., the person that purchases the bond), and the surety (i.e., the insurance company that sells/issues the bond for an amount that guarantees compliant performance).

The surety legally binds itself to an obligee for an amount of money guaranteed to the obligee for the faithful performance of a contract or other act required of the principal (see FIG. 1). The bonds issued by a surety can include bid bonds, contract bonds, court and subdivision bonds, performance bonds, customs bonds, notary bonds, liquor license bonds, license and permit bonds, small business administration bonds, bail bonds, supersedeas bonds or other bonds required in litigation, etc.

In a very common scenario, when a contractor, builder, supplier, etc. wishes to bid on some aspect of a construction project or submit a bid in connection with a governmental purchase of equipment or supplies, the entity requesting bids typically requires that for a bidder to be considered, a bid bond must be submitted along with the bid.

Many municipalities have their own particular bid form, and others use a format that is approved by the American Institute of Architects. In the typical bid bond the principal is the contractor/builder who is submitting the bid. The surety is typically an insurance or bonding company who pursuant to the bond is "held and firmly bound" to the entity seeking the bid for a predetermined sum, usually some percentage of the bid amount. In the event the bid is accepted, the bond becomes effective and protects the entity awarding the contract by assuring the entity of faithful performance of the contract, as well as prompt payment of labor and materials furnished in performing the contract. The bond also protects the bid seeking entity from the failure of the winning bidder to enter into the contract being awarded, by paying the difference between the winning bid and the amount that the entity would have to pay to another party to complete the project because of the default. For the non-winning bidders their bond terminates and only the winning bidder's bond has any effect.

Each bidder submits a bid bond with its bid in the appropriate form decided upon by the entity seeking the bids. In the event the wrong form of bid bond is used, the party submitting the bid bond runs the risk that the entity soliciting the bonds will reject the bid out of hand even if the person submitting the bond was the lowest bidder. Many agencies soliciting bids are reluctant to accept a bid with an improper bid bond form because there is a risk that the losing bidders who submitted the proper form may challenge the agency if it awards the bid based on an improper bid form.

When a contractor is submitting a bid, much of the contractor's effort is spent calculating and adjusting various aspects of the bid to make sure the contractor has a bid that he/she considers to be the best for the particular job. Since much of the pre-bid effort is spent calculating and recalculating material and/or labor costs, frequently a bid bond is not sought by the contractor until just before the bidding deadline. In addition, many contractors are bidding on a plurality of jobs at the same time. Furthermore, for many projects there are a great number of contractors bidding on the same project. As a result a great deal of effort has to be done in a short period of time to prepare and to evaluate multiple bonds.

Surety companies typically rely on local agents to receive the bond request and process the necessary paper work to complete the bid bond. For certain bond requests where the amount of the bond request is low the agent may have authority to issue a bond without approval from the surety company. For other requests the surety company must approve the bond requests. Once the bond request is approved, the agent must prepare the actual bond which must be signed by the agent on behalf of the surety company. In order to save time in the process many surety companies provide their agents with executed powers of attorney for them to retain at their offices until needed. While this procedure saves considerable time in the procedure of issuing bonds, there is also the risk that an agent could issue a bond inappropriately to an unsatisfactory party. While the procedure described above is for bid bonds, the steps and procedures for issuing other types of bonds is nonetheless very similar.

As a result of the time deadlines with respect to the current procedures for issuing bonds, there is a need for improved methods and apparatus for obtaining and issuing bonds that provides greater safeguards and security against fraud.

Surety bond fraud, i.e., issuance of fake surety bonds, are promulgated by fake surety companies, rogue bond agents, and unscrupulous contractors (unscrupulous principals). A fake surety bond can cripple a construction site when the bond is needed to fulfill an unmet obligation. Although it is often suggested that the ethical contractor seek to verify the legitimacy of the surety bond, such as by checking for the corporate seal, even such seals have been known to be forged to create a fake bond.

The apparatus and method disclosed herein overcomes these and other issues relating to the prevention of fraudulent surety bonds being submitted to and accepted by an oblige.

OBJECTS OF THE INVENTION

It is an object of the invention to provide a method of obtaining surety bonds using a computer system network.

It is another object of the invention to provide apparatus and a computer-implemented system for issuing surety bonds.

It is a further object of the invention to provide increased security in the issuance of bonds.

It is another object of the invention to provide a method that shortens the time necessary for obtaining a surety bonds.

Further objects and advantages of the invention will become apparent from the following description and claims, and from the accompanying drawings.

SUMMARY OF THE INVENTION

The patent or application file contains at least one drawing executed in color. Copies of this patent or patent application publication with color drawing(s) will be provided by the Office upon request and payment of the necessary fee.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention is directed to a computer-implemented network, a method, and a system for issuing and transmitting surety bonds, including but not limited to bid bonds, contract bonds, court and subdivision bonds, performance bonds, customs bonds, notary bonds, liquor license bonds, license and permit bonds, small business administration bonds, bail bonds, supersedeas bonds or other bonds required in litigation, etc.

The present invention also has applicability in the field of insurance and other businesses including but not limited to binding certificates of insurance and policy endorsements. The invention relates generally to computerized systems and more particularly to a computer system network for issuances of bonds through a communications linkage for communicating and processing the bond details necessary for the issuance of a surety bond in a timely and efficient manner. The invention also relates to a system for the collection, processing, and dissemination of bond related information generated from the application process.

The present invention is a computerized system for automated execution of bonds through an Internet or Intranet website or other communications linkage for communicating and processing information. In addition, the present invention permits designated persons to view approved bonds from remote locations as a security feature. In order to log onto the system a user account and/or password are inputted.

BRIEF DESCRIPTION OF THE DRAWINGS

The description of the various example embodiments is explained in conjunction with appended drawings, in which:

FIG. 122 shows the home page screen displayed when a user at the surety company is logged back into the system, and the surety user can see the newly executed bond in the bond activity on the left, or may also see the bond by clicking on the bond icon, which is shown therein with the user hovering the cursor thereon;

FIG. 123 shows the bonds page displayed after the user has clicked on the bond icon in the home page GUI screen of FIG. 122, which shows the newly executed bond, as well as any other bond that one of its agents has had executed/issued, and which includes a search tool on the left hand side that may be used to search for a specific bond;

FIG. 124 shows the user hovering the cursor over the "Companies" menu item, which causes the display of a dropdown list that includes "Agencies," and "Obliges," and "Principals," indicating that a registered user of each can use that menu item to log into the system;

FIG. 125 shows the home page screen displayed when the obligee is logged into the system, permitting the obligee to see the most recently executed bonds, and the most frequent contractors that bid;

FIG. 126 shows the obligee clicking on the bonds icon in the home page GUI screen of FIG. 125 in order to see a full list of bonds;

FIG. 127 shows the full list of bonds (i.e., 22 bonds) being displayed to the obligee after clicking on the bonds icon in the home page GUI screen of FIG. 125;

FIG. 128 shows the obligee hovering the cursor over one of the bonds in the GUI screen of FIG. 127, and clicking on the "View Details" dropdown list option that is subsequently displayed;

FIGS. 129A and 129B show respective upper and lower GUI screen portions that display descriptive portions of the information that is on the Bond that was selected in the GUI screen of FIG. 127, and which upper screen portion includes a "View Executed & Signed Document" link for viewing of the actual bond and associated documents;

FIG. 130 shows the upper GUI screen portion of FIG. 129A, with the user clicking on the download button to exposed a dropdown list of the documents associated with the executed bond;

FIG. 131 shows a PDF version of the executed bond that was selected in the dropdown list of the GUI screen of FIG. 130;

FIG. 132 shows a seal of authenticity that is used on the issued bond and power of attorney;

FIG. 133 shows a printed copy of an issued bid bond prepared using the system disclosed herein;

Figure 135:
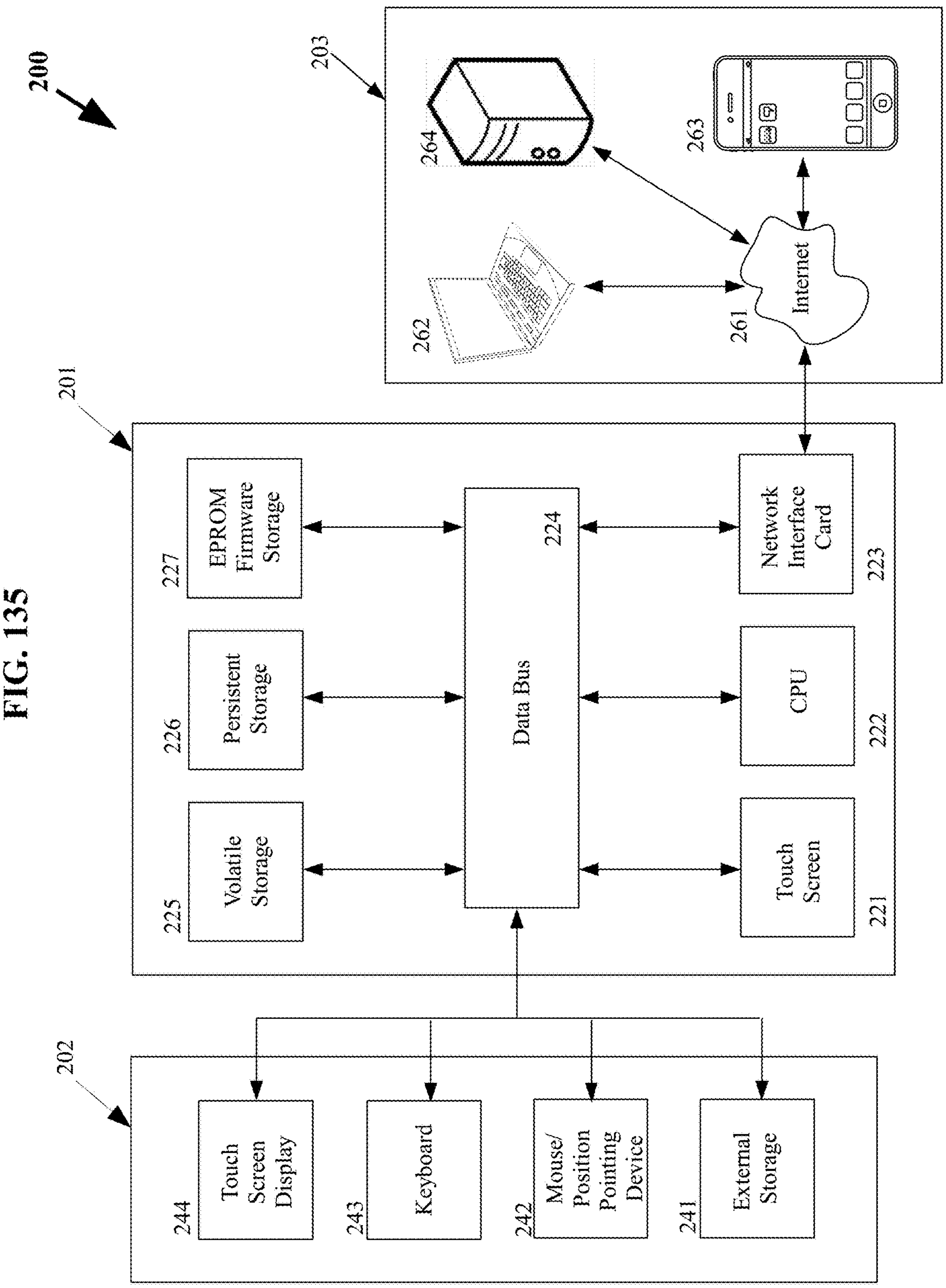

FIG. 134 shows a printed copy of a power of attorney that is associated with the issued bid bond of FIG. 133; and FIG. 135 is a schematic illustration showing an exemplary computing unit capable of being programmed by the instructions of the software of the present invention, and which may include personal computers, cellular phones, and other mobile computing devices.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular GUI and/or feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Figure 1:
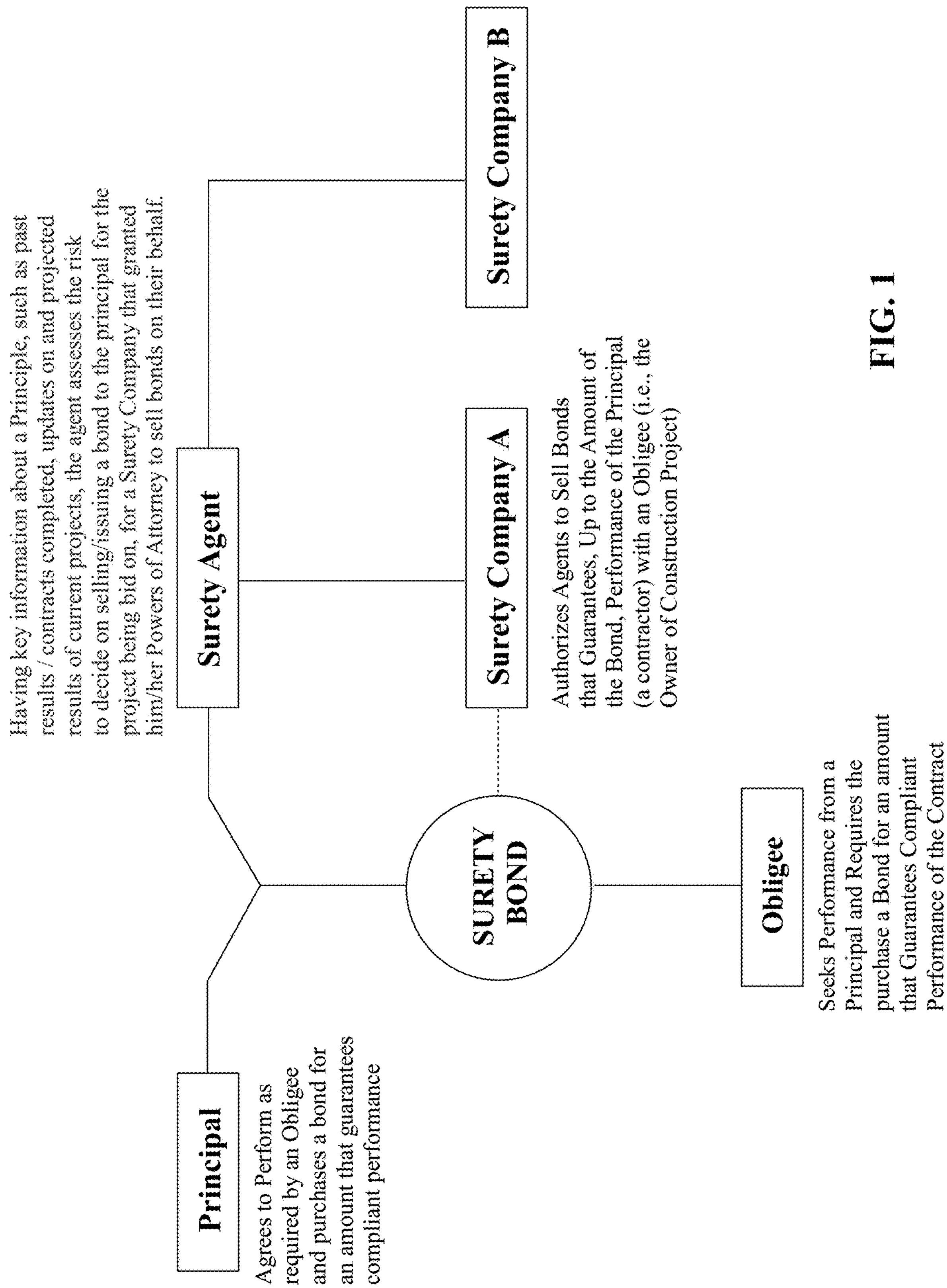
FIG. 1 is a block diagram illustrating the relationship formed between an obligee, a principal, and a surety (a surety agent and/or surety company), once a surety bond is issued.

As described with reference to the accompanying figures, the herein disclosed computer system and network provides an improved computer system and network that provide a plurality of Graphical User Interface (GUI) display screens (see FIGS. 2-131) and communication and processing capabilities for coordinating a principal seeking to purchase a bond, a surety agent seeking to sell a surety bond on behalf of a surety company, and an oblige who requires the purchase of a bond by the Principal to assure compliant performance by the Principal (see FIG. 1).

The ability for the Principal, the Surety Agent and Surety Company, and the Obligee to connect to a centralized network for requesting, executing, and verifying the issuance of a surety bond is found in Applicant's issued U.S. Pat. No. 8,571,898, the disclosures of which are incorporated herein by reference.

However, the system disclosed herein further leverages that network to improve the system in several respects, particularly as to preventing the issuance of fraudulent bonds. Obliges can instantly know whether a bond is genuine, and have access to all information relating to the bond that guarantees its authenticity. Principals can similarly be assured that the purchased bond is alto authentic and may guarantee performance in case they are otherwise unable to complete the contract.

Figure 2:
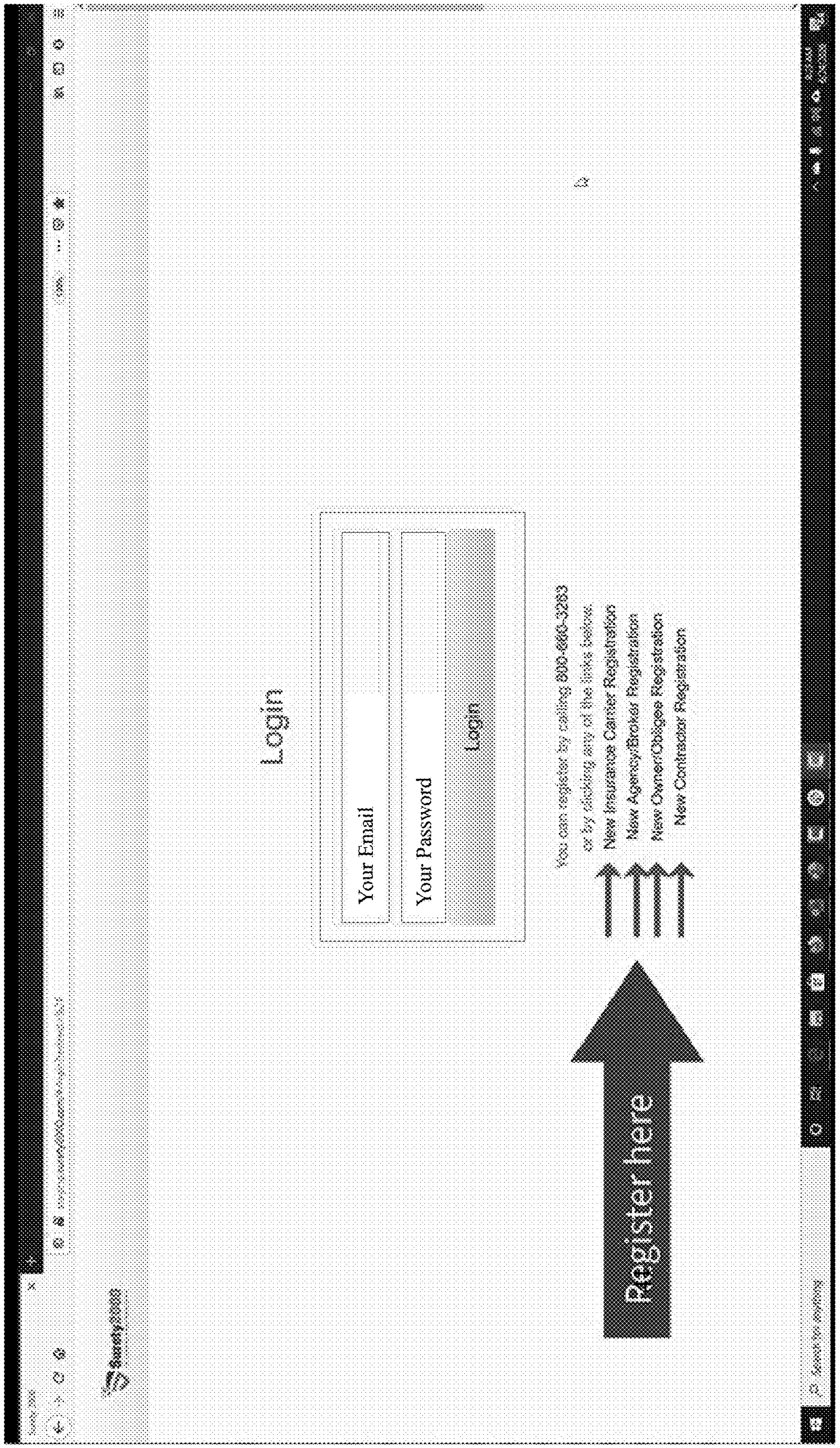
FIG. 2 illustrates a login and registration screen of a first graphic user interface (GUI) that may be displayed on a plurality of computers linked in the herein disclosed network.

As seen in FIG. 2, the Principal/Surety/Obligee may each independently access the corresponding GUI homepage and subsequent screen on a computer or electronic terminal that is coupled to the network using the login screen GUI shown therein.

Figure 3:
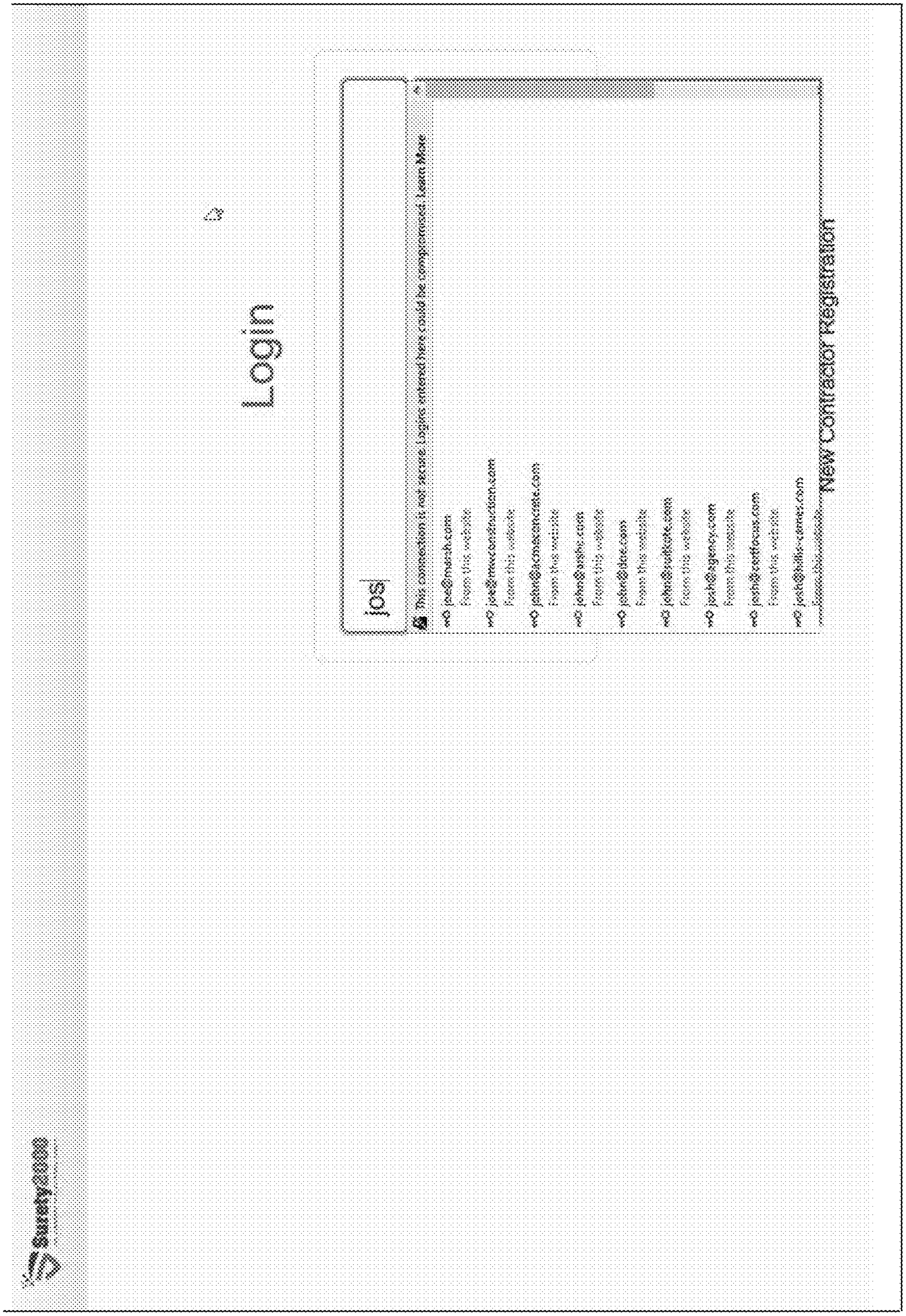
FIG. 3 illustrates the login screen portion of the GUI of FIG. 2, shown with a smart search being performed of the registered users to find the person logging in as he/she is typing in their userID, permitting selection from a dropdown list matching the currently typed entry.

FIG. 3 illustrates the login screen portion of the GUI of FIG. 2, shown with a smart search being performed of the registered users to find the person logging in as he/she is typing in their userID, permitting selection from a drop-down list matching the currently typed entry.

Figure 4:
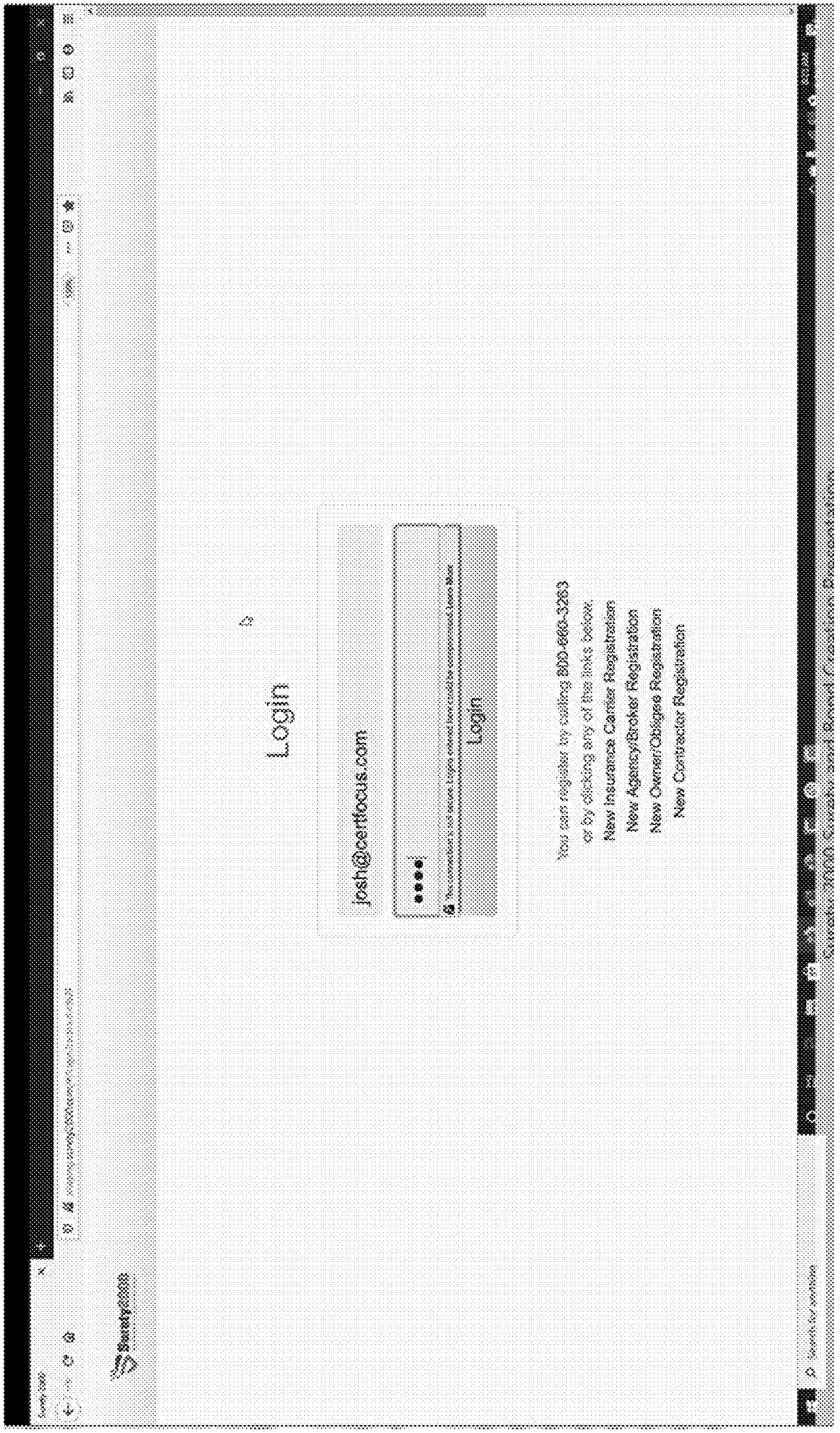
FIG. 4 shows the login screen of FIG. 3, shown after the person has selected or entered his/her userID, and as the person is entering his/her password.

FIG. 4 shows the login screen of FIG. 3, shown after the person has selected or entered his/her userID, and as the person is entering his/her password.

Figure 5:
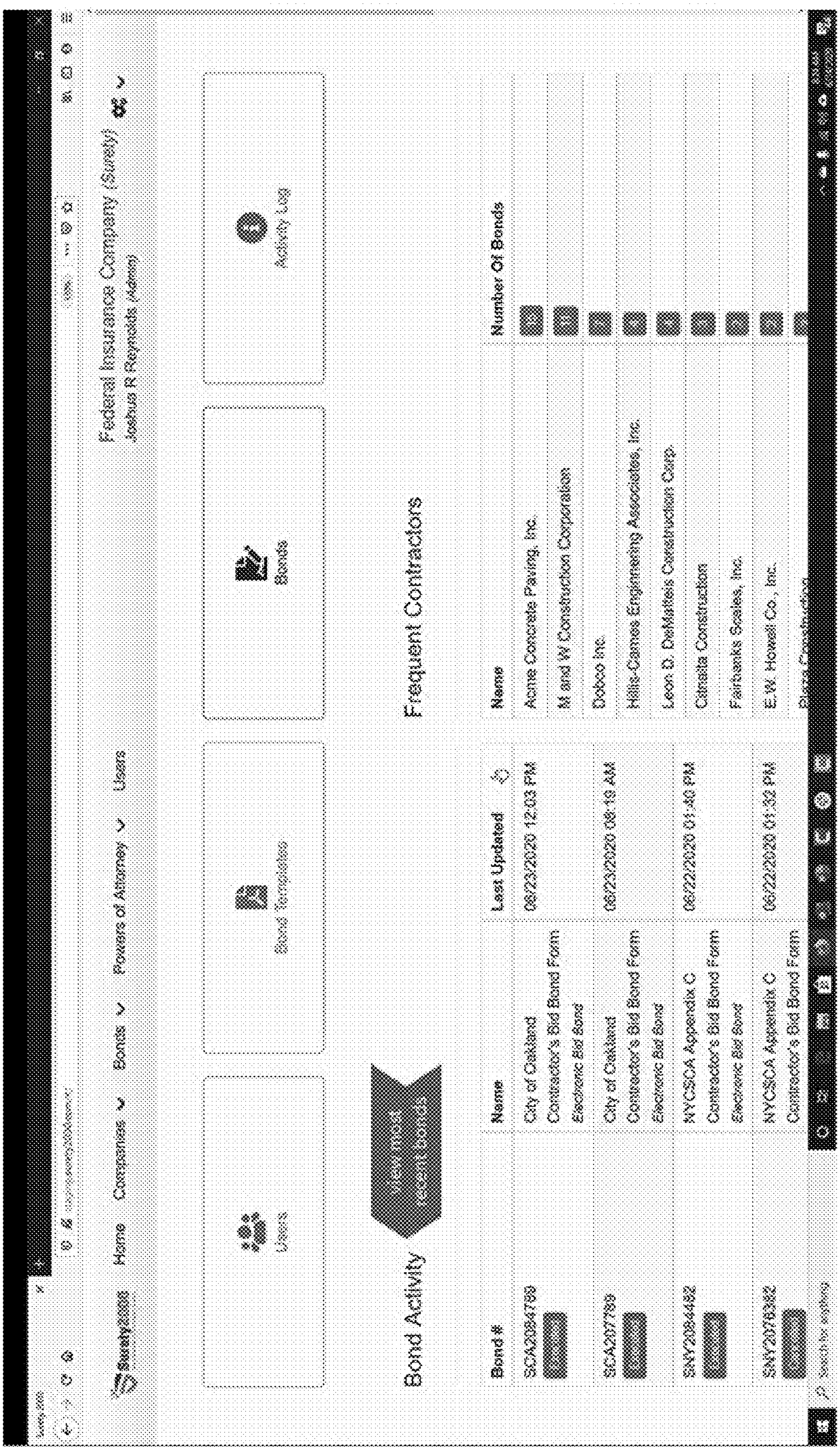
FIG. 5 illustrates a Surety Company homepage GUI that may be utilized by a surety company after one of its registered administrative users (e.g., "Joshua R. Reynolds") has logged into the network.

FIG. 5 illustrates a Surety Company homepage GUI that may be utilized by a surety company after one of its registered administrative users (e.g., "Joshua R. Reynolds") has logged into the network.

Figure 6:
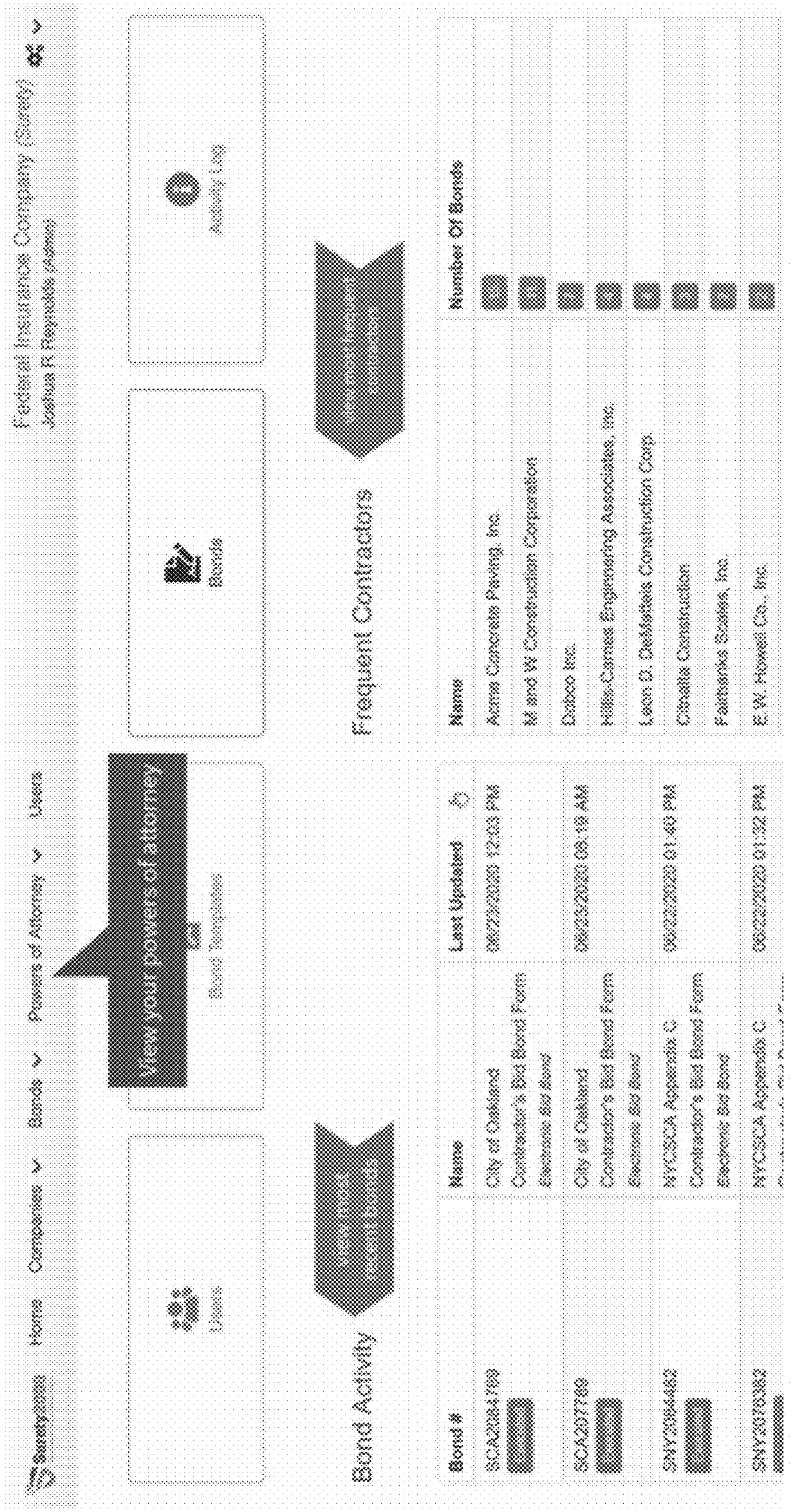
FIG. 6 illustrates the homepage GUI of FIG. 5, but also highlights links positioned therein that permit the administrative user to view: the most recent bonds that were issued, the frequently used contractors, and the powers of attorney that have been granted to its agents.

FIG. 6 illustrates the homepage GUI of FIG. 5, but also highlights links positioned therein that permit the administrative user to view: the most recent bonds that were issued, the frequently used contractors, and the powers of attorney that have been granted to its agents.

Figure 7:
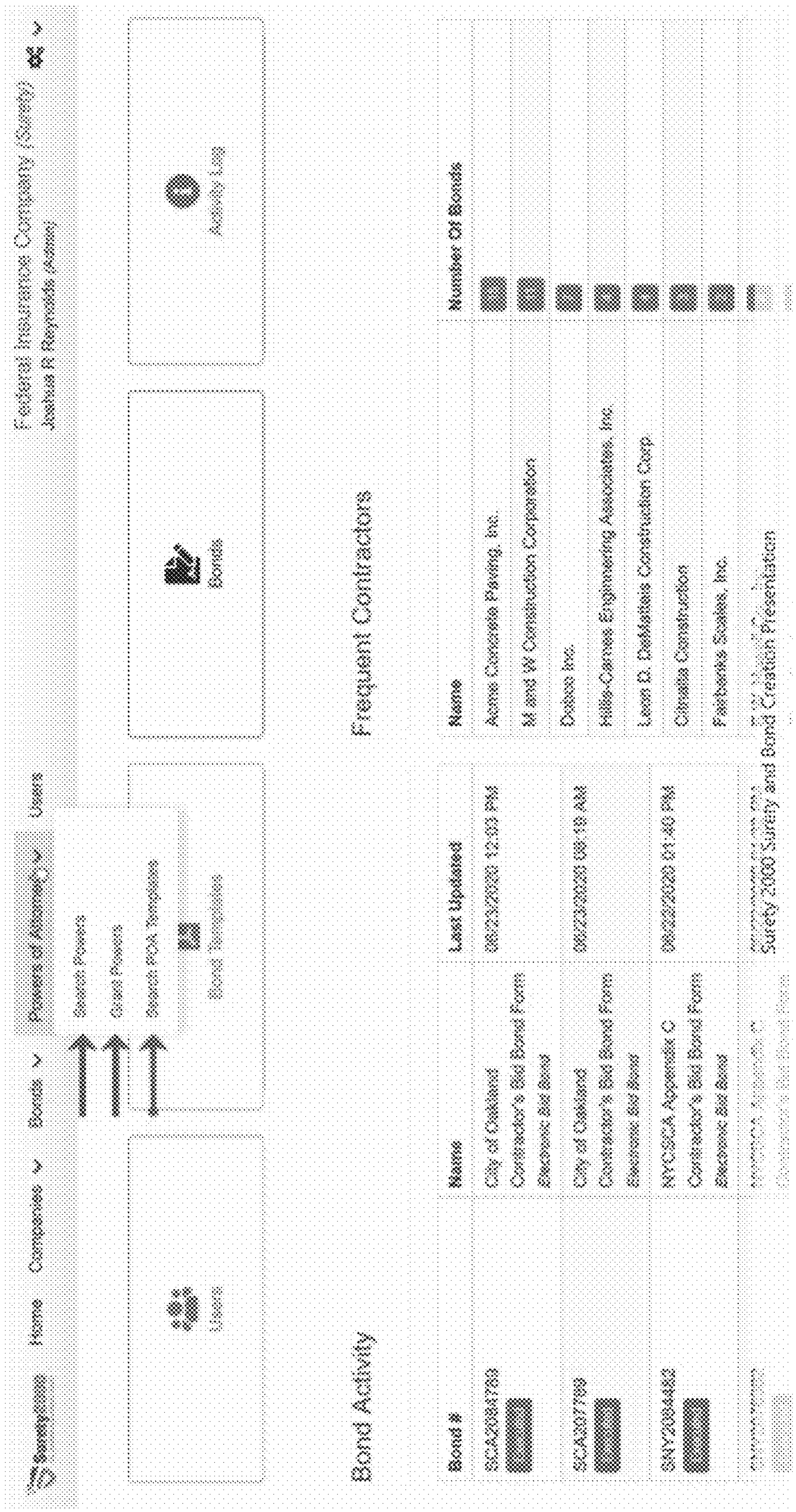
FIG. 7 illustrates a drop down listing in the homepage GUI of FIG. 4, which permits the surety: to search for powers of attorney that have already been granted, to grant new powers of attorney, and to create power of attorney templates.

FIG. 7 illustrates a drop down listing in the homepage GUI of FIG. 4, which permits the surety: to search for powers of attorney that have already been granted, to grant new powers of attorney, and to create power of attorney templates.

Figure 8:
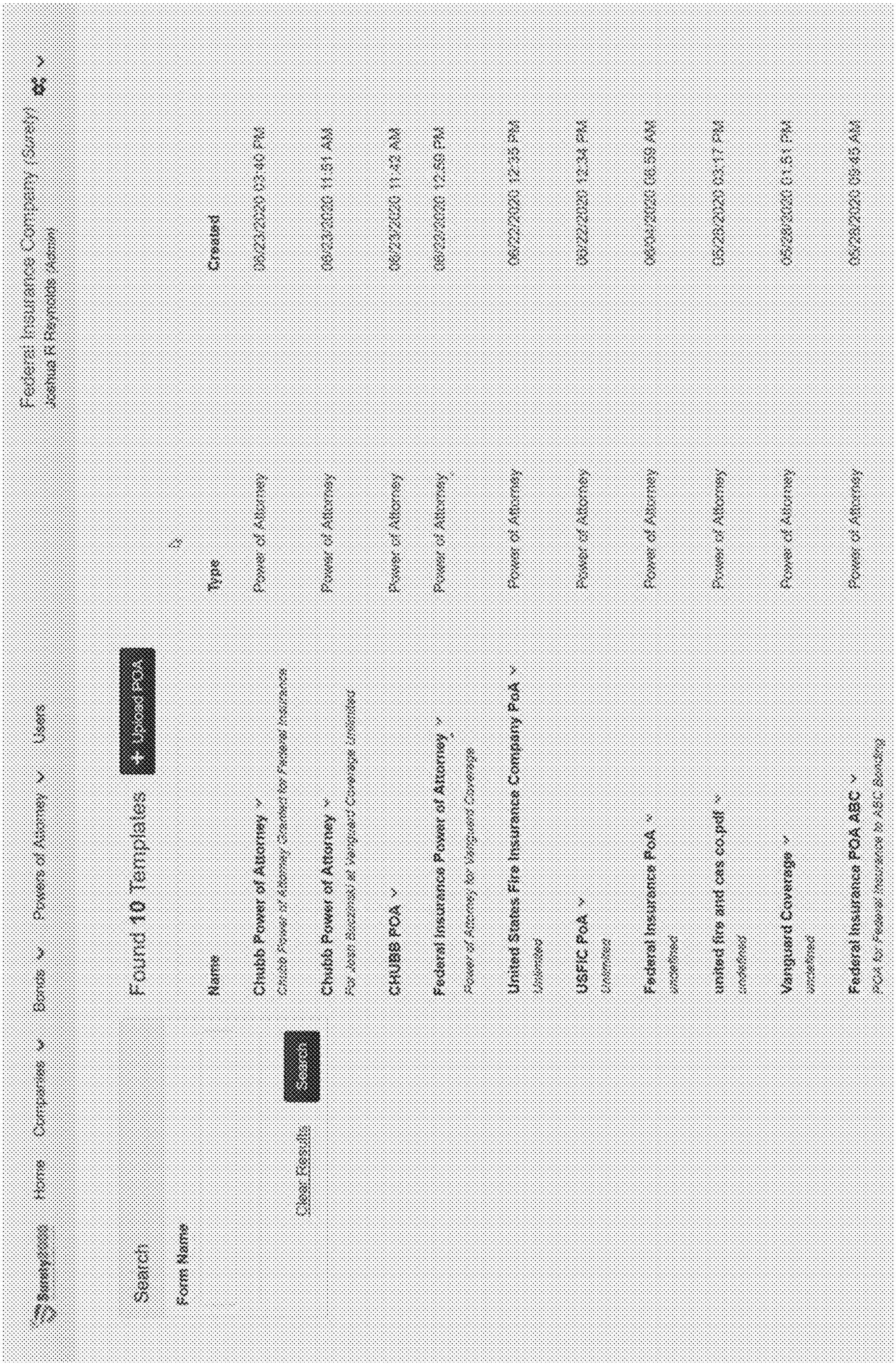
FIG. 8 illustrates a GUI that is displayed after selecting the power of attorney templates option from the dropdown list shown in FIG. 7, and which GUI displays and permits viewing of already created power of attorney templates, and also permits creating of additional power of attorney templates by toggling of the "Upload POA" button/icon.

FIG. 8 illustrates a GUI that is displayed after selecting the power of attorney templates option from the dropdown list shown in FIG. 7, and which GUI displays and permits viewing of already created power of attorney templates, and also permits creating of additional power of attorney templates by toggling of the "Upload POA" button/icon.

Figure 9:
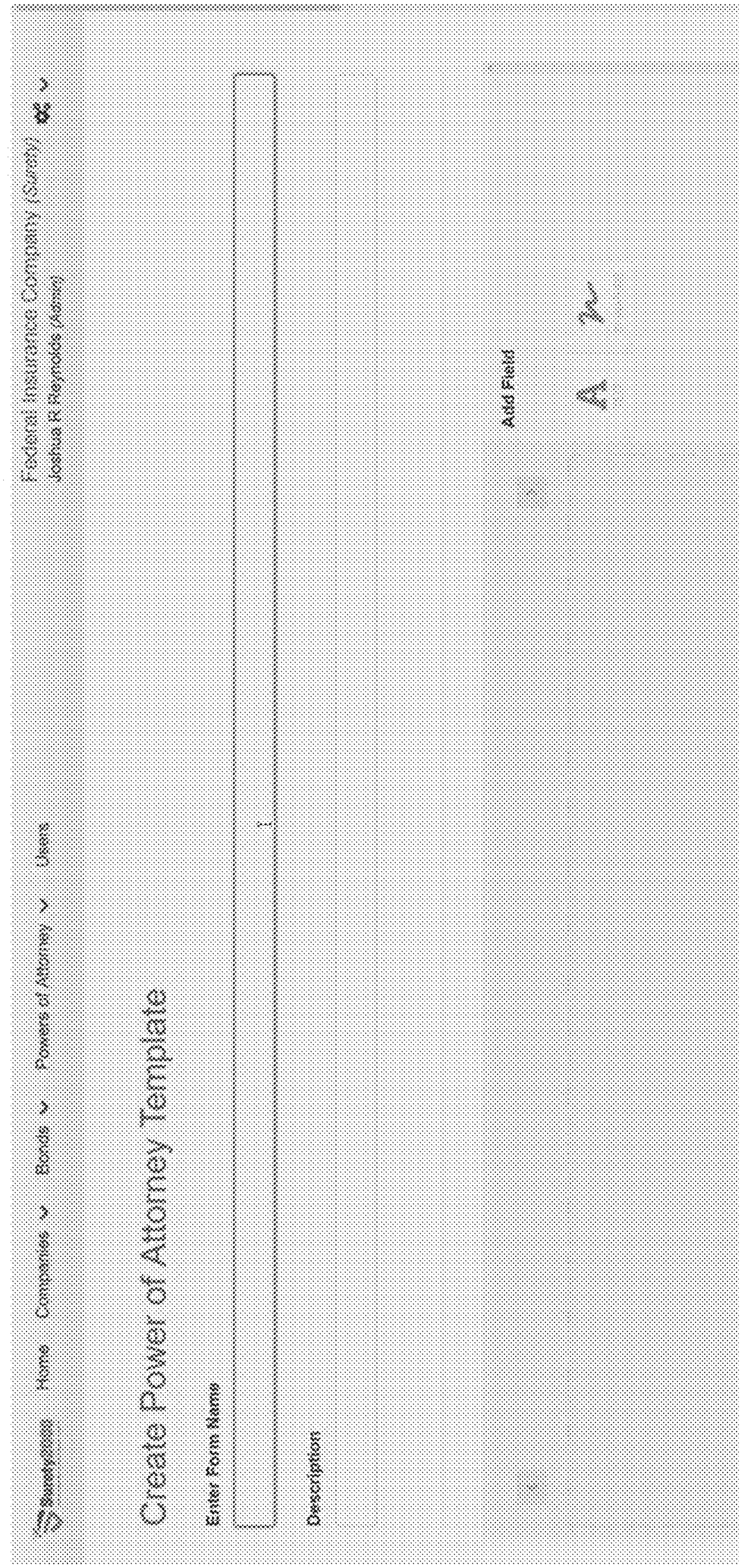
FIG. 9 illustrates the Create Power of Attorney GUI screen that is displayed after toggling of the "Upload POA" button shown in FIG. 8, and which permits: the surety to add a power of attorney PDF, which may be a generic power of attorney form; to name the power of attorney; to give the custom power of attorney a description; and to add text fields to the custom power of attorney template.

FIG. 9 illustrates the Create Power of Attorney GUI screen that is displayed after toggling of the "Upload POA" button shown in FIG. 8, and which permits: the surety can add a power of attorney PDF, name the power of attorney, give the power a description, and add text fields.

Figure 10:
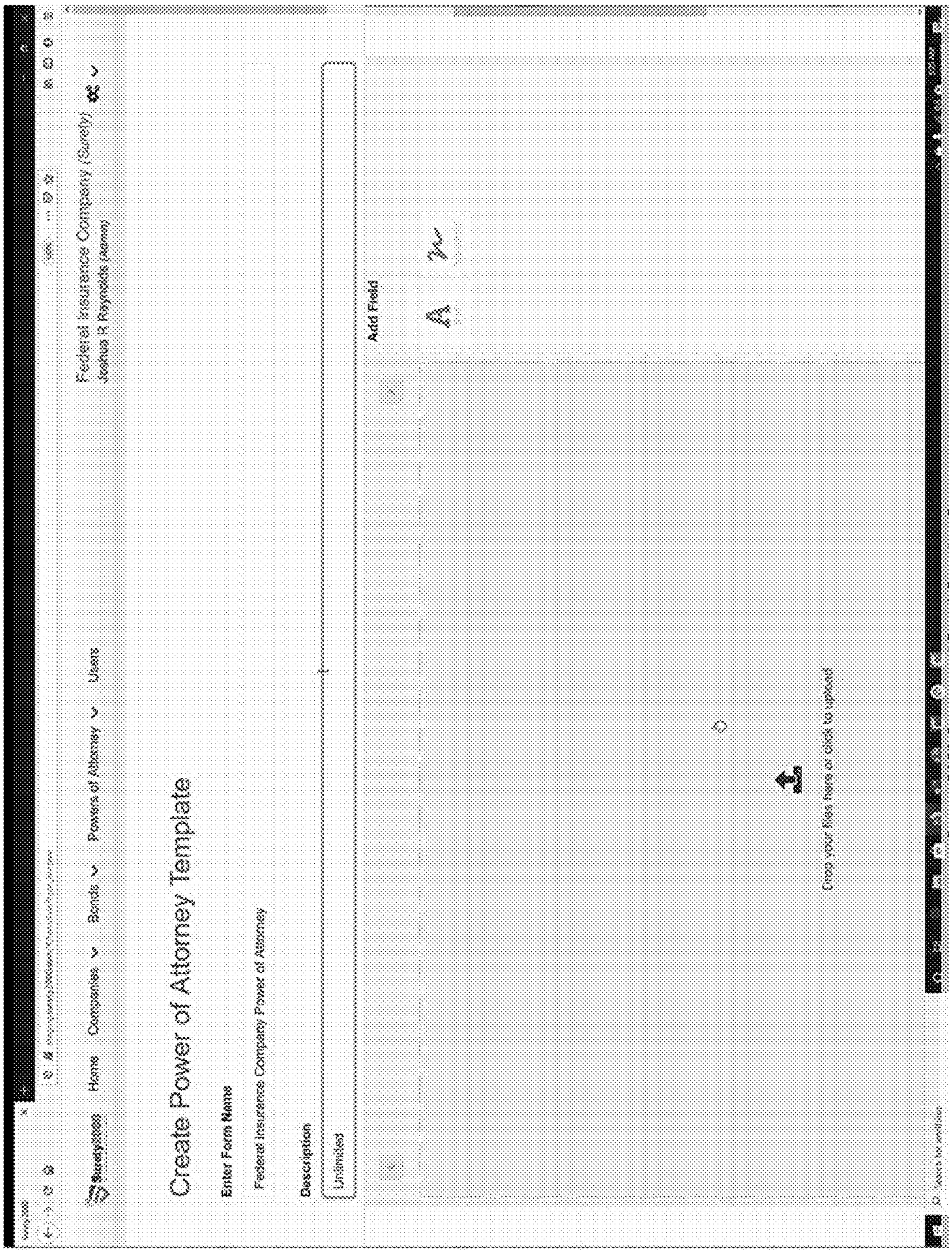
FIG. 10 shows the Create Power of Attorney GUI screen of FIG. 9, but is shown after a form name and description have been entered.

FIG. 10 shows the Create Power of Attorney GUI screen of FIG. 9, but is shown after a form name and description have been entered.

Figure 11:
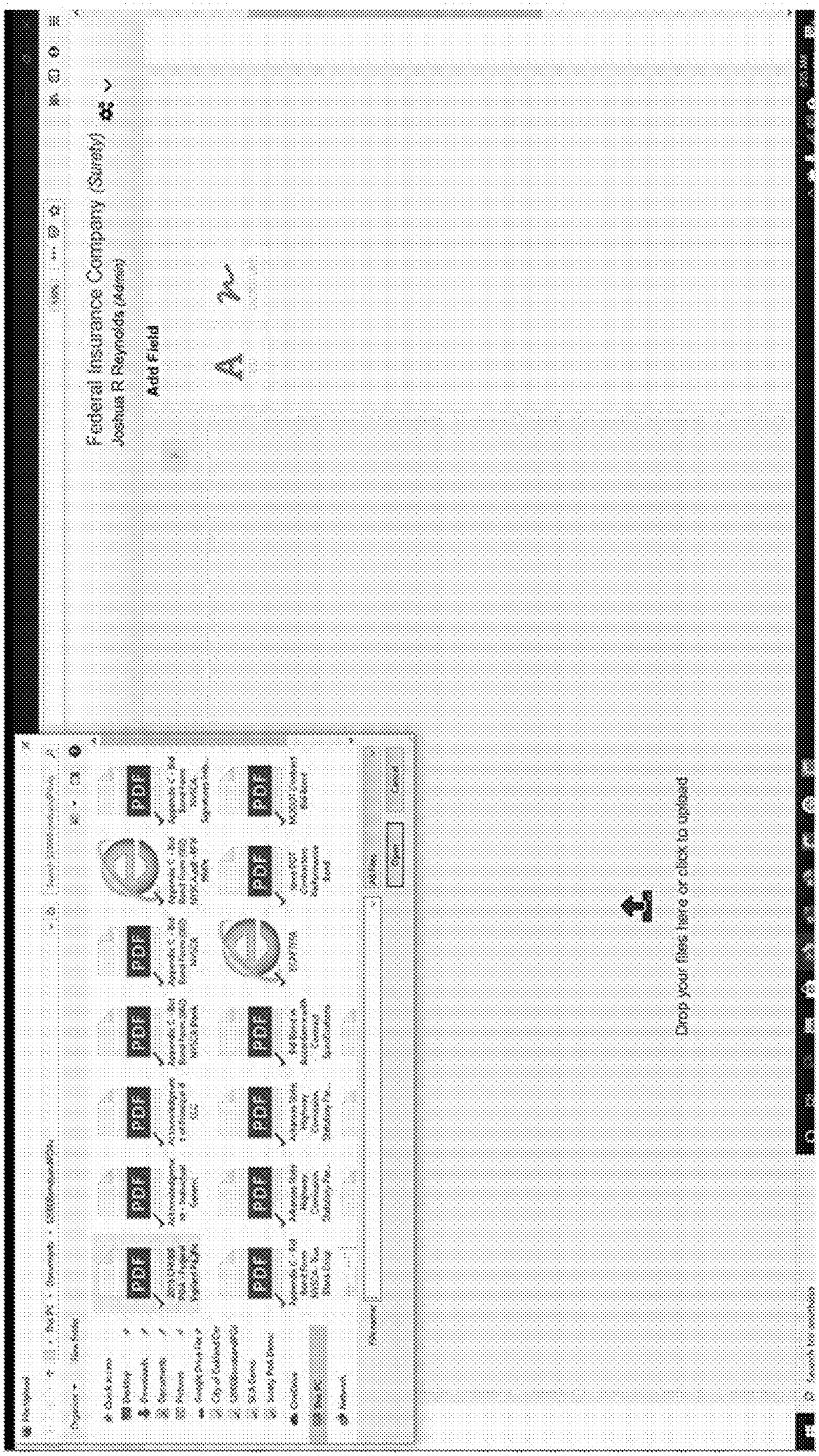
FIG. 11 shows the Create Power of Attorney GUI screen of FIG. 10, but is shown after the "click to upload" button was toggled, resulting in the displaying of a series of power of attorney templates that may be selected.

FIG. 11 shows the Create Power of Attorney GUI screen of FIG. 10, but is shown after the "click to upload" button was toggled, resulting in the displaying of a series of power of attorney templates that may be selected.

Figure 12:
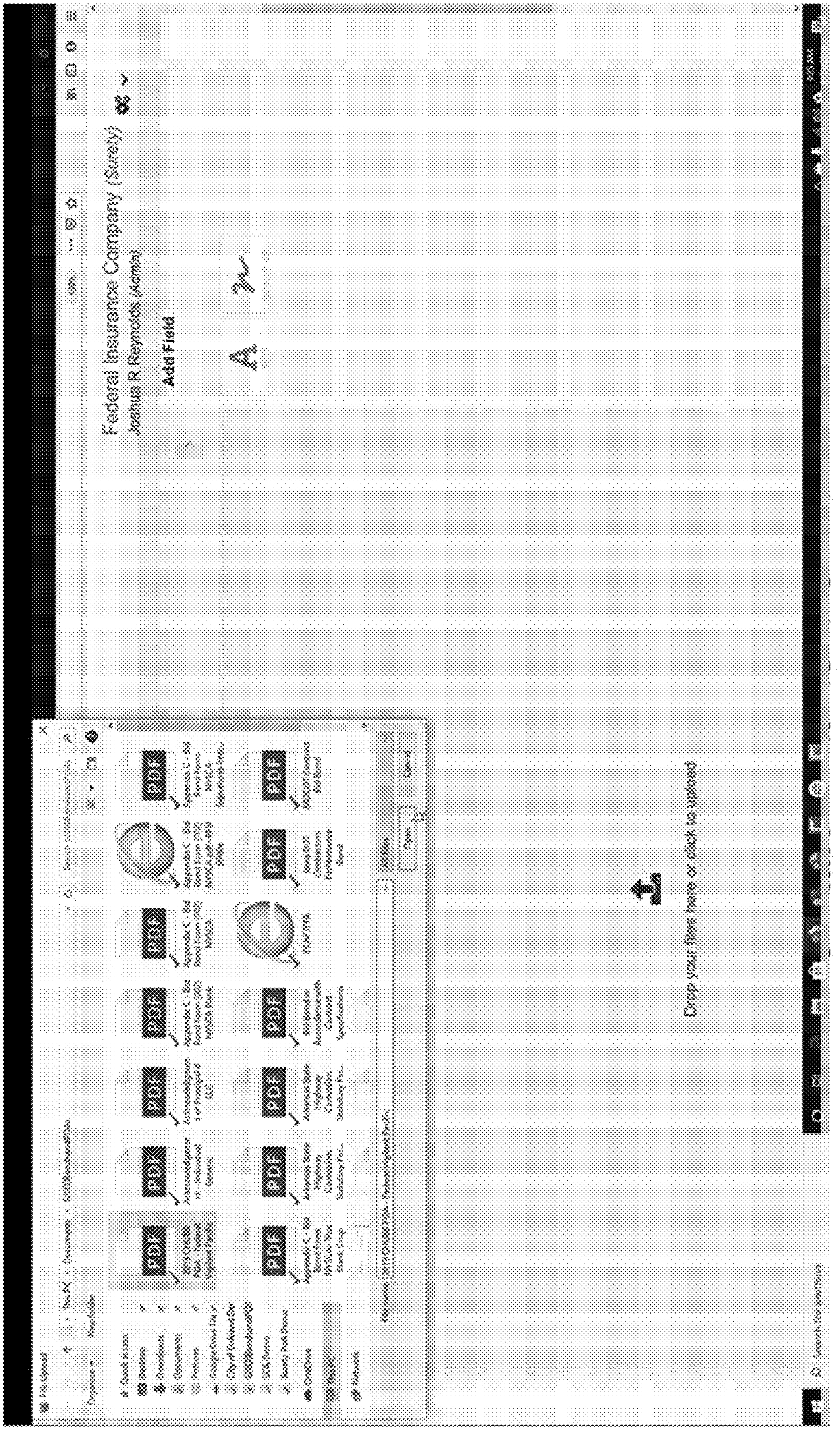
FIG. 12 shows the Create Power of Attorney GUI screen of FIG. 11, but which also shows the cursor placed over the "open" button to accept the selected template.

FIG. 12 shows the Create Power of Attorney GUI screen of FIG. 11, but which also shows the cursor placed over the "open" button to accept the selected template.

Figure 13:
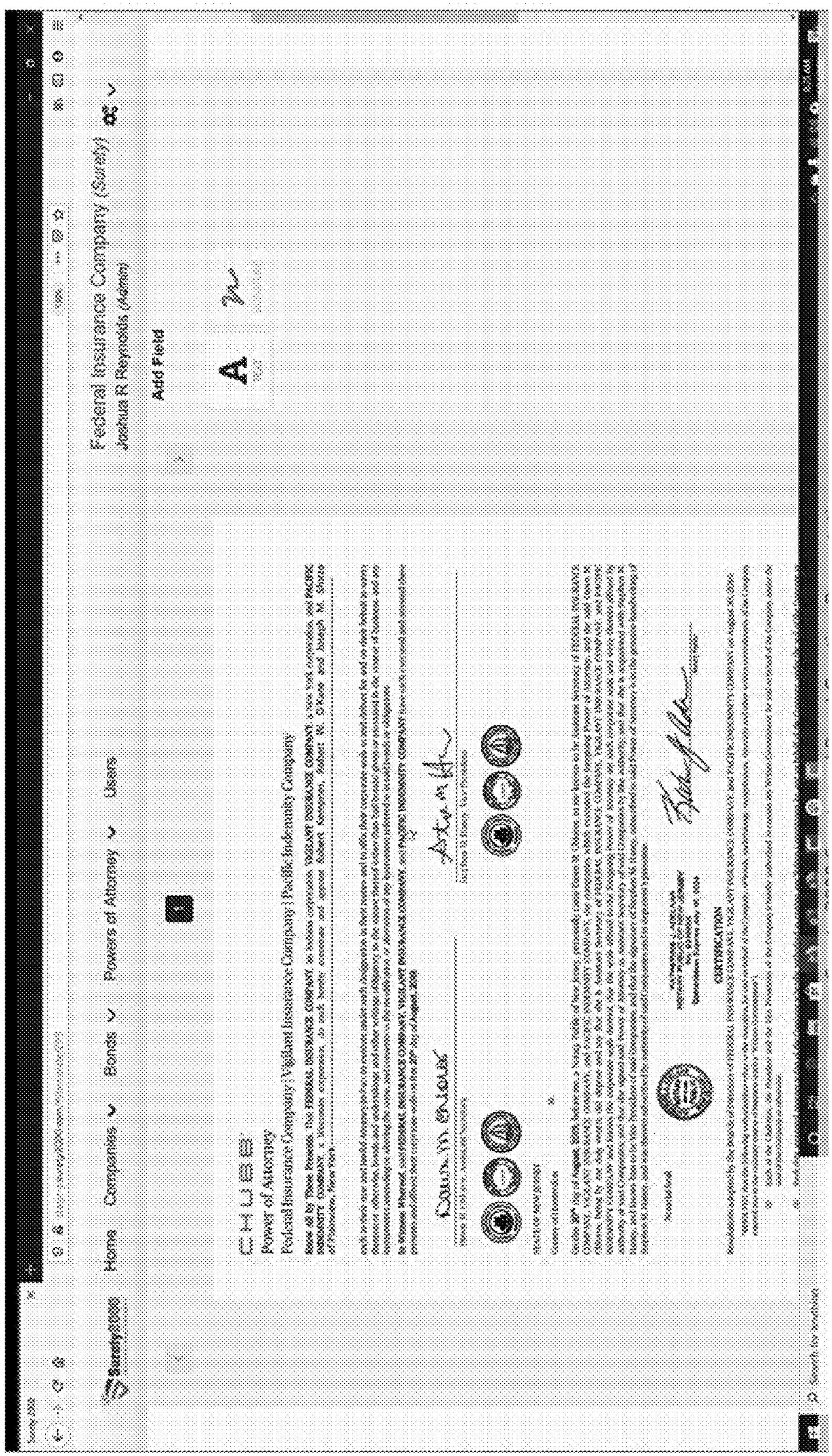
FIG. 13 shows the GUI screen of FIG. 12, with the uploaded power of attorney template that was selected.

FIG. 13 shows the GUI screen of FIG. 12, with the uploaded power of attorney template that was selected.

Figure 14:
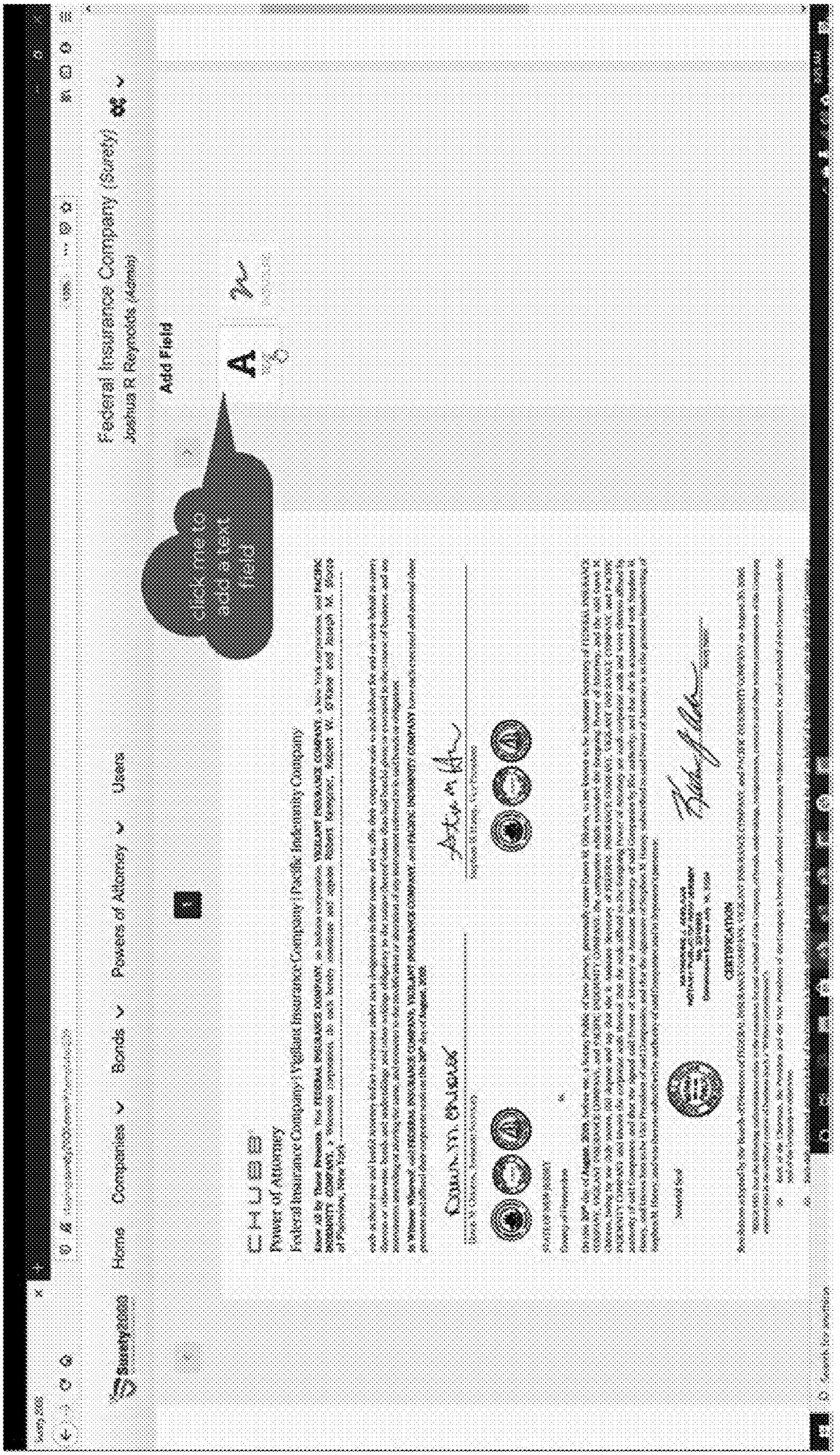
FIG. 14 shows the uploaded power of attorney template as seen in the GUI screen of FIG. 13, but which is also highlighted to indicate the "text" button that may be used for adding test fields to customize the power of attorney template.

FIG. 14 shows the uploaded power of attorney template as seen in the GUI screen of FIG. 13, but which is also highlighted to indicate the "text" button that may be used for adding test fields to customize the power of attorney template.

Figure 15:
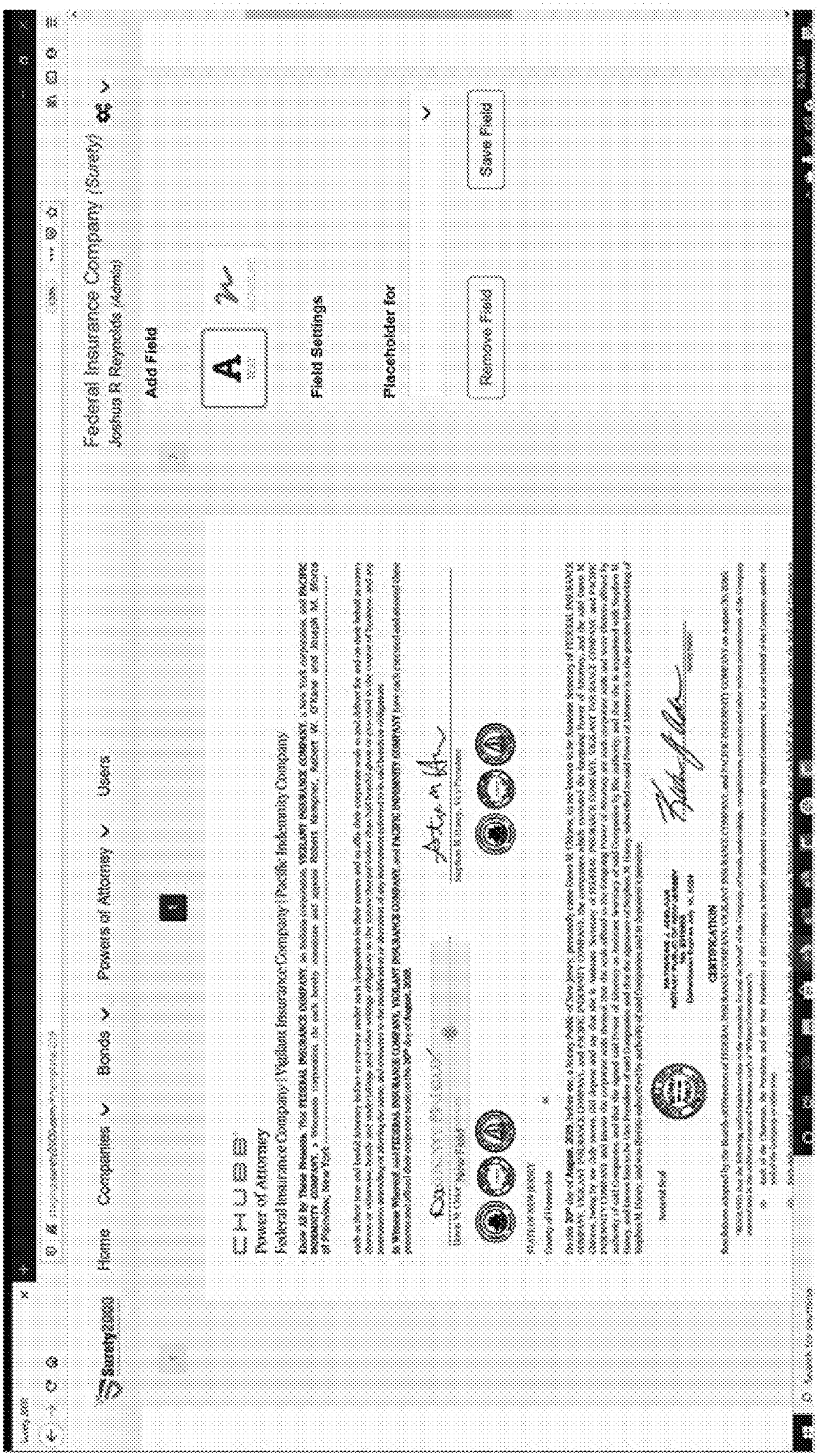
FIG. 15 shows the uploaded power of attorney template as seen in the GUI screen of FIG. 14, and a text field that was added as a result of toggling the "text" button'

FIG. 15 shows the uploaded power of attorney template as seen in the GUI screen of FIG. 14, and a text field that was added as a result of toggling the "text" button.

Figure 16:
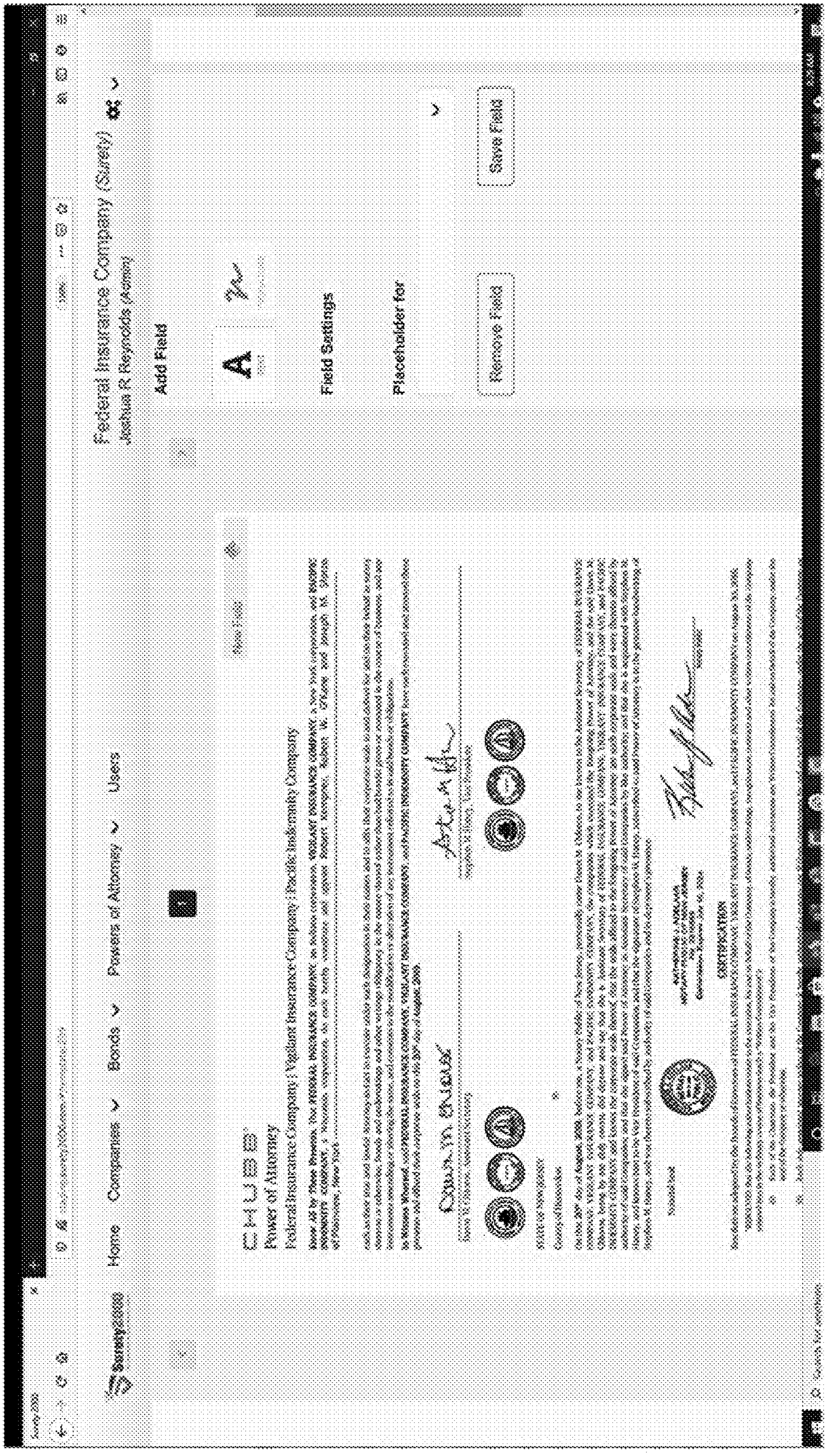
FIG. 16 shows the uploaded power of attorney template with an added text field as seen in the GUI screen of FIG. 15, but is shown after the dimensions of the text field have been modified by dragging its edges, and after the text field has been dragged to its desired position on the template.

FIG. 16 shows the uploaded power of attorney template with an added text field as seen in the GUI screen of FIG. 15, but is shown after the dimensions of the text field have been modified by dragging its edges, and after the text field has been dragged to its desired position on the template.

Figure 17:
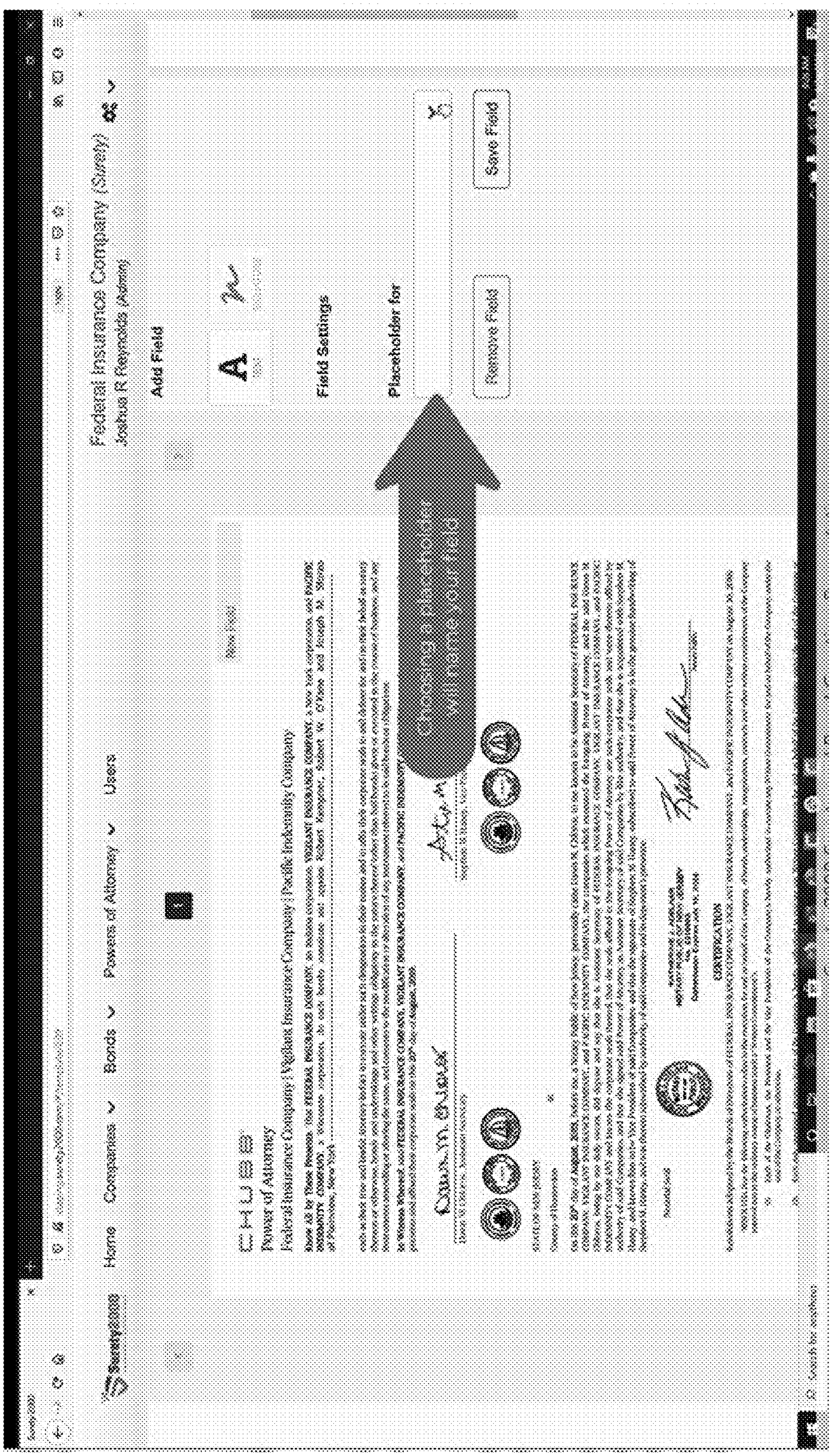
FIG. 17 shows the uploaded power of attorney template with an added and modified text field as seen in the GUI screen of FIG. 16, but also highlights the text box into which may be entered the placeholder for the added text field.

FIG. 17 shows the uploaded power of attorney template with an added and modified text field as seen in the GUI screen of FIG. 16, but also highlights the text box into which may be entered the placeholder for the added text field.

Figure 18:
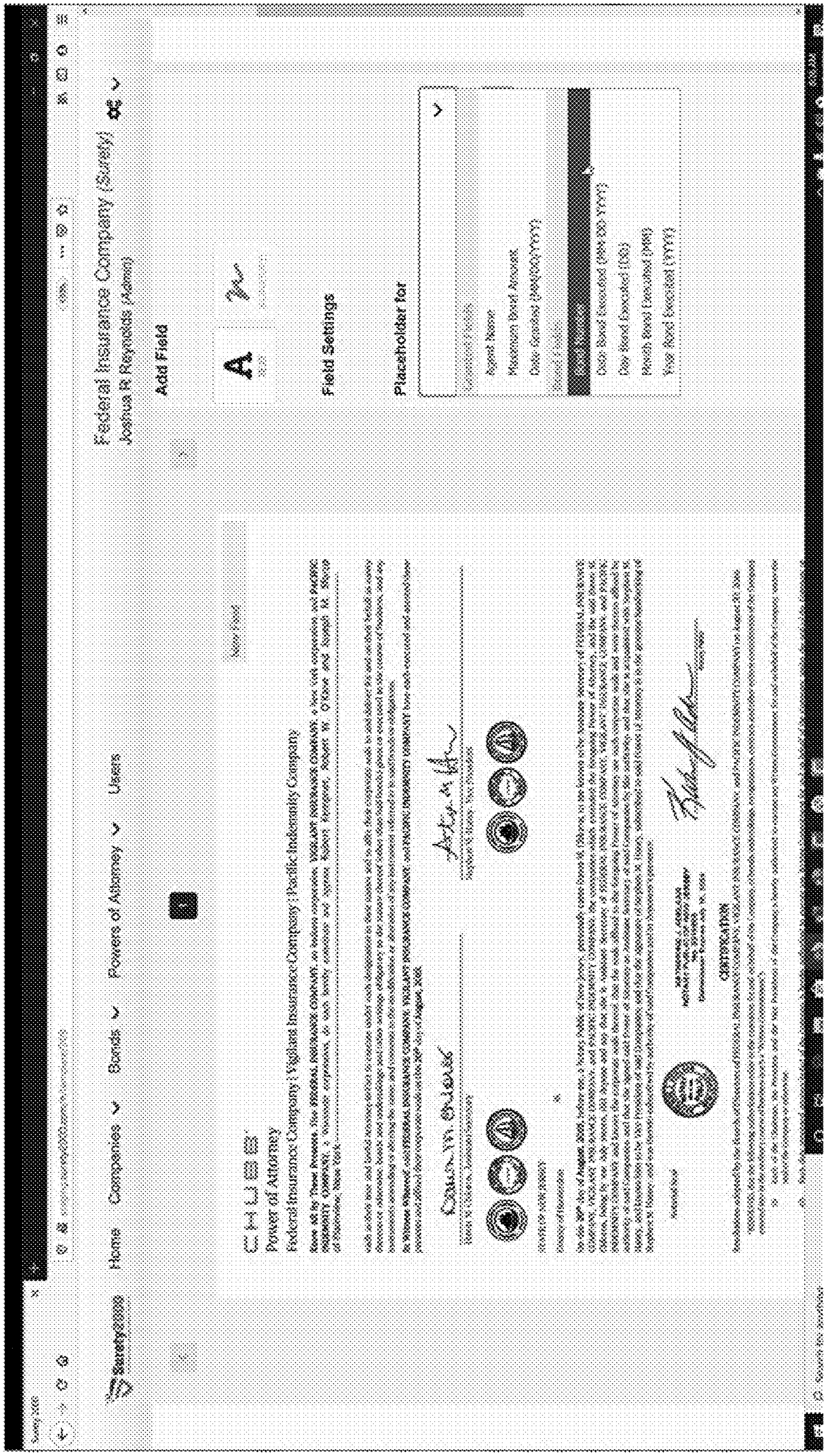
FIG. 18 shows the power of attorney template of the GUI screen of FIG. 17, but after the user has toggled the dropdown list for the placeholder, and has highlighted the option to choose "Bond Number" for the text field.

FIG. 18 shows the power of attorney template of the GUI screen of FIG. 17, but after the user has toggled the dropdown list for the placeholder, and has highlighted the option to choose "Bond Number" for the text field.

Figure 19:
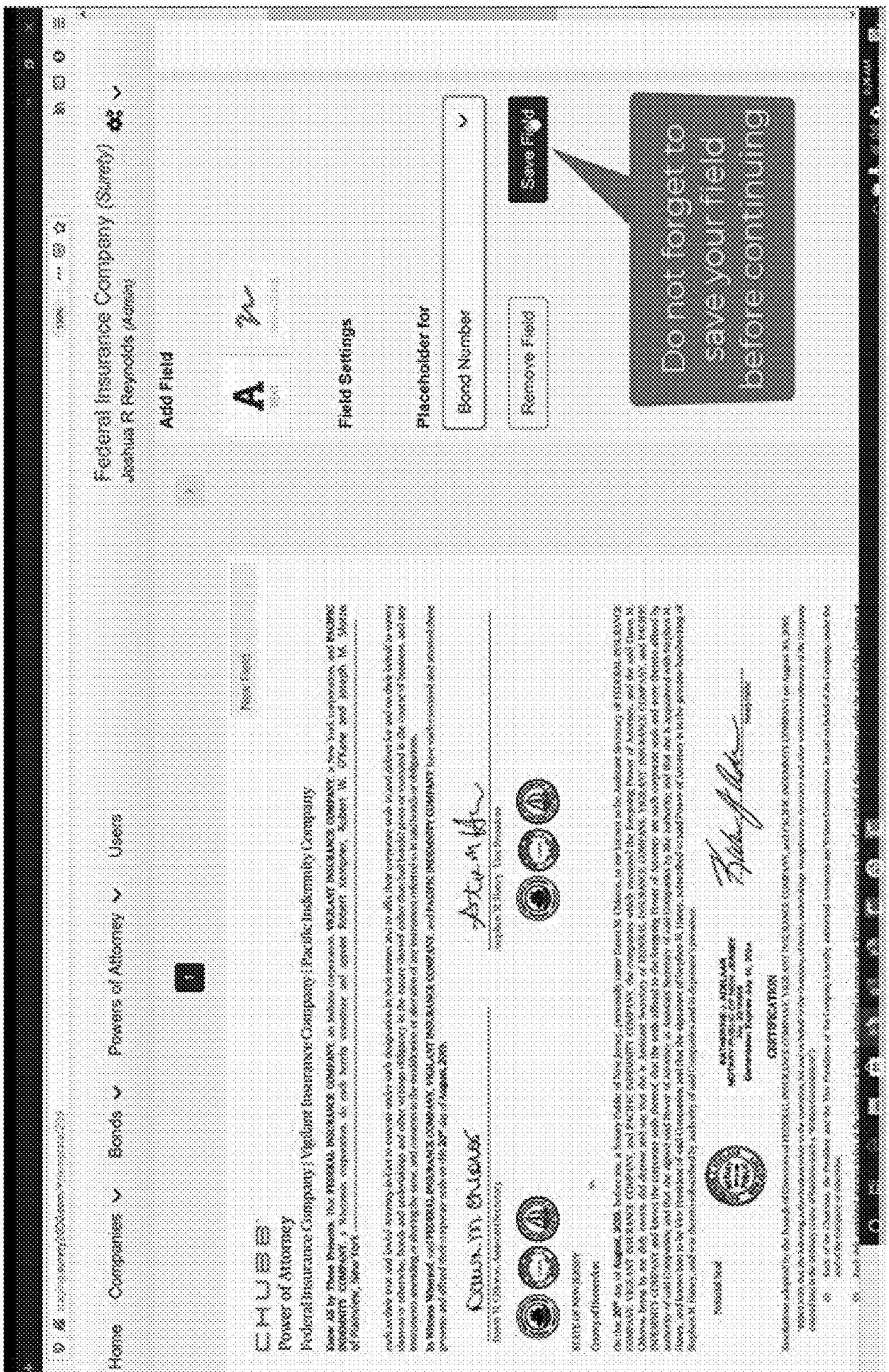
FIG. 19 shows the power of attorney template of the GUI screen of FIG. 18, after the "Bond Number" option has been selected, and highlights to the user that the "save field" button must be toggled to retain the field just created.

FIG. 19 shows the power of attorney template of the GUI screen of FIG. 18, after the "Bond Number" option has been selected, and highlights to the user that the "save field" button must be toggled to retain the field just created.

Figure 20:
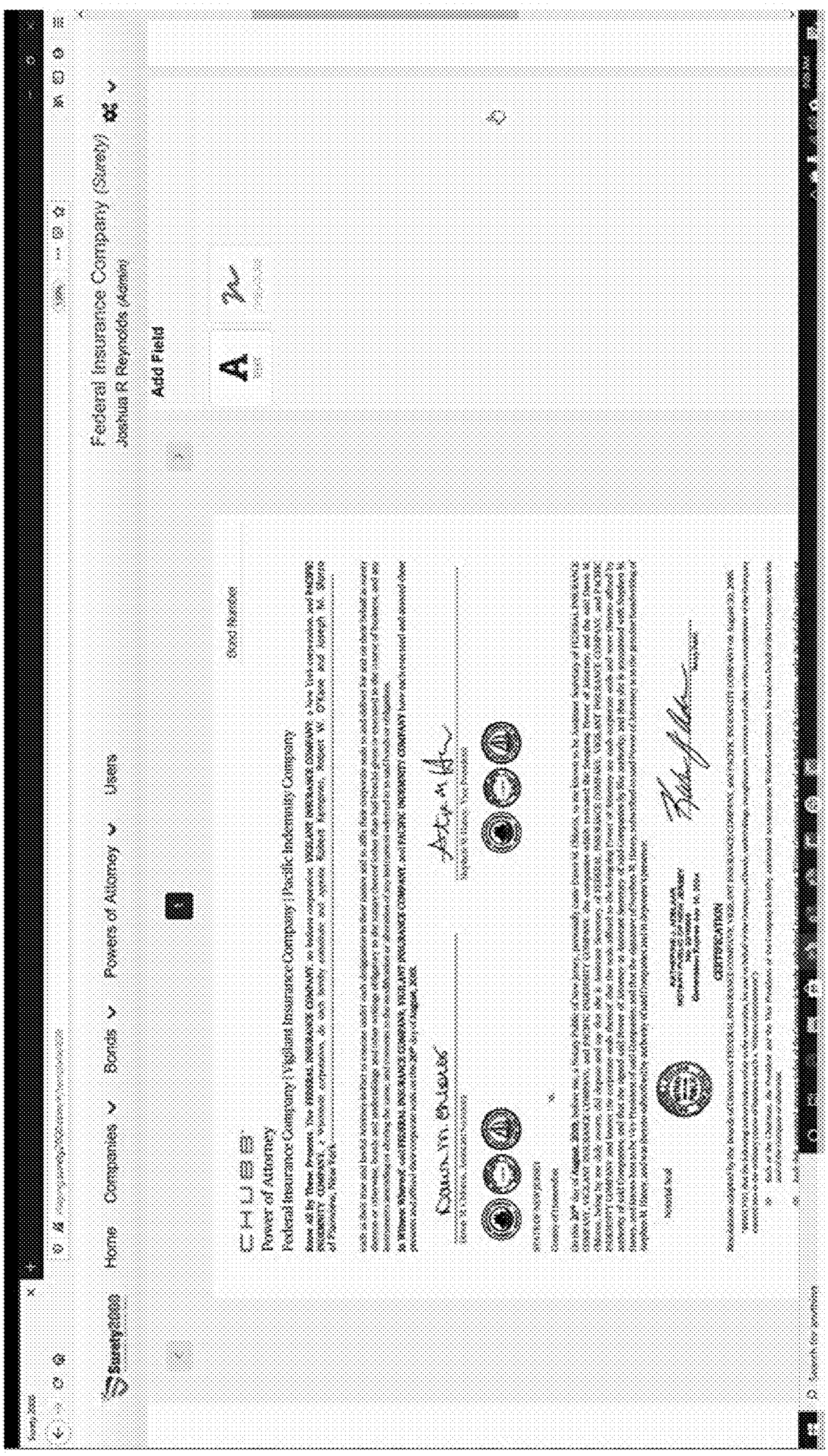
FIG. 20 shows the power of attorney template of the GUI screen of FIG. 19, after the "savefield" button has been toggled, and the text field is now labeled as "Bond Number"

FIG. 20 shows the power of attorney template of the GUI screen of FIG. 19, after the "savefield" button has been toggled, and the text field is now labeled as "Bond Number".

Figure 21:
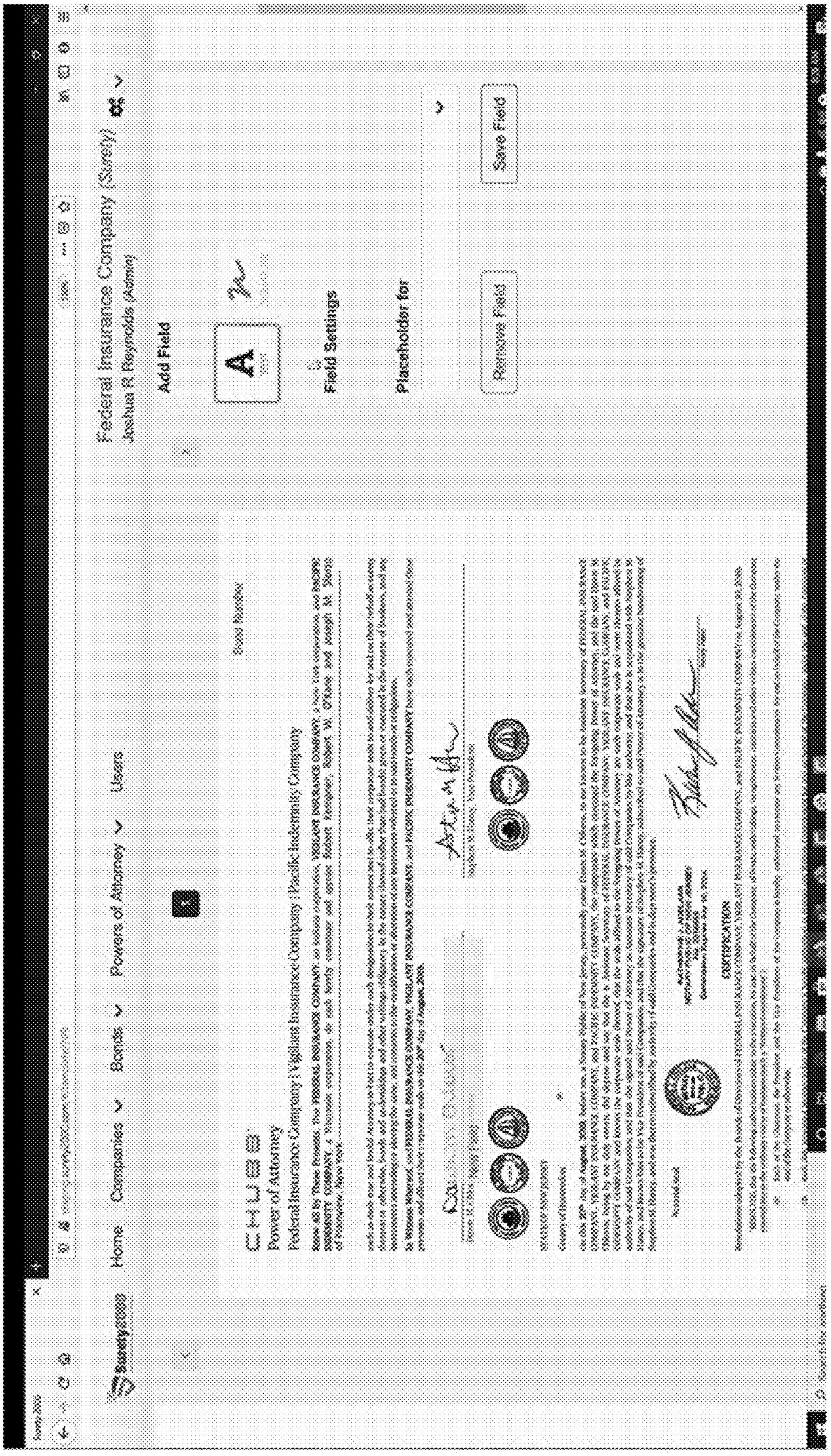
FIG. 21 shows the power of attorney template of the GUI screen of FIG. 20, after the "textfield" button has been toggled to add a second text field to the template.

FIG. 21 shows the power of attorney template of the GUI screen of FIG. 20, after the "textfield" button has been toggled to add a second text field to the template.

Figure 22:
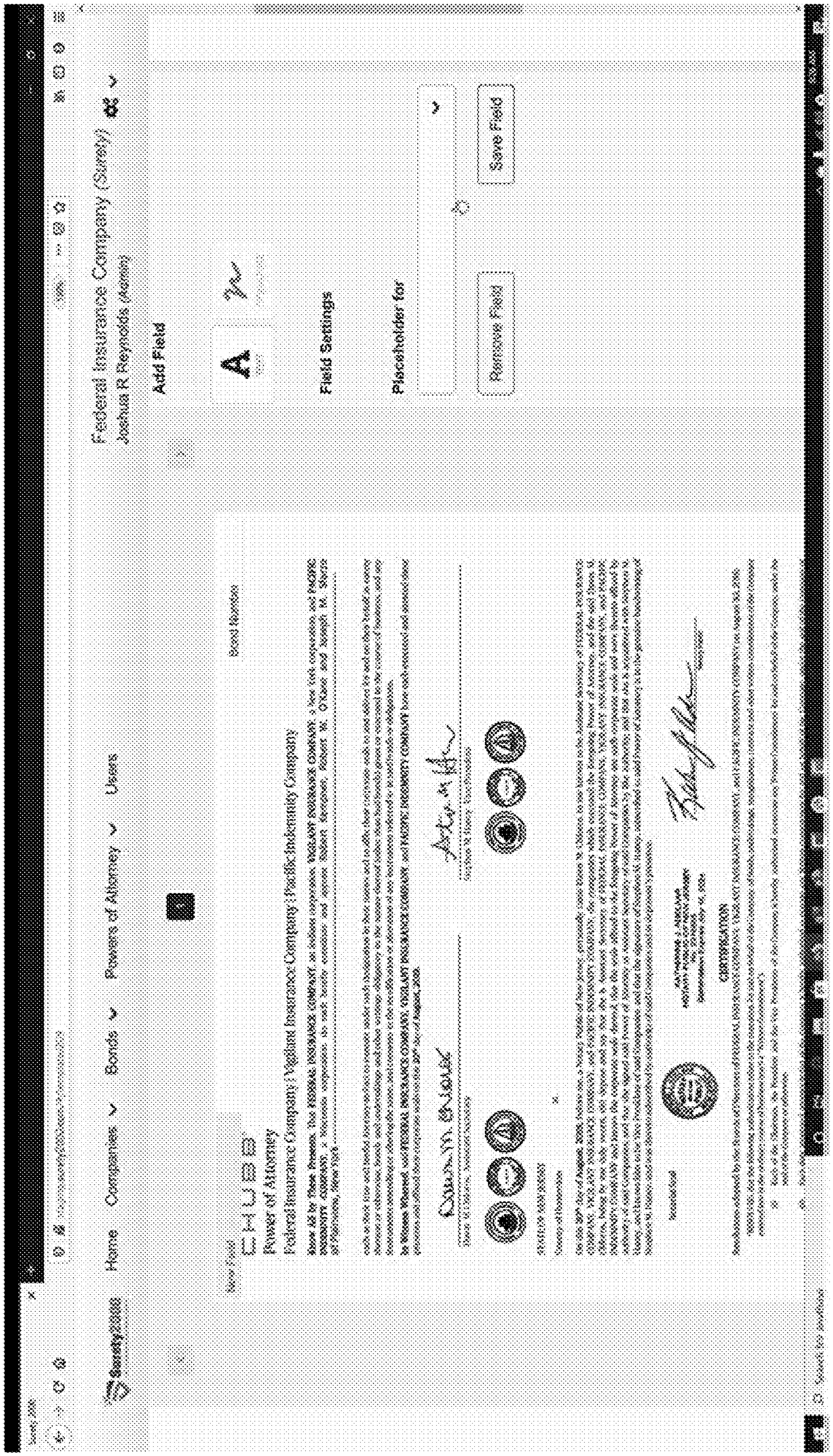
FIG. 22 shows the power of attorney template of the GUI screen of FIG. 21, after the second added text field has be resized, and repositioned to the upper left corner.

FIG. 22 shows the power of attorney template of the GUI screen of FIG. 21, after the second added text field has be resized, and repositioned to the upper left corner.

Figure 23:
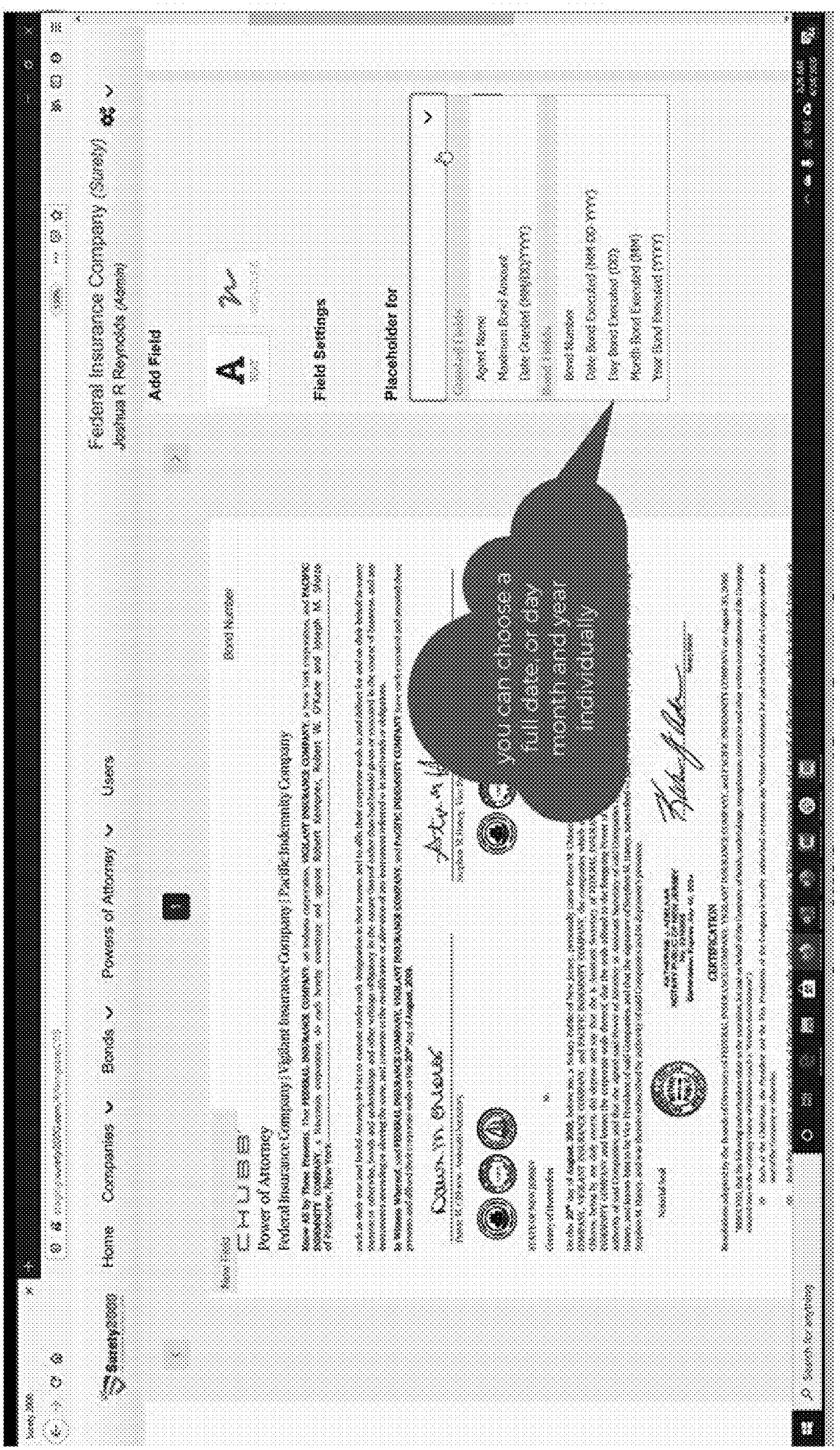
FIG. 23 shows the power of attorney template of the GUI screen of FIG. 22, but is shown after the user has toggled the dropdown list for the placeholder, and is shown with the options for the date highlighted for the reader.

FIG. 23 shows the power of attorney template of the GUI screen of FIG. 22, but is shown after the user has toggled the dropdown list for the placeholder, and is shown with the options for the date highlighted for the reader.

Figure 24:
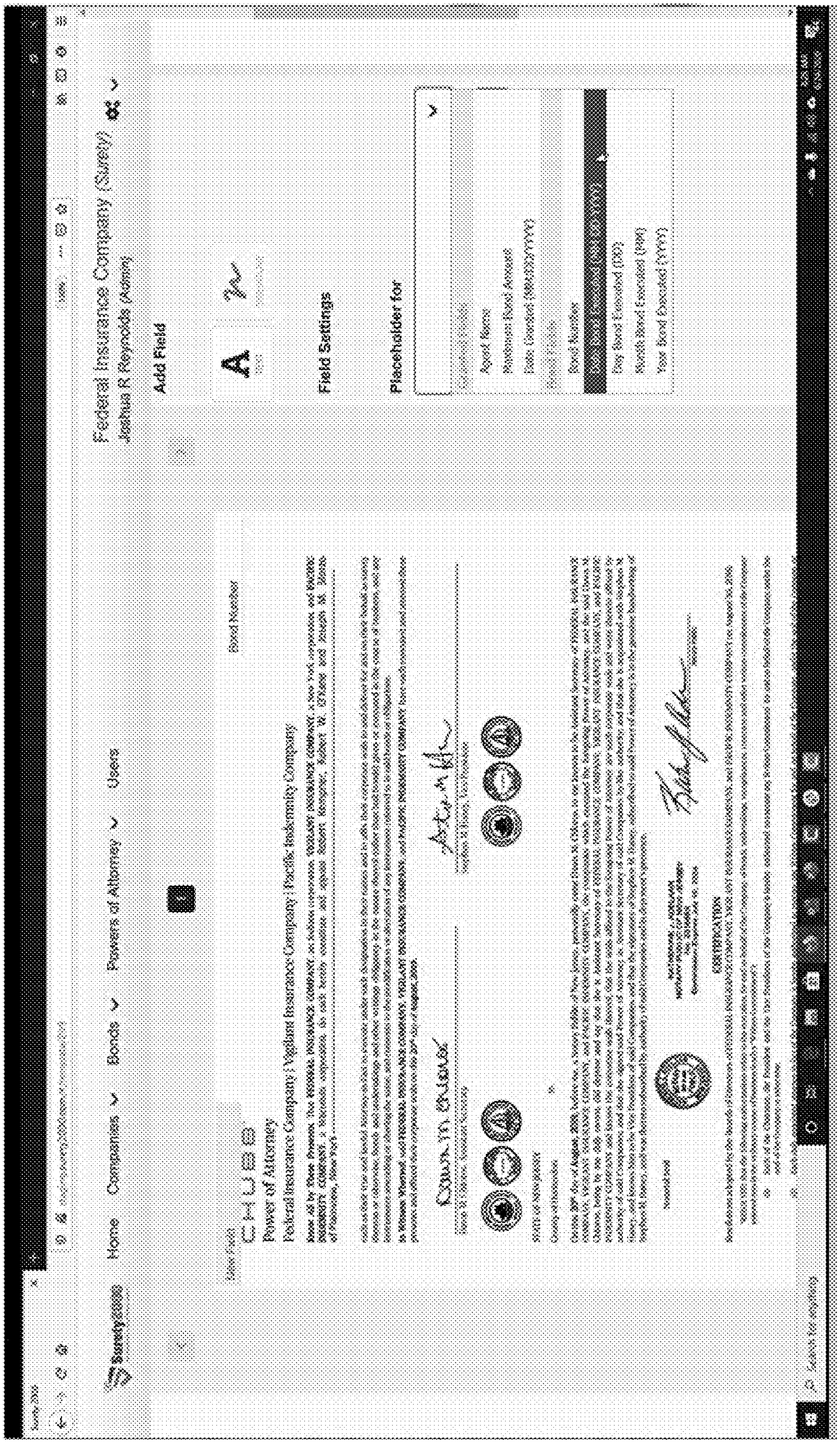
FIG. 24 shows the power of attorney template of the GUI screen of FIG. 23, but is shown with the user highlighting, in the dropdown list, the "Date Bond Executed (MM-DD-YYYY)" option for the placeholder.

FIG. 24 shows the power of attorney template of the GUI screen of FIG. 23, but is shown with the user highlighting, in the dropdown list, the "Date Bond Executed (MM-DD-YYYY)" option for the placeholder.

Figure 25:
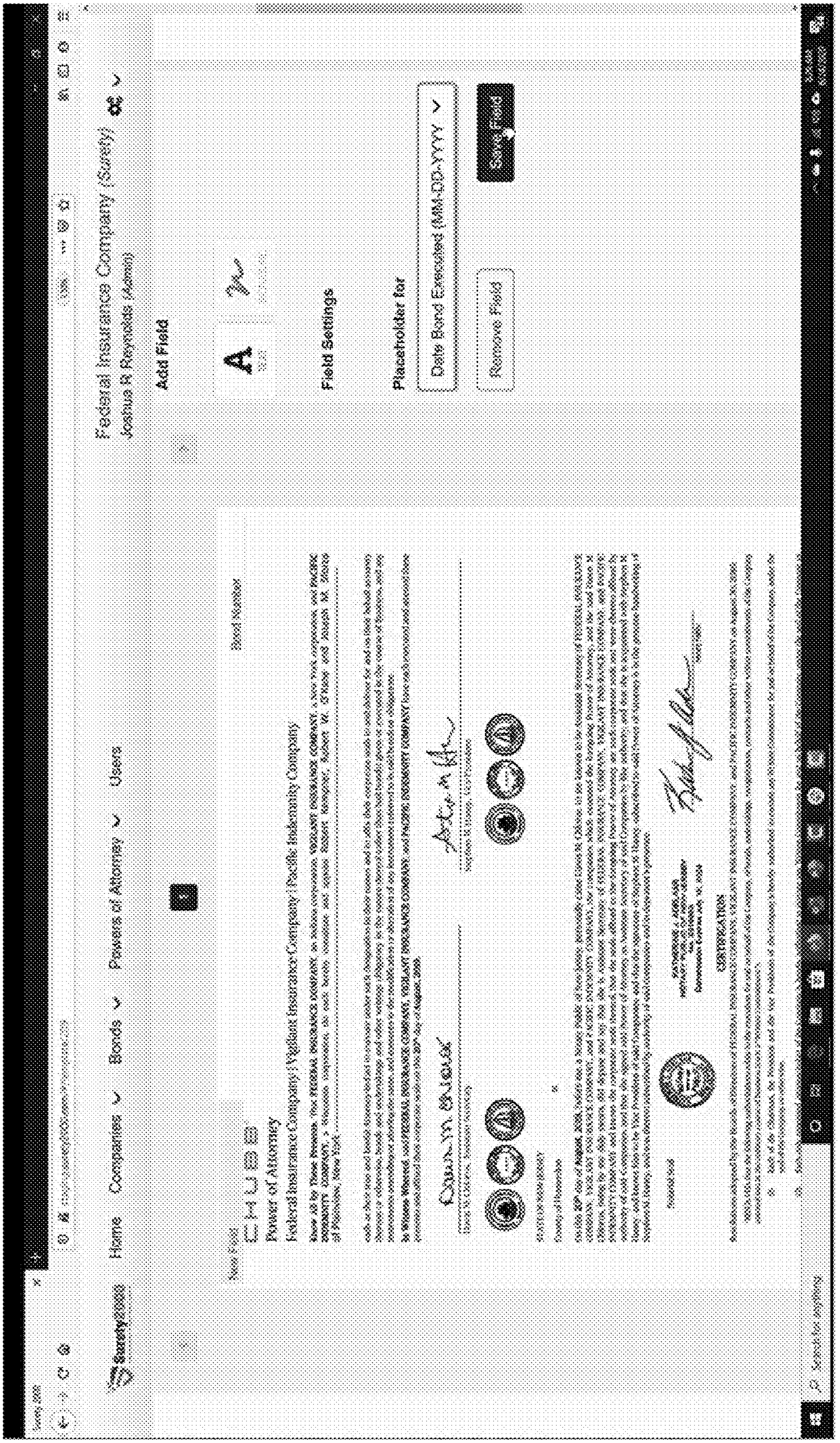
FIG. 25 shows the power of attorney template of the GUI screen of FIG. 24, but is shown after the user has selected the "Date Bond Executed (MM-DD-YYYY)" option for the placeholder from the dropdown list.

FIG. 25 shows the power of attorney template of the GUI screen of FIG. 24, but is shown after the user has selected the "Date Bond Executed (MM-DD-YYYY)" option for the placeholder from the dropdown list.

Figure 26:
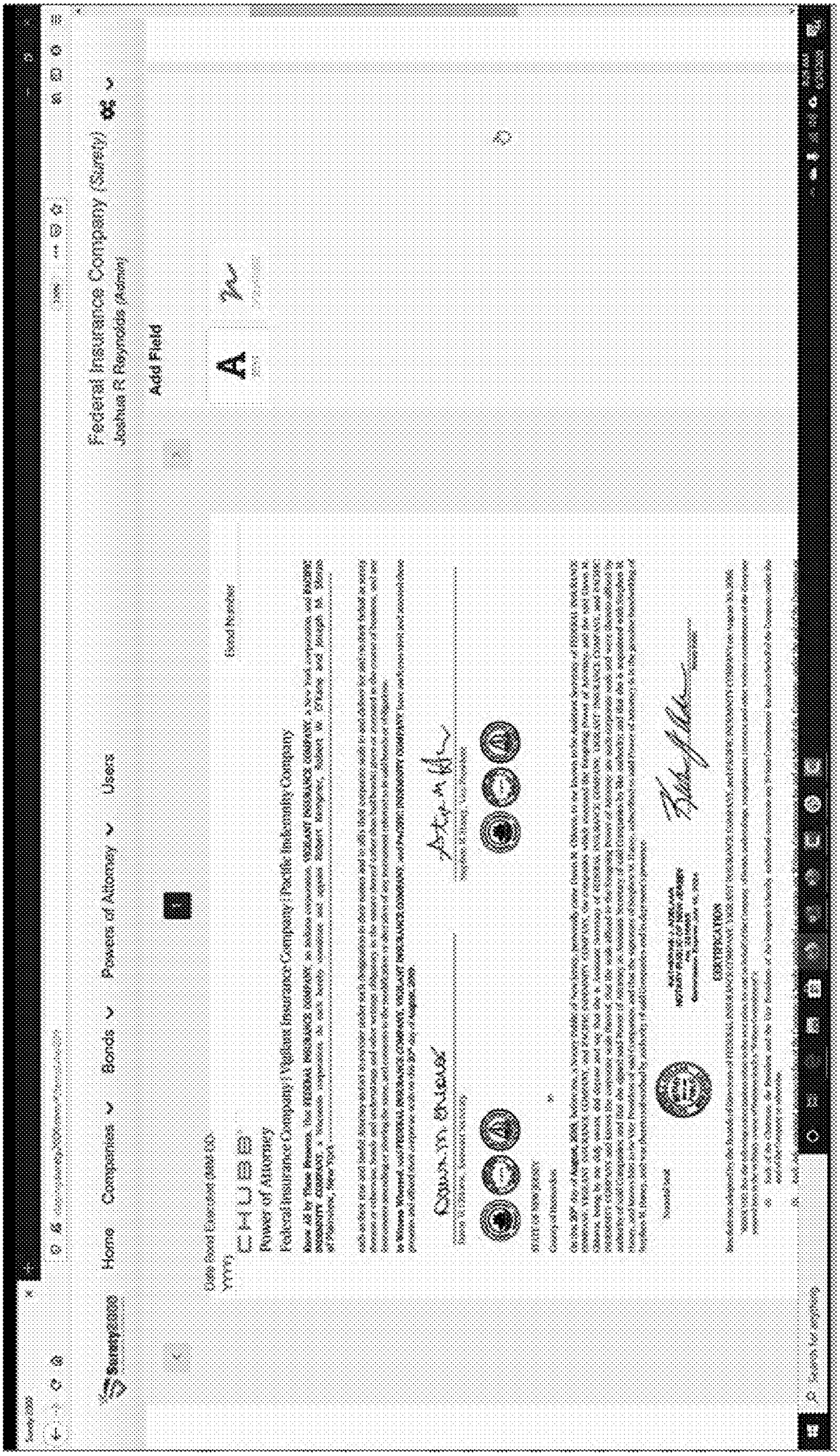
FIG. 26 shows the power of attorney template of the GUI screen of FIG. 25, but is shown after the user has saved the "Date Bond Executed (MM-DD-YYYY)" option for the placeholder from the dropdown list, and showing the text field in the upper left-hand corner being too small for the selected placeholder, with the text extending onto a second line.

FIG. 26 shows the power of attorney template of the GUI screen of FIG. 25, but is shown after the user has saved the "Date Bond Executed (MM-DD-YYYY)" option for the placeholder from the dropdown list, and showing the text field in the upper left-hand corner being too small for the selected placeholder, with the text extending onto a second line.

Figure 27:
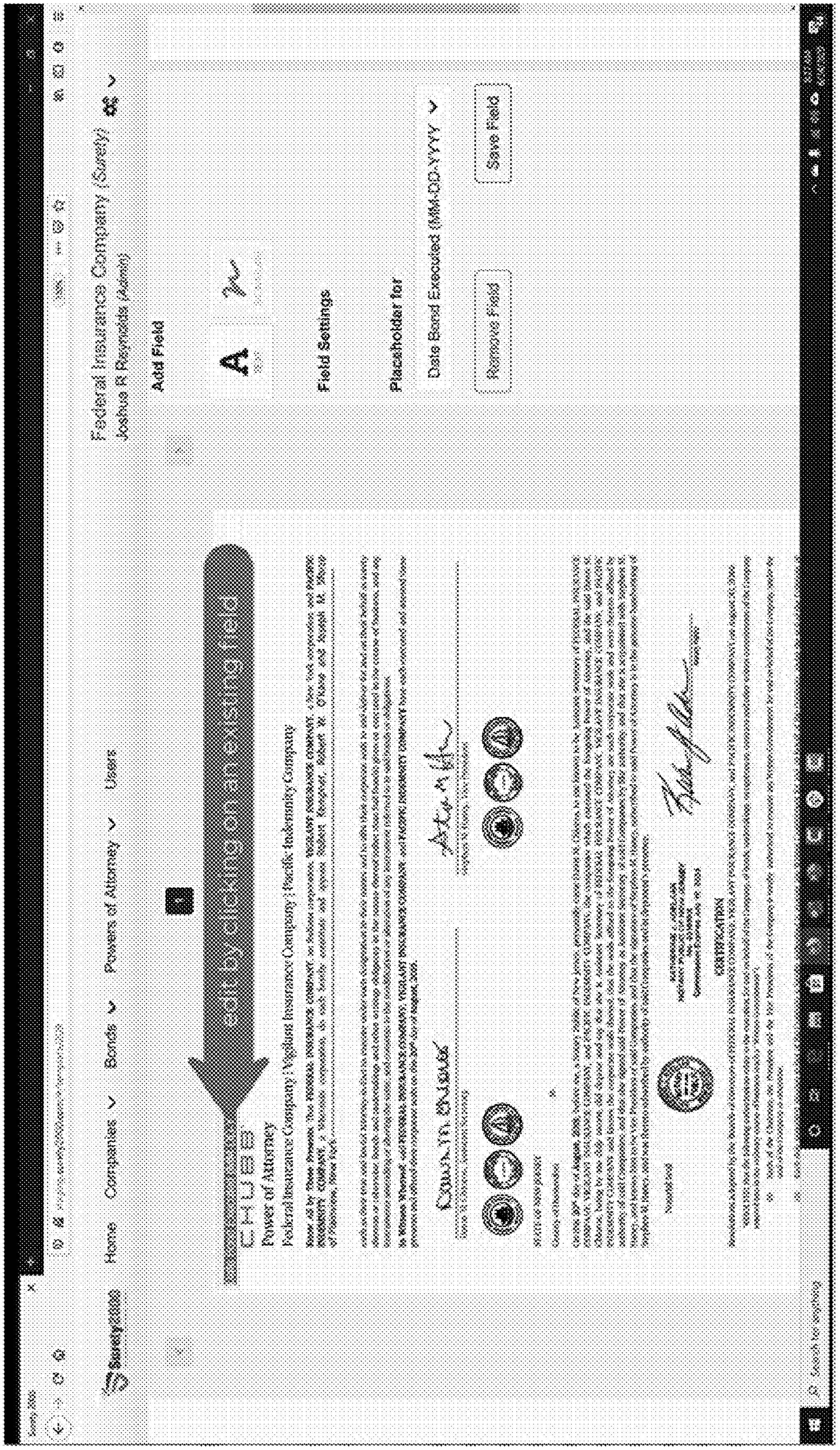
FIG. 27 shows the power of attorney template of the GUI screen of FIG. 26, but is shown after the user has edited the length of the text field for the "Date Bond Executed (MM-DD-YYYY)" placeholder to be positioned on a single line, and is shown highlighted for the reader as reminder that it can be edited simply by selecting the text field.

FIG. 27 shows the power of attorney template of the GUI screen of FIG. 26, but is shown after the user has edited the length of the text field for the "Date Bond Executed (MM-DD-YYYY)" placeholder to be positioned on a single line, and is shown highlighted for the reader as reminder that it can be edited simply by selecting the text field.

Figure 28:
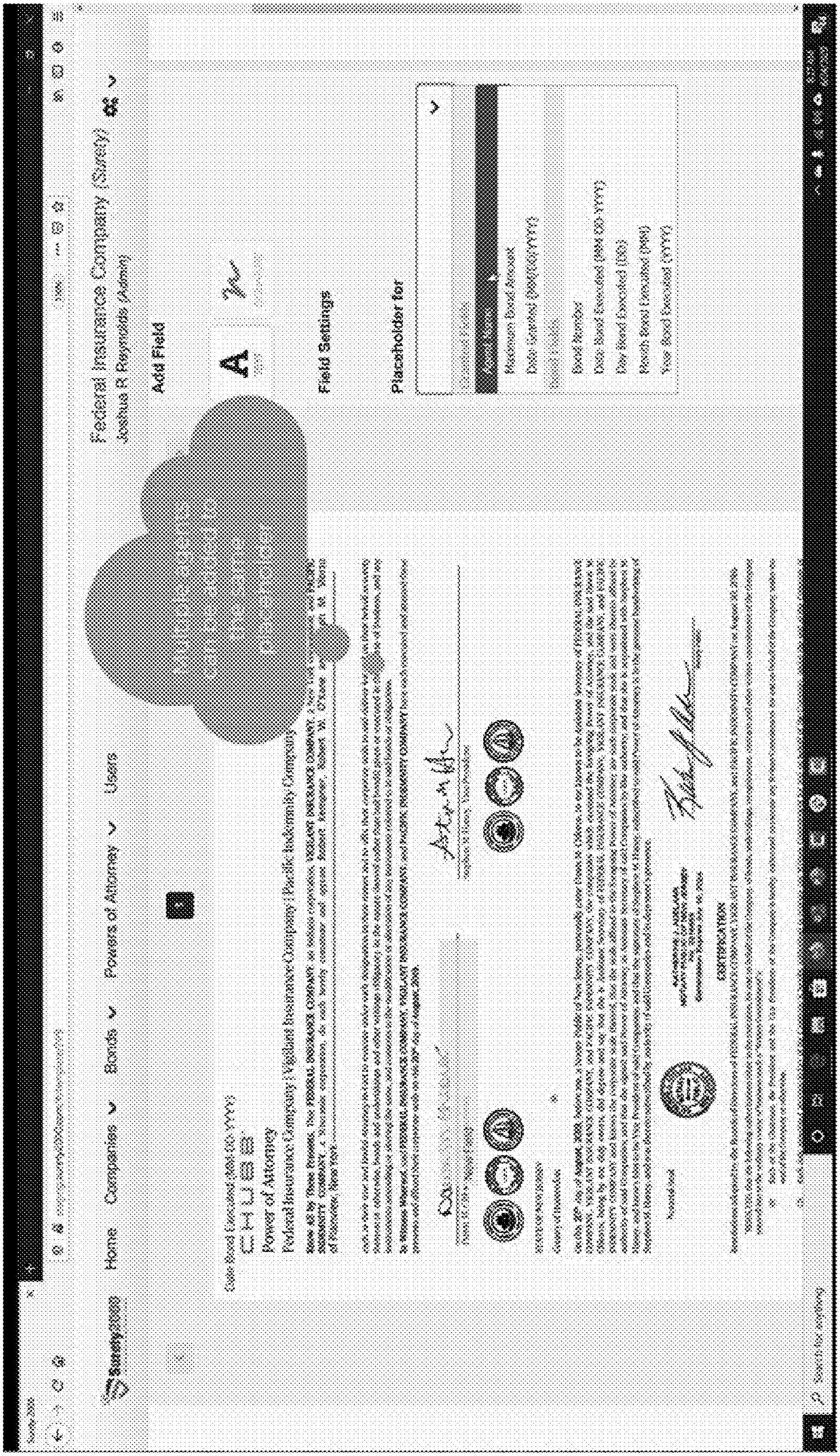
FIG. 28 shows the power of attorney template of the GUI screen of FIG. 27, but is shown after a third text field has been added, but with the user highlighting, in the dropdown list, the "Agent Name" option for the placeholder, and is shown highlighted to inform the reader that multiple agent names can be added to the same placeholder.

FIG. 28 shows the power of attorney template of the GUI screen of FIG. 27, but is shown after a third text field has been added, but with the user highlighting, in the dropdown list, the "Agent Name" option for the placeholder, and is shown highlighted to inform the reader that multiple agent names can be added to the same placeholder.

Figure 29:
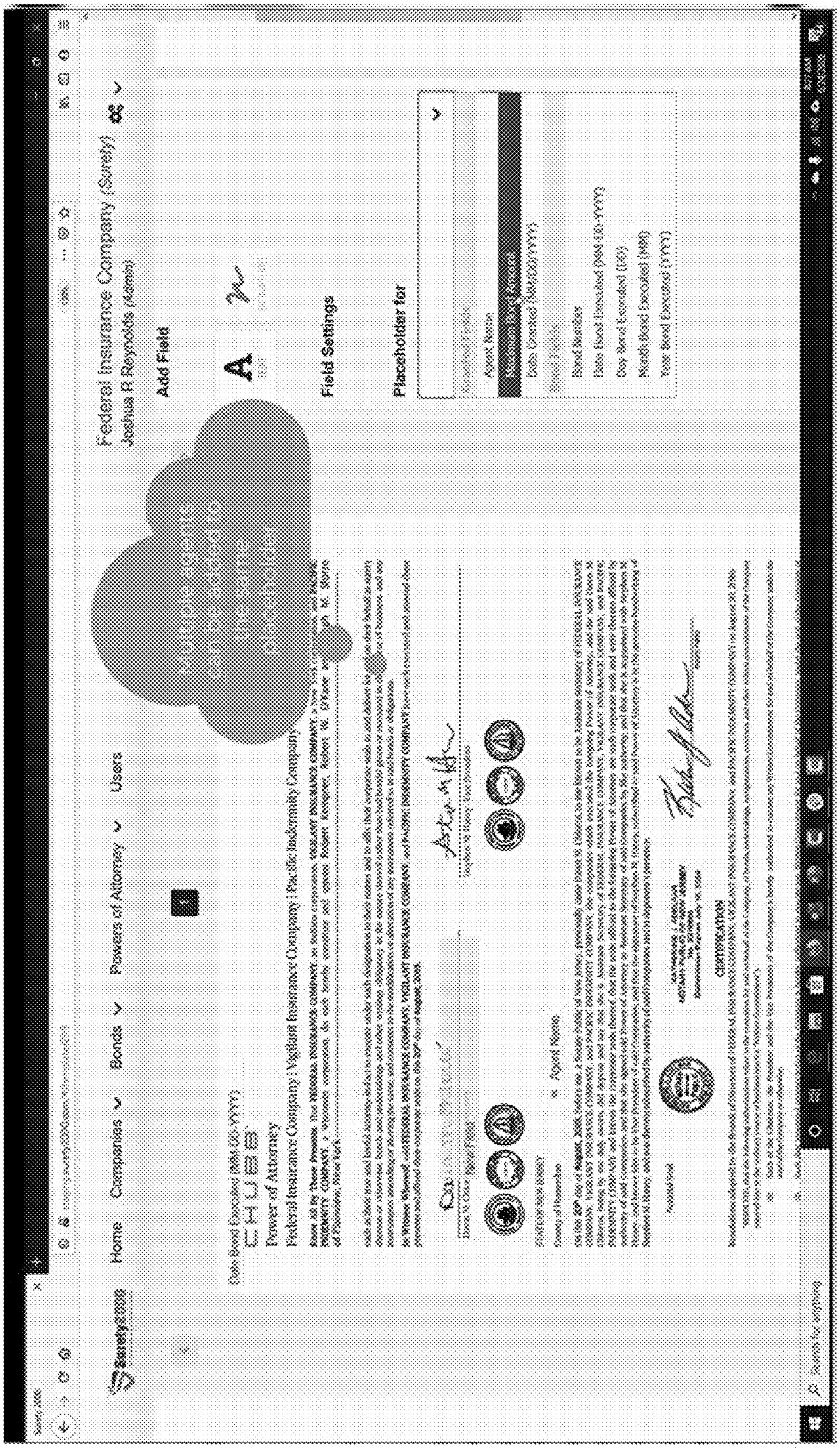
FIG. 29 shows the power of attorney template of the GUI screen of FIG. 28, but is shown after the "Agent Name" placeholder has been saved for the third text field, and after a fourth text field has been added, being also shown with the user highlighting, in the dropdown list, the "Maximum Bond Amount" option for the placeholder for the fourth text field.

FIG. 29 shows the power of attorney template of the GUI screen of FIG. 28, but is shown after the "Agent Name" placeholder has been saved for the third text field, and after a fourth text field has been added, being also shown with the user highlighting, in the dropdown list, the "Maximum Bond Amount" option for the placeholder for the fourth text field.

Figure 30:
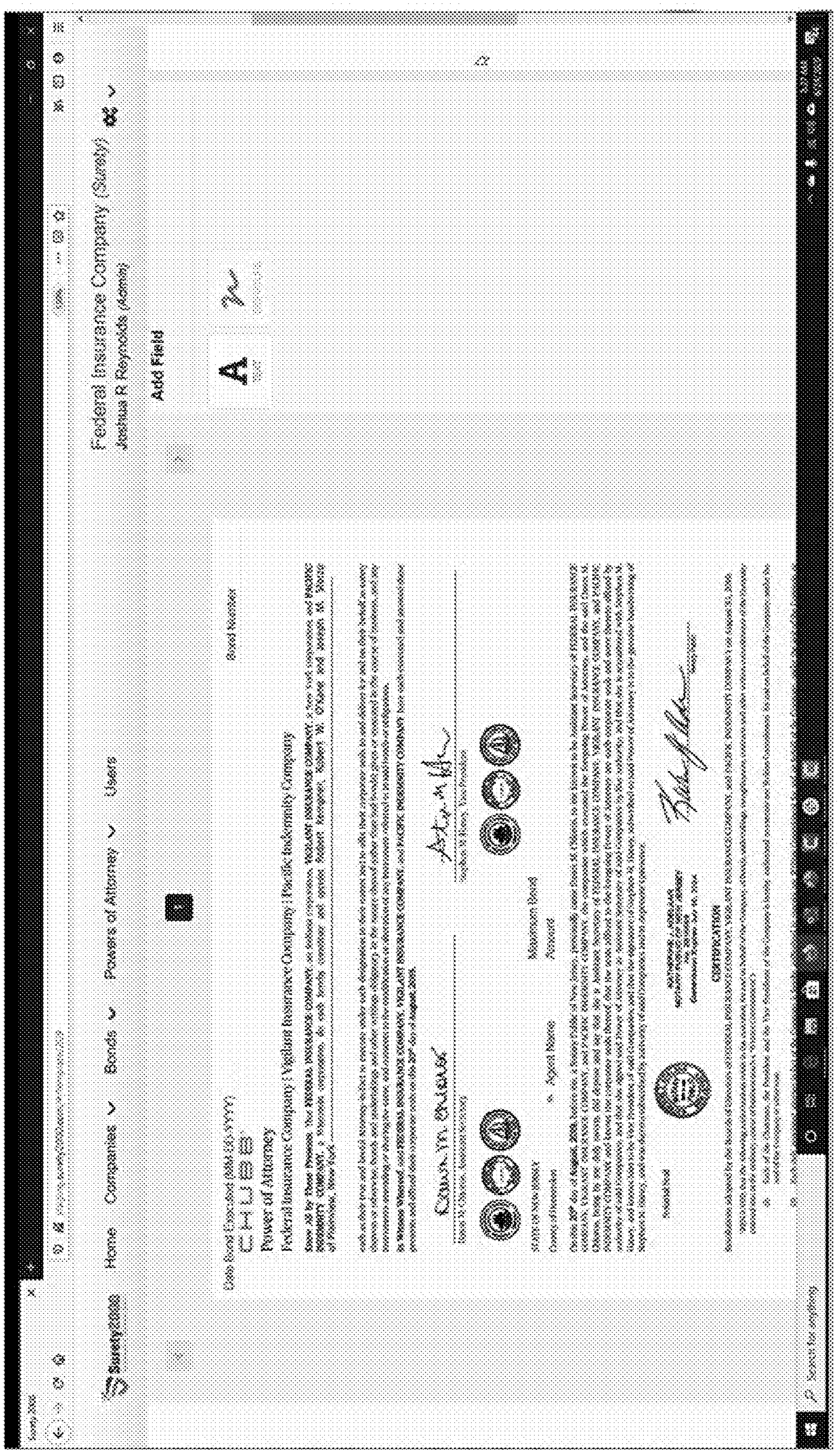
FIG. 30 shows the power of attorney template of the GUI screen of FIG. 29, but is shown after the "Maximum Bond Amount" placeholder has been saved for the fourth text field.

FIG. 30 shows the power of attorney template of the GUI screen of FIG. 29, but is shown after the "Maximum Bond Amount" placeholder has been saved for the fourth text field.

Figure 31A:
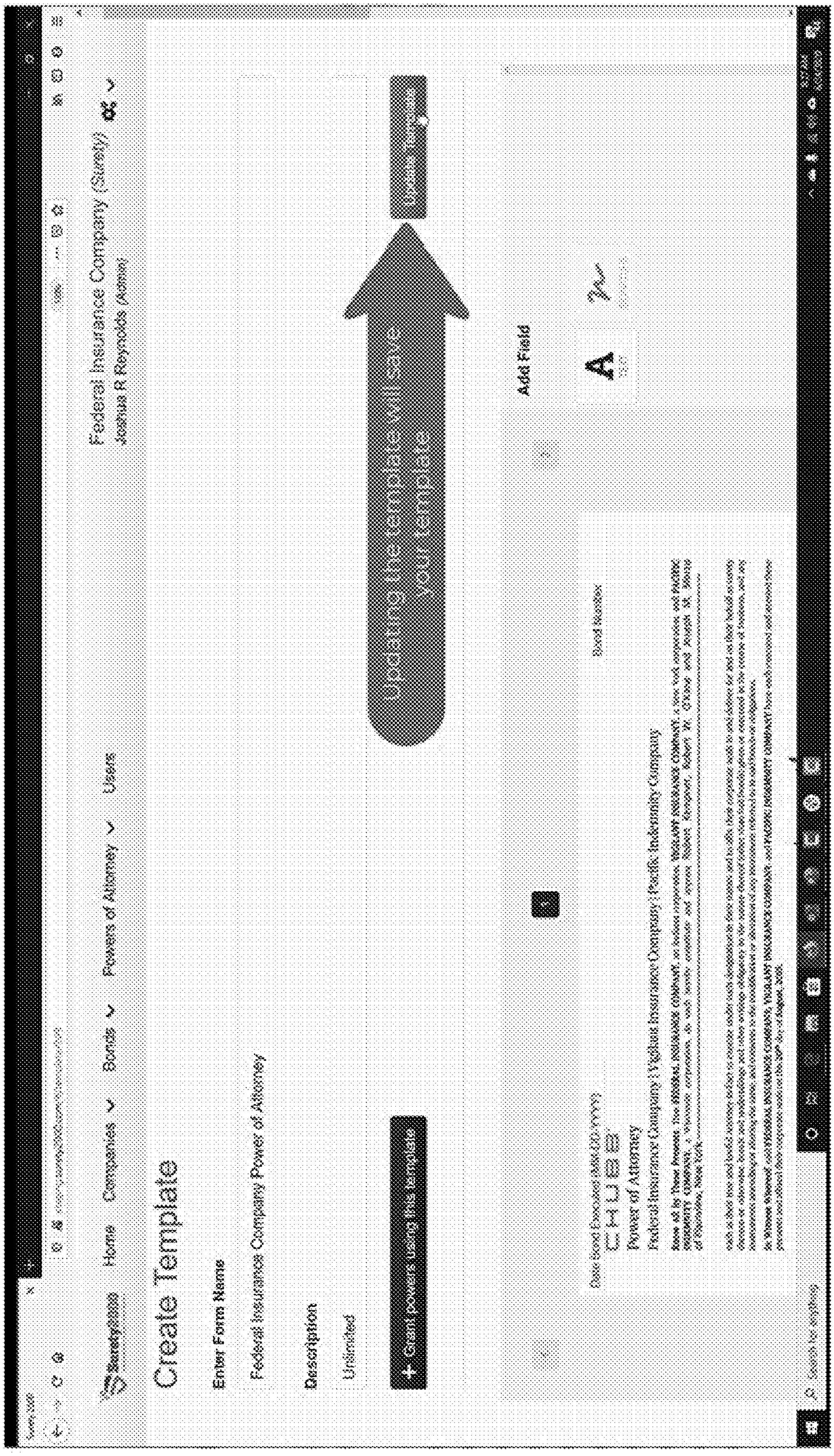
FIG. 31A shows the power of attorney template of the GUI screen of FIG. 30, but is shown with the "update template" button at the top of the GUI screen being highlighted to indicate that it may be toggled to save the template after all of the required text fields have been added for the new power of attorney template.

FIG. 31A shows the power of attorney template of the GUI screen of FIG. 30, but is shown with the "update template" button at the top of the GUI screen being highlighted to indicate that it may be toggled to save the template after all of the required text fields have been added for the new power of attorney template.

Figure 31B:
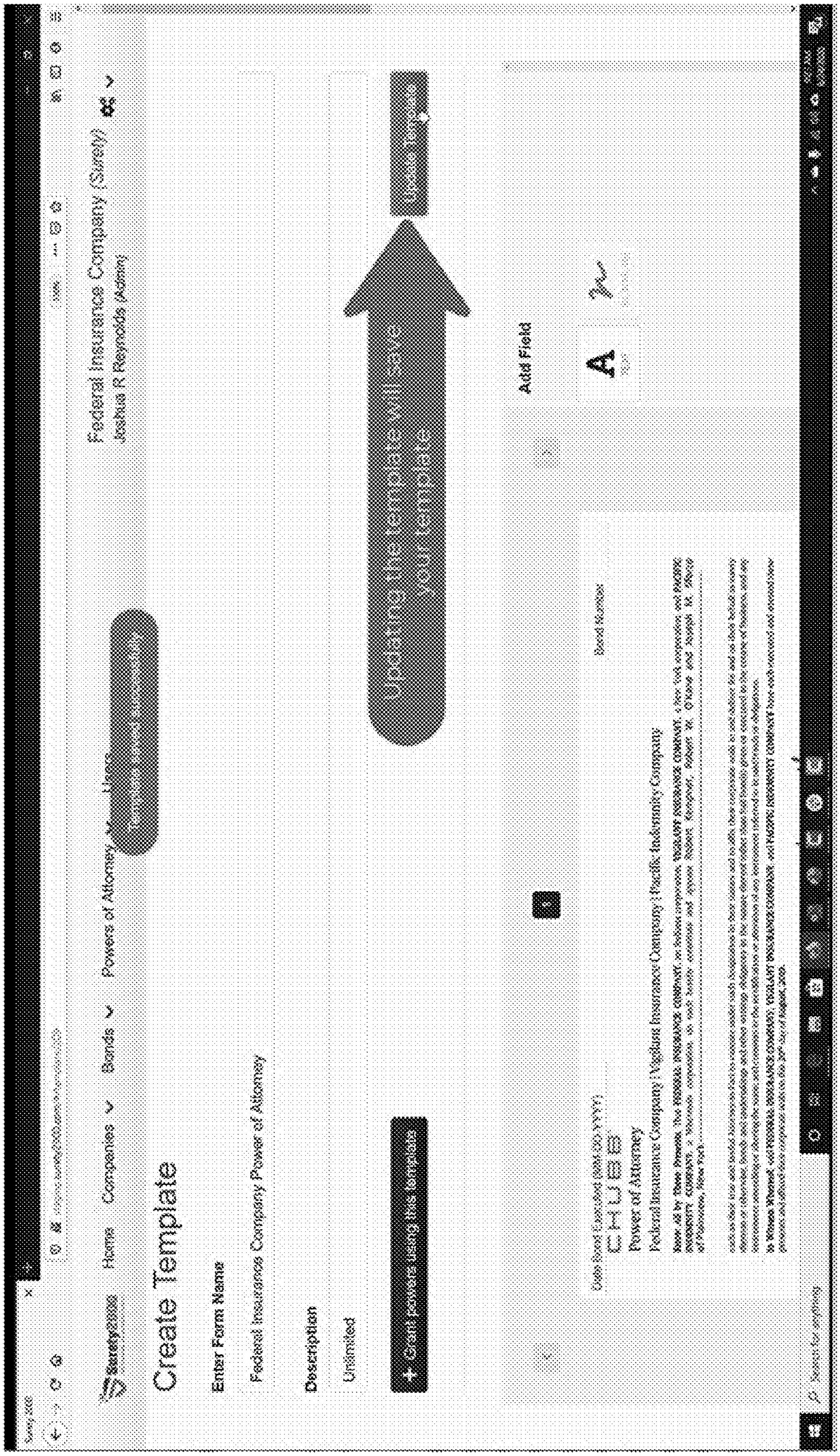
FIG. 31B shows the power of attorney template of the GUI screen of FIG. 31A, but is shown after the "update template" button has been toggled, and with a "Template Saved Successfully" message being displayed in the GUI by the system.

FIG. 31B shows the power of attorney template of the GUI screen of FIG. 31A, but is shown after the "update template" button has been toggled, and with a "Template Saved Successfully" message being displayed in the GUI by the system.

Figure 32:
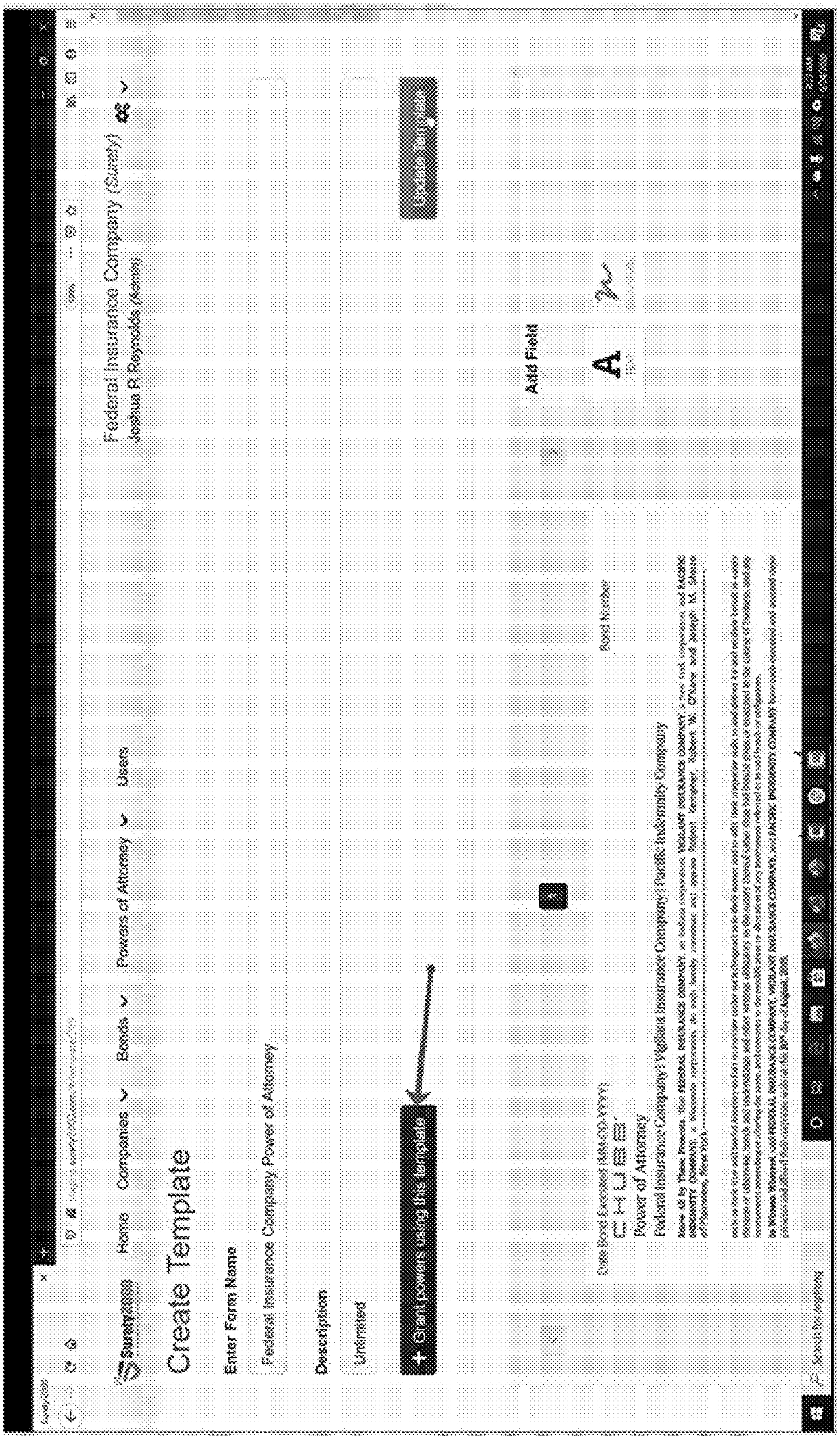
FIG. 32 shows the saved power of attorney template of the GUI screen of FIG. 31B, but is shown highlighting, for the reader, the "Grant Powers Using This Template" button to show that the surety can also grant powers directly from this template screen.

FIG. 32 shows the saved power of attorney template of the GUI screen of FIG. 31B, but is shown highlighting, for the reader, the "Grant Powers Using This Template" button to show that the surety can also grant powers directly from this template screen.

Figure 33:
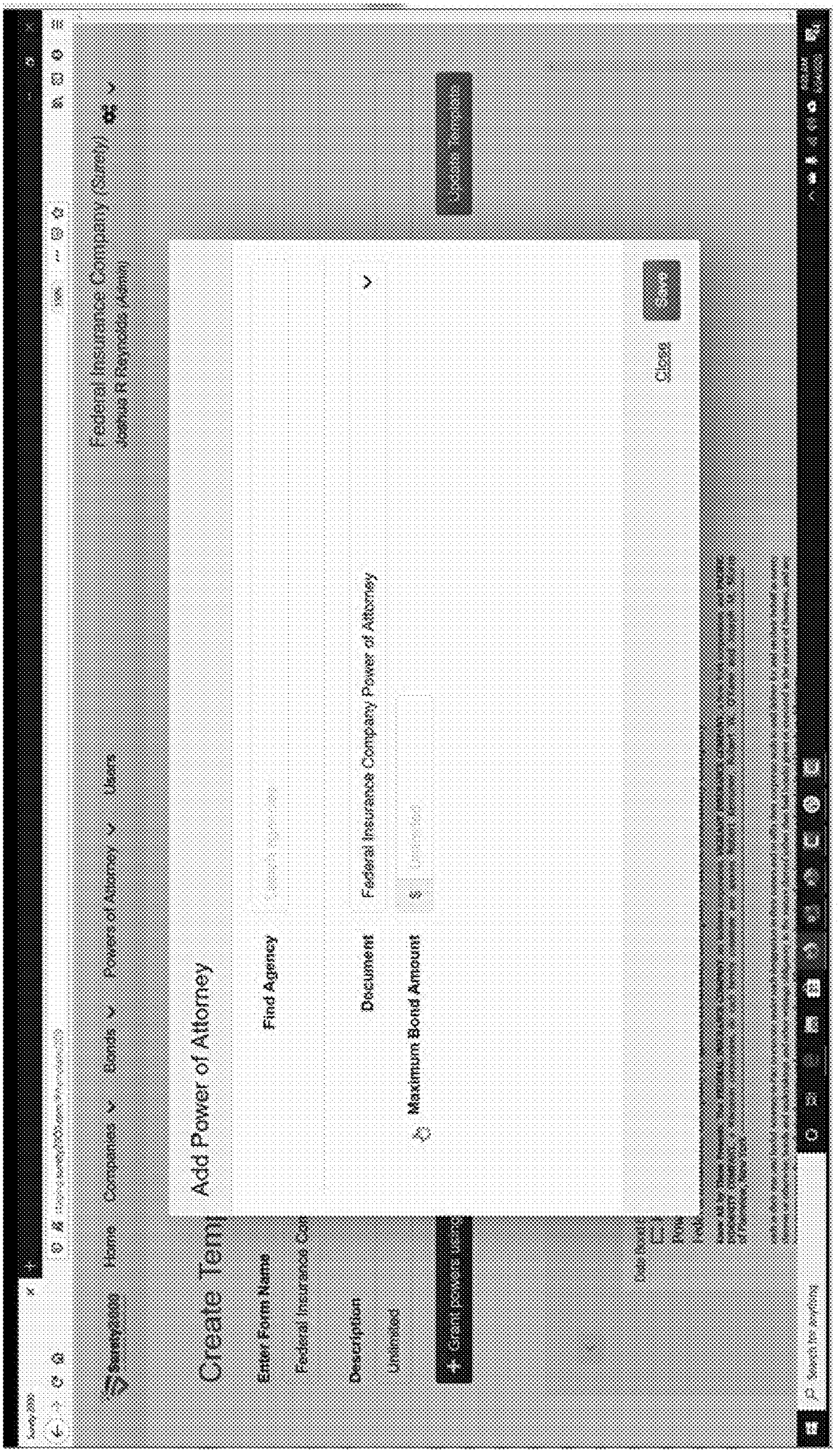
FIG. 33 shows a GUI screen that includes text entry boxes and a dropdown list to permit the addition of powers of attorney for the power of attorney template of the GUI screen of FIG. 32.

FIG. 33 shows a GUI screen that includes text entry boxes and a dropdown list to permit the addition of powers of attorney for the power of attorney template of the GUI screen of FIG. 32.

Figure 34:
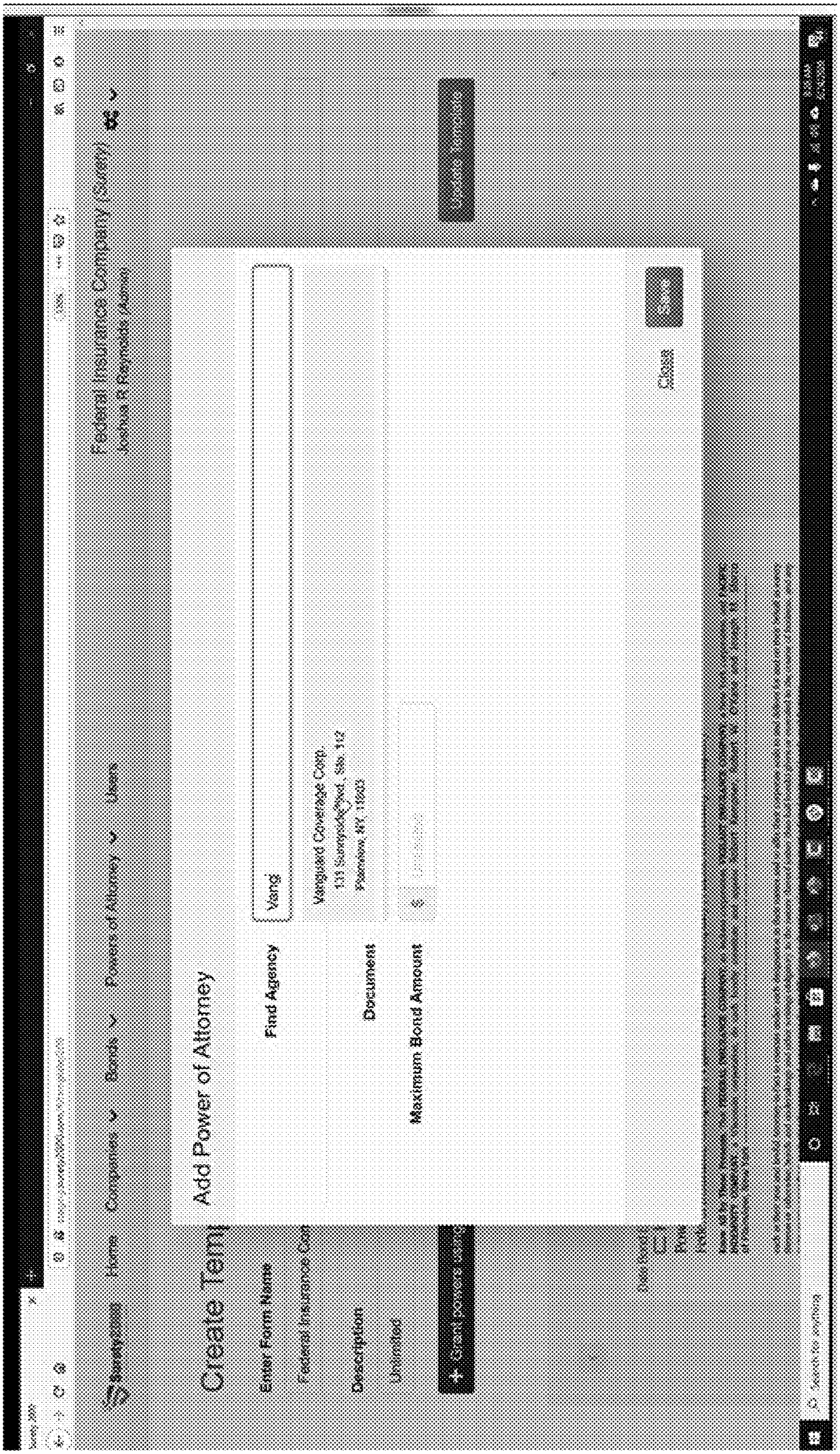
FIG. 34 shows the GUI screen of FIG. 33, in which a name is being typed into the "Find Agency" text box, and also showing that any matching agency information will automatically be populated below if it had been previously entered, and which populated information may be selected using the cursor.

FIG. 34 shows the GUI screen of FIG. 33, in which a name is being typed into the "Find Agency" text box, and also showing that any matching agency information will automatically be populated below if it had been previously entered, and which populated information may be selected using the cursor.

Figure 35:
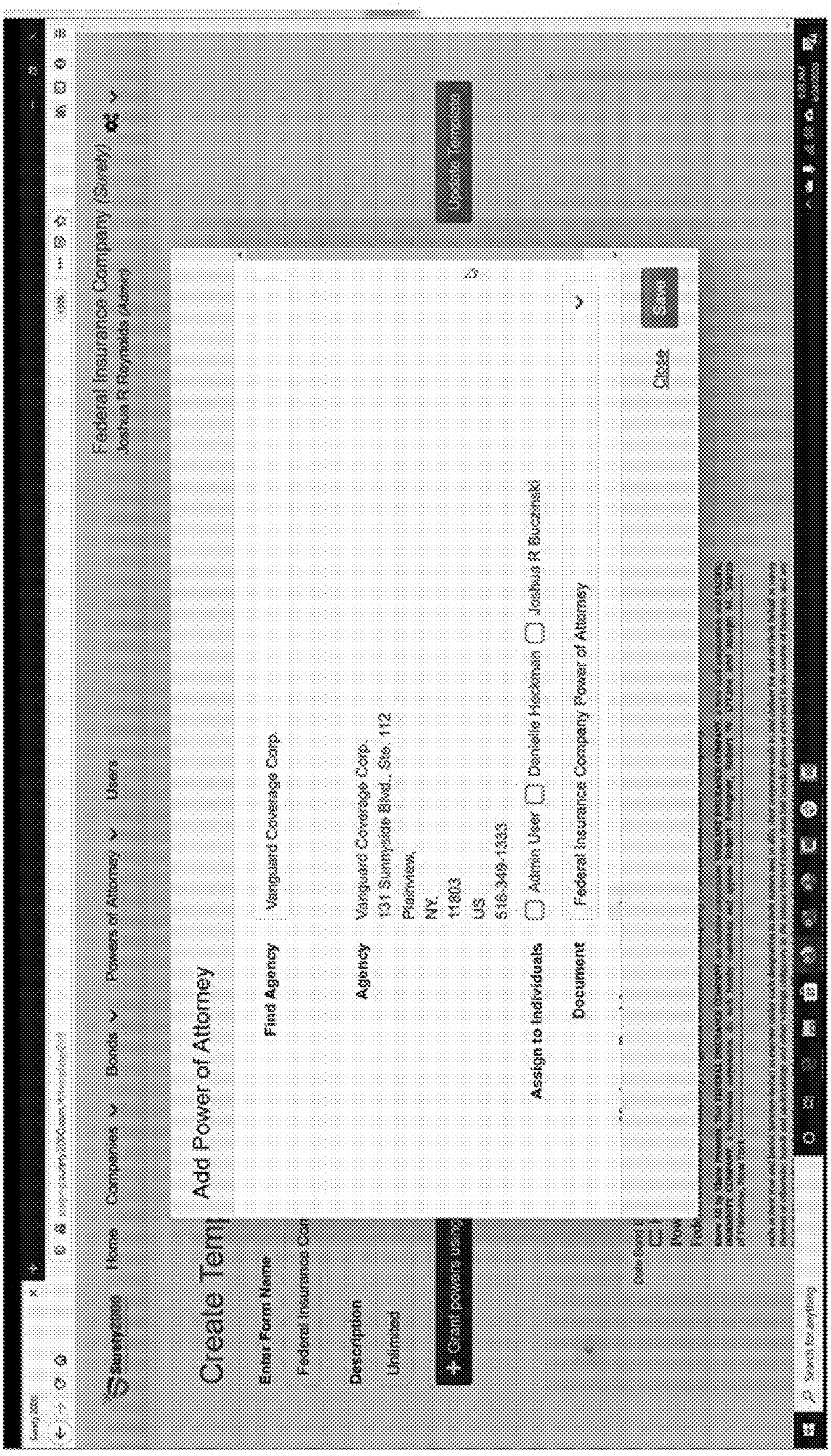
FIG. 35 shows the GUI screen of FIG. 34, in which the information of the selected agency is displayed, along with the individuals that the surety may choose to assign certain powers to, any or all of which individuals may be selected by toggling the associated radio button(s) shown therein.

FIG. 35 shows the GUI screen of FIG. 34, in which the information of the selected agency is displayed, along with the individuals that the surety may choose to assign certain powers to, any or all of which individuals may be selected by toggling the associated radio button(s) shown therein.

Figure 36:
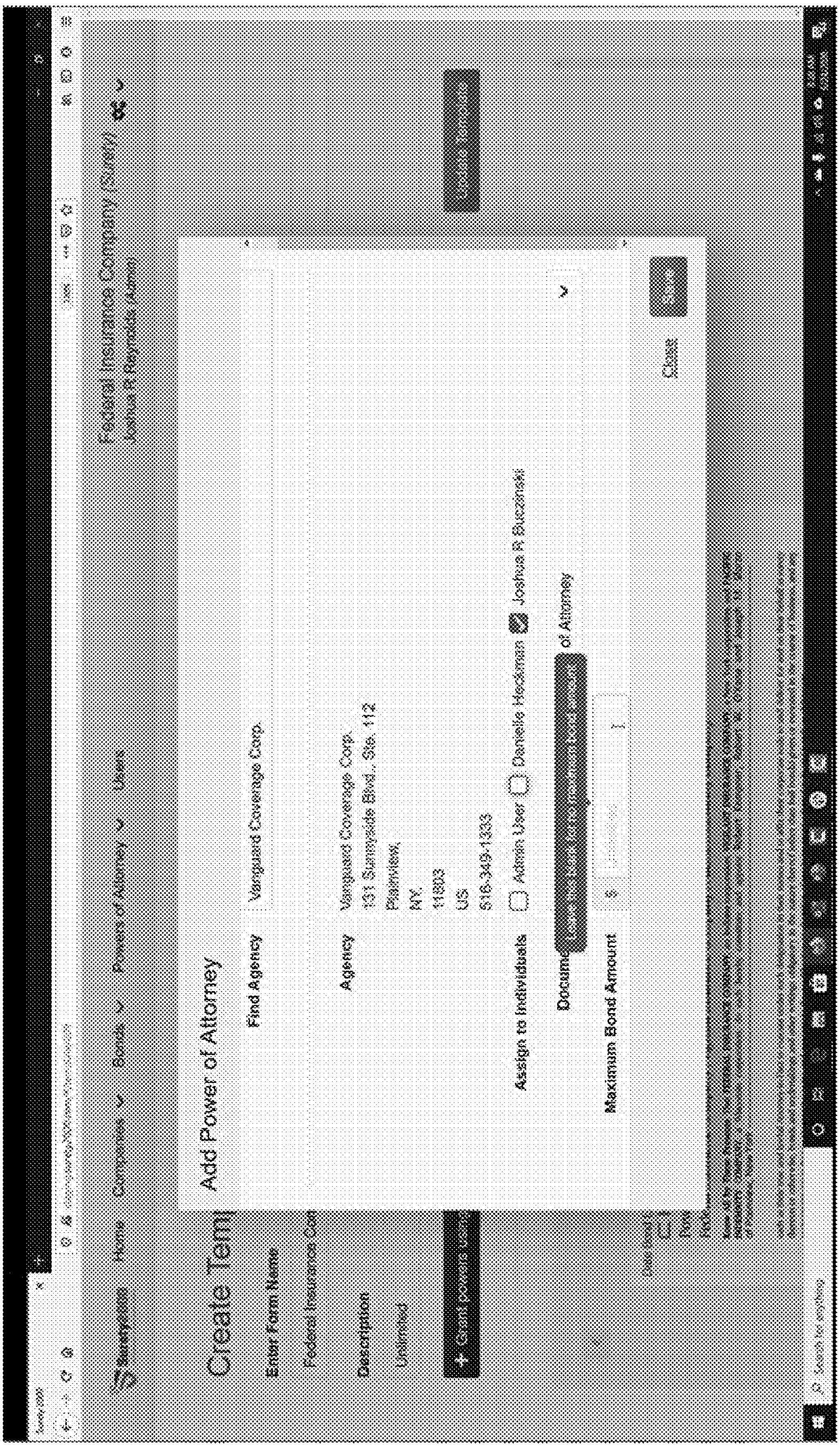
FIG. 36 shows the GUI screen of FIG. 35, in which the cursor is placed over the text box for the "Maximum Bond Amount," which may be used to limit the individuals' power to issue bonds to the entered maximum amount, with a message also being displayed therein to indicate that if the text box is left empty, the selected individual will have an unlimited bond amount.

FIG. 36 shows the GUI screen of FIG. 35, in which the cursor is placed over the text box for the "Maximum Bond Amount," which may be used to limit the individuals' power to issue bonds to the entered maximum amount, with a message also being displayed therein to indicate that if the text box is left empty, the selected individual will have an unlimited bond amount.

Figure 37:
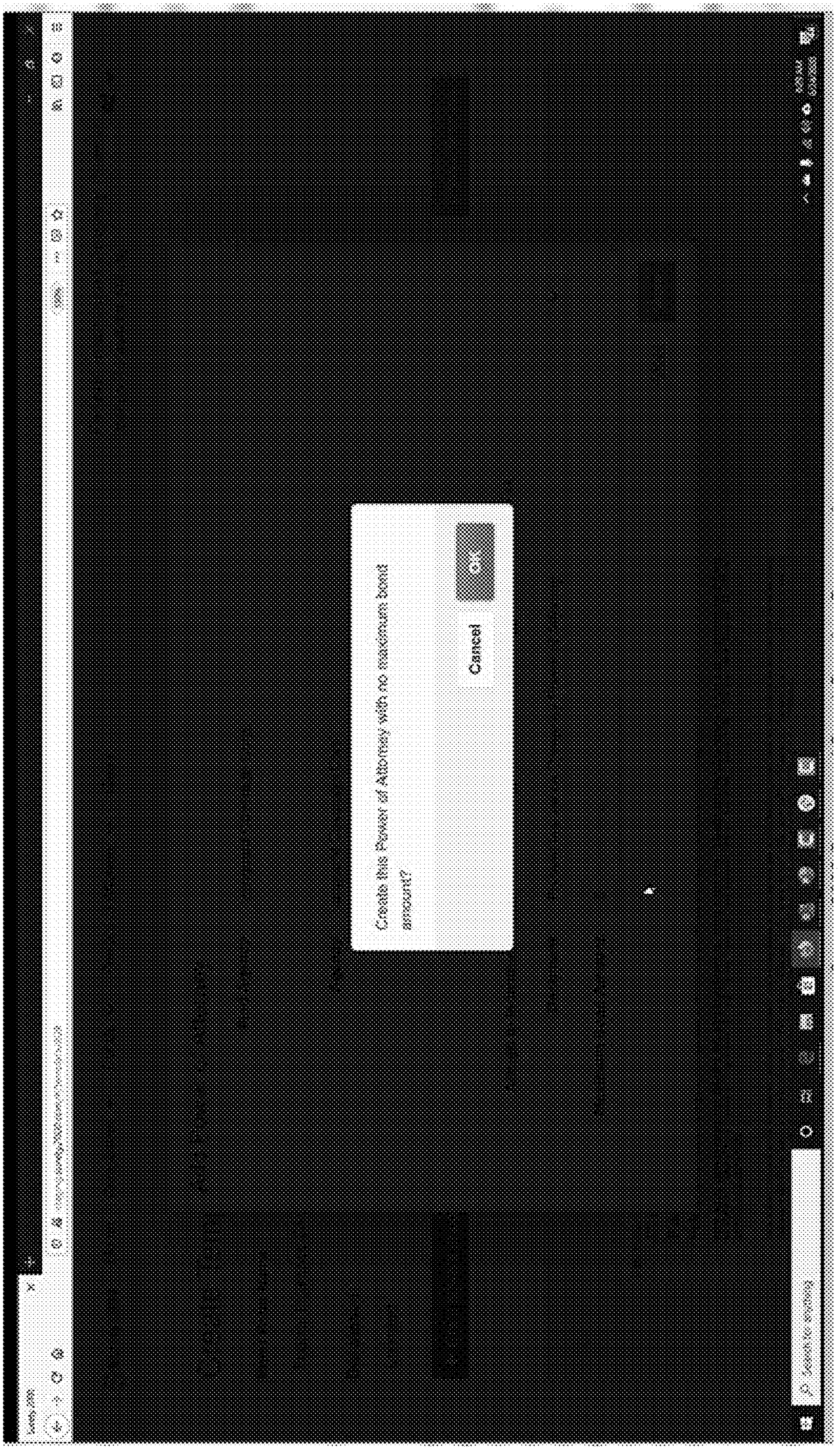
FIG. 37 shows the GUI screen of FIG. 36, after the text box for the "Maximum Bond Amount" was left empty and the user had clicked the "save" button, with the system displaying a warning message questioning if the user intends to "Create this Power of Attorney with no Maximum Bond Amount" and also displaying an "Ok" button to proceed and a "Cancel" button to permit entering of a bond amount.

FIG. 37 shows the GUI screen of FIG. 36, after the text box for the "Maximum Bond Amount" was left empty and the user had clicked the "save" button, with the system displaying a warning message questioning if the user intends to "Create this Power of Attorney with no Maximum Bond Amount" and also displaying an "Ok" button to proceed and a "Cancel" button to permit entering of a bond amount.

Figure 38:
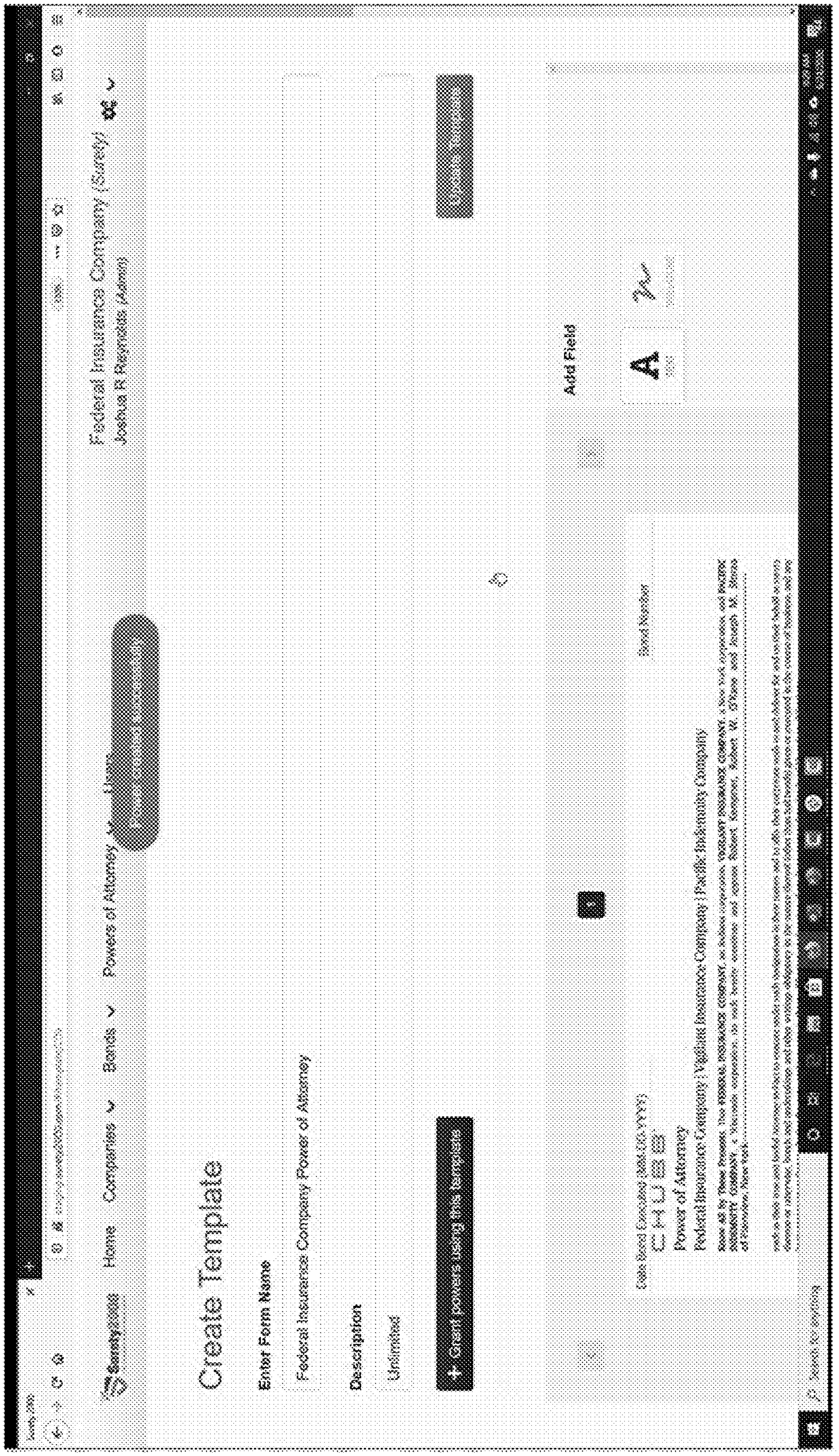
FIG. 38 shows a GUI screen that is displayed after the "Ok" button of the GUI screen of FIG. 37 had been pressed, with the system displaying a message "Power Created Successfully" indicating that a power of attorney has been successfully granted to one or more agents at a surety agency.

FIG. 38 shows a GUI screen that is displayed after the "Ok" button of the GUI screen of FIG. 37 had been pressed, with the system displaying a message "Power Created Successfully" indicating that a power of attorney has been successfully granted to one or more agents at a surety agency.

Figure 39:
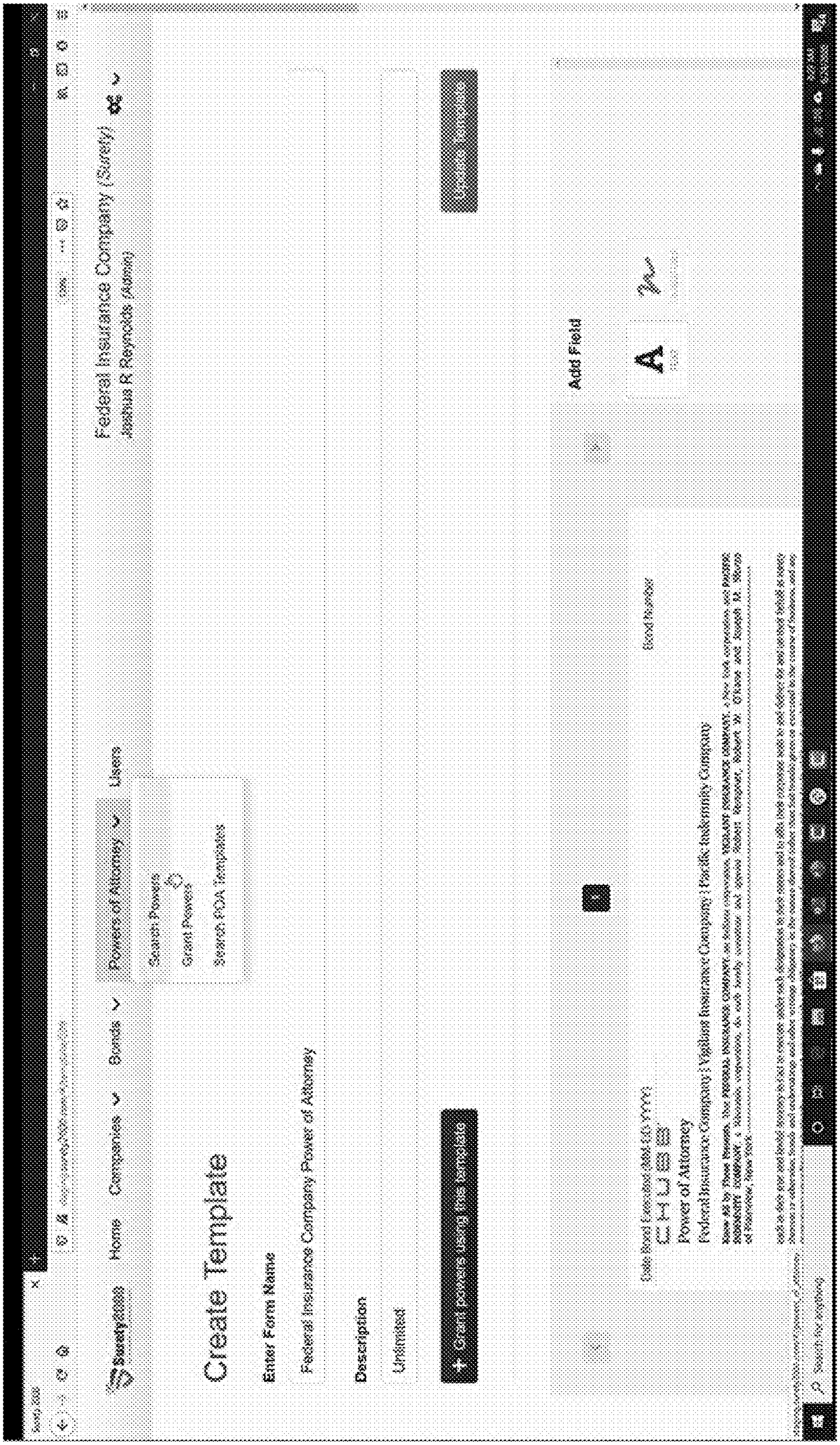
FIG. 39 shows the saved power of attorney template of the GUI screen of FIG. 32, and with the user holding the cursor over the dropdown list labeled "Powers of Attorney" in the upper menu region, which permits searching for and viewing any powers that have been created by toggling the "Search Powers" option in the list.

FIG. 39 shows the saved power of attorney template of the GUI screen of FIG. 32, and with the user holding the cursor over the dropdown list labeled "Powers of Attorney" in the upper menu region, which permits searching for and viewing any powers that have been created by toggling the "Search Powers" option in the list.

Figure 40:
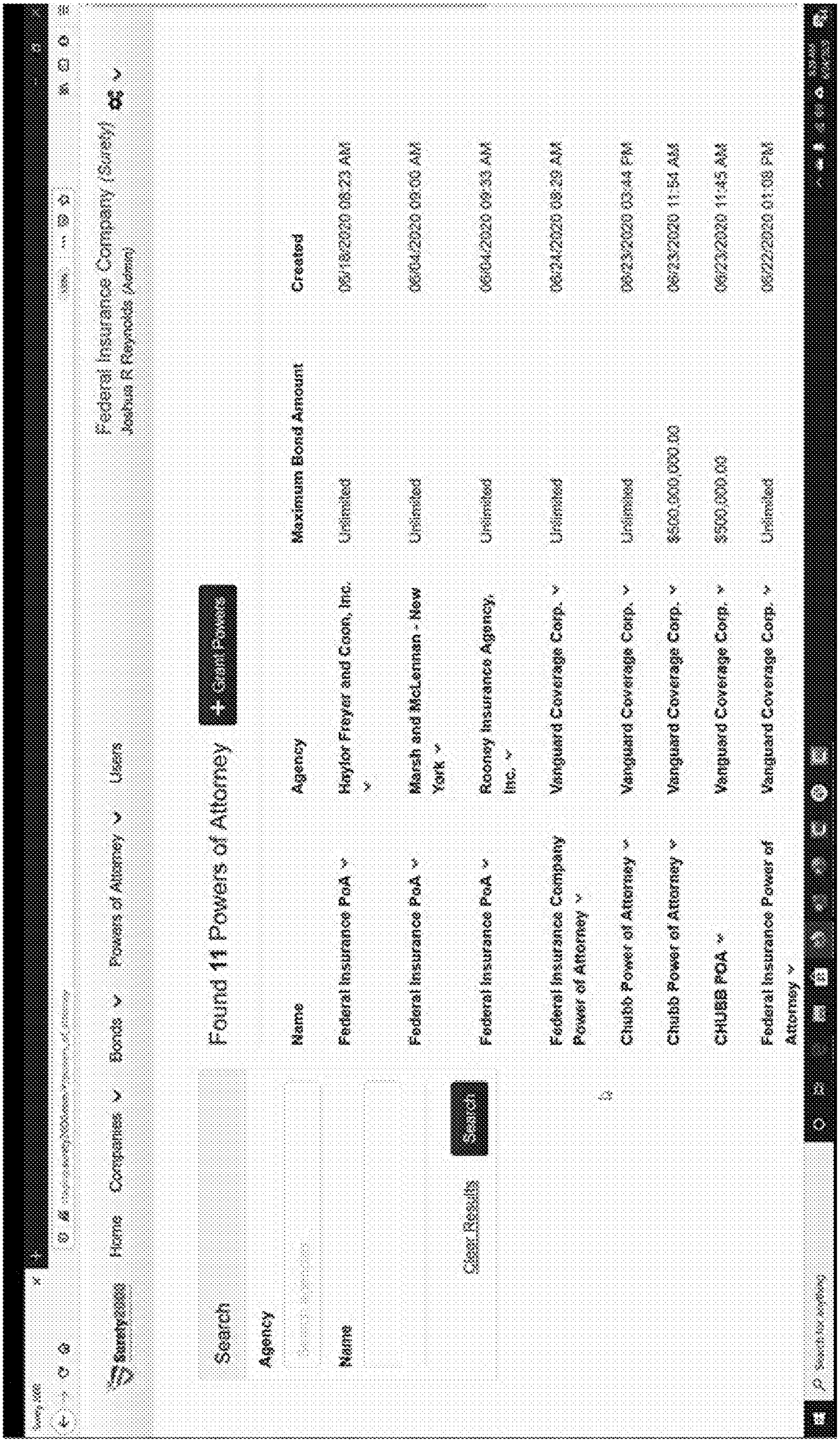
FIG. 40 shows a GUI screen that is displayed after the "Search Powers" option in the "Powers of Attorney" dropdown list is toggled, which screen displays the exiting powers that have been granted, which agency the power is tied to, and the maximum bond amount.

FIG. 40 shows a GUI screen that is displayed after the "Search Powers" option in the "Powers of Attorney" dropdown list is toggled, which screen displays the existing powers that have been granted, which agency the power is tied to, and the maximum bond amount.

Figure 41:
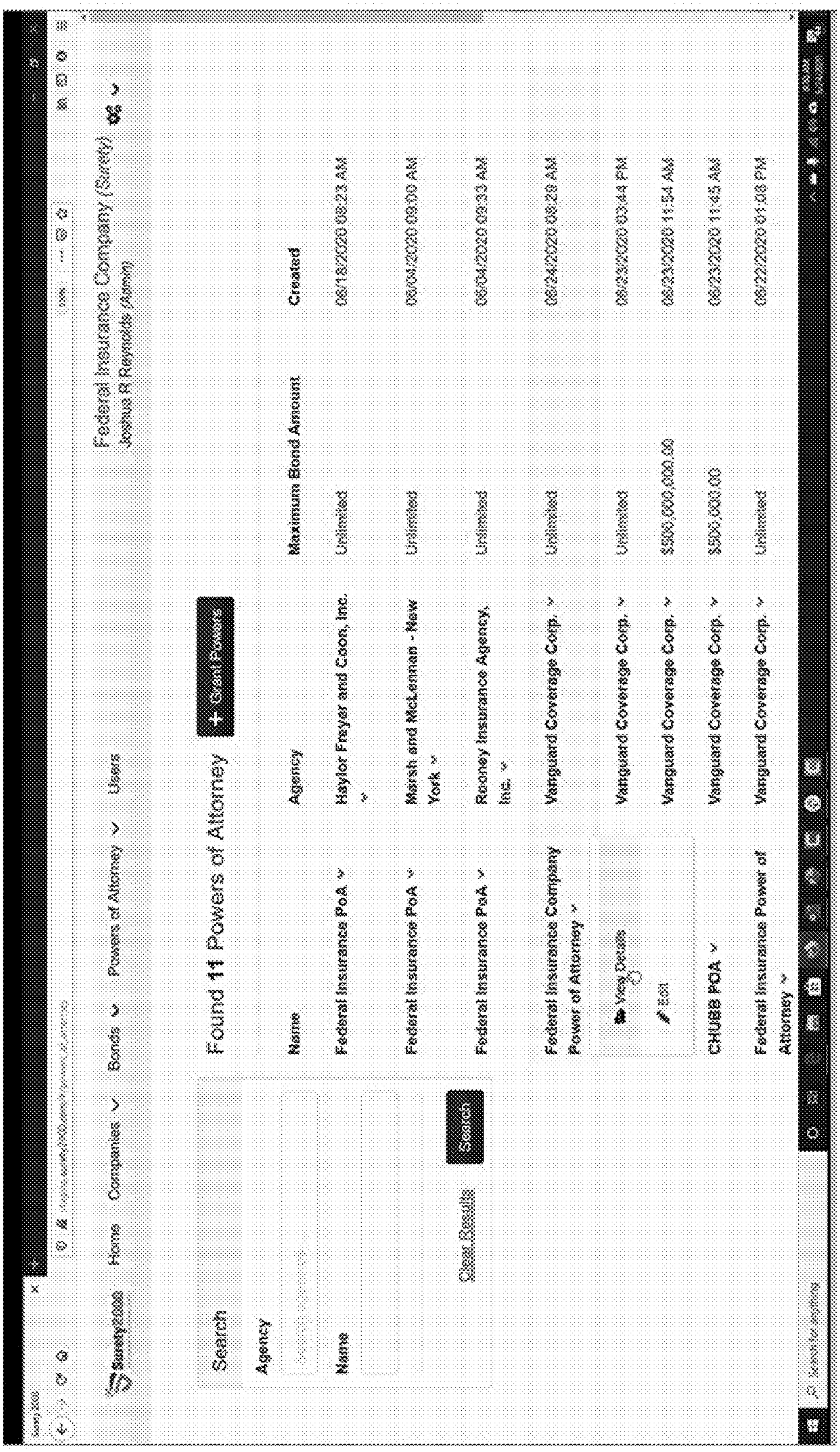
FIG. 41 is the GUI screen of FIG. 40, but is shown after the user hovers the cursor over the name of the power that he/she is interested in, which provides two dropdown list options, being "View Details" and "Edit"

FIG. 41 is the GUI screen of FIG. 40, but is shown after the user hovers the cursor over the name of the power that he/she is interested in, which provides two dropdown list options, being "View Details" and "Edit."

Figure 42:
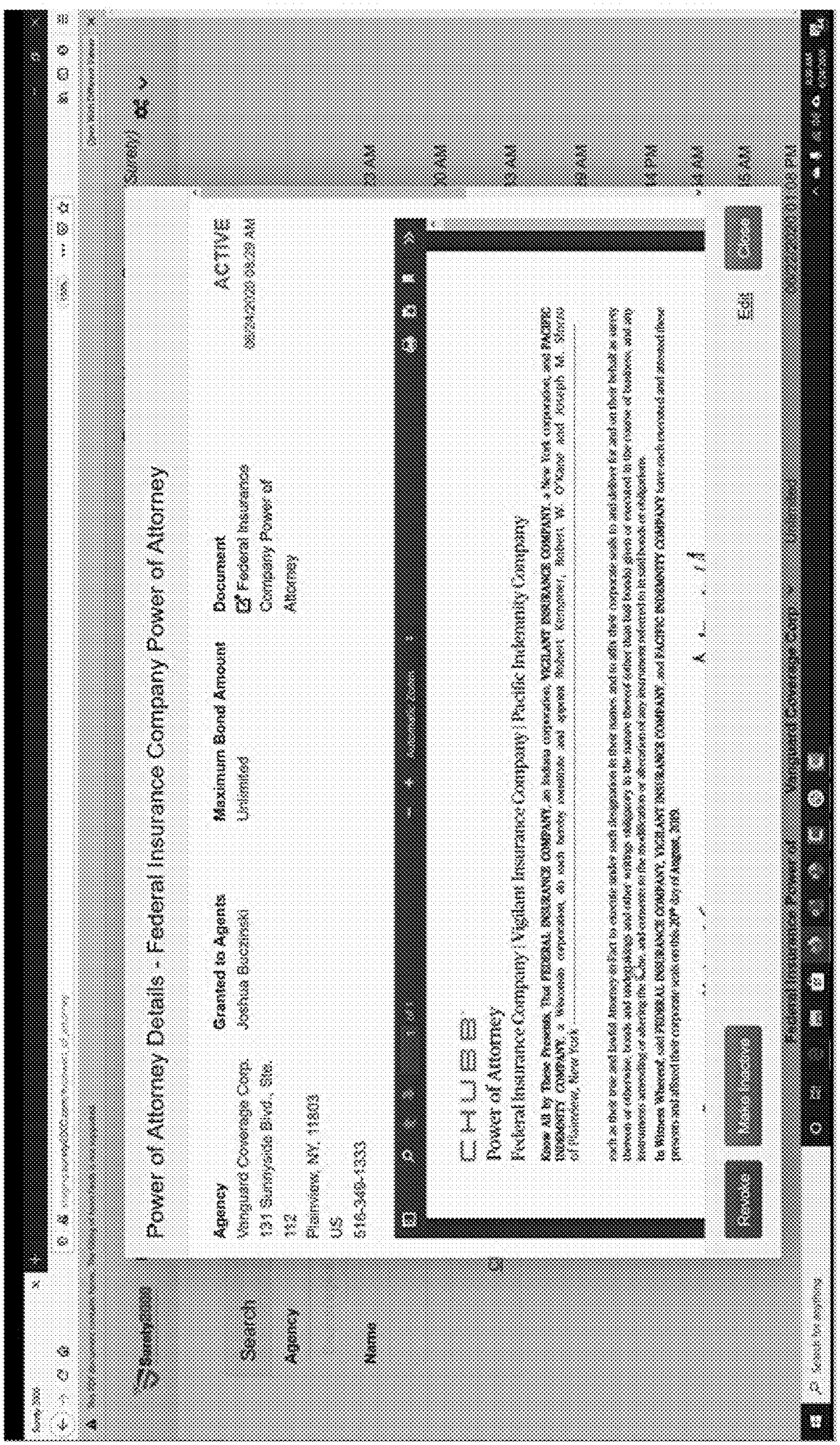
FIG. 42 is a GUI screen that shows the power of attorney selected from the dropdown list shown in FIG. 41, and which shows the agency, the agents to which the power was granted, the maximum bond amount, as well as radio buttons that permit the user to "Revoke" or "Make Inactive" or "Edit" the power.

FIG. 42 is a GUI screen that shows the power of attorney selected from the dropdown list shown in FIG. 41, and which shows the agency, the agents to which the power was granted, the maximum bond amount, as well as radio buttons that permit the user to "Revoke" or "Make Inactive" or "Edit" the power.

Figure 43:
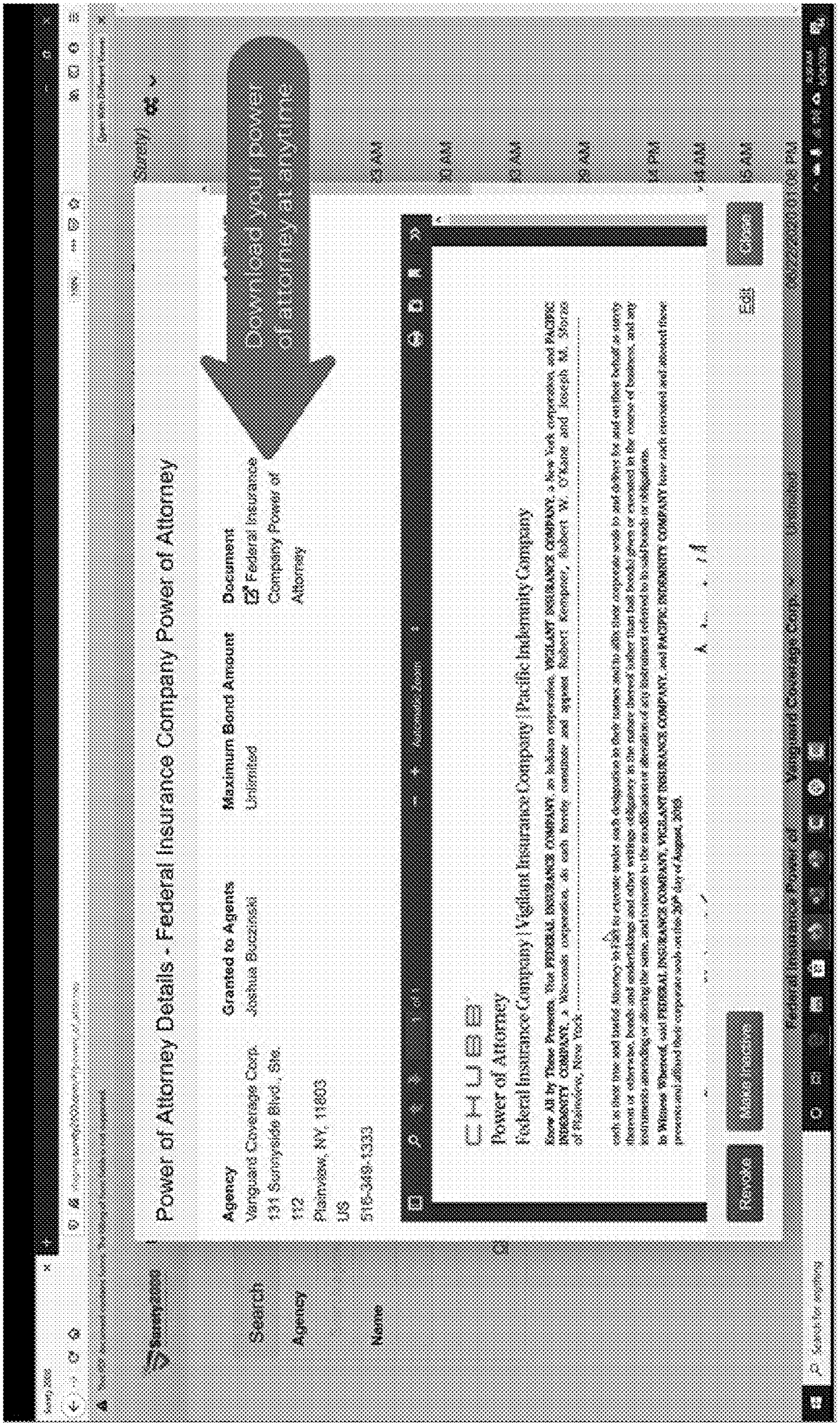
FIG. 43 is the GUI screen of FIG. 42, but which highlights, for the reader, the link that permits downloading of a PDF copy of the power.

FIG. 43 is the GUI screen of FIG. 42, but which highlights, for the reader, the link that permits downloading of a PDF copy of the power.

Figure 44:
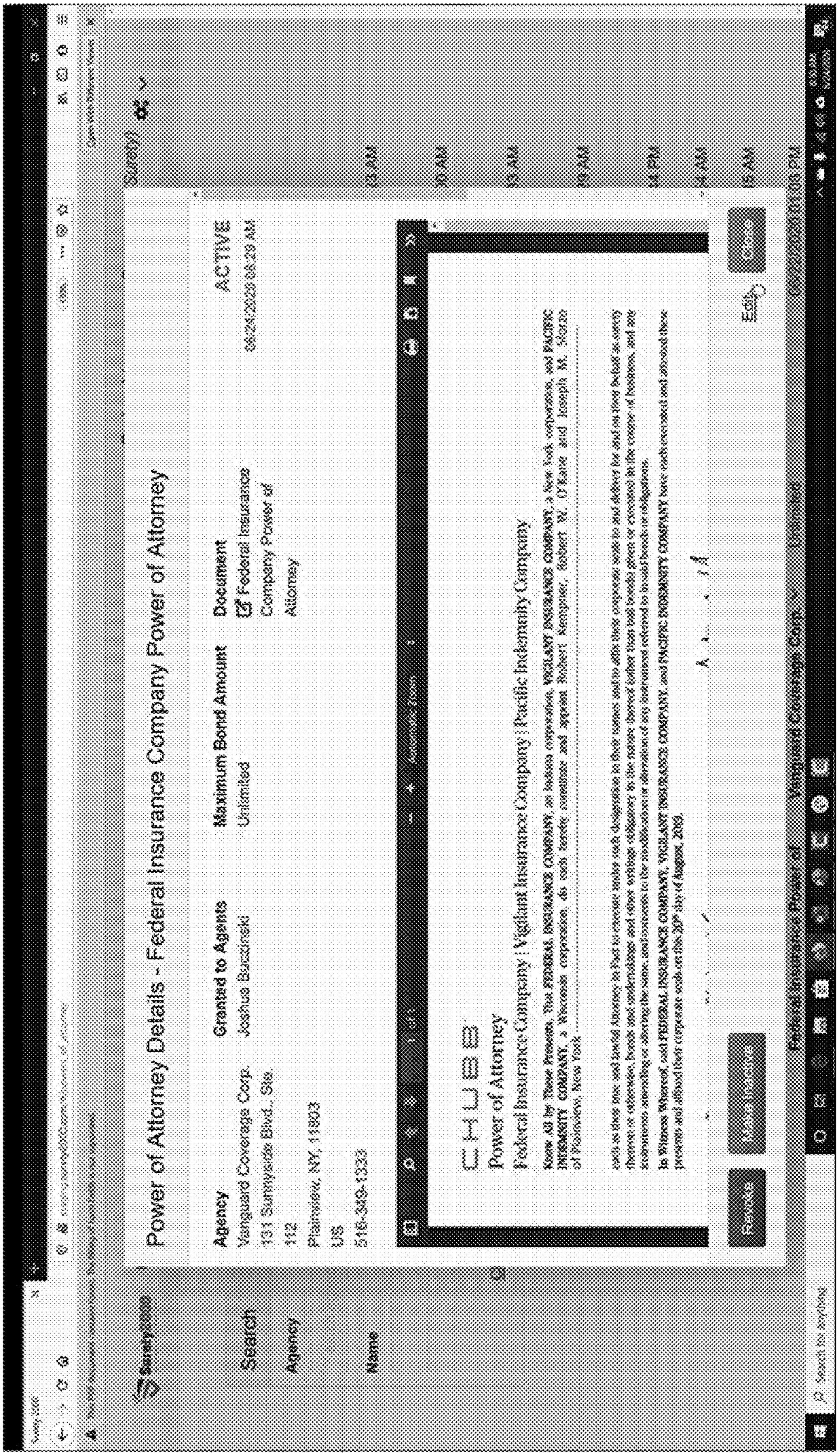
FIG. 44 is the GUI screen of FIG. 43, in which the user is placing the cursor over the "Edit" option.

FIG. 44 is the GUI screen of FIG. 43, in which the user is placing the cursor over the "Edit" option.

Figure 45:
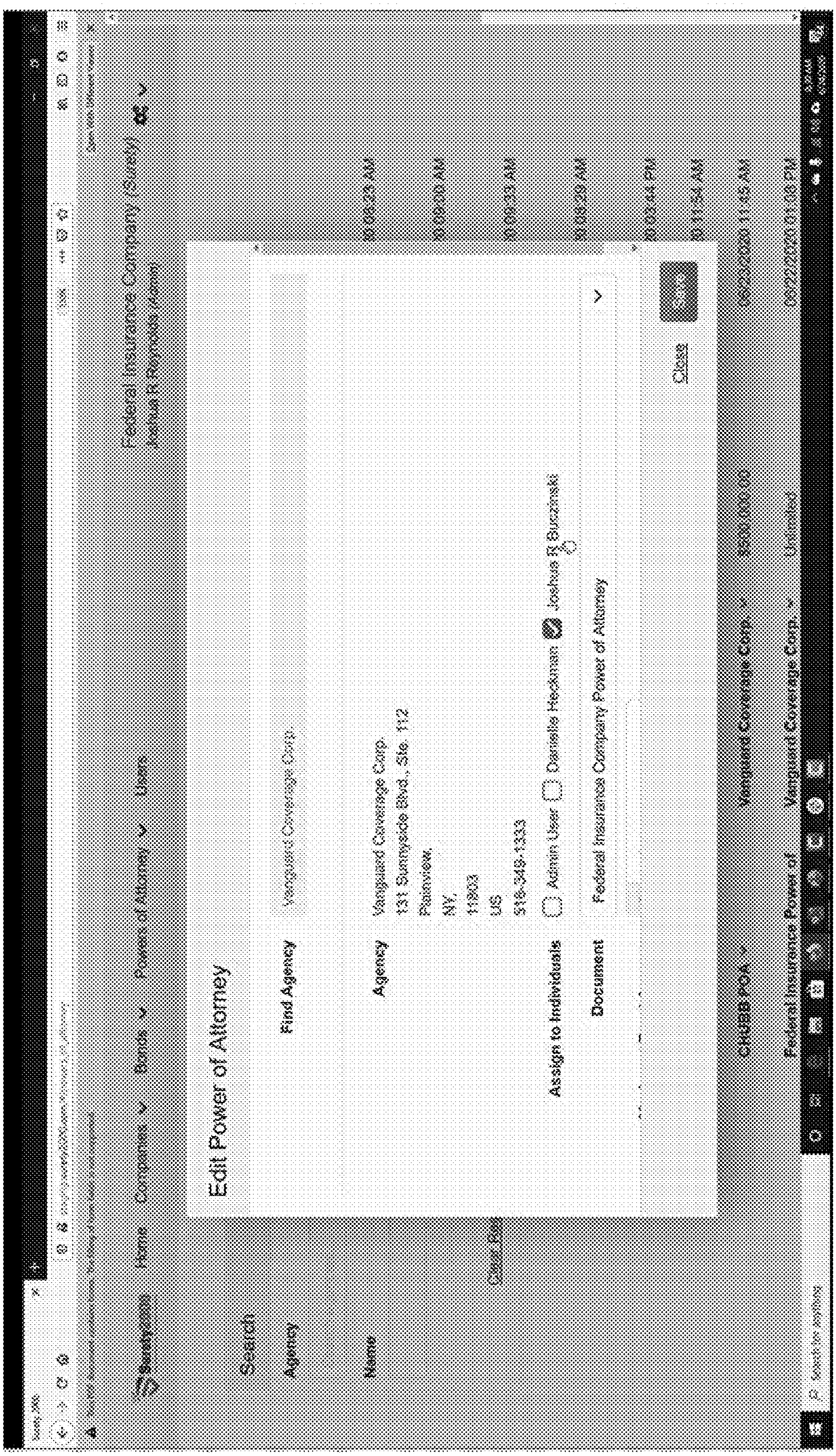
FIG. 45 is the GUI screen that is displayed after the user has selected the edit option in the GUI screen of FIG. 44, and which provides options to change who has access to the power.

FIG. 45 is the GUI screen that is displayed after the user has selected the edit option in the GUI screen of FIG. 44, and which provides options to change who has access to the power.

Figure 46:
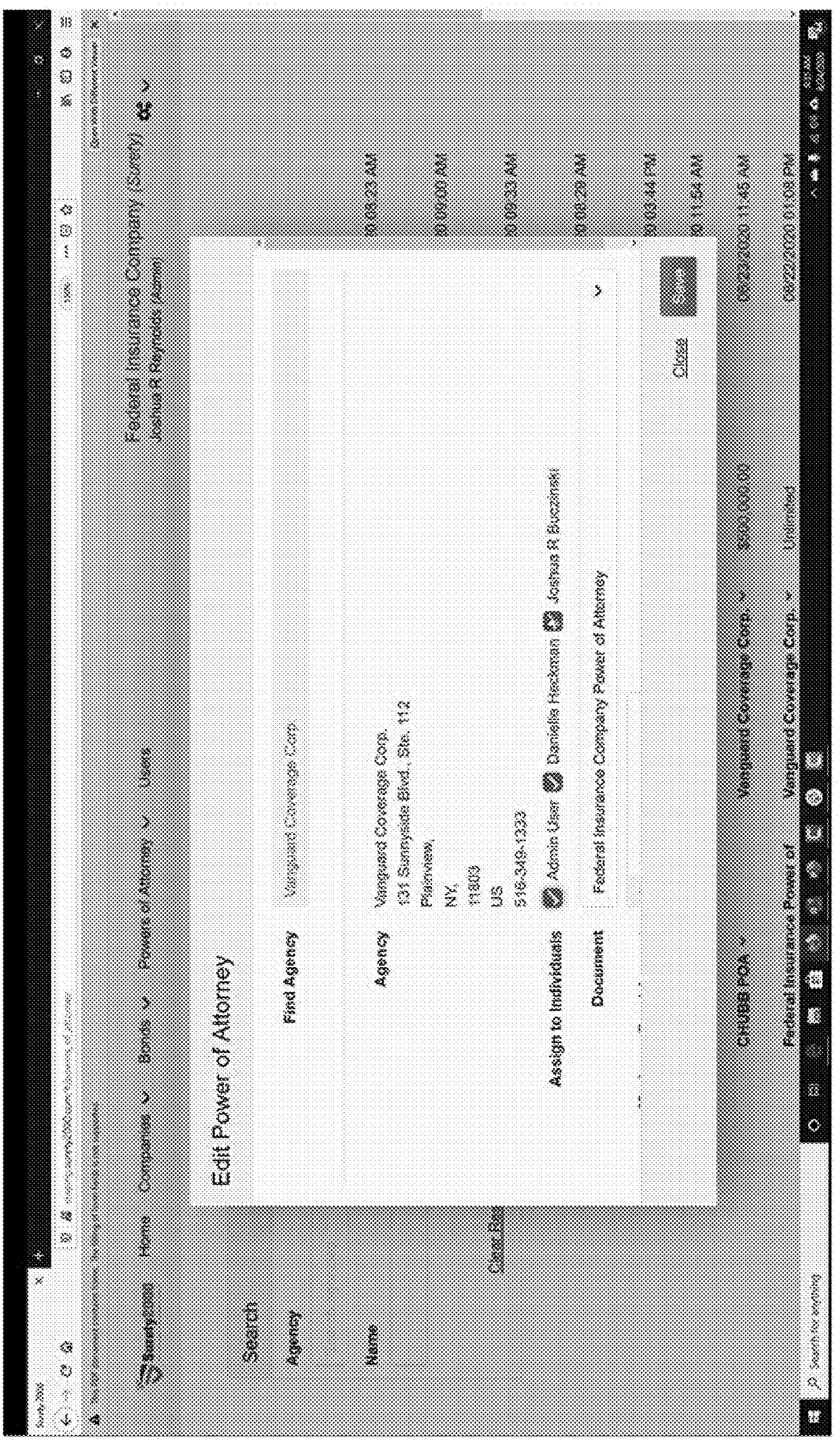
FIG. 46 is the GUI screen of FIG. 45, but shown after the radio buttons associated with two other individuals have been toggled to give them the power as well.

FIG. 46 is the GUI screen of FIG. 45, but shown after the radio buttons associated with two other individuals have been toggled to give them the power as well.

Figure 47:
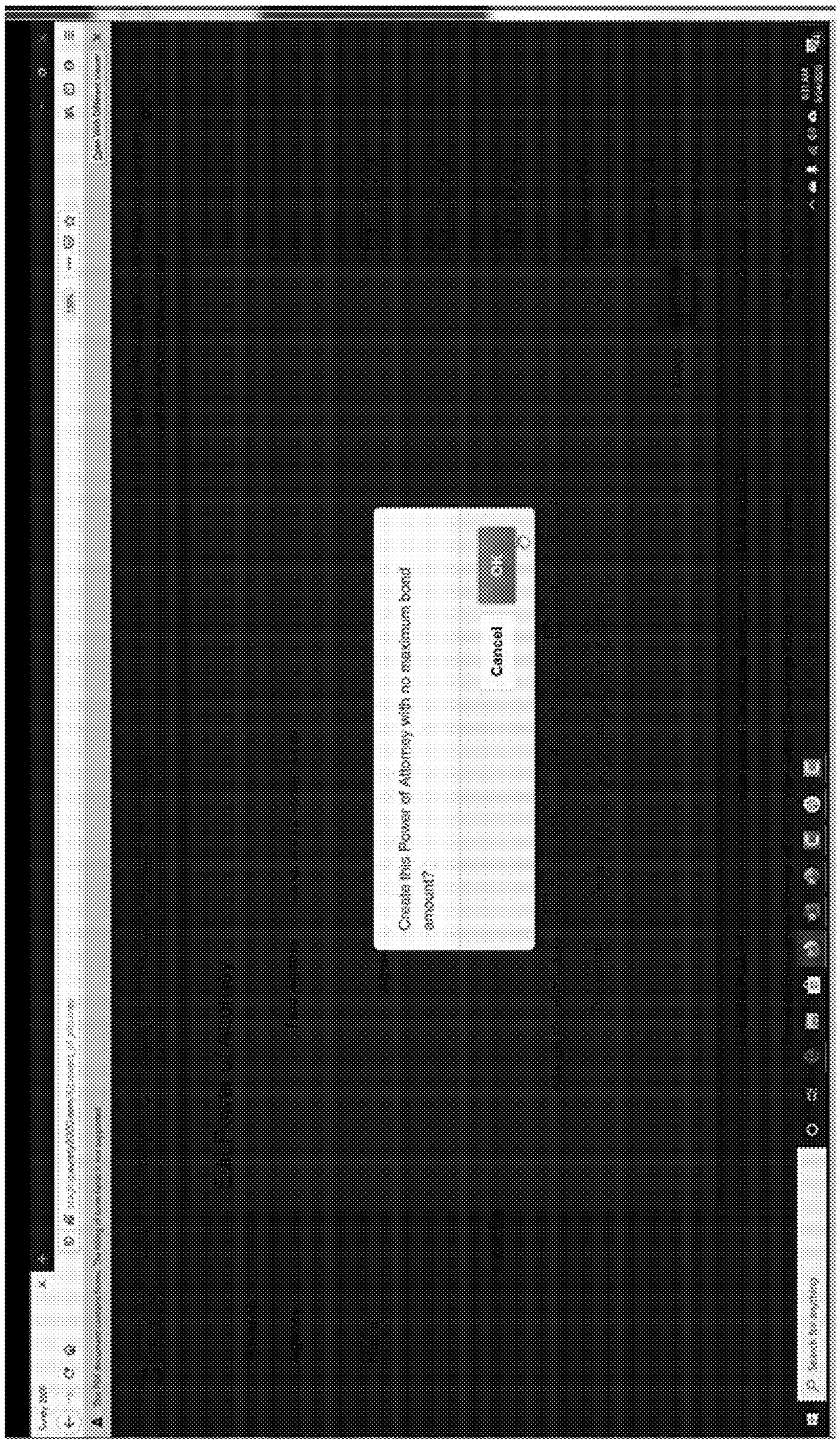
FIG. 47 shows a GUI screen that is displayed after the "Save" button is toggled in the GUI screen of FIG. 46, with the system again displaying a warning message questioning if the user intends to "Create this Power of Attorney with no Maximum Bond Amount" and also displaying an "Ok" button to proceed, and a "Cancel" button to permit entering of a bond amount.

FIG. 47 shows a GUI screen that is displayed after the "Save" button is toggled in the GUI screen of FIG. 46, with the system again displaying a warning message questioning if the user intends to "Create this Power of Attorney with no Maximum Bond Amount" and also displaying an "Ok" button to proceed, and a "Cancel" button to permit entering of a bond amount.

Figure 48:
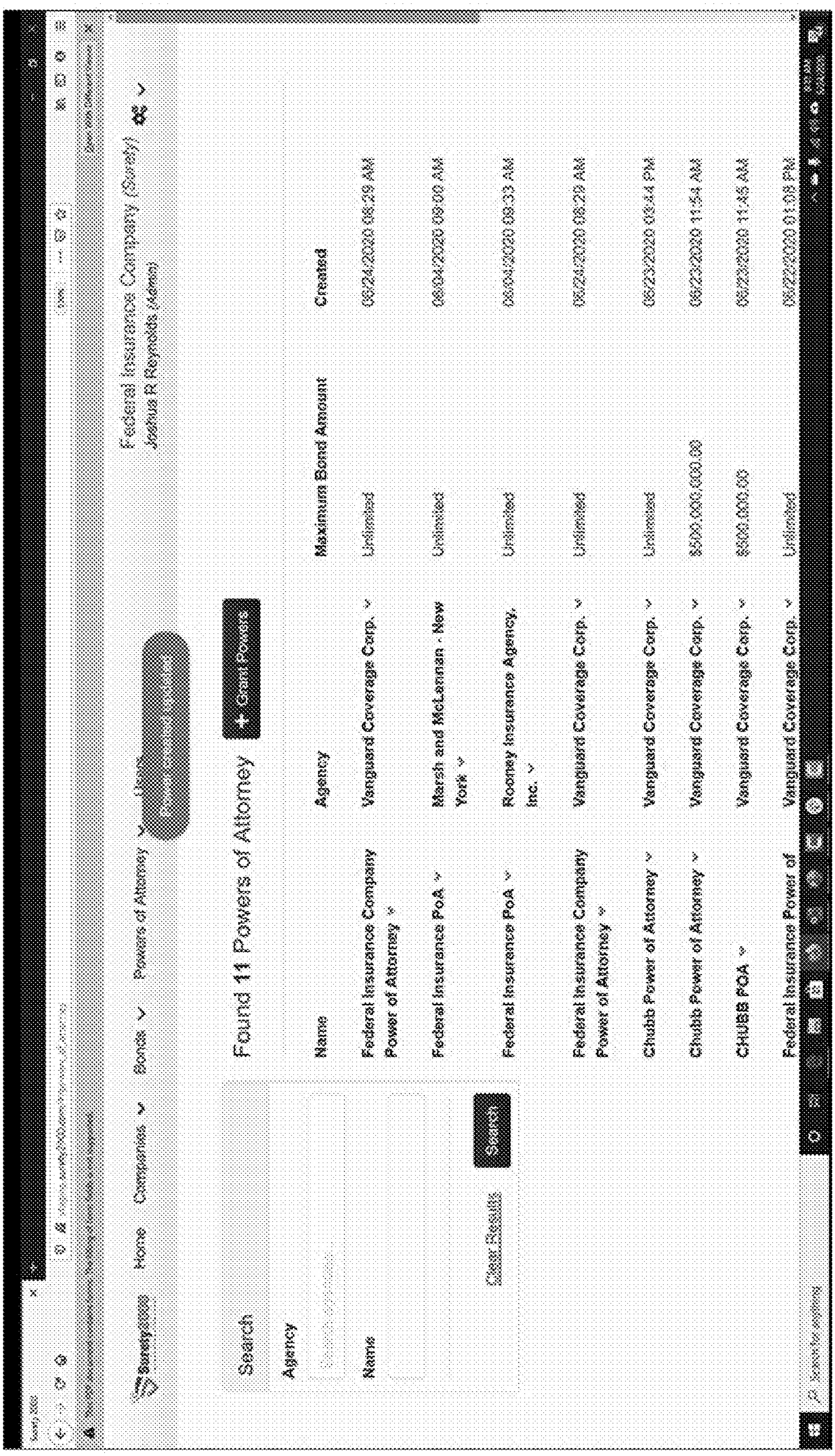
FIG. 48 shows a GUI screen that is displayed after the "Ok" button of the GUI screen of FIG. 47 had been pressed, with the system displaying a message "Power Created Successfully" indicating that a power of attorney has been successfully modified.

FIG. 48 shows a GUI screen that is displayed after the "Ok" button of the GUI screen of FIG. 47 had been pressed, with the system displaying a message "Power Created Successfully" indicating that a power of attorney has been successfully modified.

Figure 49:
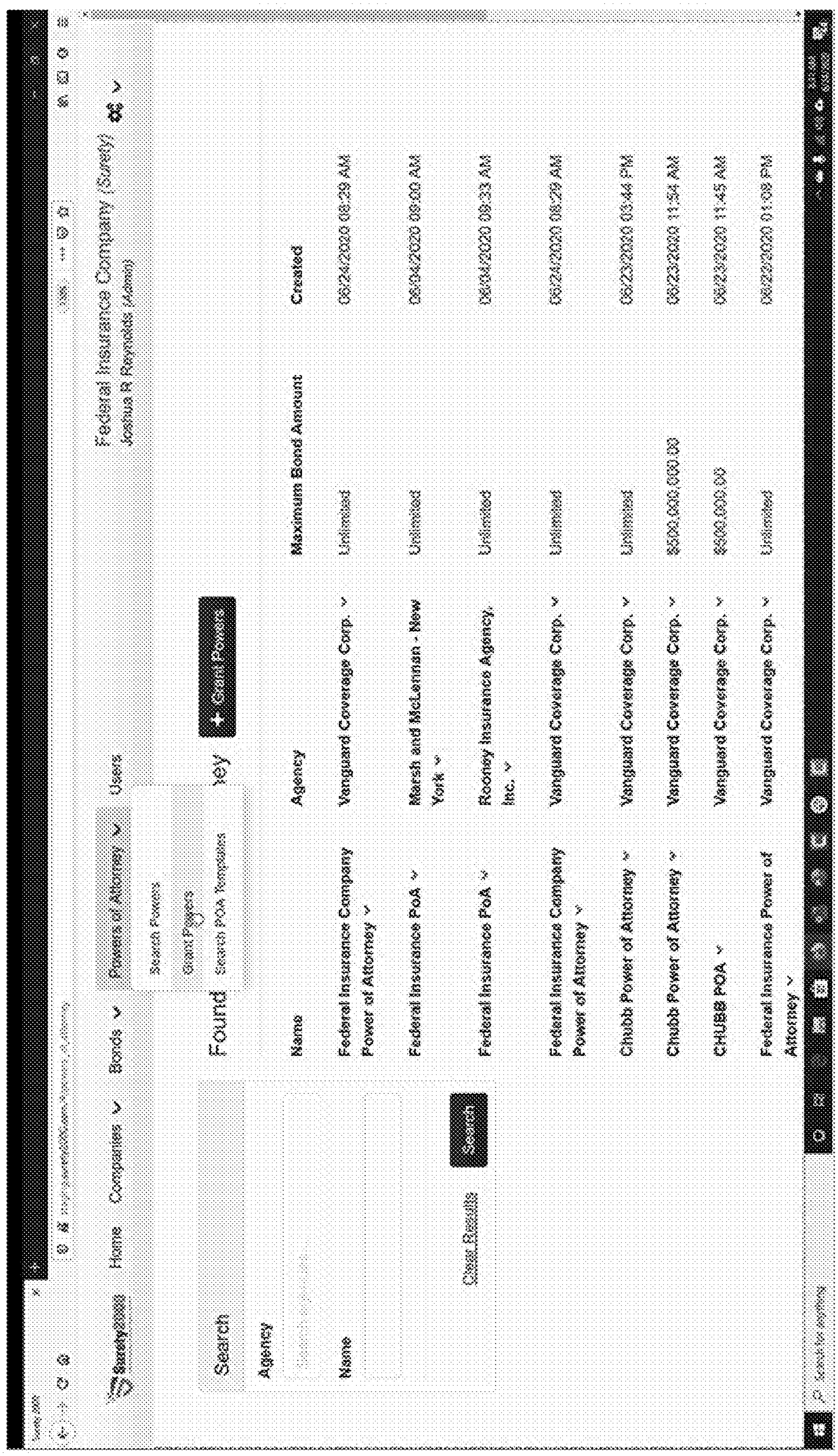
FIG. 49 shows a GUI screen with the user holding the cursor over the "Grant Powers" option in the dropdown list labeled "Powers of Attorney" in the upper menu region.

FIG. 49 shows a GUI screen with the user holding the cursor over the "Grant Powers" option in the dropdown list labeled "Powers of Attorney" in the upper menu region.

Figure 50:
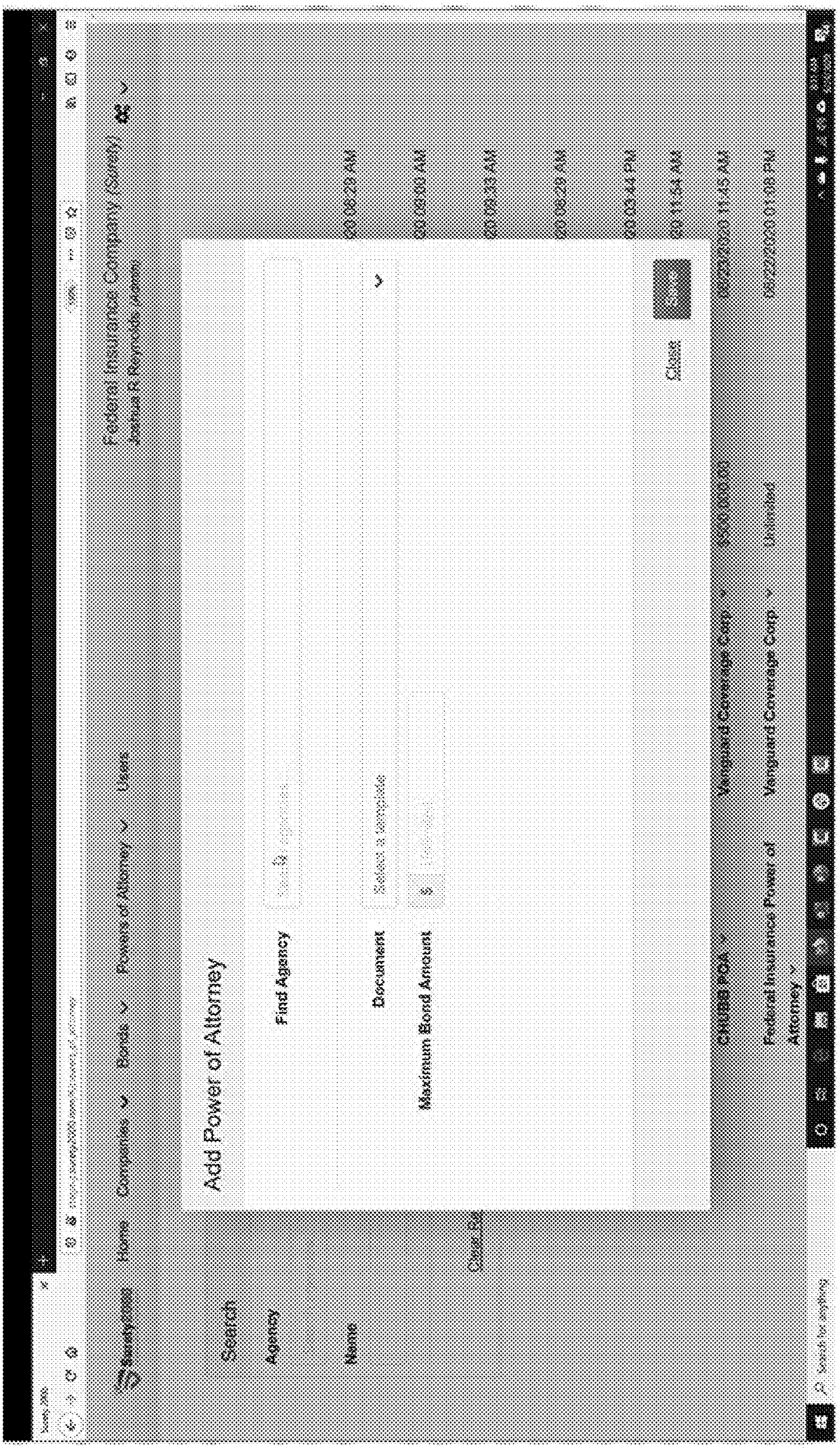
FIG. 50 shows the options permitted after selecting "Grant Powers" in the dropdown list labeled "Powers of Attorney" in the GUI of FIG. 49, which includes choosing (i.e., entering) the agency, selecting an existing power of attorney template to use, and a maximum bond amount, which may be retained by hitting the "Save" button after being entered/selected.

FIG. 50 shows the options permitted after selecting "Grant Powers" in the dropdown list labeled "Powers of Attorney" in the GUI of FIG. 49, which includes choosing (i.e., entering) the agency, selecting an existing power of attorney template to use, and a maximum bond amount, which may be retained by hitting the "Save" button after being entered/selected.

Figure 51:
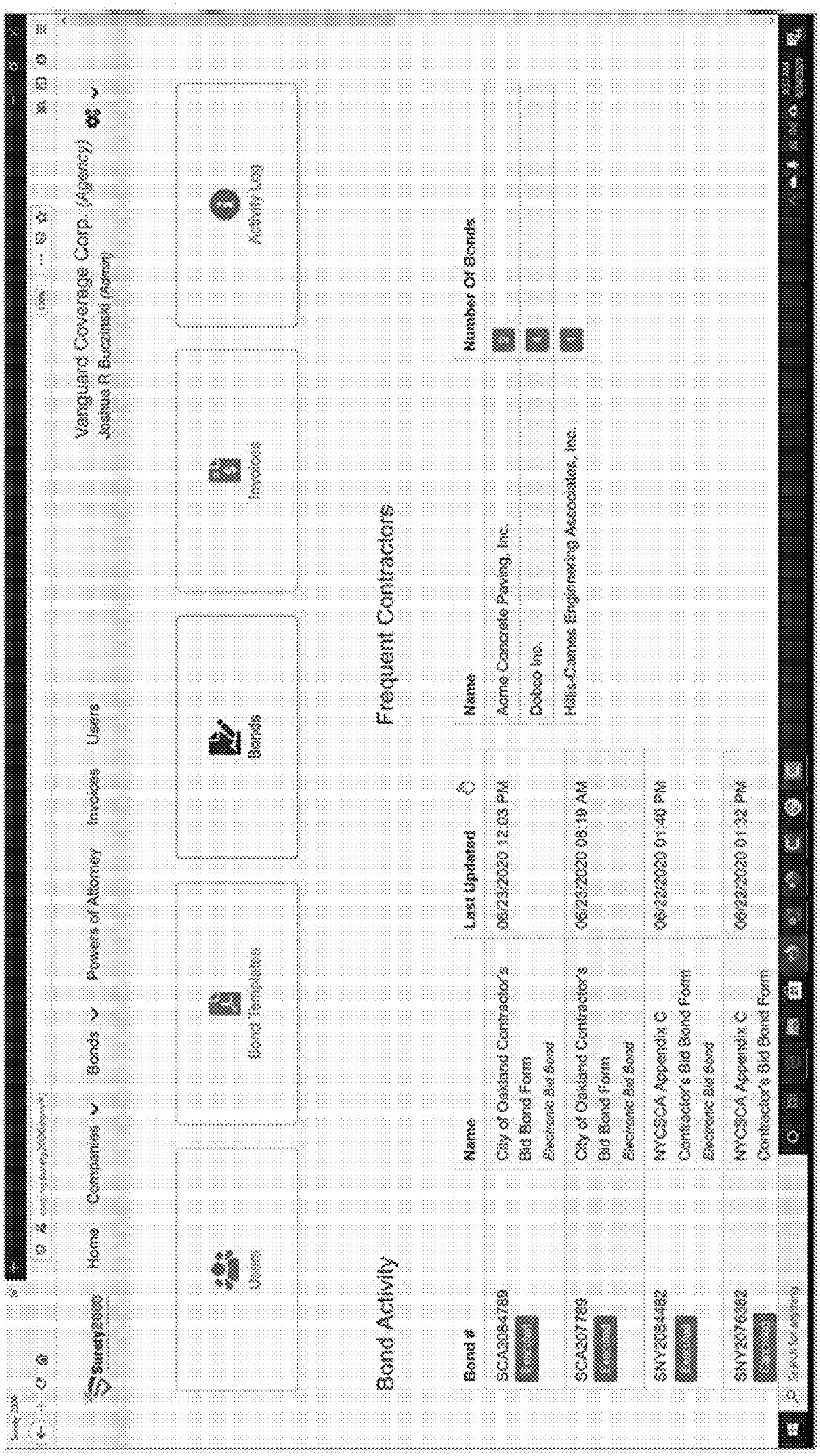
FIG. 51 illustrates a Surety Agent homepage GUI that may be utilized after a registered surety agent has logged into the network.

FIG. 51 illustrates a Surety Agent homepage GUI that may be utilized after a registered surety agent has logged into the network.

Figure 52:
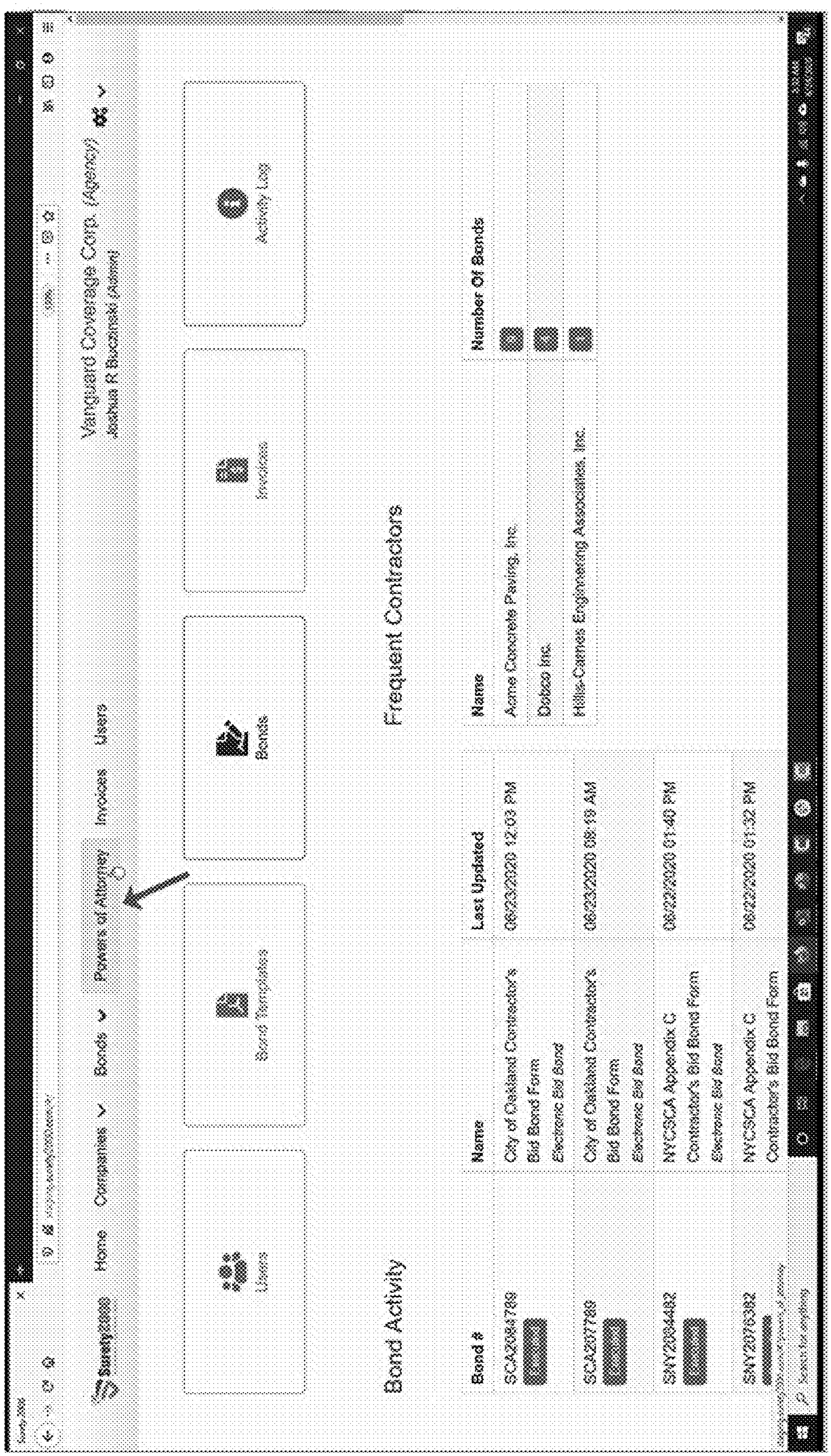
FIG. 52 shows the GUI homepage of FIG. 51, with agent hovering the cursor over the "Powers of Attorney" menu option.

FIG. 52 shows the GUI homepage of FIG. 51, with the agent hovering the cursor over the "Powers of Attorney" menu option.

Figure 53:
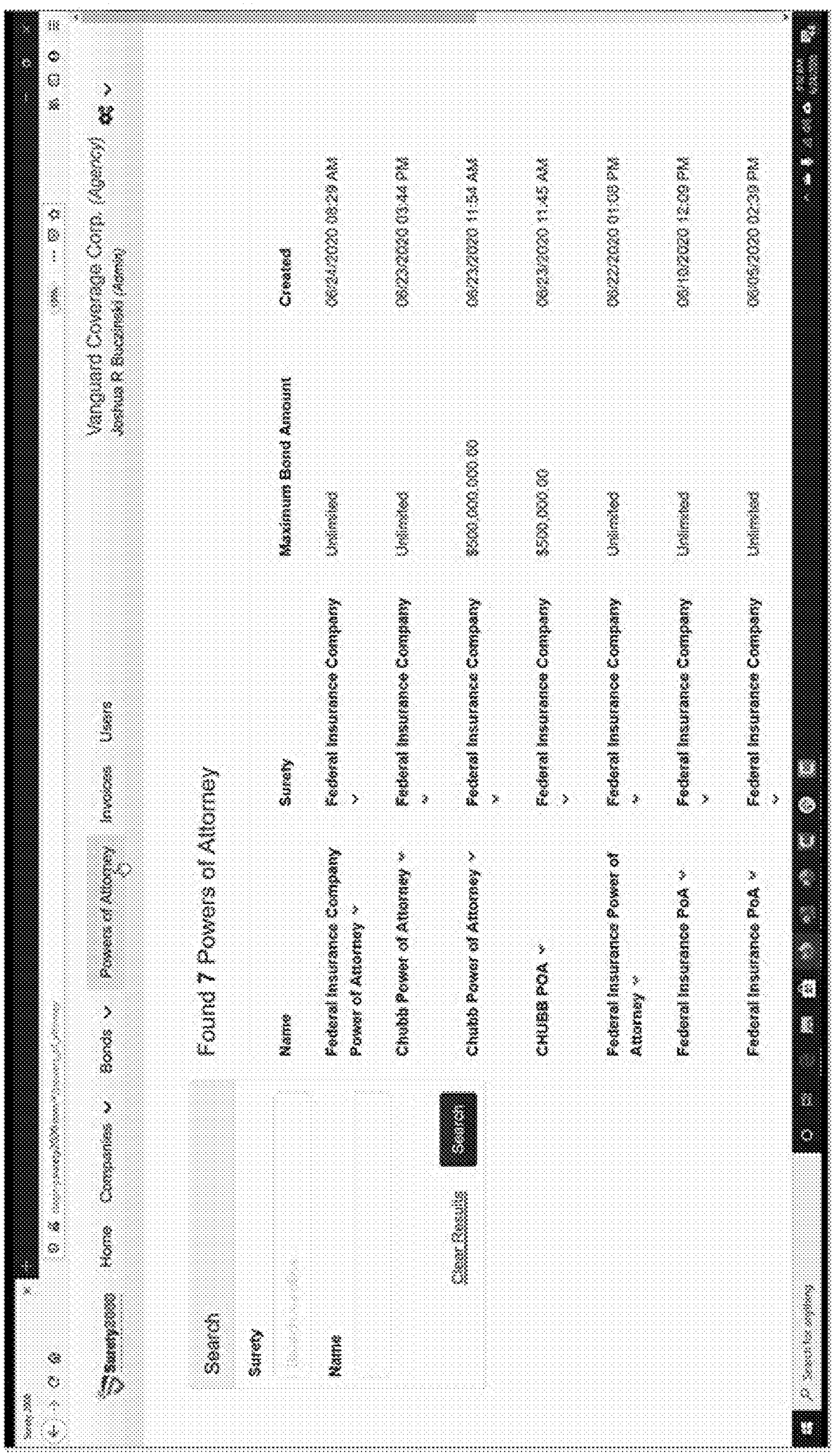
FIG. 53 shows a Power of Attorney GUI screen which will display all the Powers of Attorney granted to the agent that is logged in, after having selected the "Powers of Attorney" menu option in the GUI screen of FIG. 52, showing which powers of attorney are available to the agent, which surety granted the power, and the maximum bond amount.

FIG. 53 shows a Power of Attorney GUI screen which will display all the Powers of Attorney granted to the agent that is logged in, after having selected the "Powers of Attorney" menu option in the GUI screen of FIG. 52, showing which powers of attorney are available to the agent, which surety granted the power, and the maximum bond amount.

Figure 54:
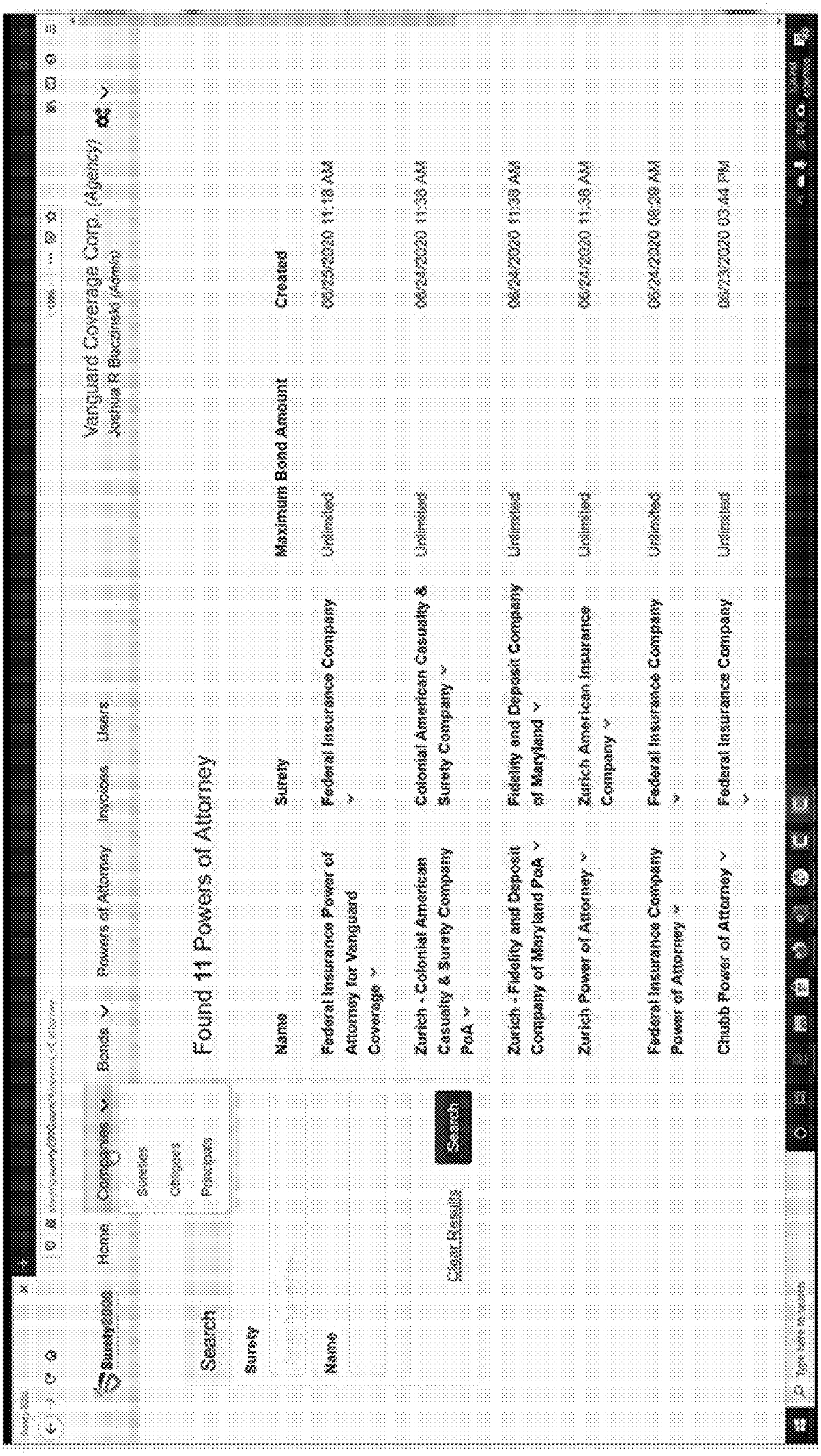
FIG. 54 shows the GUI screen of FIG. 53, with the agent hovering the cursor over the "Companies" dropdown list in the upper menu region.

FIG. 54 shows the GUI screen of FIG. 53, with the agent hovering the cursor over the "Companies" dropdown list in the upper menu region.

Figure 55:
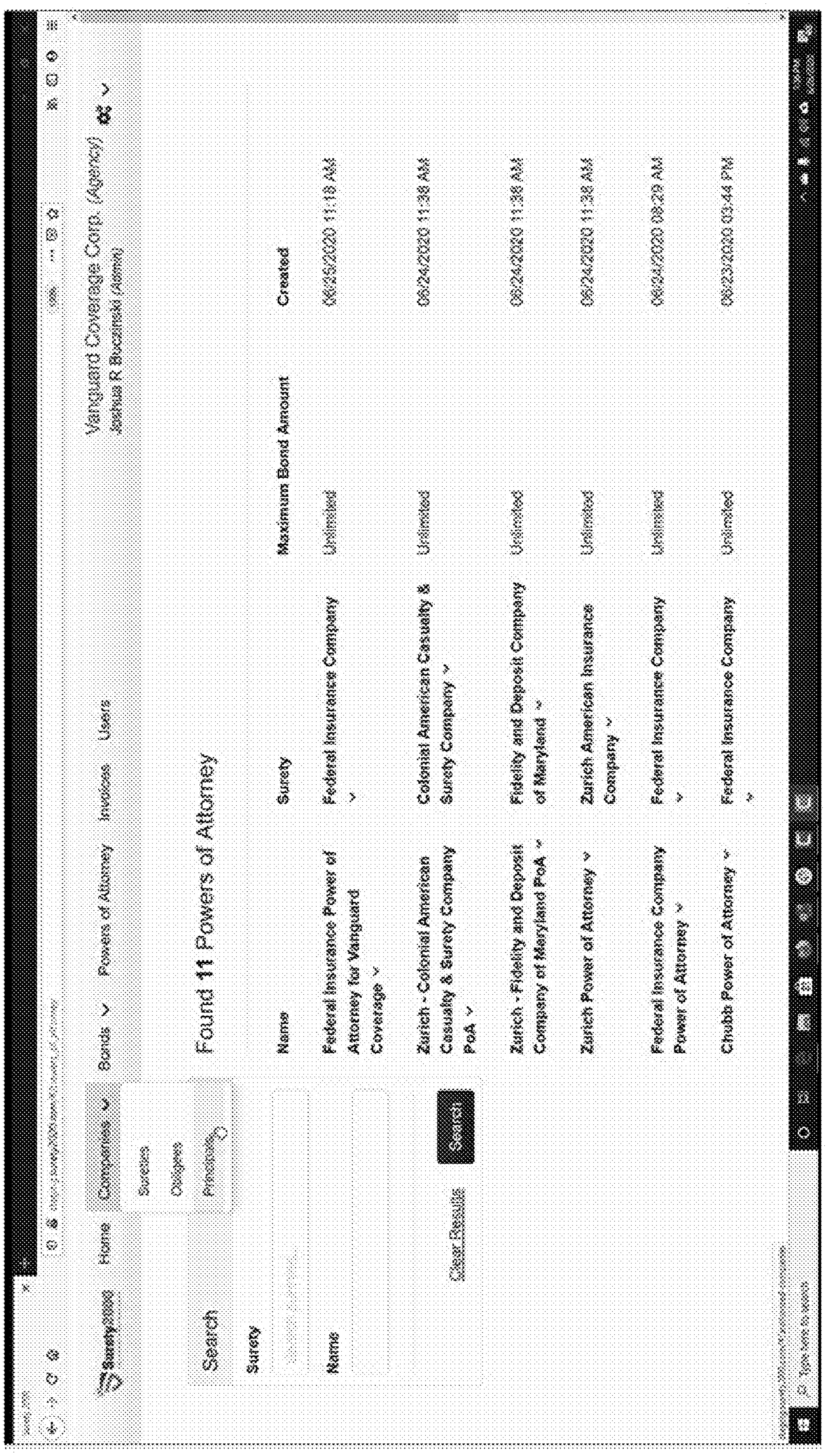
FIG. 55 shows the GUI screen of FIG. 54, with the agent hovering the cursor over the "Principals" option of the "Companies" dropdown list in the upper menu region, which must be used to add a contractor before a bond can be issued to that contractor (Principal)

FIG. 55 shows the GUI screen of FIG. 54, with the agent hovering the cursor over the "Principals" option of the "Companies" dropdown list in the upper menu region, which must be used to add a contractor before a bond can be issued to that contractor (Principal).

Figure 56:
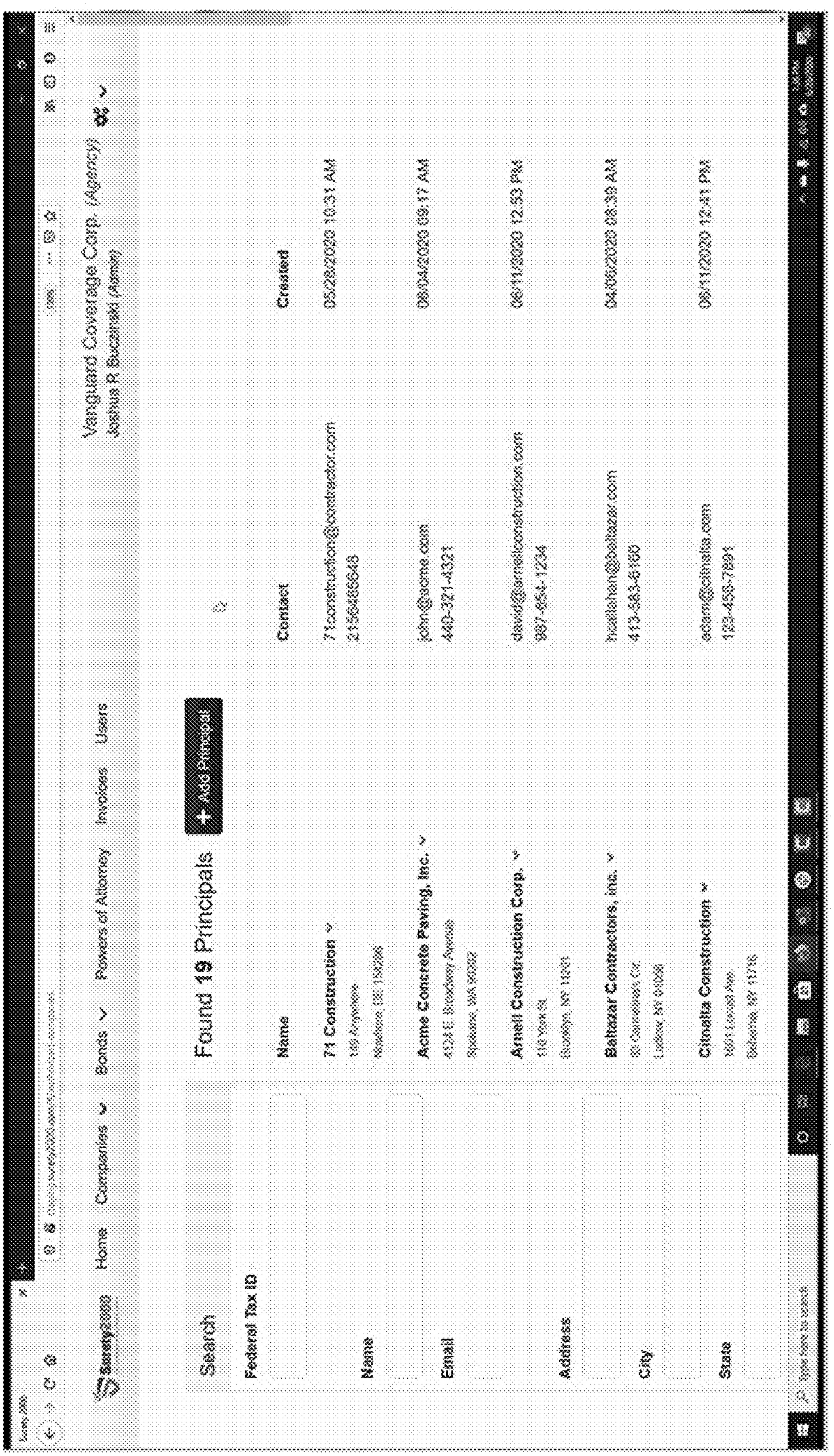
FIG. 56 is a GUI screen that will show every contractor (Principle) that has been added by the agent to the preferred contractor list, after the "Principals" option of the "Companies" dropdown list in the GUI of FIG. 55 has been selected.

FIG. 56 is a GUI screen that will show every contractor (Principle) that has been added by the agent to the preferred contractor list, after the "Principals" option of the "Companies" dropdown list in the GUI of FIG. 55 has been selected.

Figure 57:
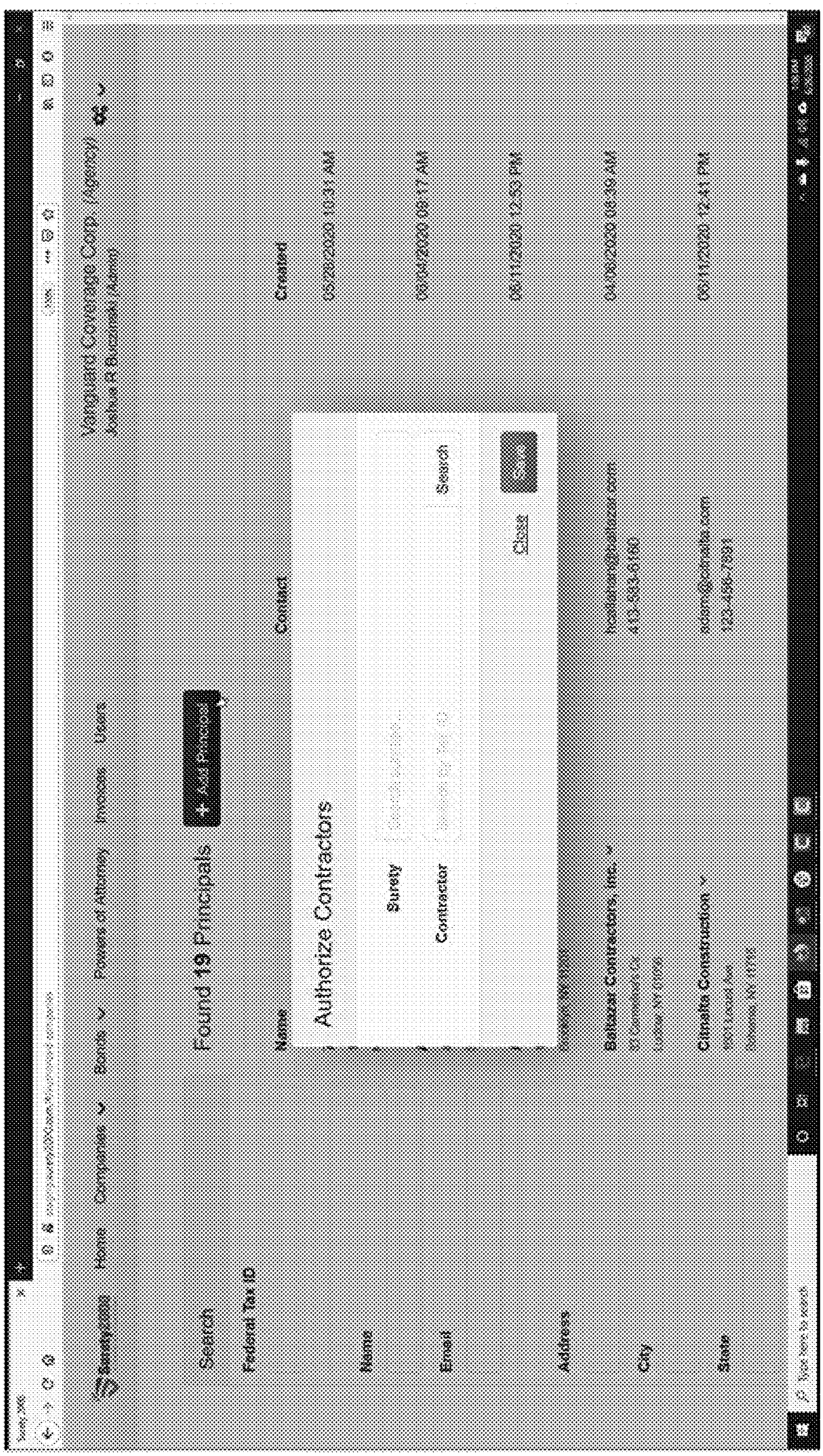
FIG. 57 shows the GUI screen of FIG. 56, after the agent has clicked on the "Add Principal" radio button, which triggers the system to display an "Authorize Contractors" window that permits the agent to enter the name of a Surety that he/she has a power of attorney with, and the tax ID of the Contractor (Principal) to be added.

FIG. 57 shows the GUI screen of FIG. 56, after the agent has clicked on the "Add Principal" radio button, which triggers the system to display an "Authorize Contractors" window that permits the agent to enter the name of a Surety that he/she has a power of attorney with, and the tax ID of the Contractor (Principal) to be added.

Figure 58:
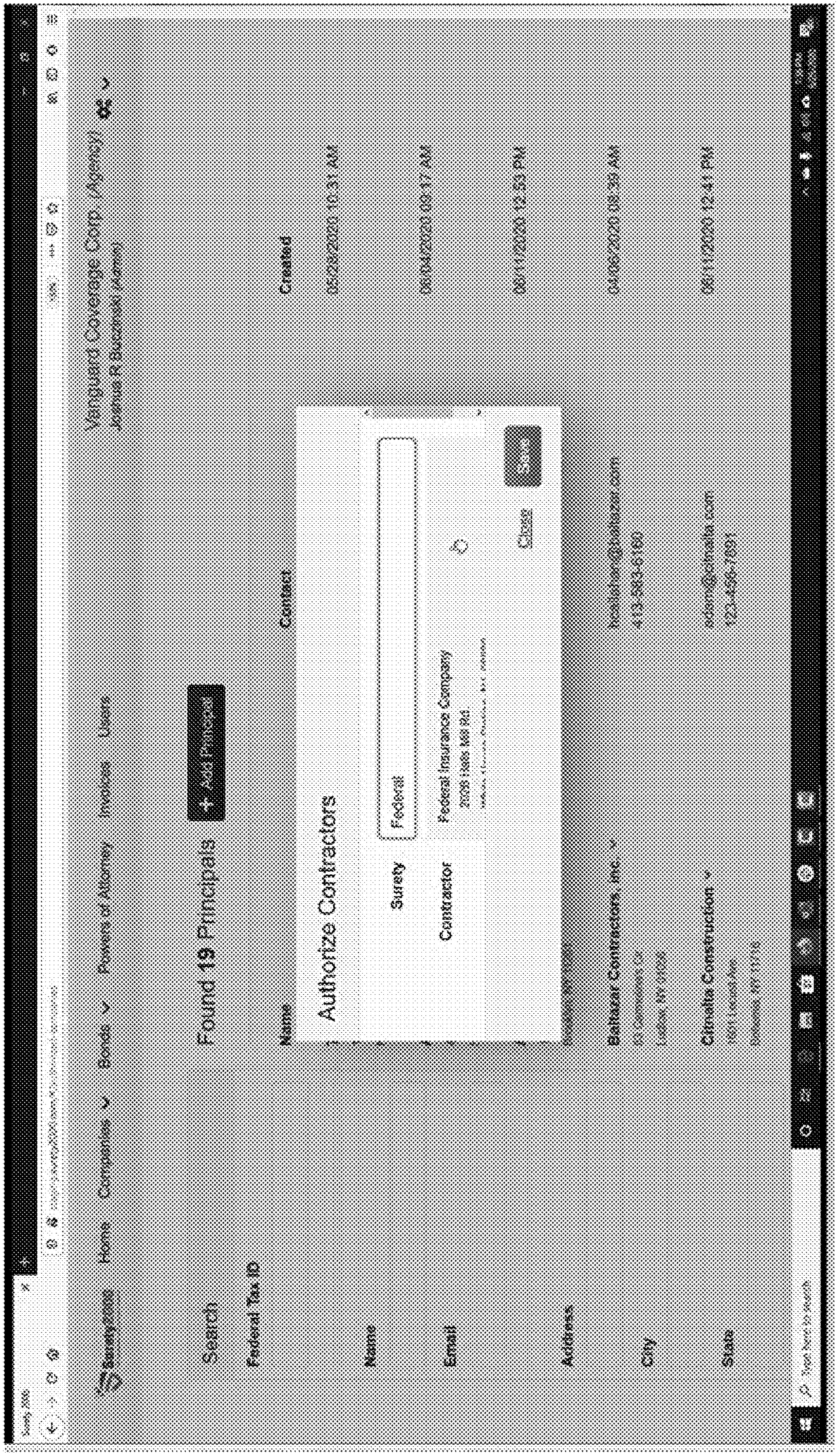
FIG. 58 shows the GUI screen of FIG. 57, after the agent has begun typing the name of the surety into the text box of the "Authorize Contractors" window, and also showing that any matching surety name(s) will automatically be populated below the text box if it had been previously entered, and which populated name(s) may be selected using the cursor.

FIG. 58 shows the GUI screen of FIG. 57, after the agent has begun typing the name of the surety into the text box of the "Authorize Contractors" window, and also showing that any matching surety name(s) will automatically be populated below the text box if it had been previously entered, and which populated name(s) may be selected using the cursor.

Figure 59:
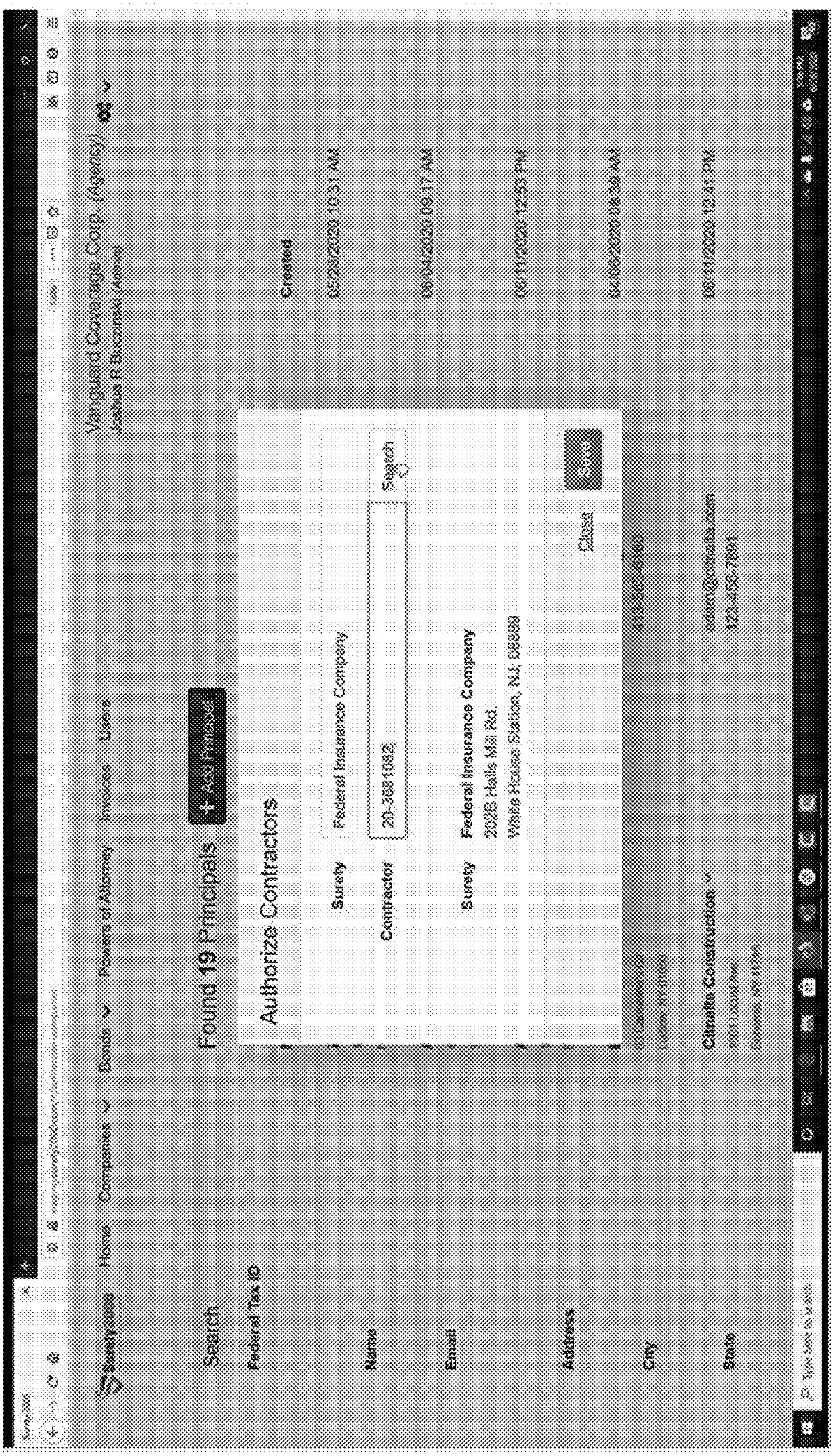
FIG. 59 shows the GUI screen of FIG. 58, after the agent had selected the "Federal Insurance Company" from the populated name list, after the agent has typed in the tax ID number of the Contractor to be added, and after the agent is hovering the cursor over the "search" button.

FIG. 59 shows the GUI screen of FIG. 58, after the agent had selected the "Federal Insurance Company" from the populated name list, after the agent has typed in the tax ID number of the Contractor to be added, and after the agent is hovering the cursor over the "search" button.

Figure 60:
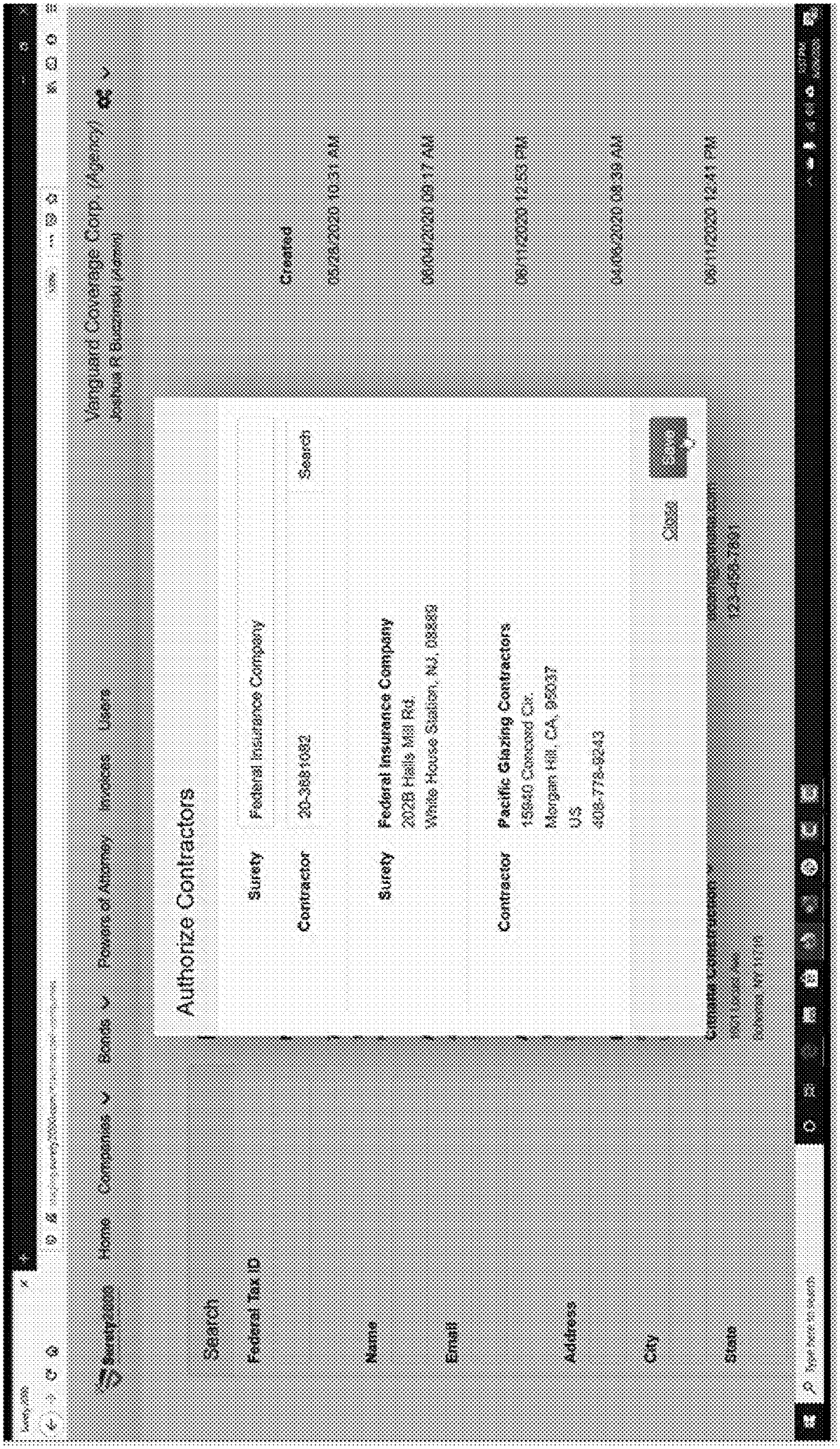
FIG. 60 shows the GUI screen of FIG. 58, but after the agent has toggled the "search" button, which results in the displaying, within the "Authorize Contractors" window, of the information on record for the entered tax ID number (i.e., "Pacific Glazing Contractors . . . ")

FIG. 60 shows the GUI screen of FIG. 58, but after the agent has toggled the "search" button, which results in the displaying, within the "Authorize Contractors" window, of the information on record for the entered tax ID number (i.e., "Pacific Glazing Contractors . . . ").

Figure 61:
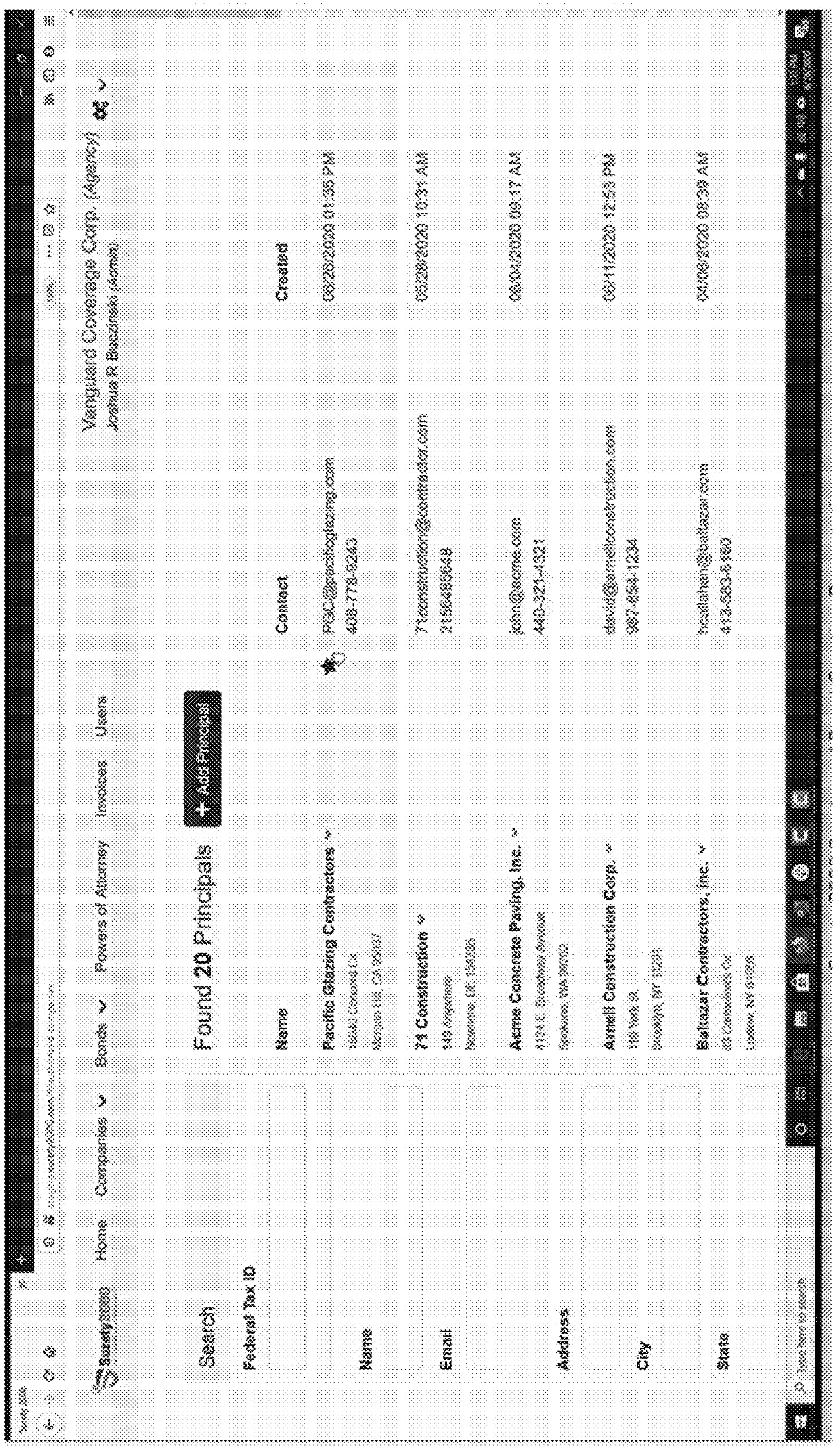
FIG. 61 shows the GUI screen of FIG. 56, which lists every contractor (Principle) that has been added by the agent to the preferred contractor list, including the "Pacific Glazing Contractors" that was added by hitting "save" in the GUI screen of FIG. 56, and in which the agent is selecting the star next to the newly added contractor "Pacific Glazing Contractors" to make that contractor a favored contractor, which favored contractors appear at the top of the list.

FIG. 61 shows the GUI screen of FIG. 56, which lists every contractor (Principle) that has been added by the agent to the preferred contractor list, including the "Pacific Glazing Contractors" that was added by hitting "save" in the GUI screen of FIG. 56, and in which the agent is selecting the star next to the newly added contractor "Pacific Glazing Contractors" to make that contractor a favored contractor, which favored contractors appear at the top of the list.

Figure 62:
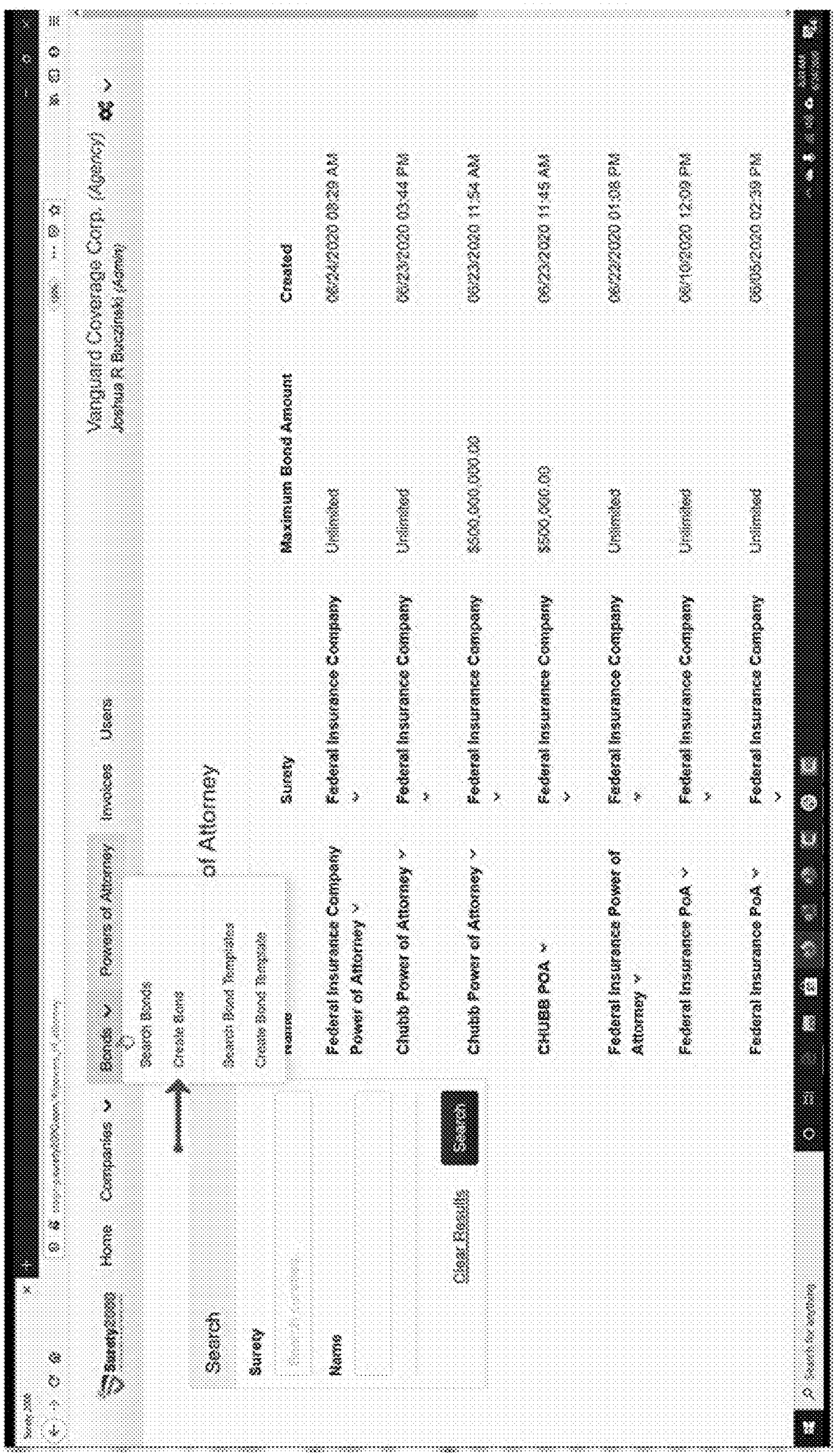
FIG. 62 shows the GUI screen of FIG. 61, with the agent hovering the cursor over the "Create Bond" option in the "Bonds" menu item in the upper menu region, which, when toggled, will cause displaying of a bond creation GUI screen.

FIG. 62 shows the GUI screen of FIG. 61, with the agent hovering the cursor over the "Create Bond" option in the "Bonds" menu item in the upper menu region, which, when toggled, will cause displaying of a bond creation GUI screen.

Figure 63:
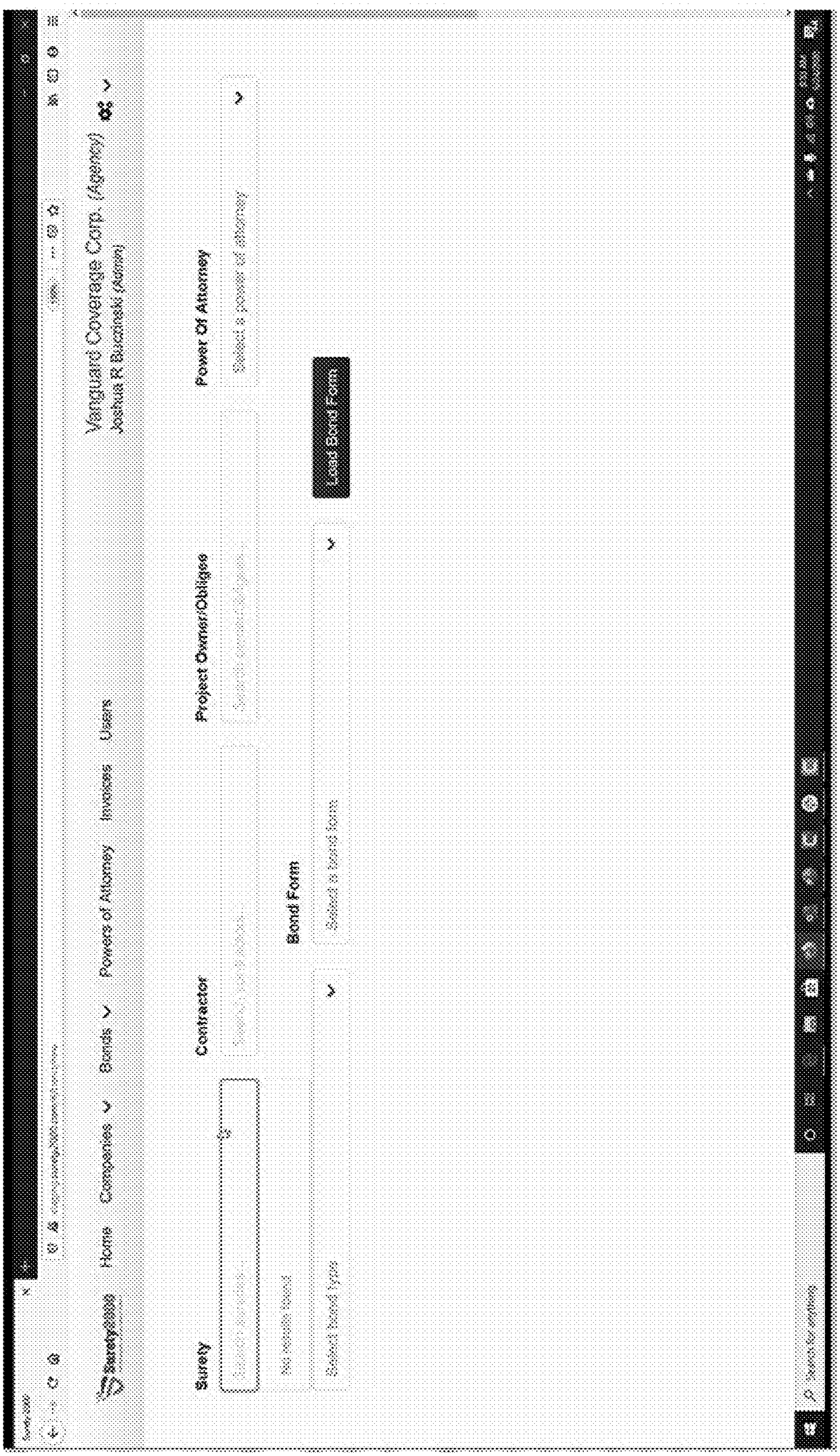
FIG. 63 shows the bond creation GUI screen, which is displayed after the "Create Bond" option in FIG. 62 is toggled.

FIG. 63 shows the bond creation GUI screen, which is displayed after the "Create Bond" option in FIG. 62 is toggled.

Figure 64:
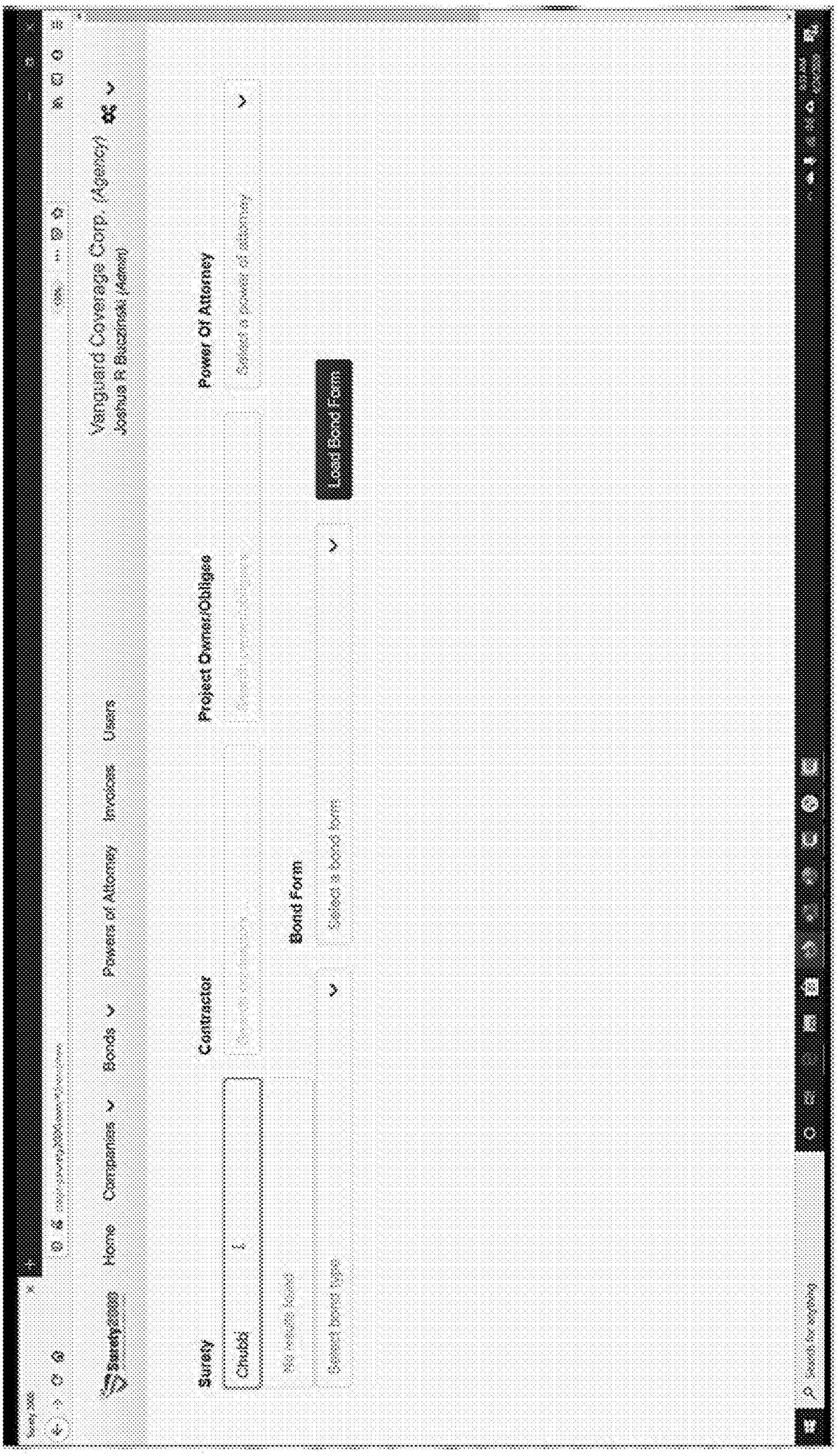
FIG. 64 shows the bond creation GUI screen of FIG. 63, in which the agent has typed "Chubb" into the "Surety" text box, which does not result in the displaying of associated surety information, saying "No Results Found," indicating that "Chubb" has not given that agent any powers of attorney.

FIG. 64 shows the bond creation GUI screen of FIG. 63, in which the agent has typed "Chubb" into the "Surety" text box, which does not result in the displaying of associated surety information, saying "No Results Found," indicating that "Chubb" has not given that agent any powers of attorney.

Figure 65:
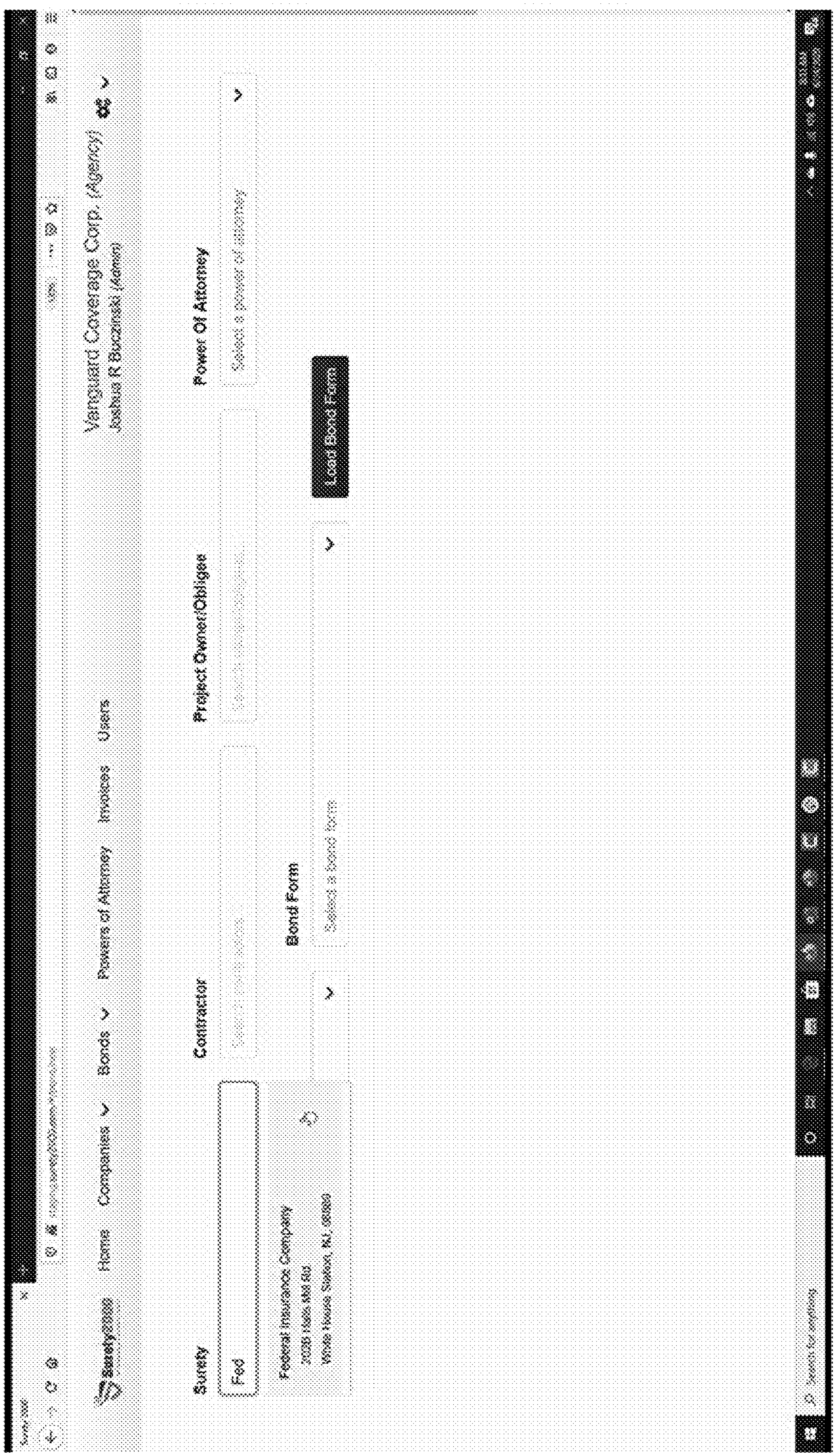
FIG. 65 shows the bond creation GUI screen of FIG. 63, in which the agent has typed "Fed" into the "Surety" text box, which results in the populating of associated surety information below the text box, indicating that "Federal Insurance Company" has given that agent a power of attorney, and which can be selected by the agent.

FIG. 65 shows the bond creation GUI screen of FIG. 63, in which the agent has typed "Fed" into the "Surety" text box, which results in the populating of associated surety information below the text box, indicating that "Federal Insurance Company" has given that agent a power of attorney, and which can be selected by the agent.

Figure 66:
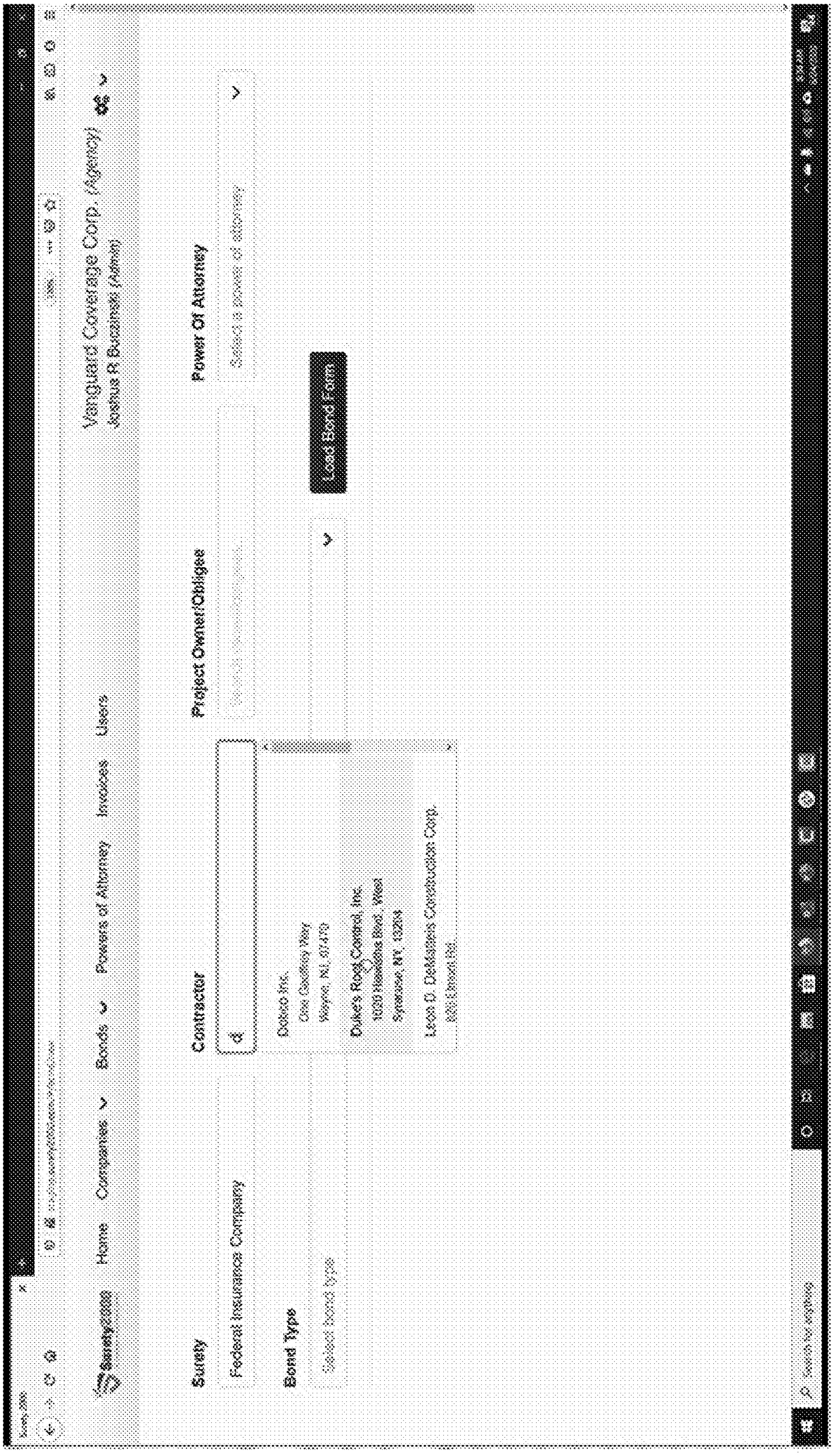
FIG. 66 shows the bond creation GUI screen of FIG. 65, in which the agent has typed the letter "D" into the "Contractor" text box, which results in the populating of contractor information below the text box for those contractors whose name begins with "D" and which is on the agent's contractor list, any of which may be selected by the agent, including the desired contractor "Duke's Root Control, Inc."

FIG. 66 shows the bond creation GUI screen of FIG. 65, in which the agent has typed the letter "D" into the "Contractor" text box, which results in the populating of contractor information below the text box for those contractors whose name begins with "D" and which is on the agent's contractor list, any of which may be selected by the agent, including the desired contractor "Duke's Root Control, Inc."

Figure 67:
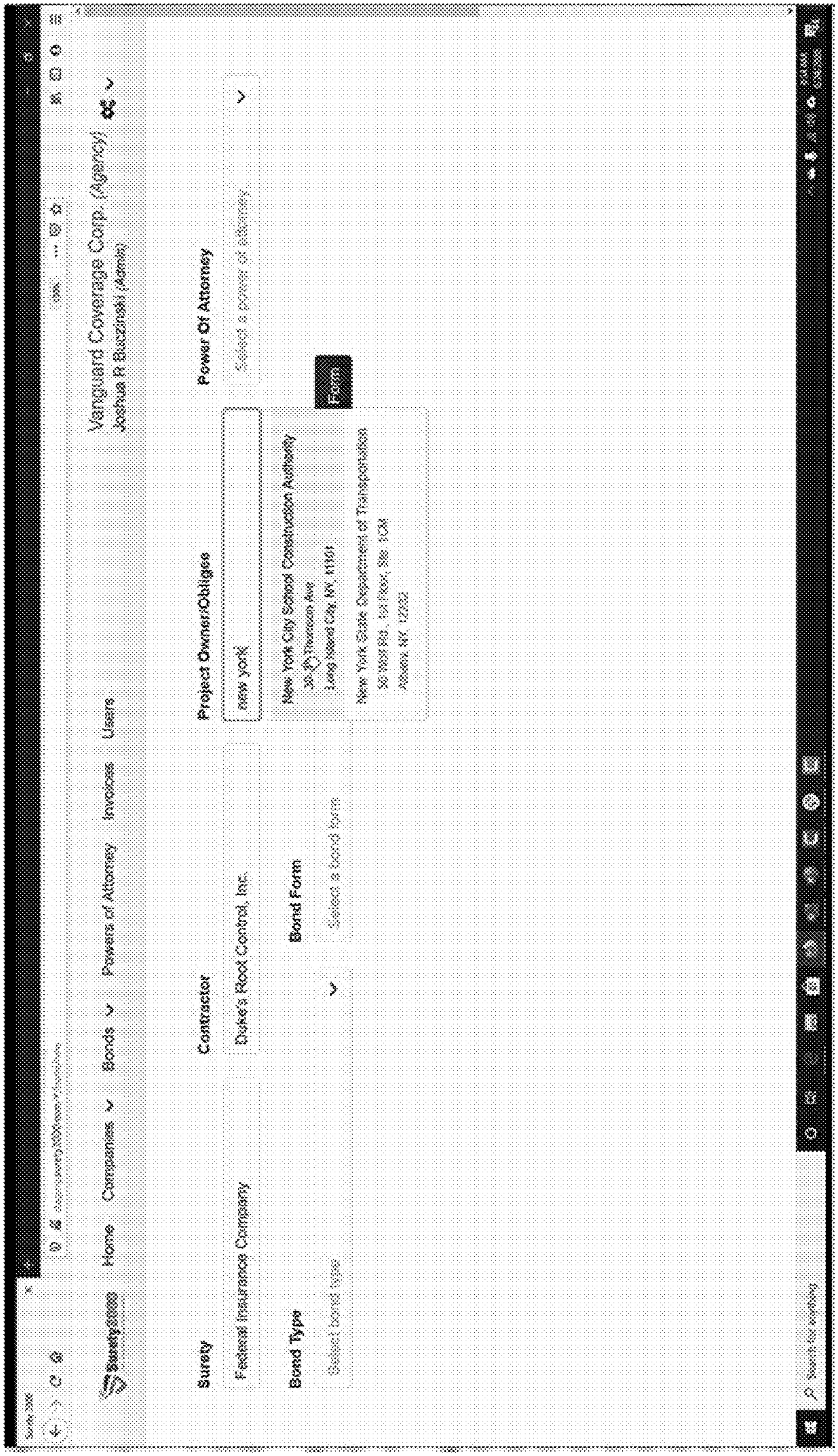
FIG. 67 shows the bond creation GUI screen of FIG. 66, in which the agent has typed the words "new york" into the "Project Owner/Obligee" text box, which results in the populating of owner/obligee information below the text box for those owners/obligees whose name includes the words "new york," any of which may be selected by the agent, including the desired owner/obligee "New York City School Construction Authority"

FIG. 67 shows the bond creation GUI screen of FIG. 66, in which the agent has typed the words "new york" into the "Project Owner/Obligee" text box, which results in the populating of owner/obligee information below the text box for those owners/obligees whose name includes the words "new york," any of which may be selected by the agent, including the desired owner/obligee "New York City School Construction Authority."

Figure 68:
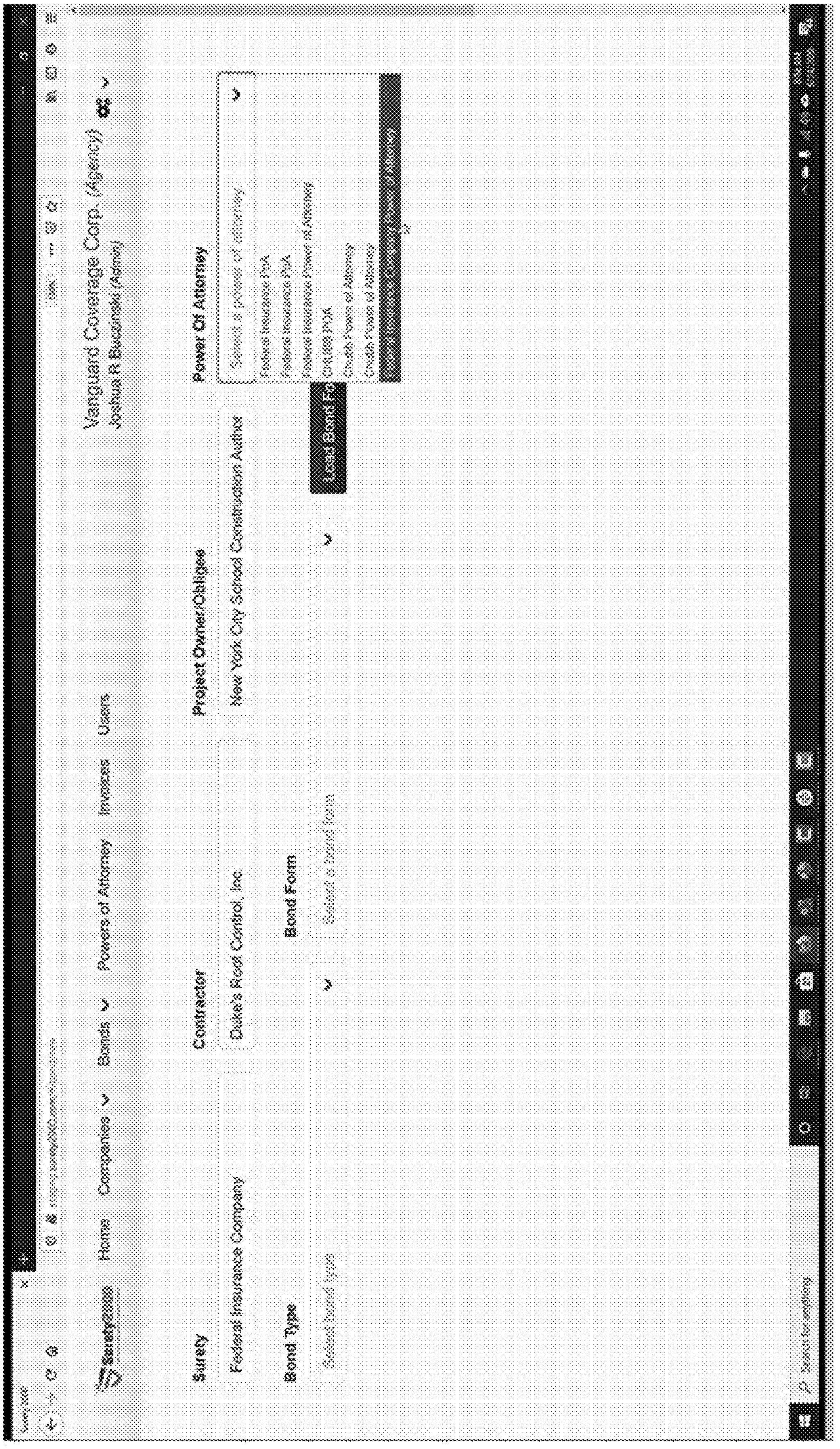
FIG. 68 shows the bond creation GUI screen of FIG. 67, in which the agent has toggled the dropdown list for the "Power of Attorney" which shows all the powers of attorney that have been granted to that agent.

FIG. 68 shows the bond creation GUI screen of FIG. 67, in which the agent has toggled the dropdown list for the "Power of Attorney" which shows all the powers of attorney that have been granted to that agent.

Figure 69:
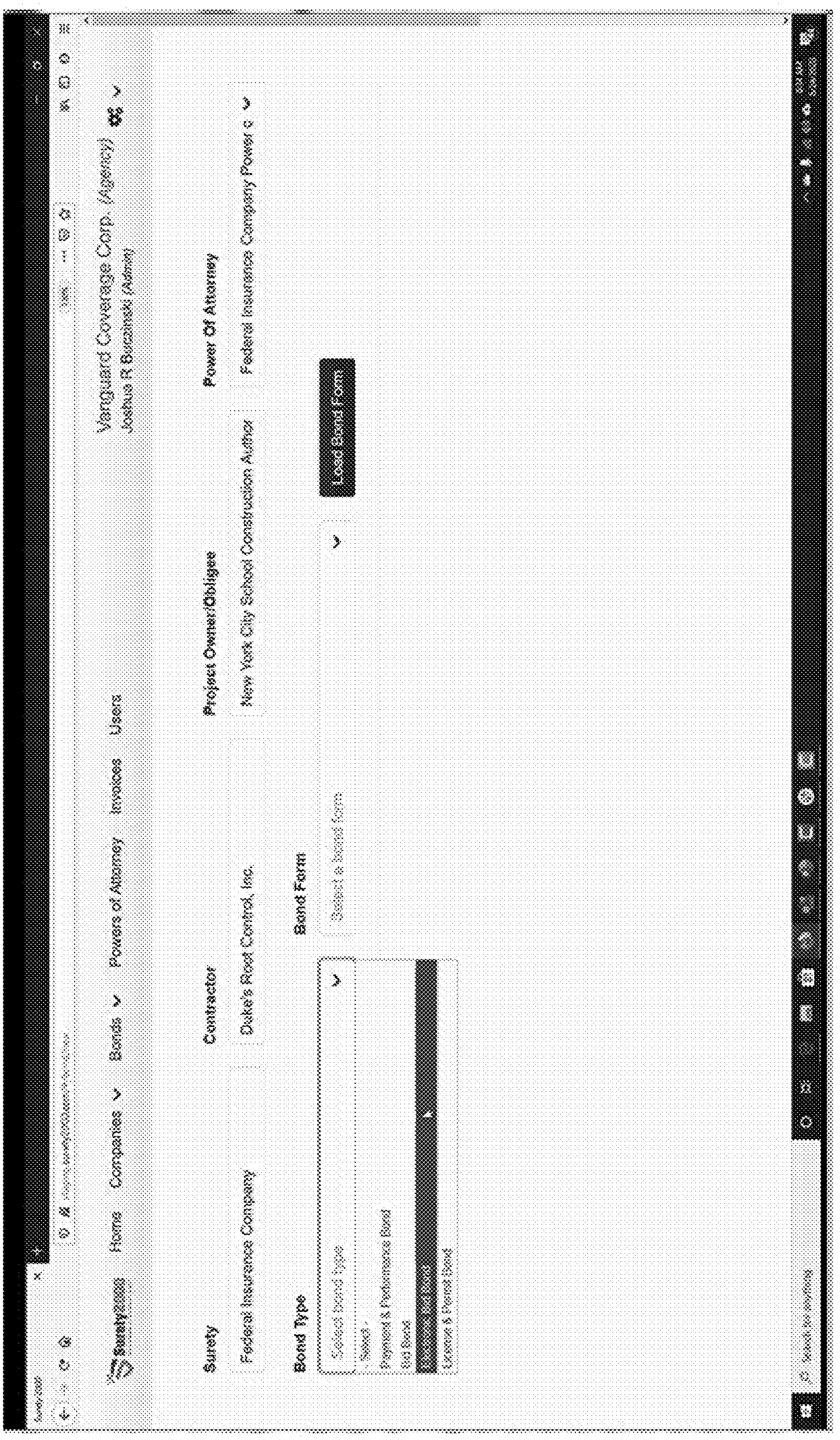
FIG. 69 shows the bond creation GUI screen of FIG. 68, in which the agent has toggled the dropdown list for the "Bond Type" which shows all the bond types that are available, with the agent selecting "Electronic Bid Bond"

FIG. 69 shows the bond creation GUI screen of FIG. 68, in which the agent has toggled the dropdown list for the "Bond Type" which shows all the bond types that are available, with the agent selecting "Electronic Bid Bond."

Figure 70:
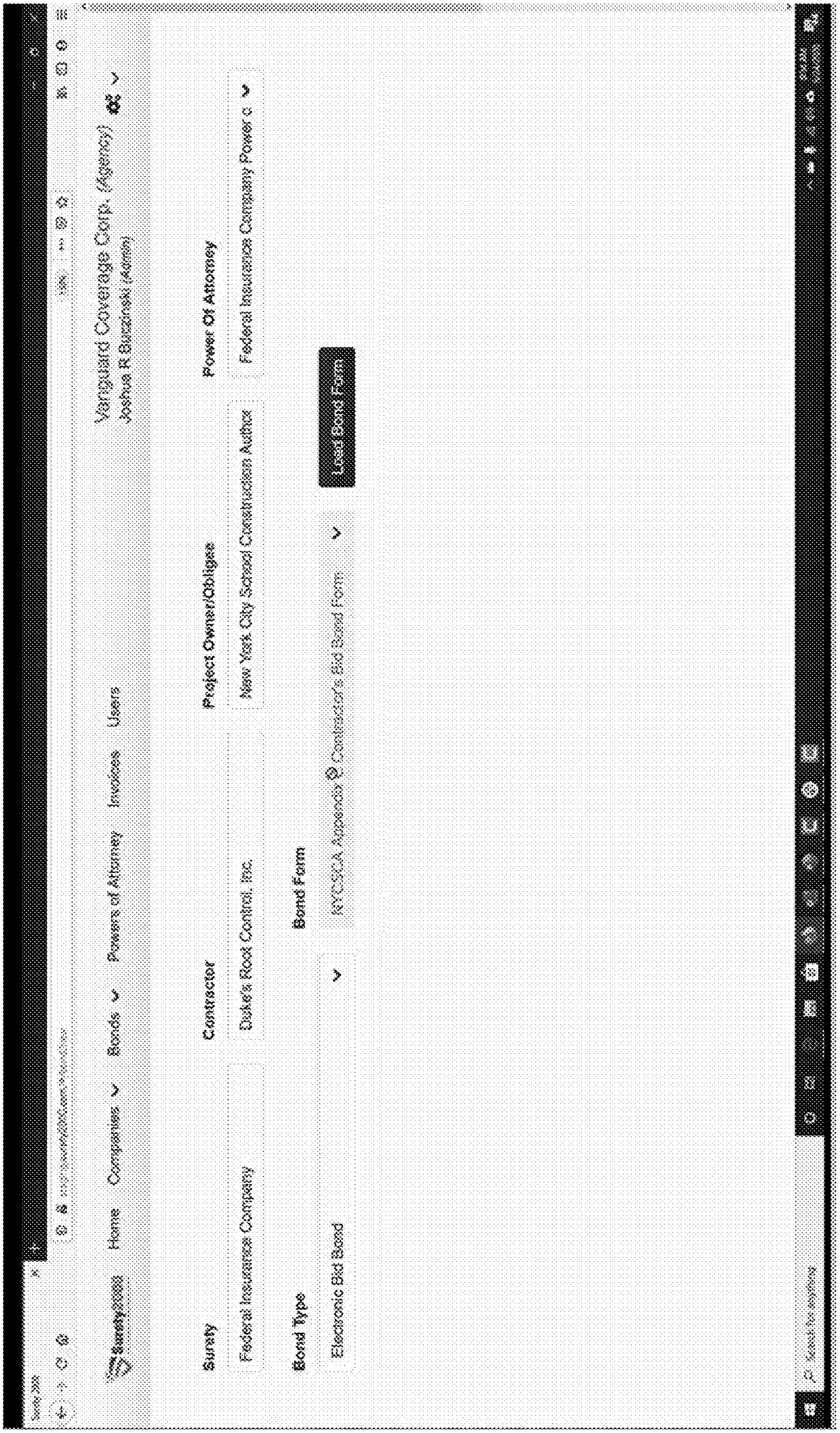
FIG. 70 shows the bond creation GUI screen of FIG. 69, in which the "Bond Form" will already be chosen by default.

FIG. 70 shows the bond creation GUI screen of FIG. 69, in which the "Bond Form" will already be chosen by default.

Figure 71A:
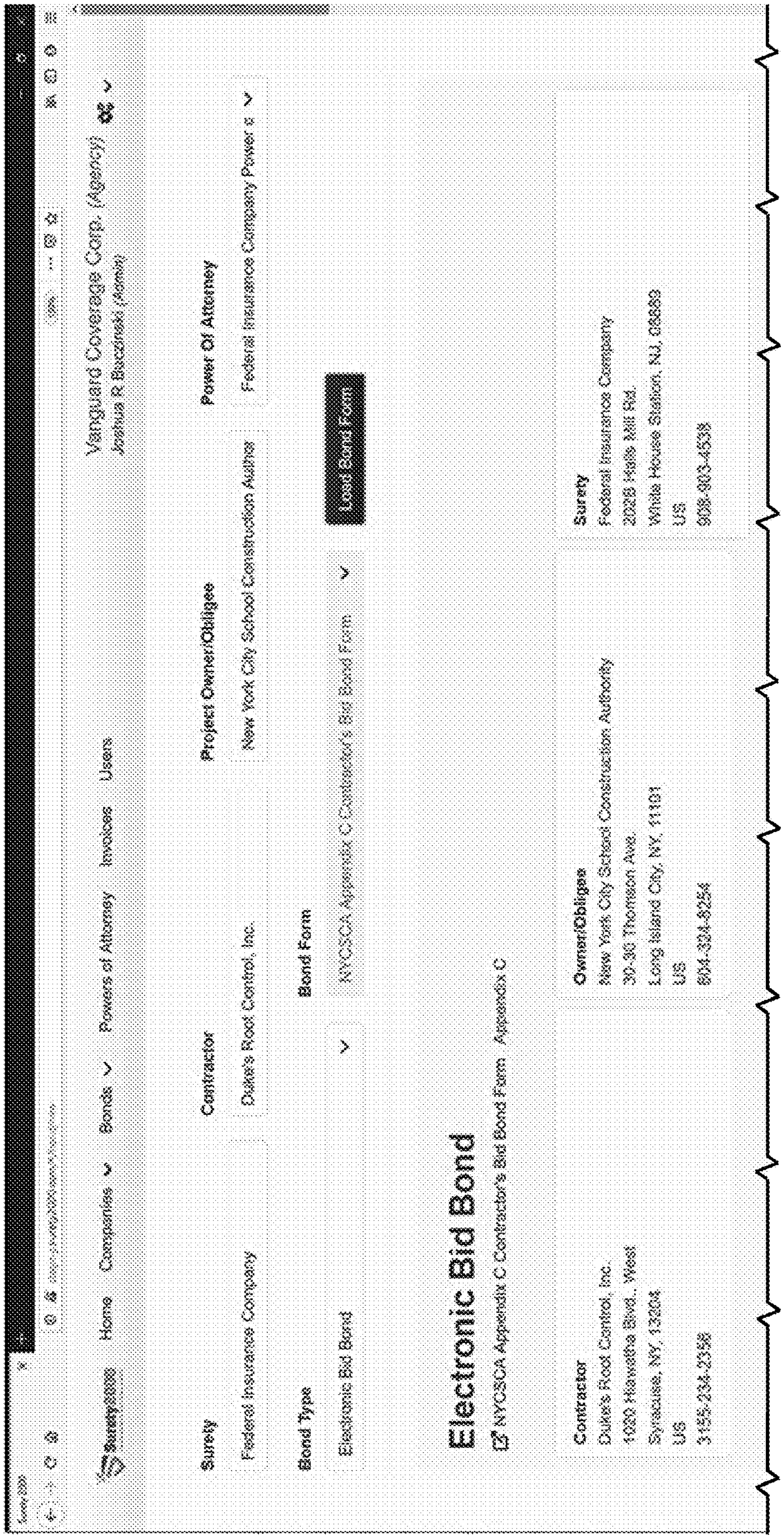
FIGS. 71A and 71B respectively show an upper portion and a lower portion of a GUI screen that displays the Electronic Bid Bond that was created when the "Load Bond Form" is toggled in the GUI screen of FIG. 70, and into which the agent can add details for the bond, and which shows a bond number that is automatically generated by the system.
Figure 71B:
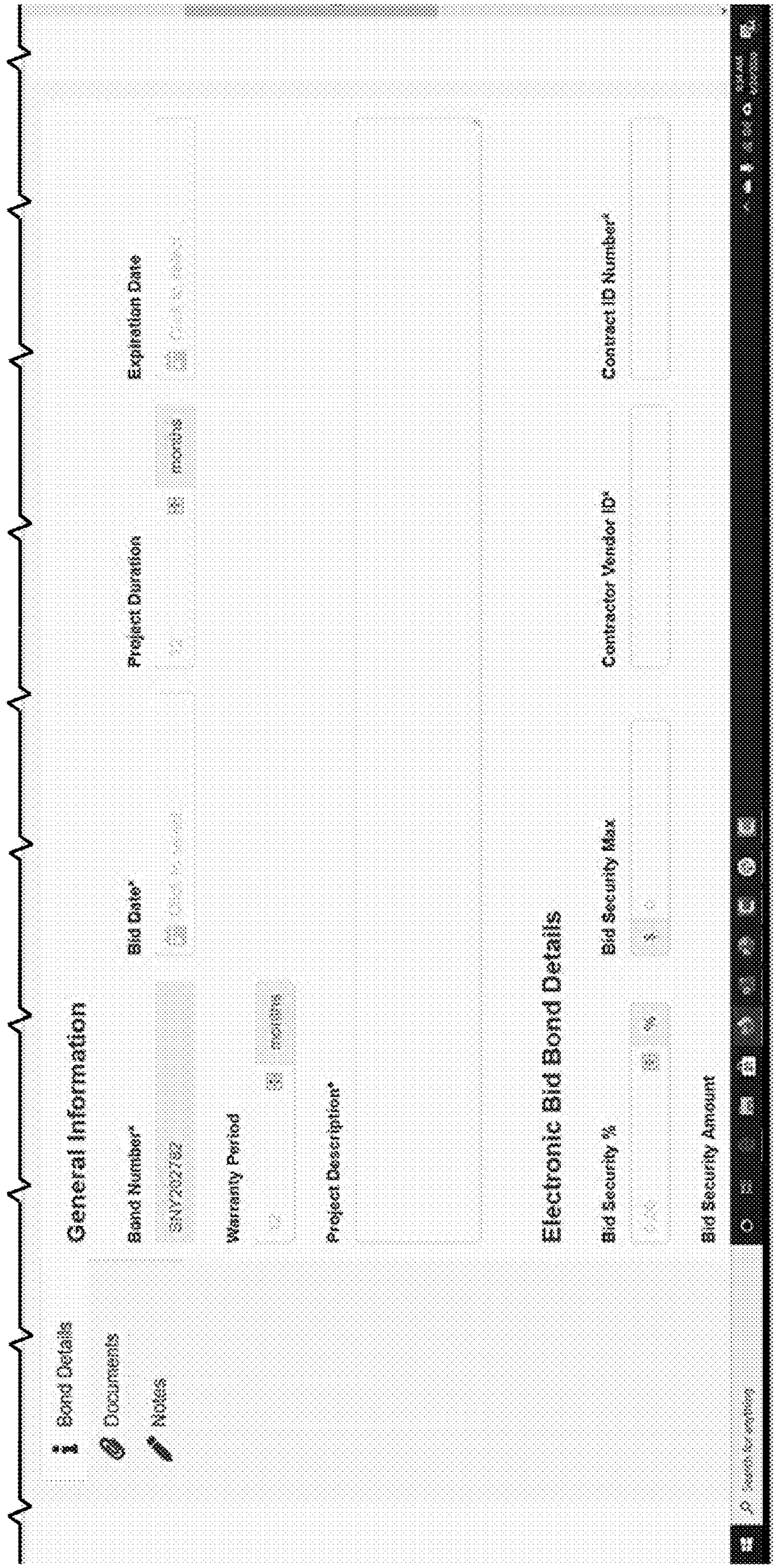

FIGS. 71A and 71B respectively show an upper portion and a lower portion of a GUI screen that displays the Electronic Bid Bond that was created when the "Load Bond Form" is toggled in the GUI screen of FIG. 70, and into which the agent can add details for the bond, and which shows a bond number that is automatically generated by the system.

Figure 72:
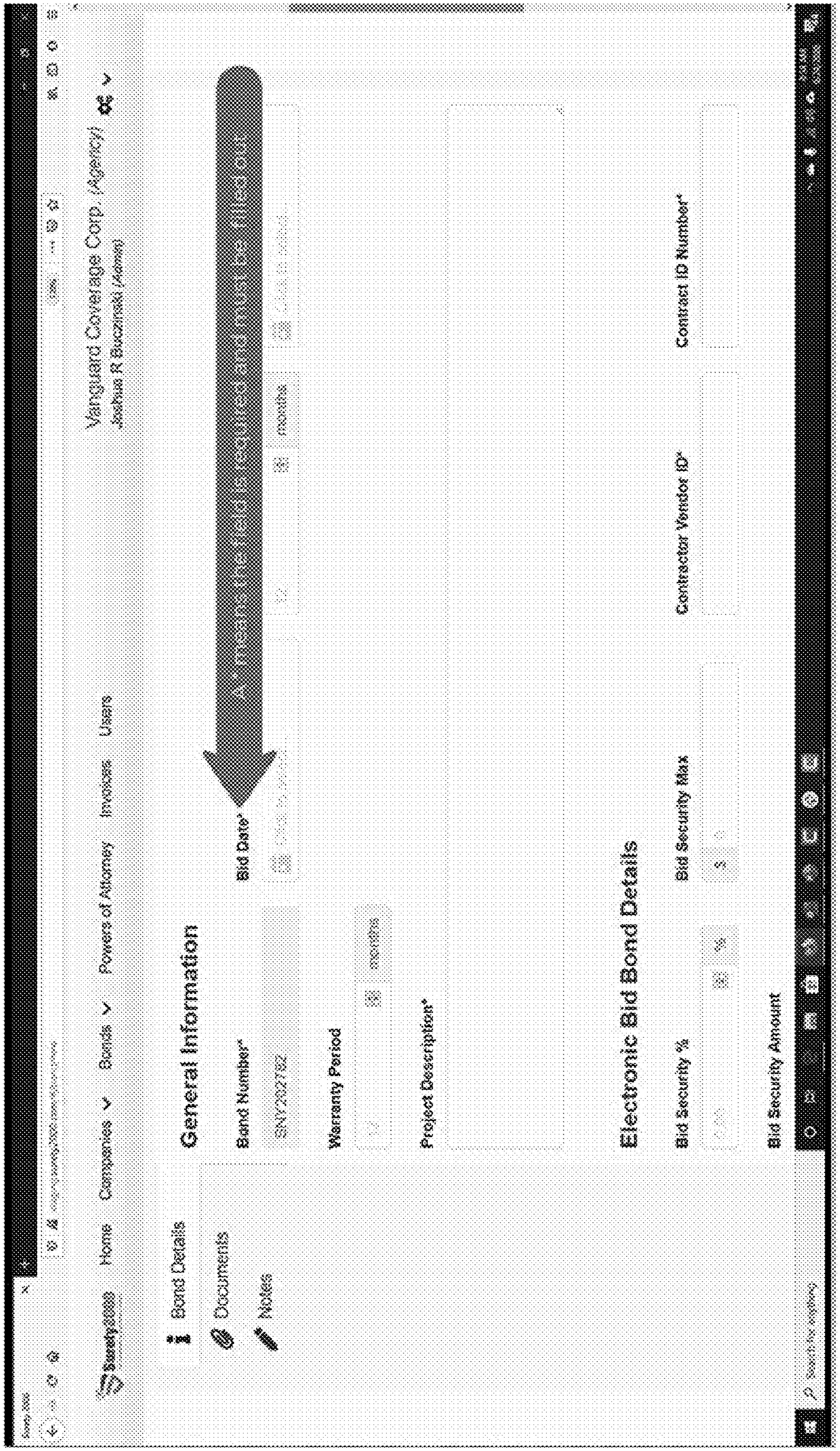
FIG. 72 shows the lower portion of the Electronic Bid Bond of the GUI screen of FIG. 71B, and is shown with the starred "Bid Date" being highlighted to indicate that the agent is required to provide an entry into that field because of the star.

FIG. 72 shows the lower portion of the Electronic Bid Bond of the GUI screen of FIG. 71B, and is shown with the starred "Bid Date" being highlighted to indicate that the agent is required to provide an entry into that field because of the star.

Figure 73:
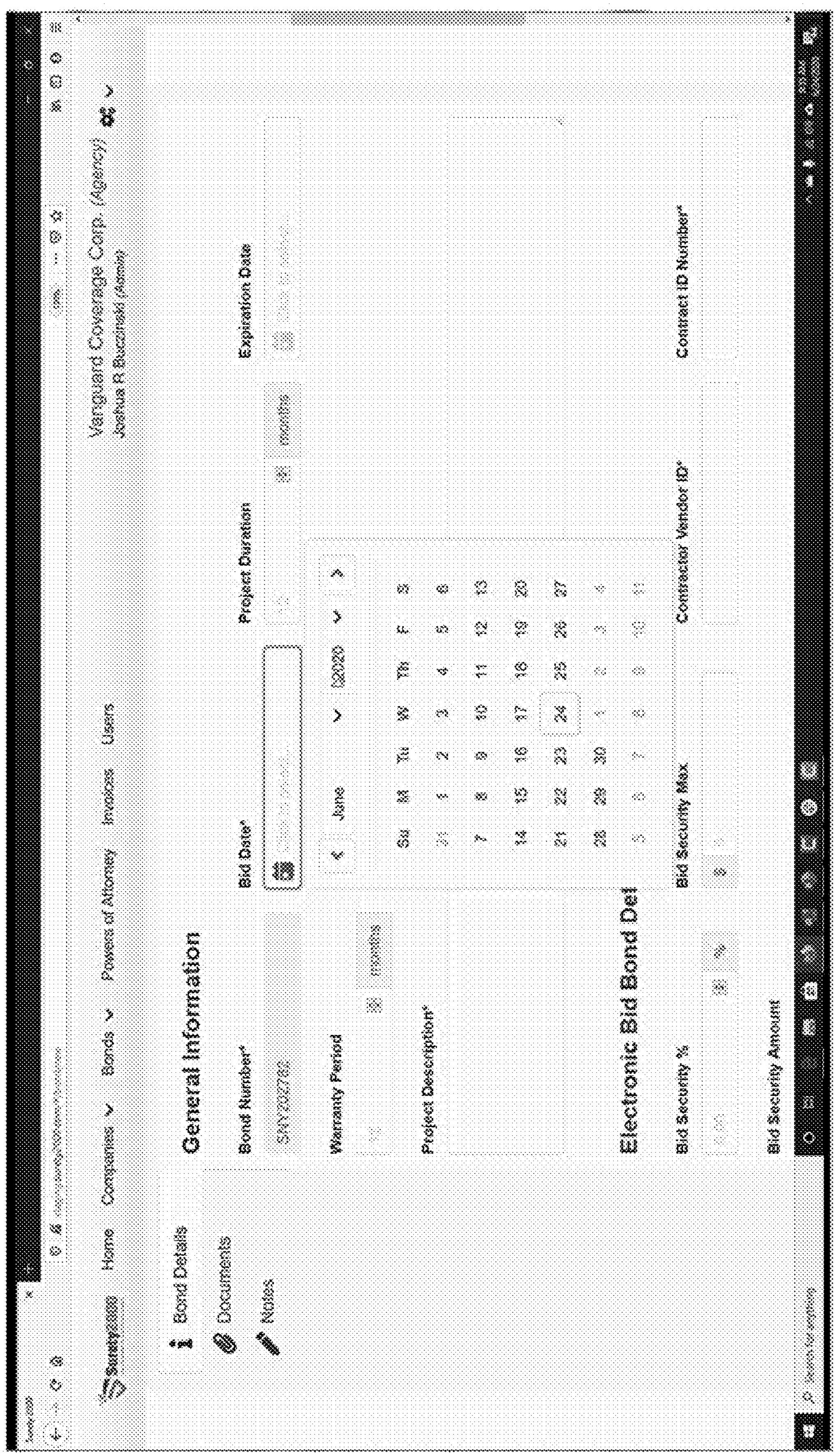
FIG. 73 shows the Electronic Bid Bond of the GUI screen of FIG. 72, shown with the agent having toggled the date picker calendar to permit selection of the "Bid Date" therein.

FIG. 73 shows the Electronic Bid Bond of the GUI screen of FIG. 72, shown with the agent having toggled the date picker calendar to permit selection of the "Bid Date" therein.

Figure 74A:
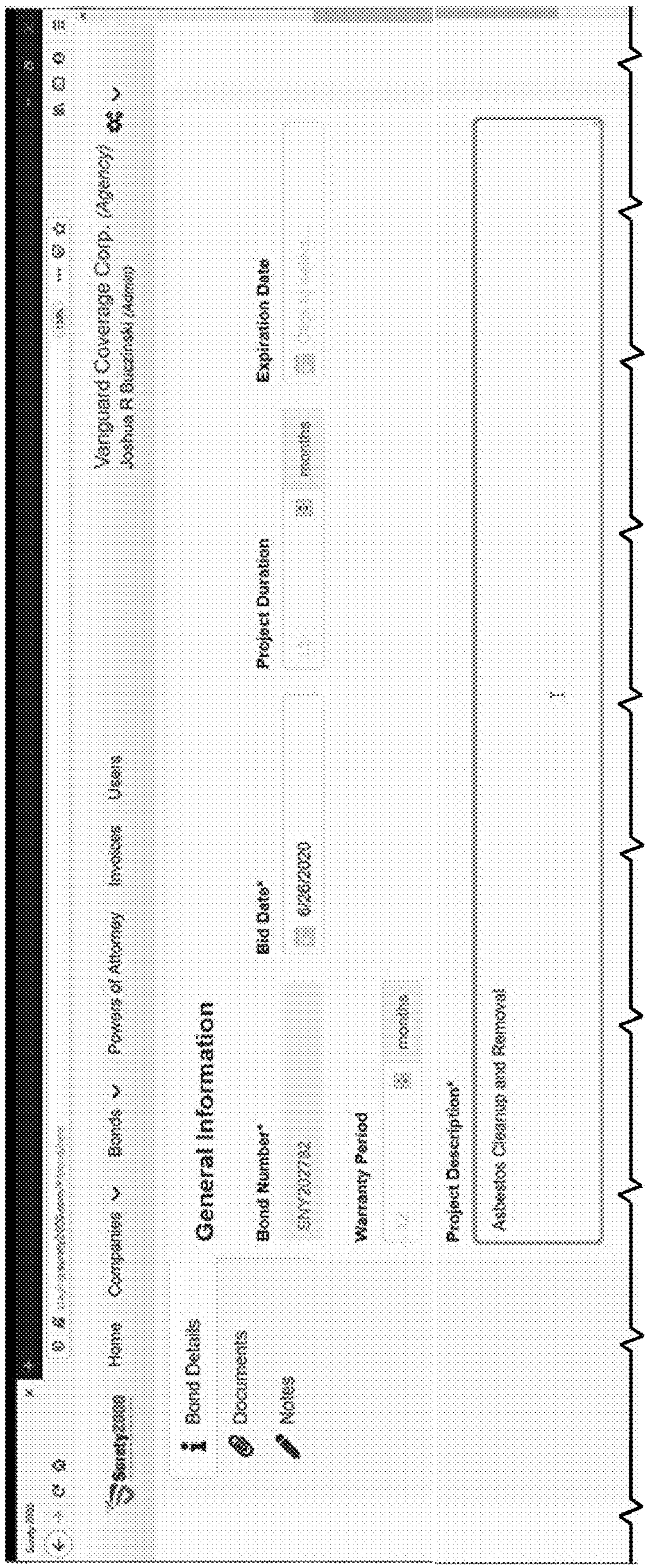
FIG. 74A shows the upper portions of the Electronic Bid Bond of the GUI screen of FIG. 73, but is shown after the agent has entered a description ("Asbestos Cleanup and Removal") into the "Project Description" text box.

FIG. 74A shows the upper portions of the Electronic Bid Bond of the GUI screen of FIG. 73, but is shown after the agent has entered a description ("Asbestos Cleanup and Removal") into the "Project Description" text box.

Figure 74B:
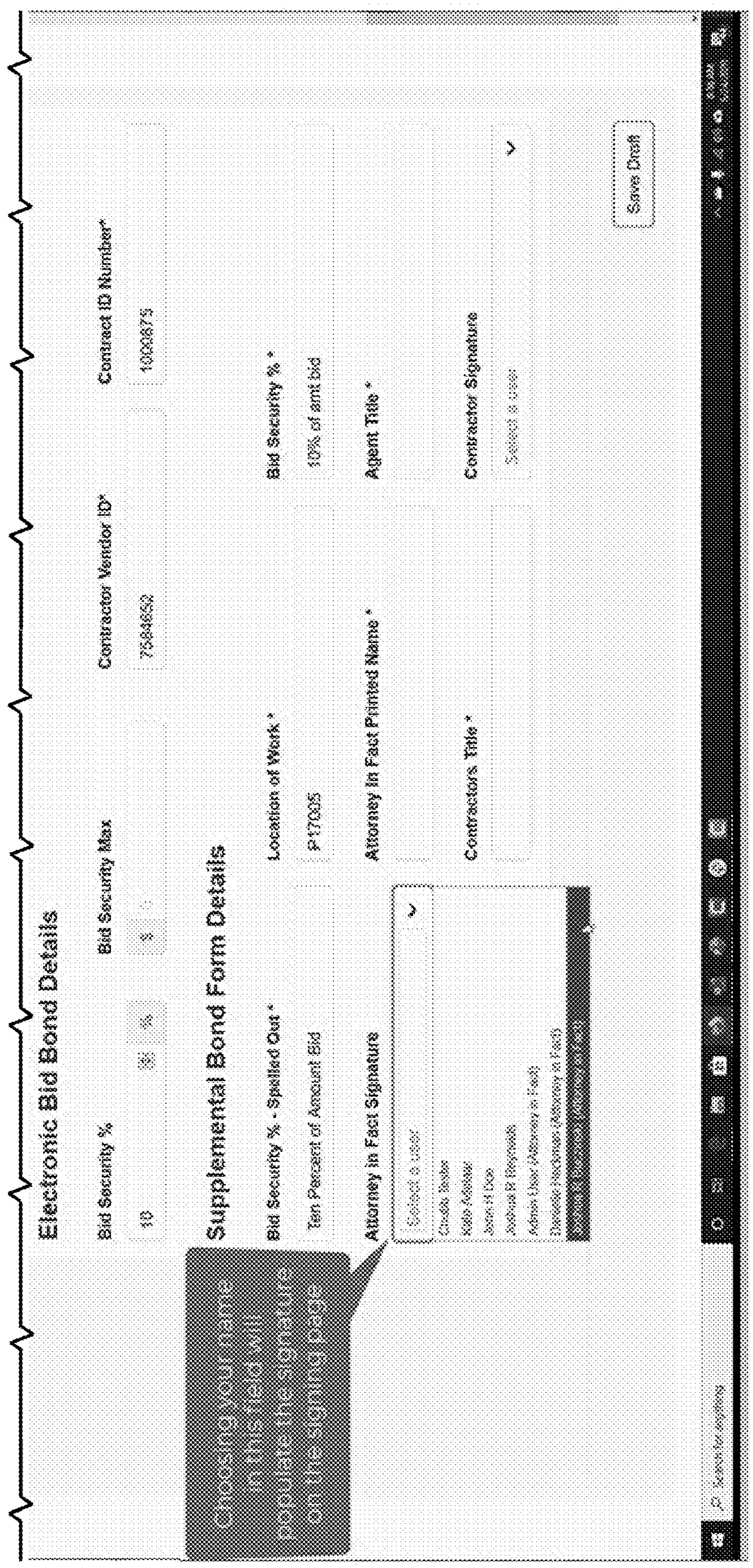
FIG. 74B shows the lower portion of the Electronic Bid Bond of the GUI screen of FIG. 73, but is shown after the agent has entered a percentage amount into the "Bid Security %" text box, an ID number into the "Contractor Vendor ID" text box, an ID number in the "Contract ID Number" text box, the text-written amount in the "Bid Security %—Spelled Out" text box, the "Location of Work" and has toggled the dropdown list for the "Attorney in Fact Signature" to select who needs to sign the bond, which may be the agent.

FIG. 74B shows the lower portion of the Electronic Bid Bond of the GUI screen of FIG. 73, but is shown after the agent has entered a percentage amount into the "Bid Security %" text box, an ID number into the "Contractor Vendor ID" text box, an ID number in the "Contract ID Number" text box, the text-written amount in the "Bid Security %—Spelled Out" text box, the "Location of Work," and has toggled the dropdown list for the "Attorney in Fact Signature" to select who needs to sign the bond, which may be the agent.

Figure 75:
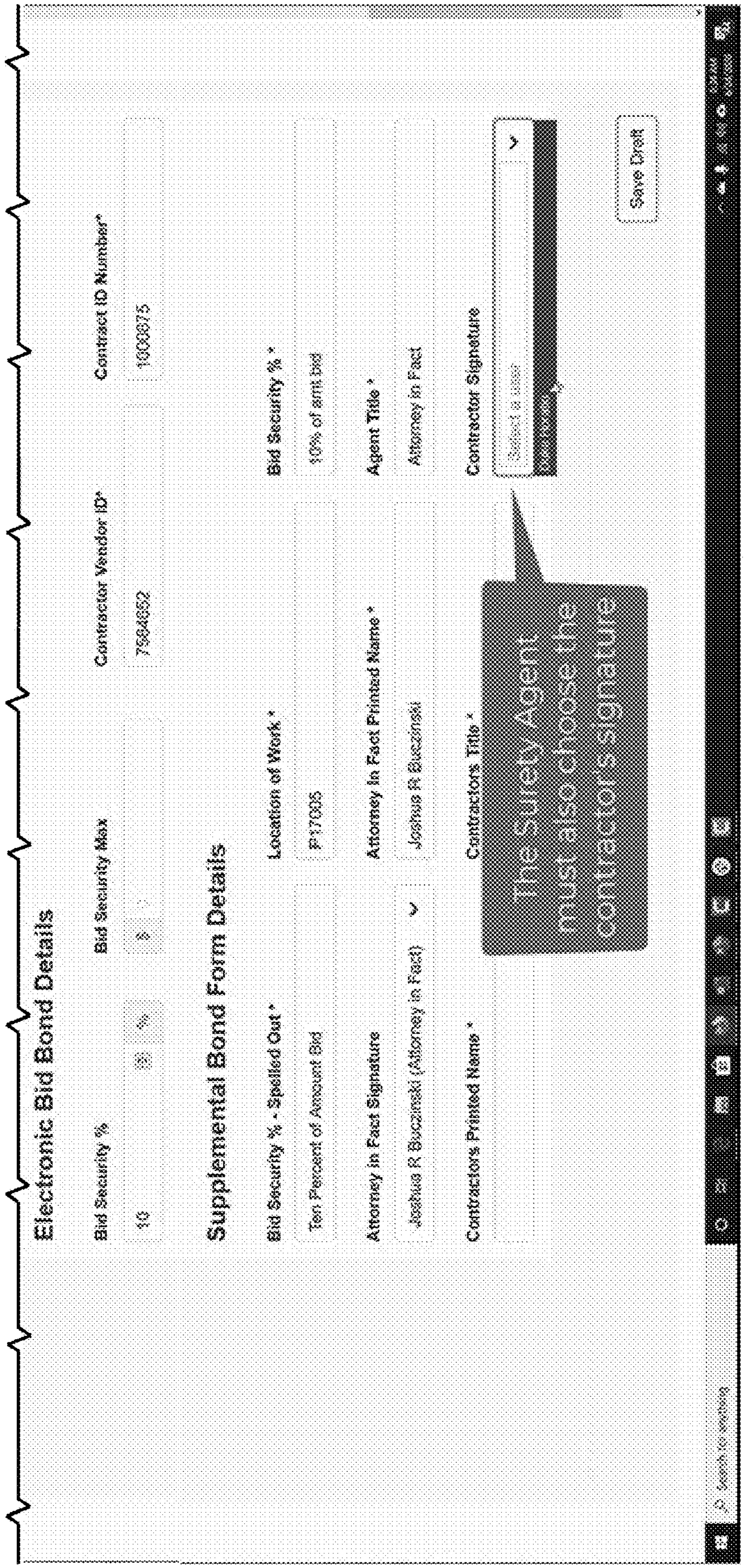
FIG. 75 shows the lower portion of the Electronic Bid Bond of the GUI screen of FIG. 74B, but is shown after the agent has entered a name in the "Attorney in Fact Printed Name" text box, his/her title in the "Agent Title" text box, and has toggled the dropdown list for the "Contractor Signature," which is shown highlighted for the reader to indicate that the Agent must also choose which contractor's signature is required.

FIG. 75 shows the lower portion of the Electronic Bid Bond of the GUI screen of FIG. 74B, but is shown after the agent has entered a name in the "Attorney in Fact Printed Name" text box, his/her title in the "Agent Title" text box, and has toggled the dropdown list for the "Contractor Signature," which is shown highlighted for the reader to indicate that the Agent must also choose which contractor's signature is required.

Figure 76:
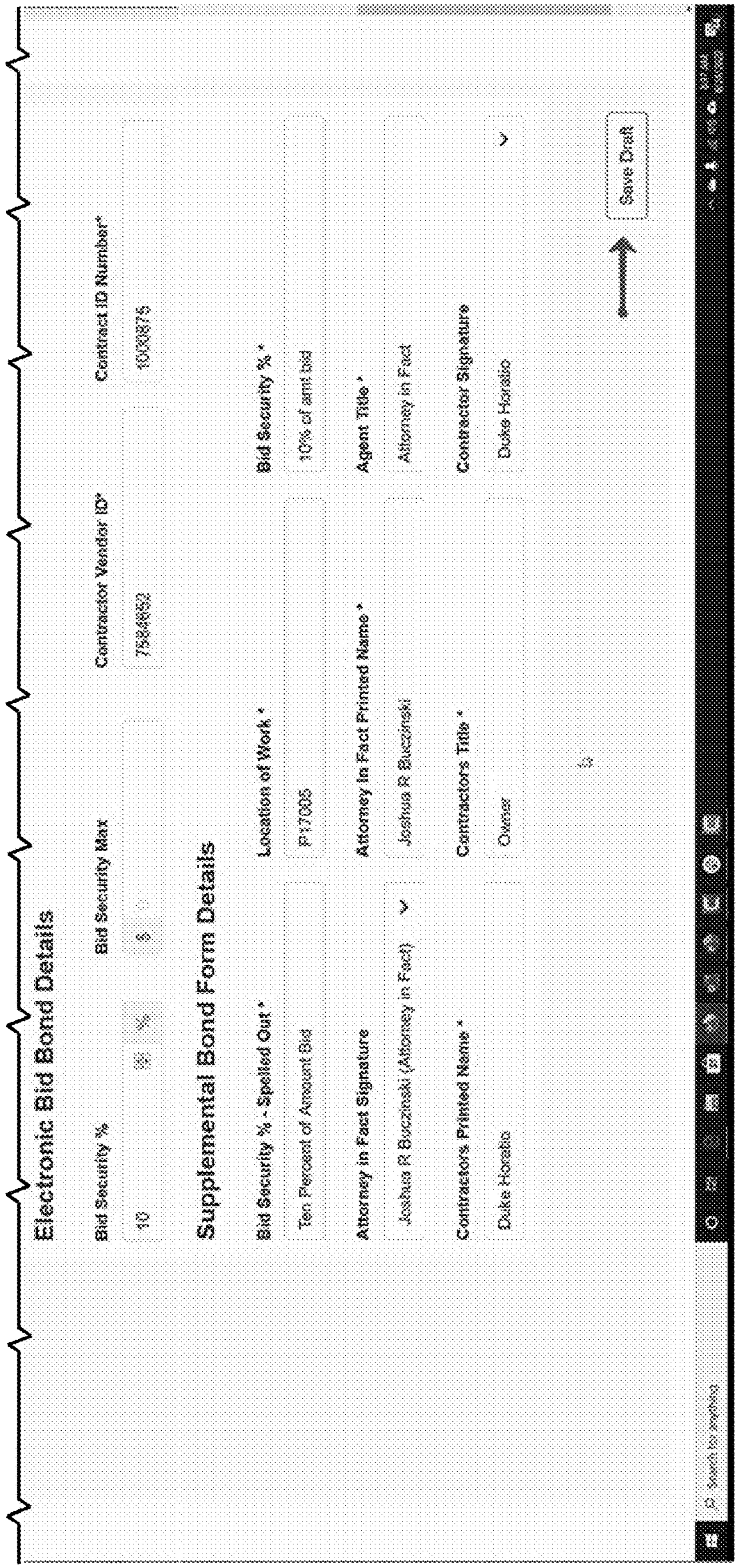
FIG. 76 shows the lower portion of the Electronic Bid Bond of the GUI screen of FIG. 75, but is shown after the agent has entered a name in the "Contractor's Printed Name" text box, a title in the "Contractor's Title" text box, and has selected a required signature from the "Contractor Signature" dropdown list, and with the "Saved Draft" button being highlighted therein for the reader to indicate it must be toggled to save the Electronic Bid Bond.

FIG. 76 shows the lower portion of the Electronic Bid Bond of the GUI screen of FIG. 75, but is shown after the agent has entered a name in the "Contractor's Printed Name" text box, a title in the "Contractor's Title" text box, and has selected a required signature from the "Contractor Signature" dropdown list, and with the "Saved Draft" button being highlighted therein for the reader to indicate it must be toggled to save the Electronic Bid Bond.

Figure 77:
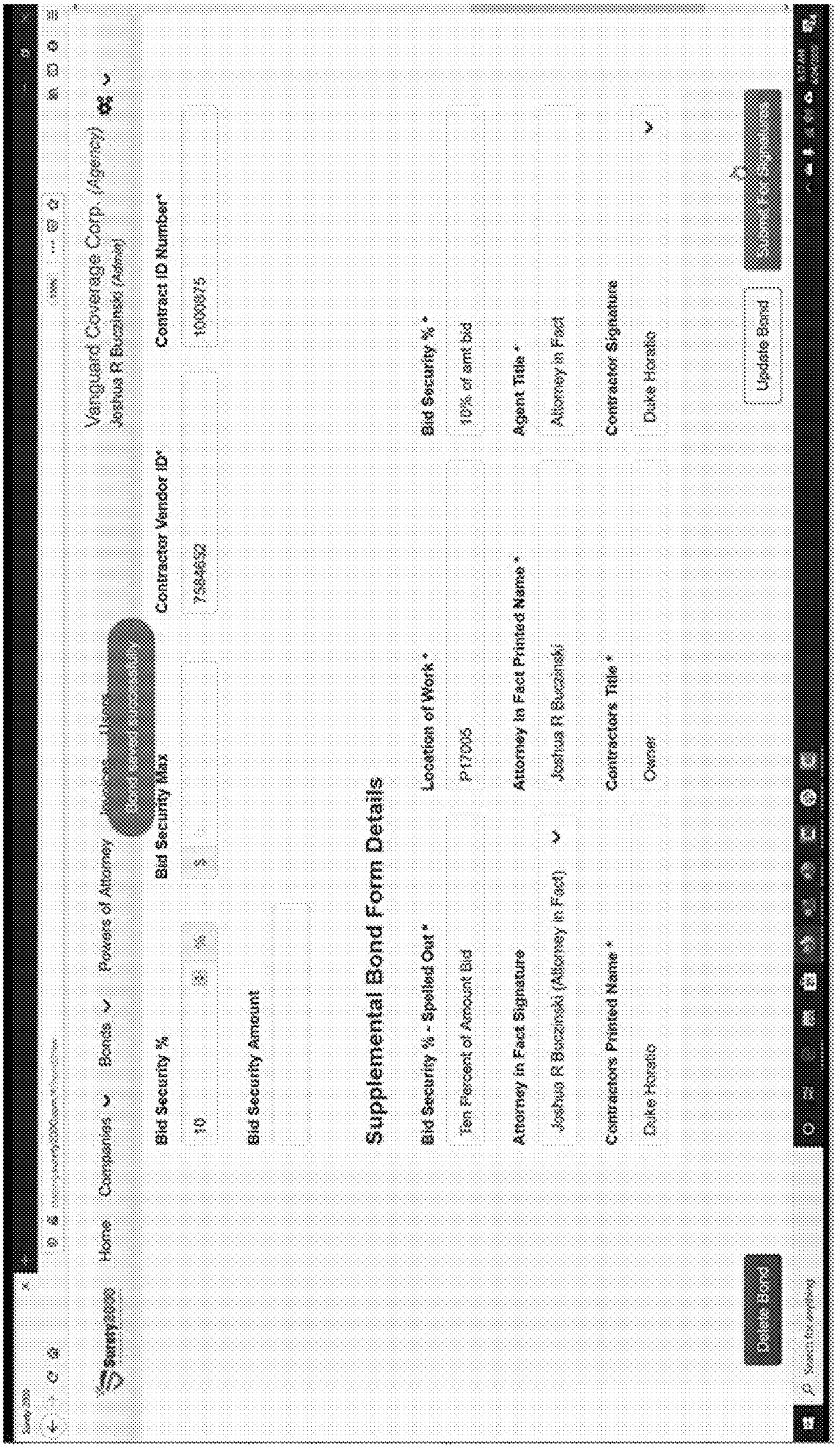
FIG. 77 shows the lower portion of the Electronic Bid Bond of the GUI screen of FIG. 76, but is shown after the agent has toggled the "Saved Draft" button, but which draft can still be edited.

FIG. 77 shows the lower portion of the Electronic Bid Bond of the GUI screen of FIG. 76, but is shown after the agent has toggled the "Saved Draft" button, but which draft can still be edited.

Figure 78:
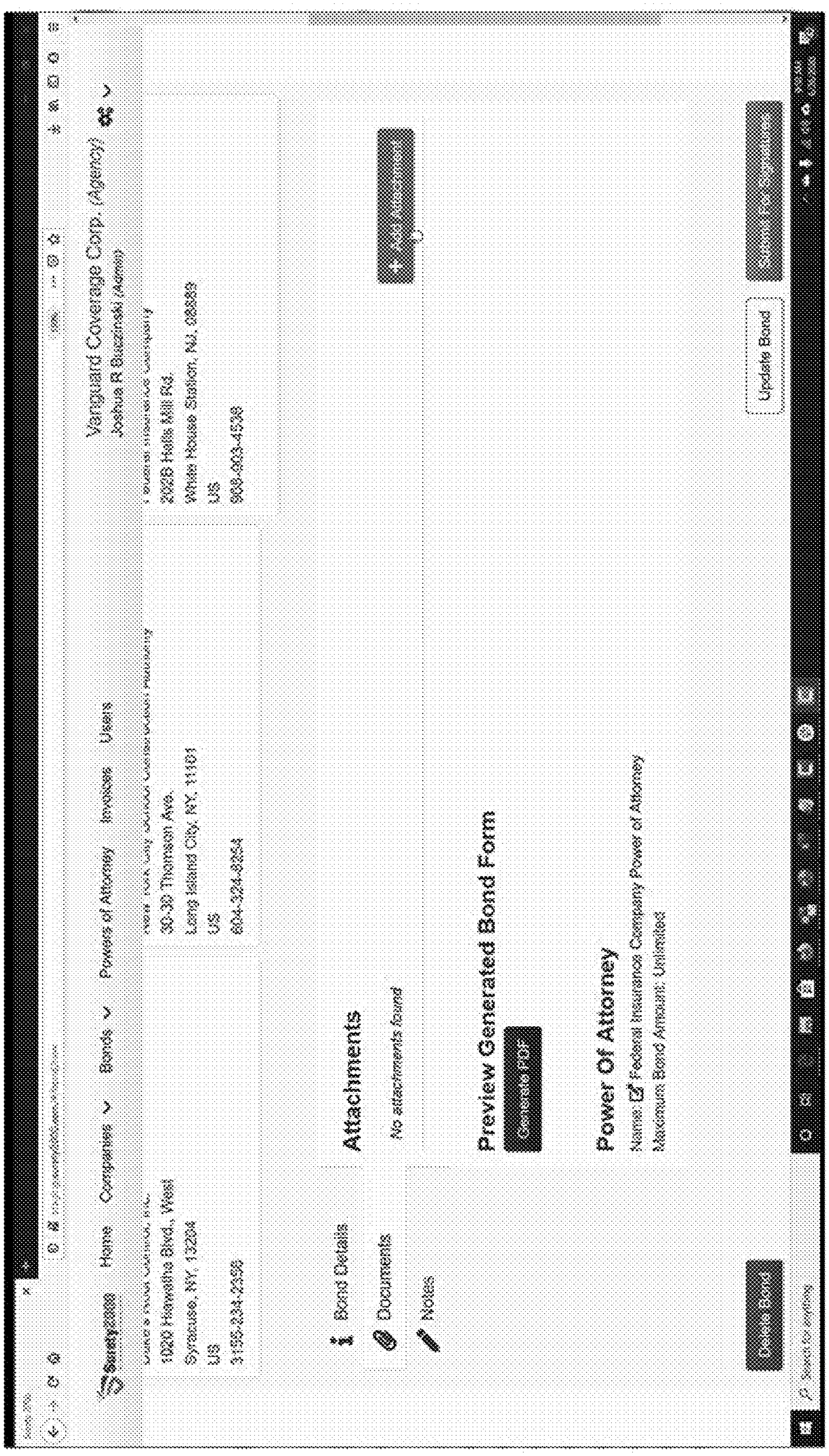
FIG. 78 shows the upper portion of the Electronic Bid Bond of the GUI screen of FIG. 77, and is shown with the agent hovering the cursor over the "Add Attachment" radio button, which may be toggled if the agent needs to add any documents, such as a rider.

FIG. 78 shows the upper portion of the Electronic Bid Bond of the GUI screen of FIG. 77, and is shown with the agent hovering the cursor over the "Add Attachment" radio button, which may be toggled if the agent needs to add any documents, such as a rider.

Figure 79:
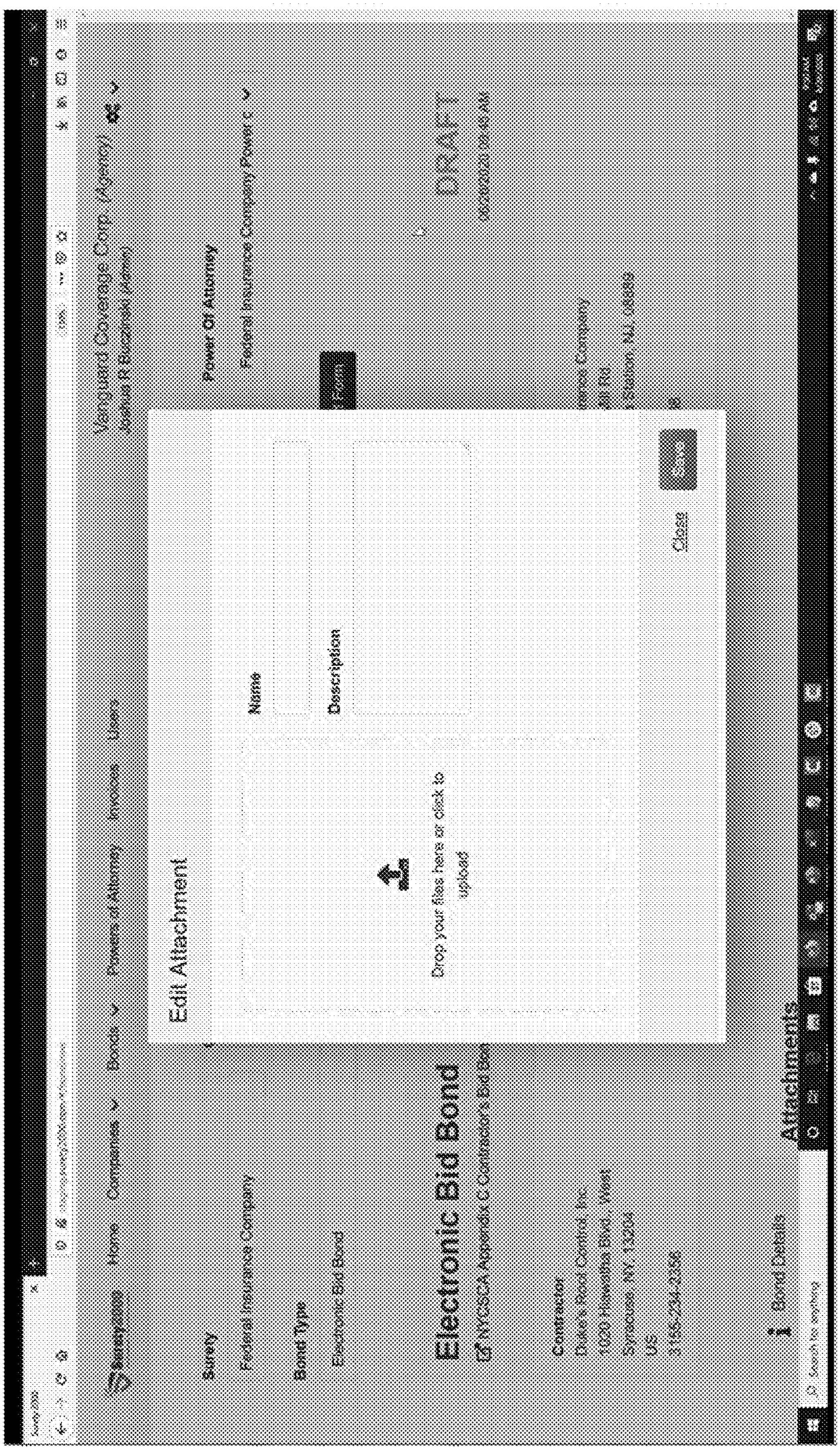
FIG. 79 shows the upper portion of the Electronic Bid Bond of the GUI screen of FIG. 78, and is shown after the agent has toggled the "Add Attachment" radio button, which results in the "Edit Attachment" window being displayed, and which permits dragging and dropping of desired files therein, or which may be clicked on to upload any PDY documents that may be required.

FIG. 79 shows the upper portion of the Electronic Bid Bond of the GUI screen of FIG. 78, and is shown after the agent has toggled the "Add Attachment" radio button, which results in the "Edit Attachment" window being displayed, and which permits dragging and dropping of desired files therein, or which may be clicked on to upload any PDY documents that may be required.

Figure 80:
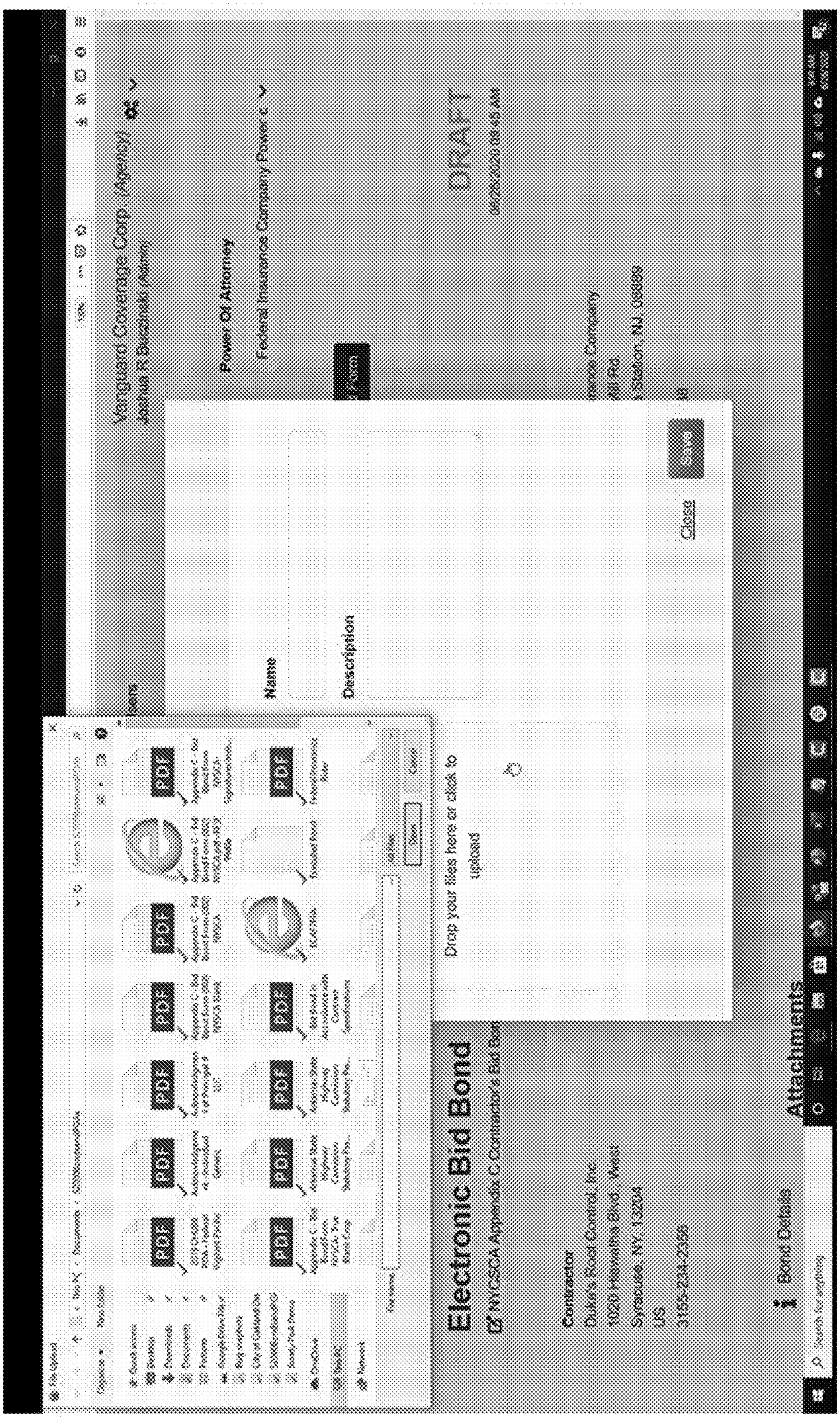
FIG. 80 shows the upper portion of the Electronic Bid Bond of the GUI screen of FIG. 79, and is shown after the agent has toggled the "Drop you files here or click to upload" button, which results in the display of the selectable document available to the agent.

FIG. 80 shows the upper portion of the Electronic Bid Bond of the GUI screen of FIG. 79, and is shown after the agent has toggled the "Drop you files here or click to upload" button, which results in the display of the selectable document available to the agent.

Figure 81:
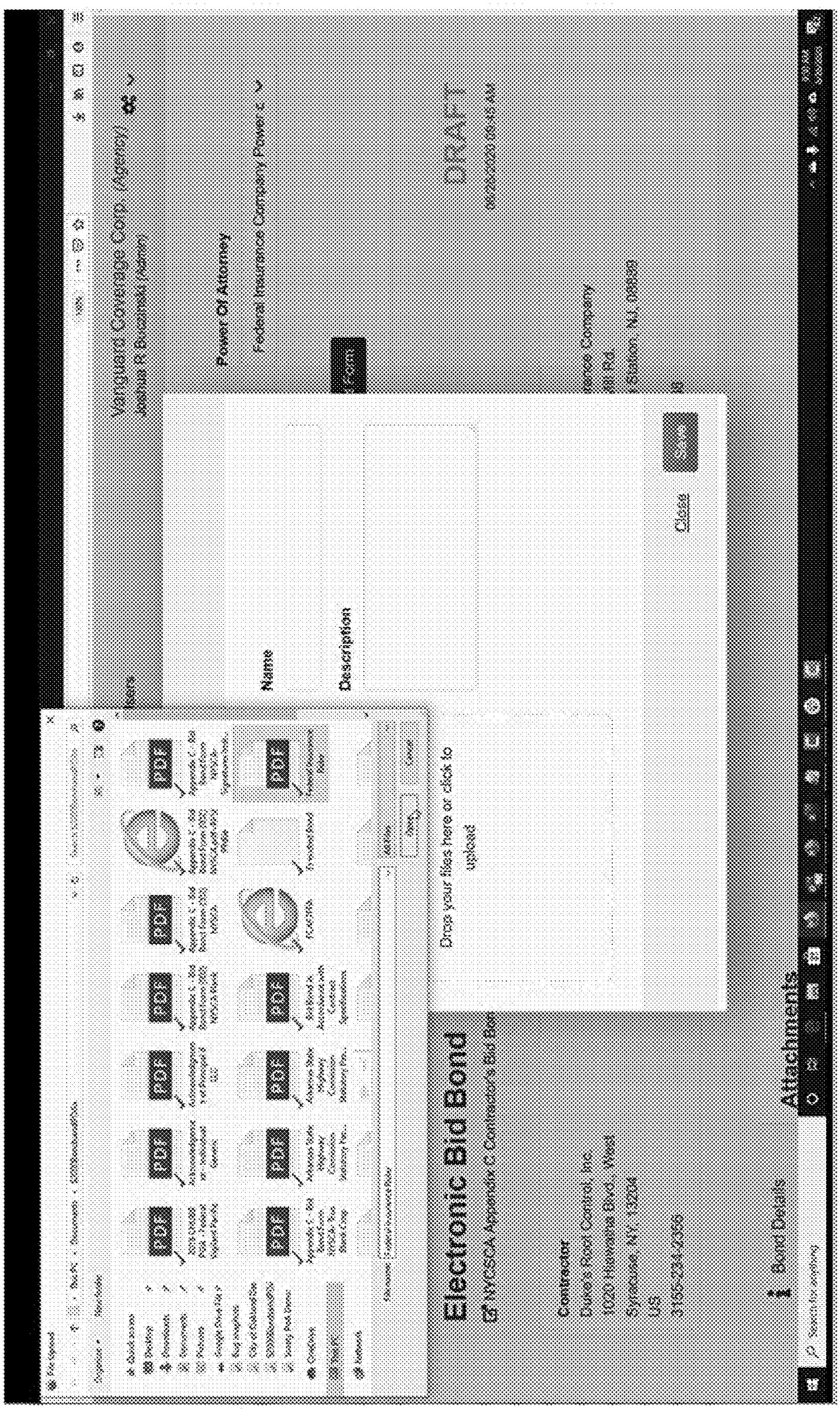
FIG. 81 shows the upper portion of the Electronic Bid Bond of the GUI screen of FIG. 80, and is shown after the agent has selected one of the available documents, and is hovering the cursor over the "open" button.

FIG. 81 shows the upper portion of the Electronic Bid Bond of the GUI screen of FIG. 80, and is shown after the agent has selected one of the available documents, and is hovering the cursor over the "open" button.

Figure 82:
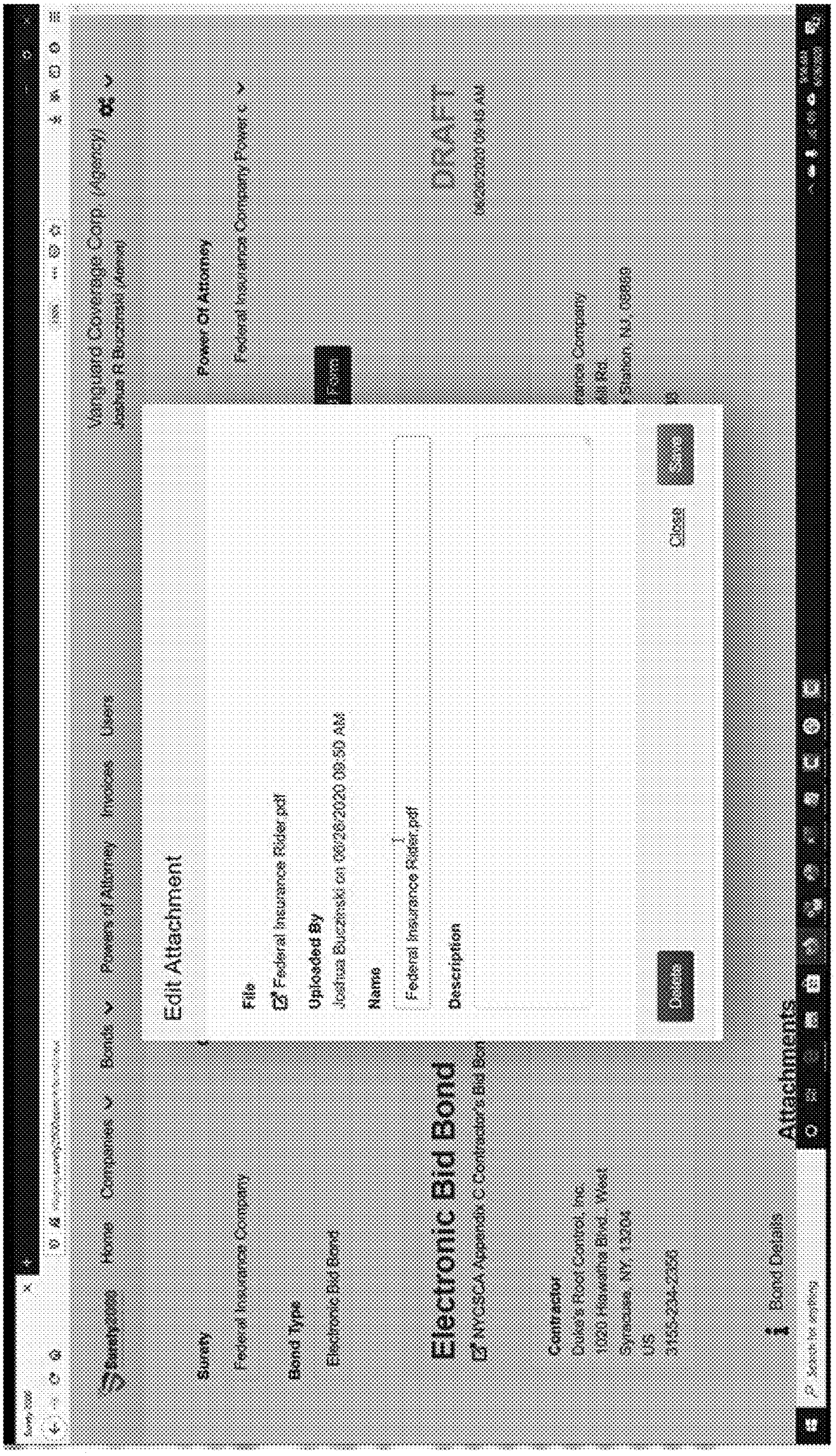
FIG. 82 shows the upper portion of the Electronic Bid Bond of the GUI screen of FIG. 81, and is shown with selected document in the "Edit Attachment" window, which has a name associated therewith that can be edited.

FIG. 82 shows the upper portion of the Electronic Bid Bond of the GUI screen of FIG. 81, and is shown with selected document in the "Edit Attachment" window, which has a name associated therewith that can be edited.

Figure 83:
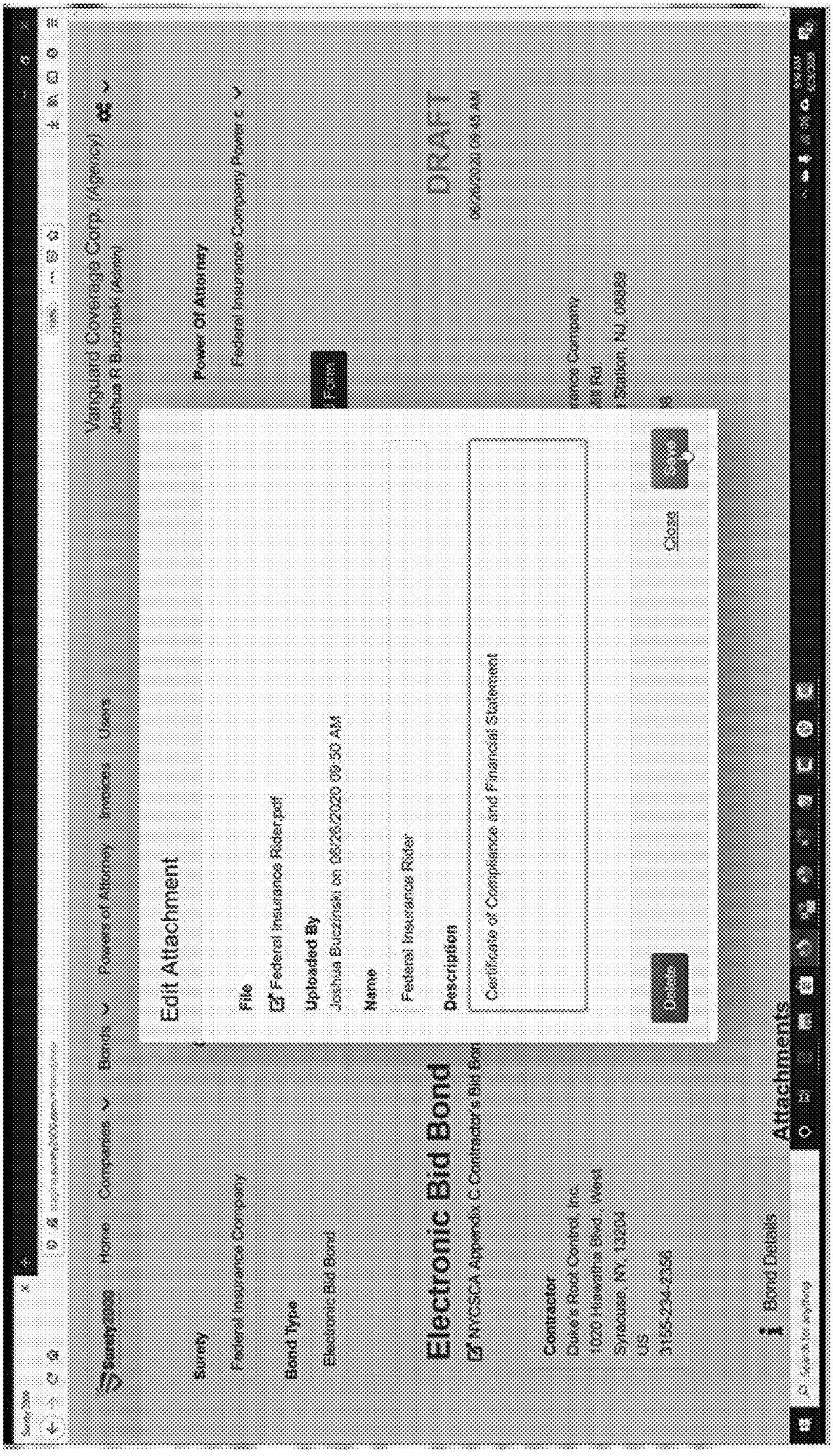
FIG. 83 shows the upper portion of the Electronic Bid Bond of the GUI screen of FIG. 82, and is shown after a description has been entered into the "Description" text field for selected document in the "Edit Attachment" window.

FIG. 83 shows the upper portion of the Electronic Bid Bond of the GUI screen of FIG. 82, and is shown after a description has been entered into the "Description" text field for selected document in the "Edit Attachment" window.

Figure 84:
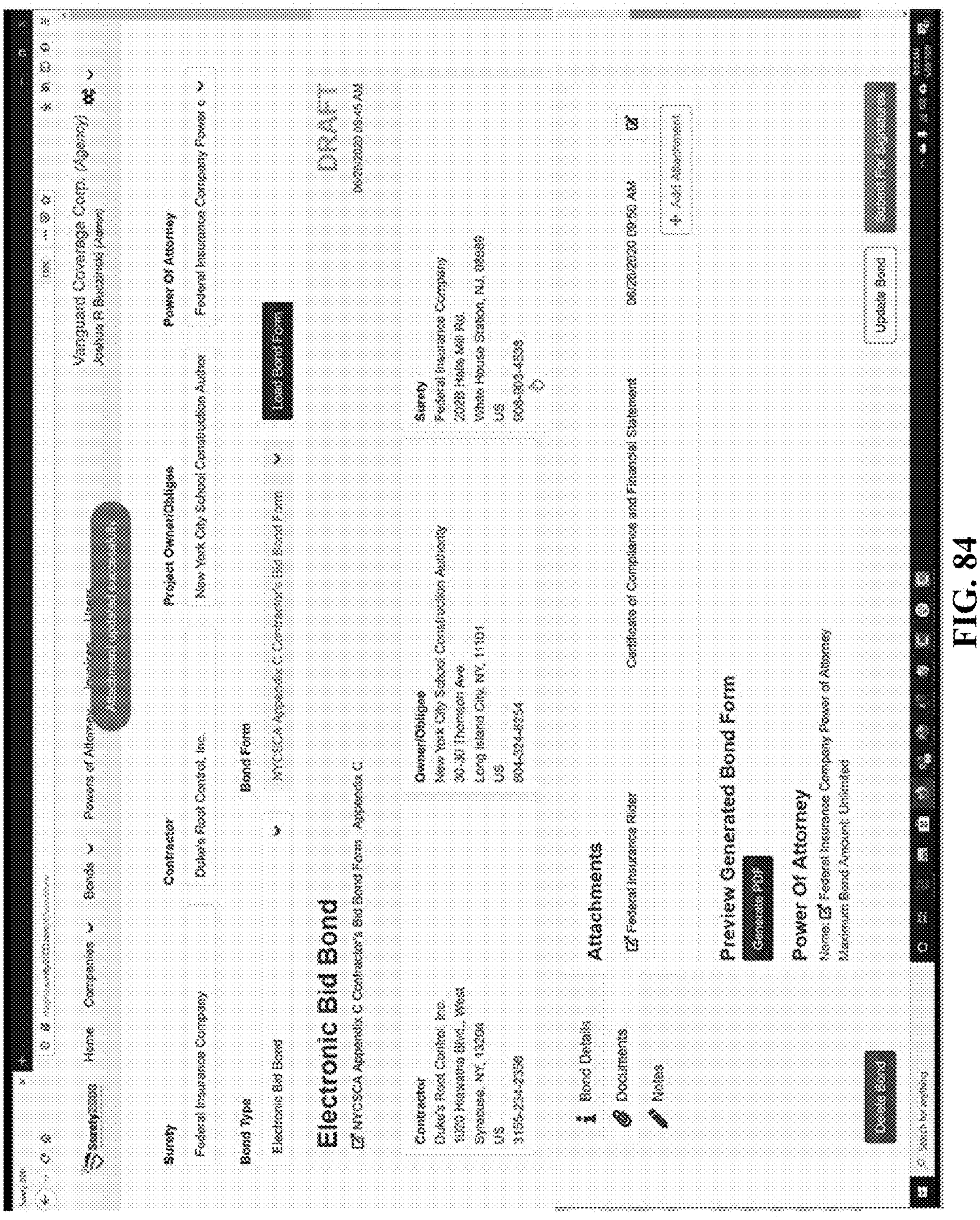
FIG. 84 shows the upper portion of the Electronic Bid Bond of the GUI screen of FIG. 83, but is shown after the "save" button had been toggled in the "Edit Attachment" window, and with the system displaying a message that the "Attachment updated successfully" indicating that the attachment has been added to the final bond form, and also displaying a "Submit for Signatures" button on the bottom right.

FIG. 84 shows the upper portion of the Electronic Bid Bond of the GUI screen of FIG. 83, but is shown after the "save" button had been toggled in the "Edit Attachment" window, and with the system displaying a message that the "Attachment updated successfully" indicating that the attachment has been added to the final bond form, and also displaying a "Submit for Signatures" button on the bottom right.

Figure 85:
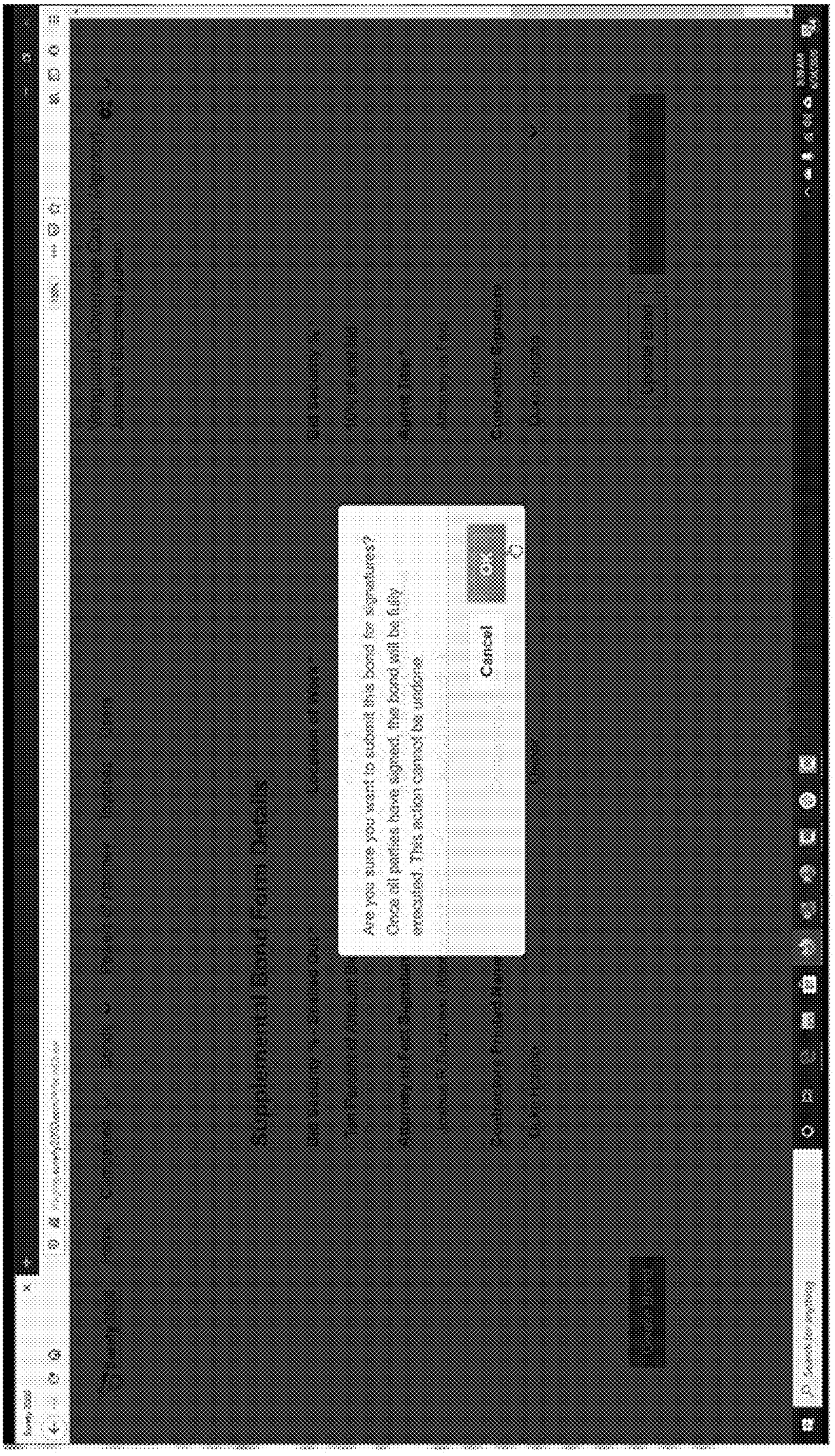
FIG. 85 shows a warning message GUI that the system displays after the agent has toggled the "Submit for Signatures" button, warning that the bond cannot be edited after that point, and displaying an "ok" button which is toggled to proceed, and a "cancel" button that may be toggled to go back and edit the bond details.

FIG. 85 shows a warning message GUI that the system displays after the agent has toggled the "Submit for Signatures" button, warning that the bond cannot be edited after that point, and displaying an "ok" button which is toggled to proceed, an a "cancel" button that may be toggled to go back and edit the bond details.

Figure 86:
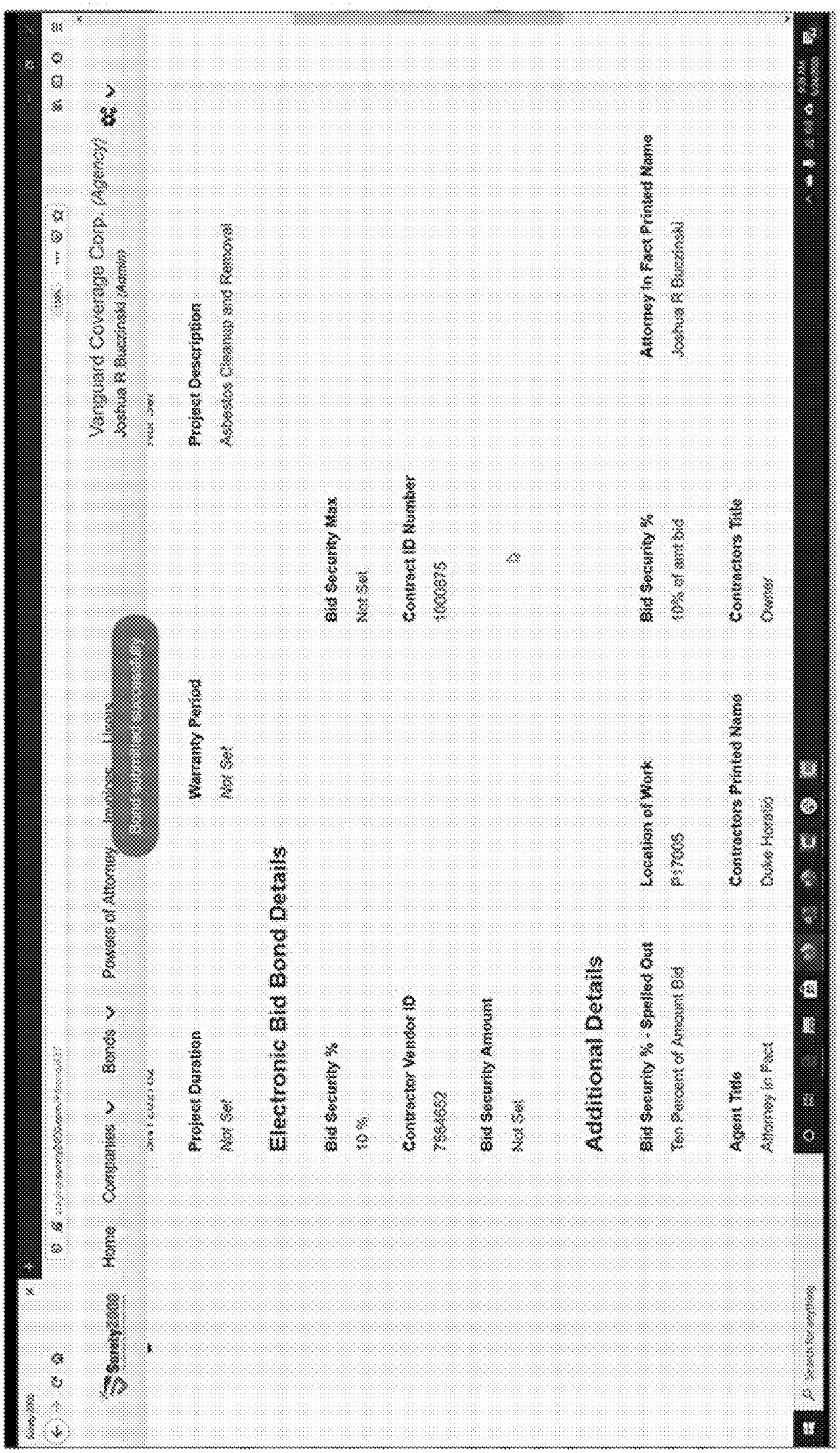
FIG. 86 shows the upper portion of the Electronic Bid Bond of the GUI screen of FIG. 84, but is shown after the "Submit for Signatures" button had been toggled, and with the system displaying a message stating "Bond submitted successfully" indicating that it is now time to sign the bond.

FIG. 86 shows the upper portion of the Electronic Bid Bond of the GUI screen of FIG. 84, but is shown after the "Submit for Signatures" button had been toggled, and with the system displaying a message stating "Bond submitted successfully" indicating that it is now time to sign the bond.

Figure 87:
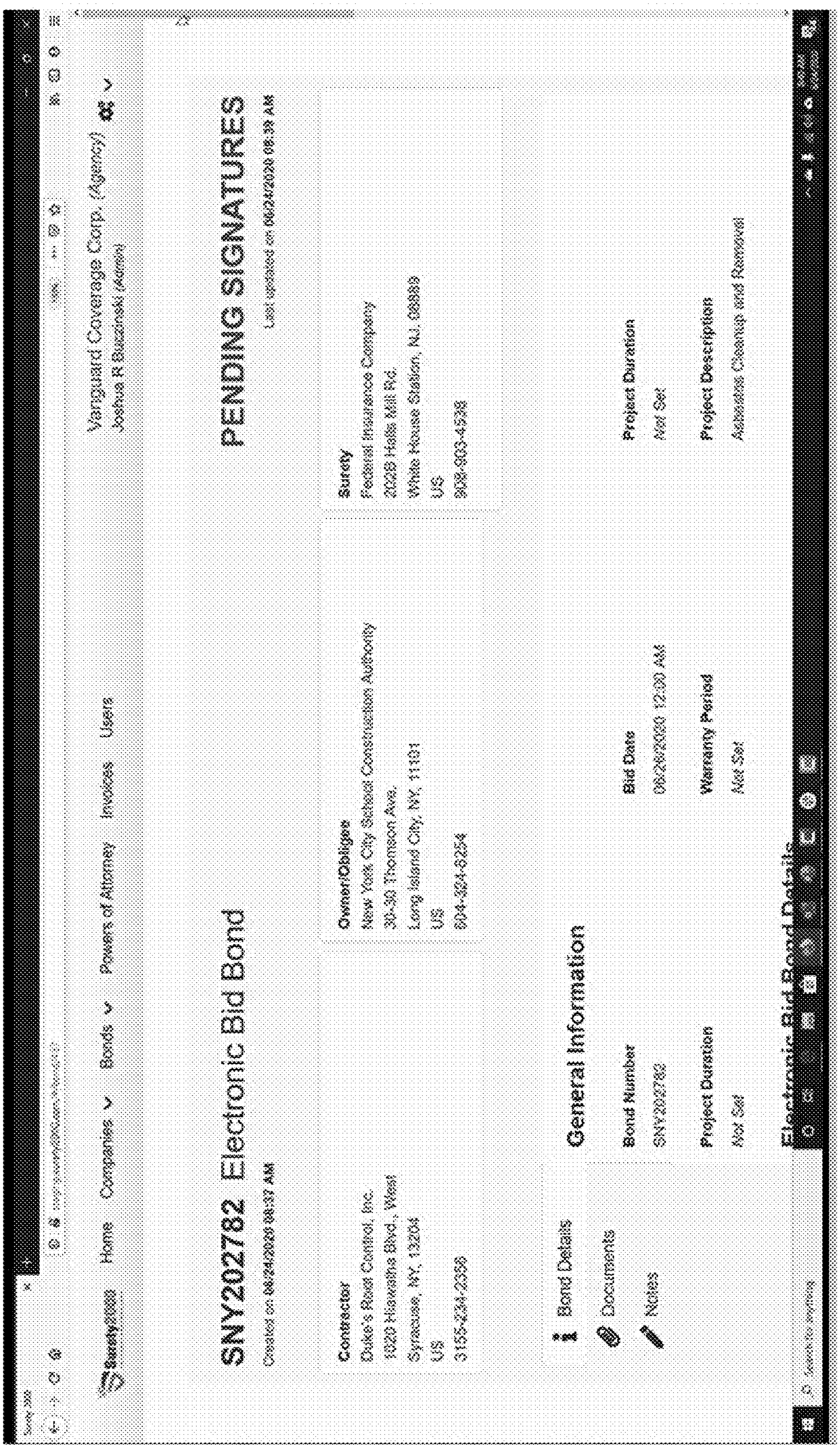
FIG. 87 shows the upper portion of the Electronic Bid Bond of the GUI screen of FIG. 84, but is shown with a status in the upper right corner of "Pending Signatures," and with a Bond number in the upper left corner.

FIG. 87 shows the upper portion of the Electronic Bid Bond of the GUI screen of FIG. 84, but is shown with a status in the upper right corner of "Pending Signatures," and with a Bond number in the upper left corner.

Figure 88:
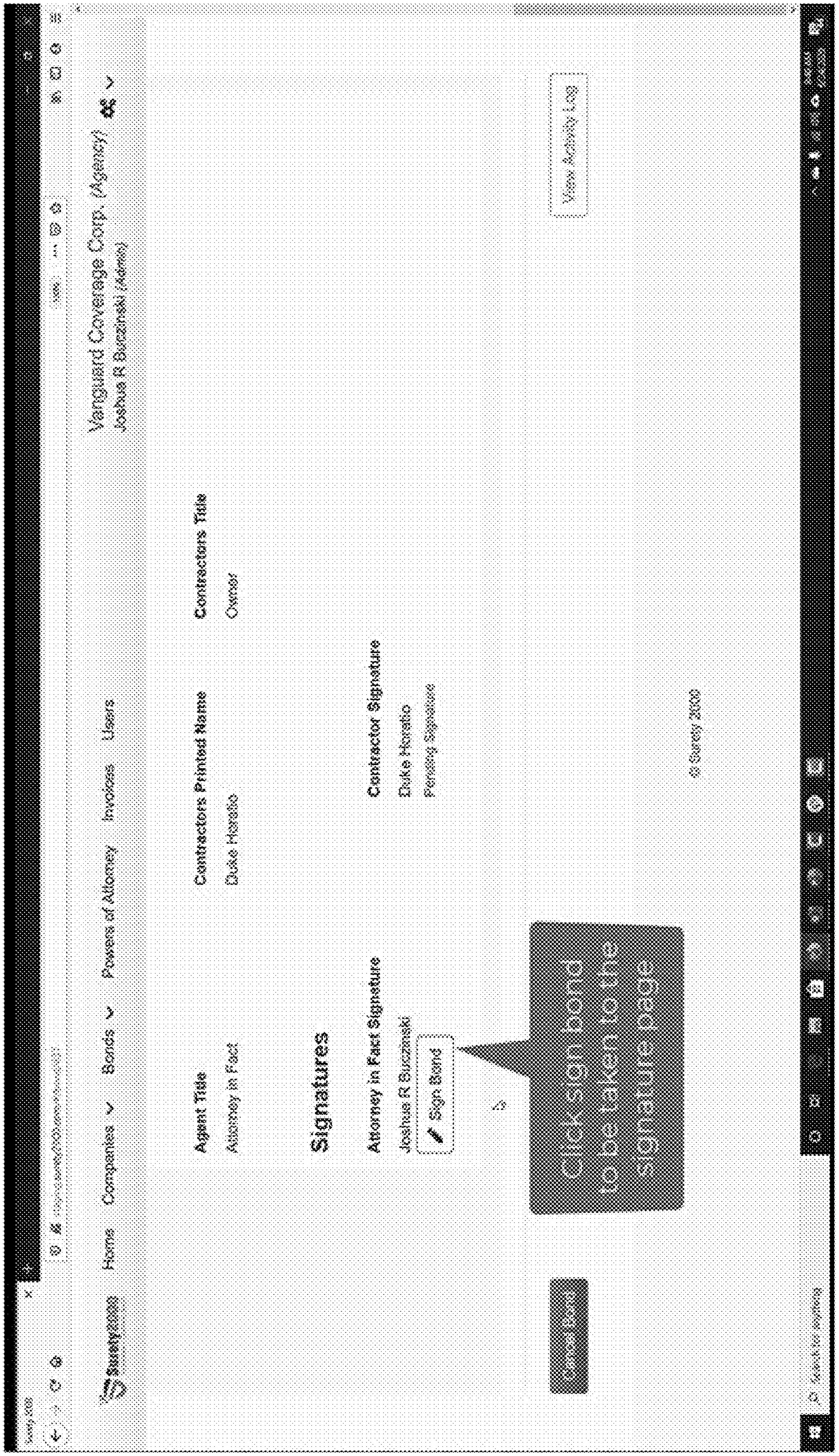
FIG. 88 shows the bottom portion of the Electronic Bid Bond of the GUI screen of FIG. 87, and with the "Sign Bond" button in the lower left corner highlighted for the reader to show that if toggled, the agent will be taken to the signature page for the "Attorney in Fact"

FIG. 88 shows the bottom portion of the Electronic Bid Bond of the GUI screen of FIG. 87, and with the "Sign Bond" button in the lower left corner highlighted for the reader to show that if toggled, the agent will be taken to the signature page for the "Attorney in Fact."

Figure 89:
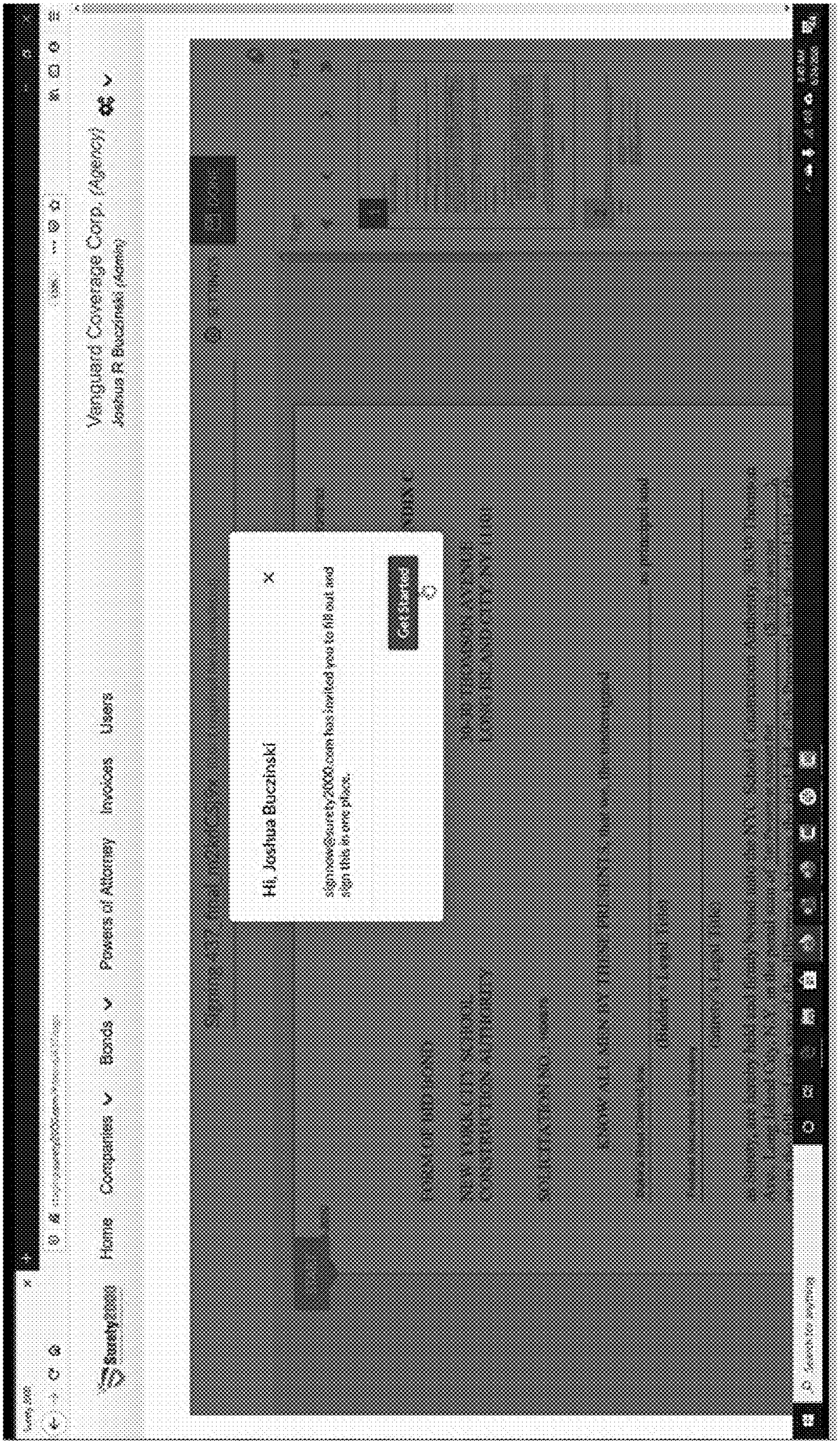
FIG. 89 shows an "Attorney in Fact" bond signing page, and with the system displaying a "Get started" button and a message for the agent stating that he/she is invited to start the bond signing process.

FIG. 89 shows an "Attorney in Fact" bond signing page, and with the system displaying a "Get started" button and a message for the agent stating that he/she is invited to start the bond signing process.

Figure 90:
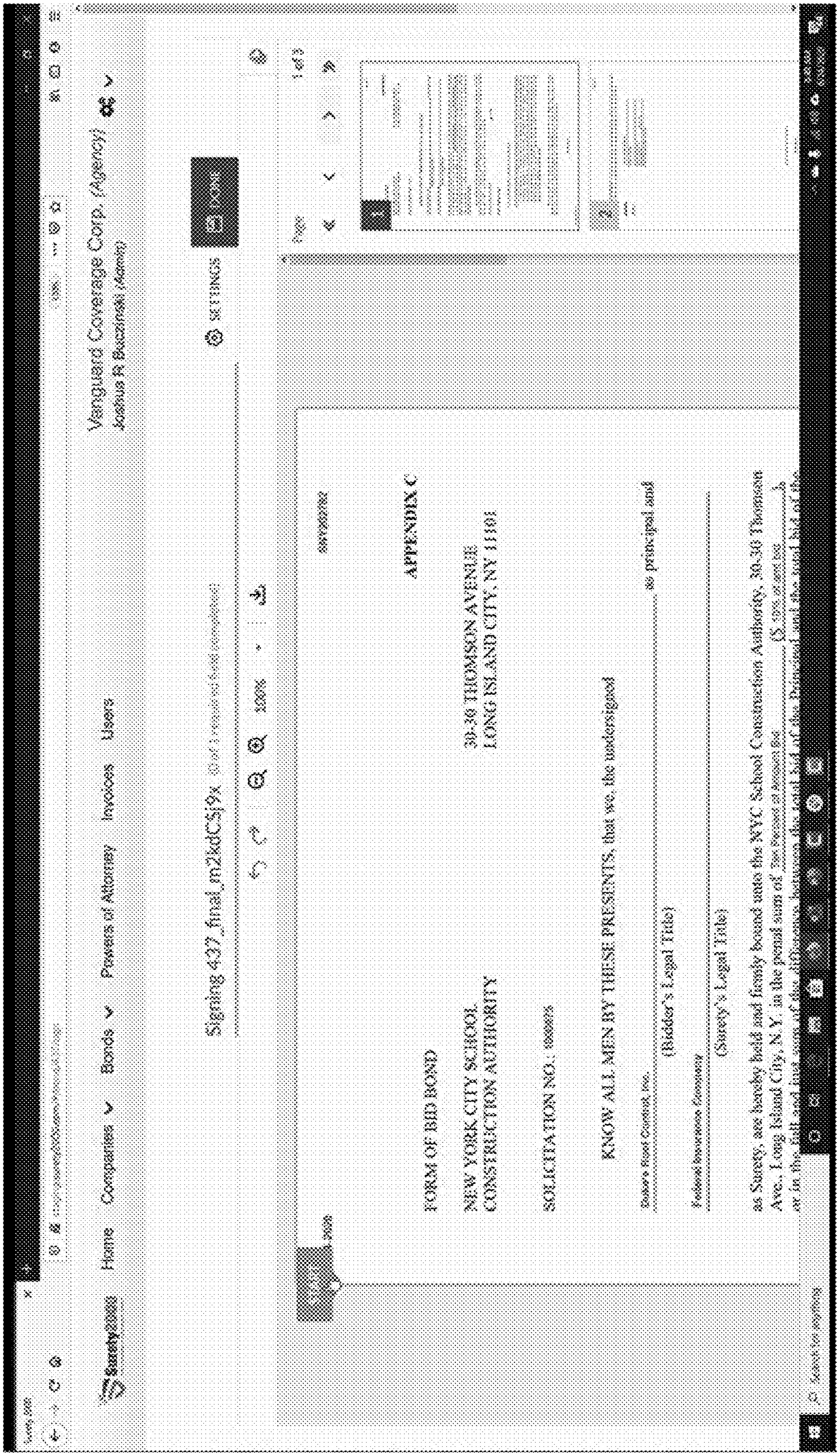
FIG. 90 shows the "Attorney in Fact" bond signing page of FIG. 89, and with a "Start" button being displayed, which may be toggled to advance the bond page to the signature section.

FIG. 90 shows the "Attorney in Fact" bond signing page of FIG. 89, and with a "Start" button being displayed, which may be toggled to advance the bond page to the signature section.

Figure 91:
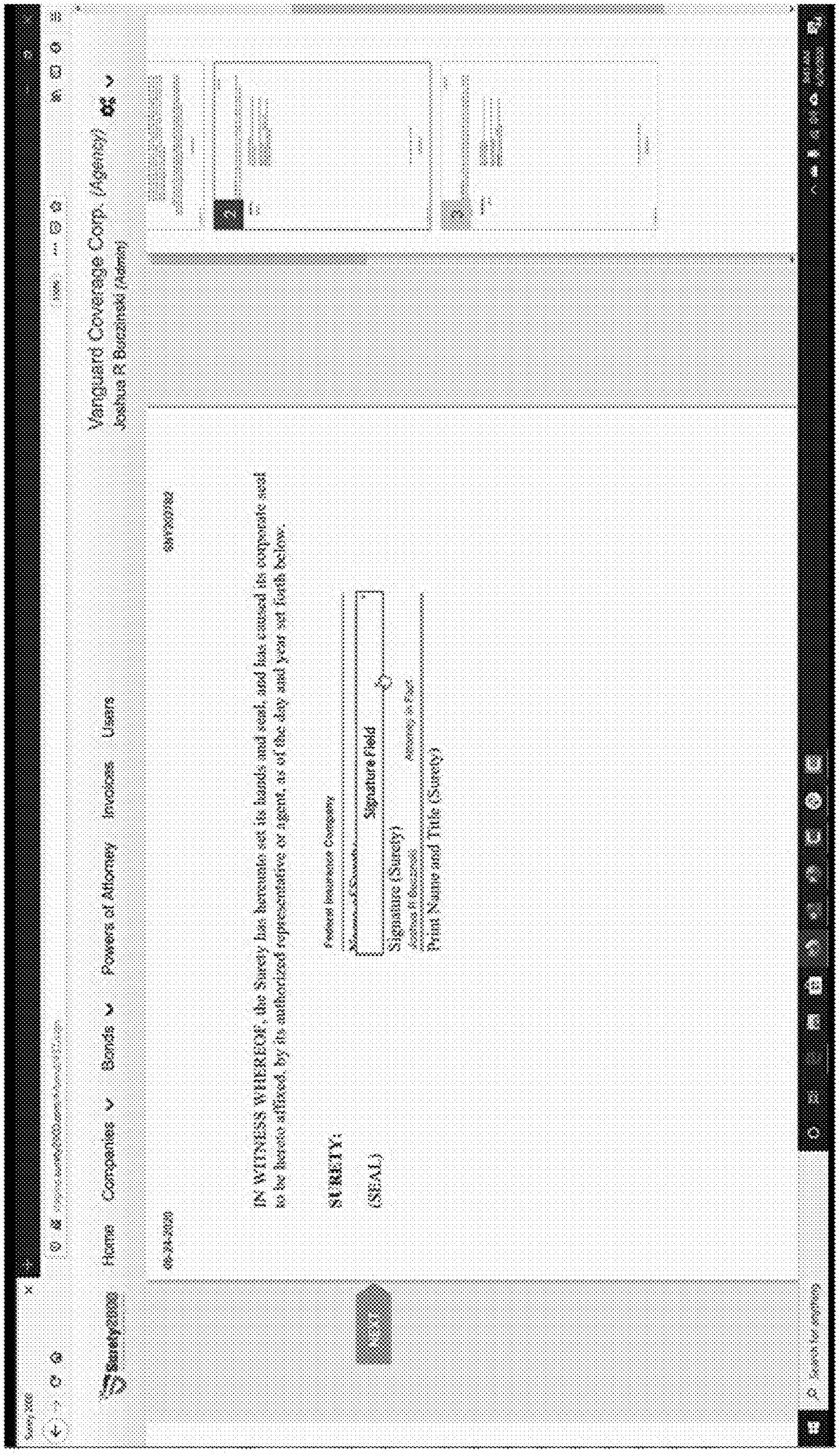
FIG. 91 shows the signature section of the "Attorney in Fact" bond signing page of FIG. 90, being shown after the "Start" button had been toggled, and which displays the "Signature Field" for the surety.

FIG. 91 shows the signature section of the "Attorney in Fact" bond signing page of FIG. 90, being shown after the "Start" button had been toggled, and which displays the "Signature Field" for the surety.

Figure 92:
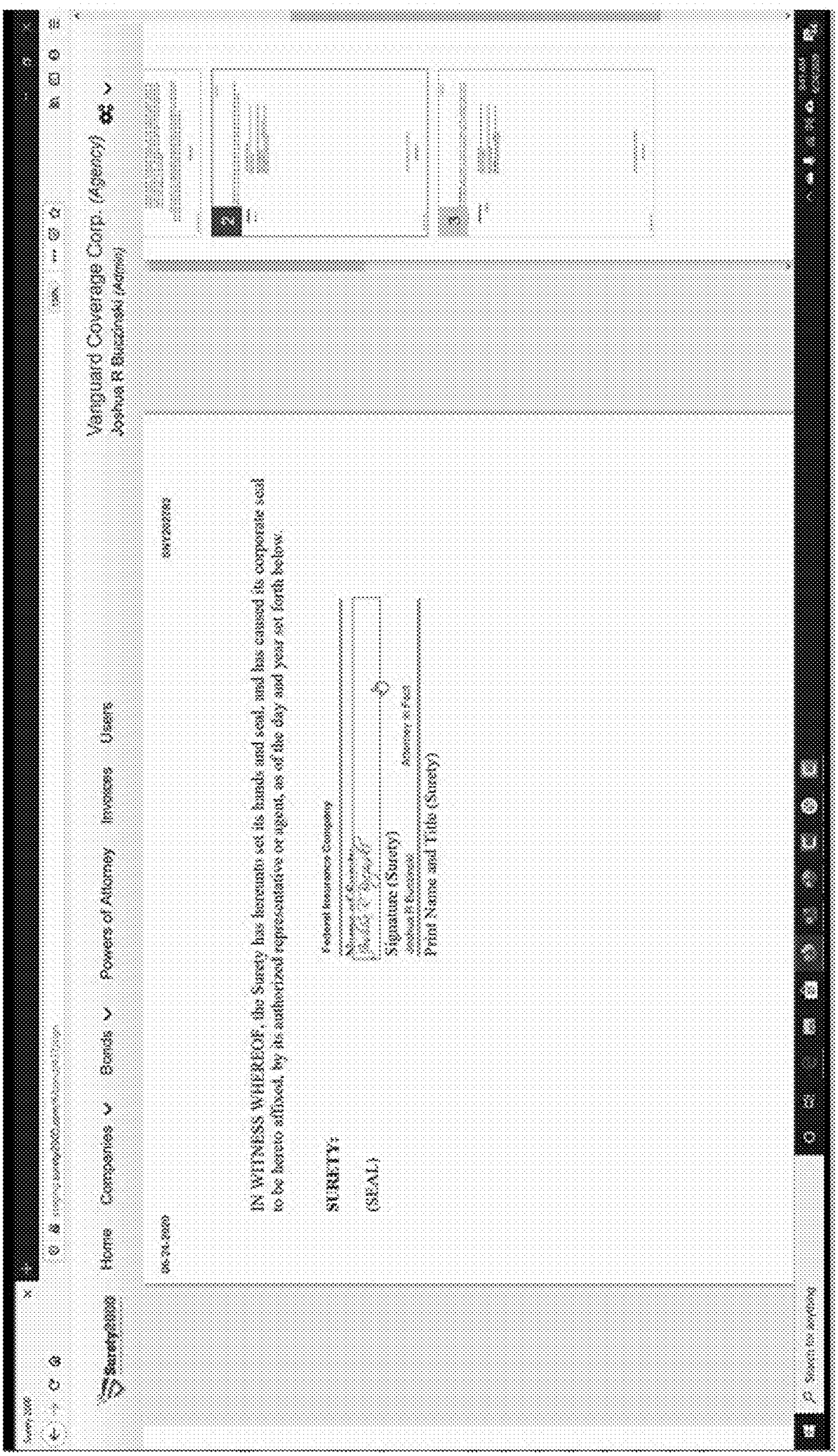
FIG. 92 shows the agent's electronic signature in the "Signature Field" for the surety in the Attorney in Fact" bond signing page of FIG. 91, being displayed therein after the agent had toggled the blank "Signature Field" shown in FIG. 91.

FIG. 92 shows the agent's electronic signature in the "Signature Field" for the surety in the Attorney in Fact" bond signing page of FIG. 91, being displayed therein after the agent had toggled the blank "Signature Field" shown in FIG. 91.

Figure 93:
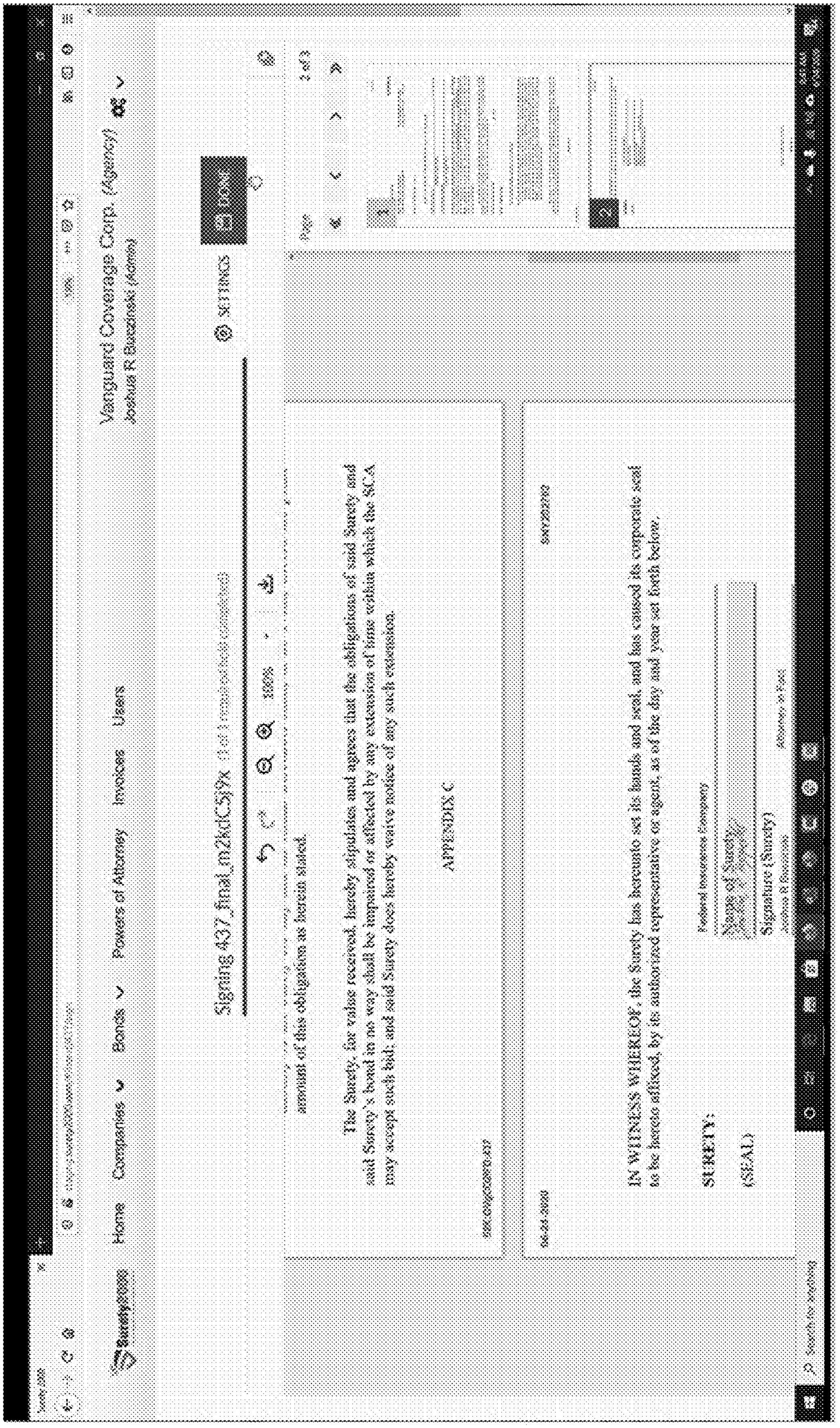
FIG. 93 shows the bond signing page of FIG. 92, being displayed after the agent has scrolled upward to reveal the "Done" button, which may appear and may be toggled after the agent's electronic signature had been provided in the "Signature Field" for the surety.

FIG. 93 shows the bond signing page of FIG. 92, being displayed after the agent has scrolled upward to reveal the "Done" button, which may appear and may be toggled after the agent's electronic signature had been provided in the "Signature Field" for the surety.

Figure 94:
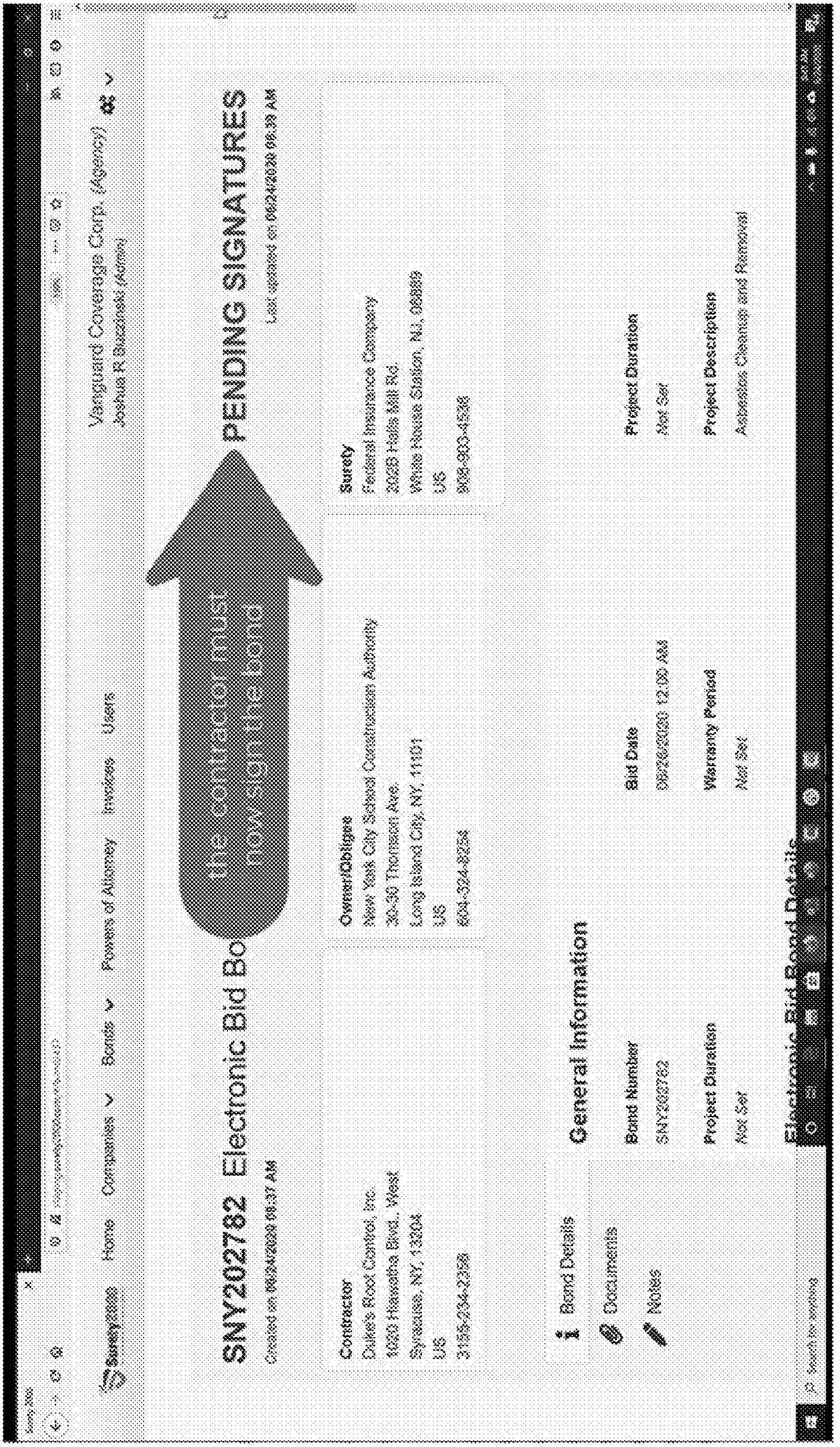
FIG. 94 shows the upper portion of the Electronic Bid Bond of the GUI screen of FIG. 87, but is shown with the "Pending Signatures" status being highlighted in the upper left corner to indicate to the reader that the contractor must still sign the bond, after the contractor has logged into the system, and who will be sent an email by the system as a reminder that the Contractor signature is now needed.

FIG. 94 shows the upper portion of the Electronic Bid Bond of the GUI screen of FIG. 87, but is shown with the "Pending Signatures" status being highlighted in the upper left corner to indicate to the reader that the contractor must still sign the bond, after the contractor has logged into the system, and who will be sent an email by the system as a reminder that the Contractor signature is now needed.

Figure 95:
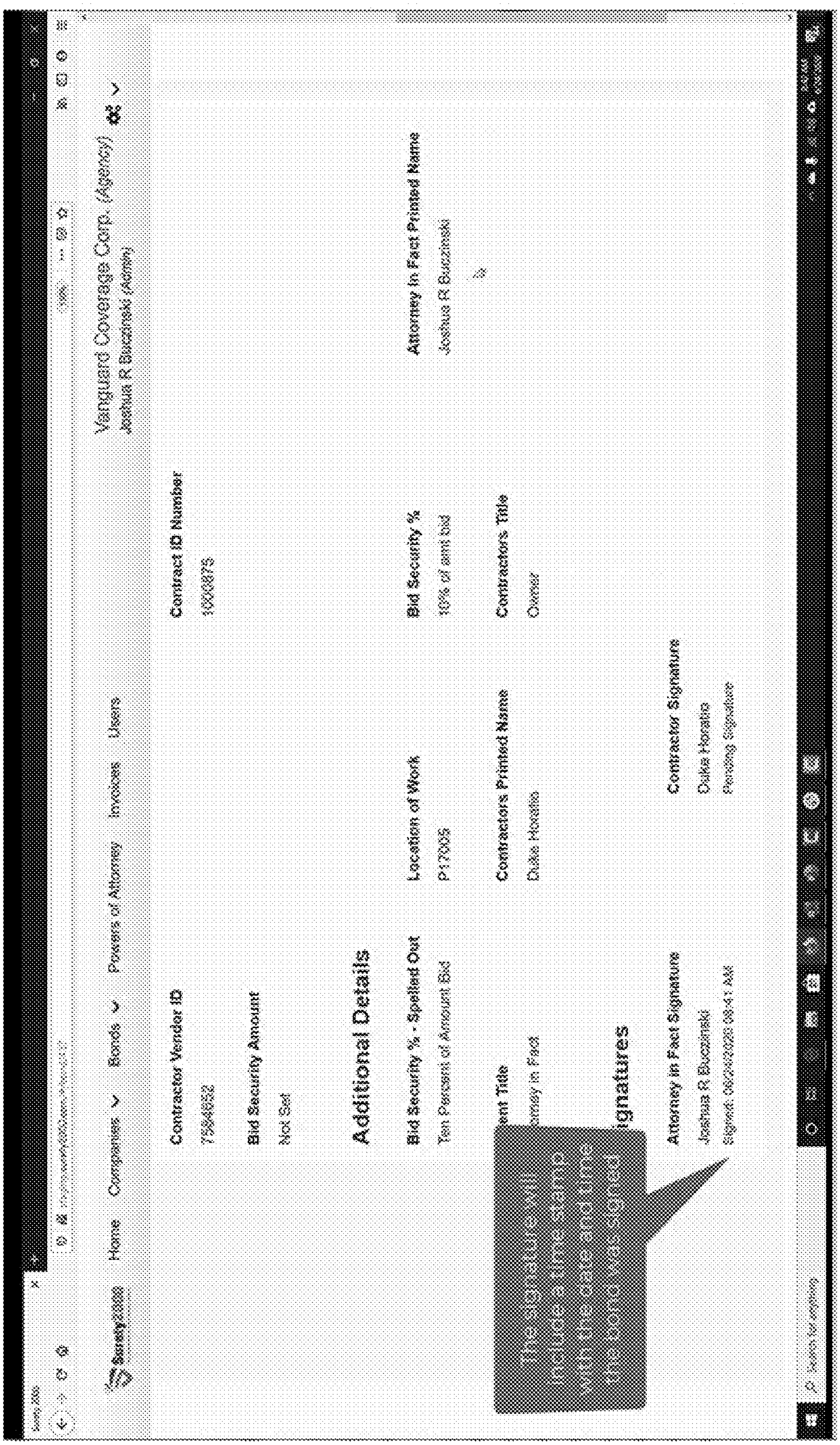
FIG. 95 shows the bottom portion of the Electronic Bid Bond of the GUI screen of FIG. 94, and which shows the time/date stamp for the agent's signature, which is also highlighted therein for the reader.

FIG. 95 shows the bottom portion of the Electronic Bid Bond of the GUI screen of FIG. 94, and which shows the time/date stamp for the agent's signature, which is also highlighted therein for the reader.

Figure 96:
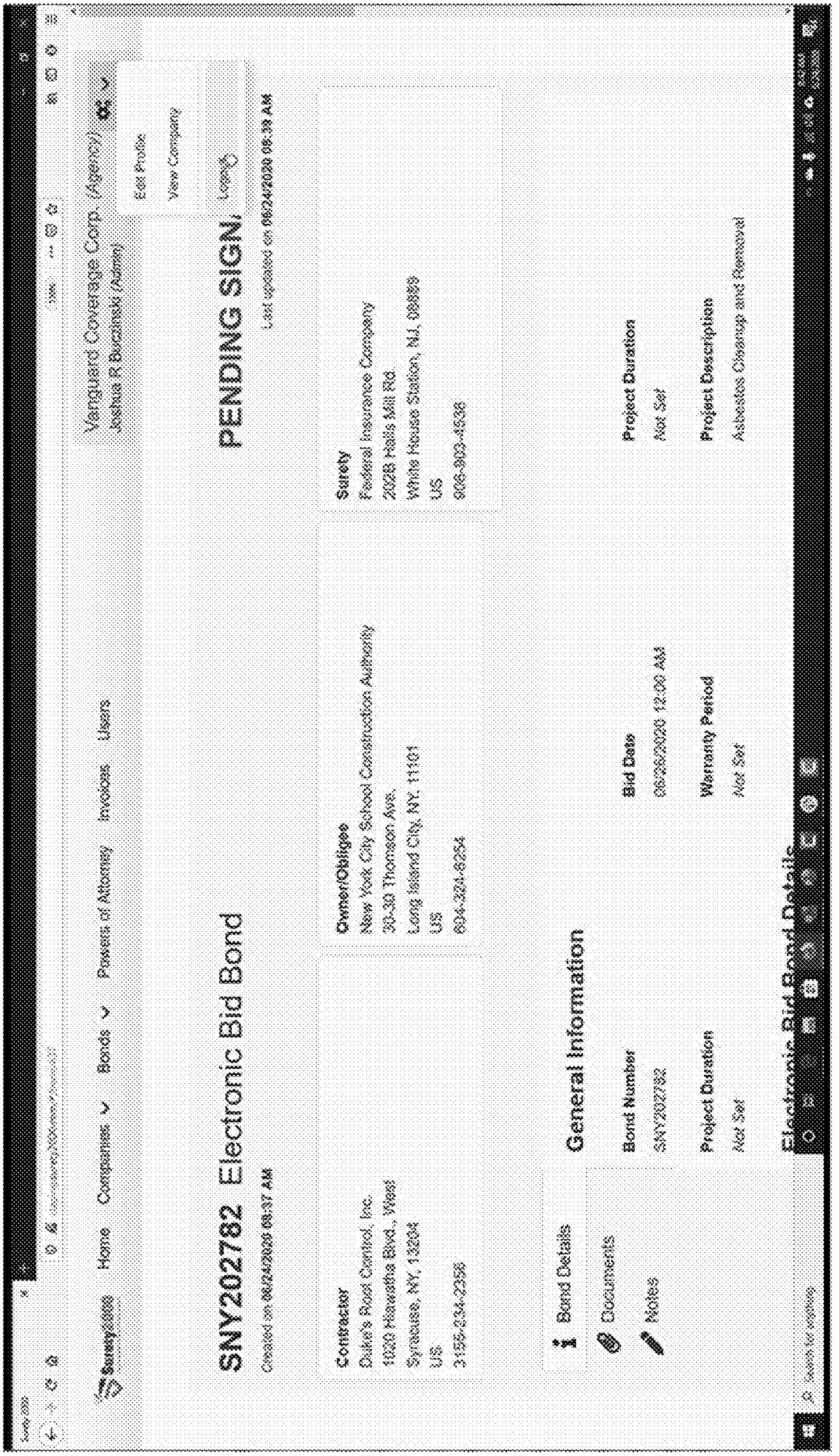
FIG. 96 shows the upper portion of the Electronic Bid Bond of the GUI screen of FIG. 94, but is shown with the agent toggling the settings icon and preparing to toggle the "Logout" option displayed in the dropdown list.

FIG. 96 shows the upper portion of the Electronic Bid Bond of the GUI screen of FIG. 94, but is shown with the agent toggling the settings icon and preparing to toggle the "Logout" option displayed in the dropdown list.

Figure 97:
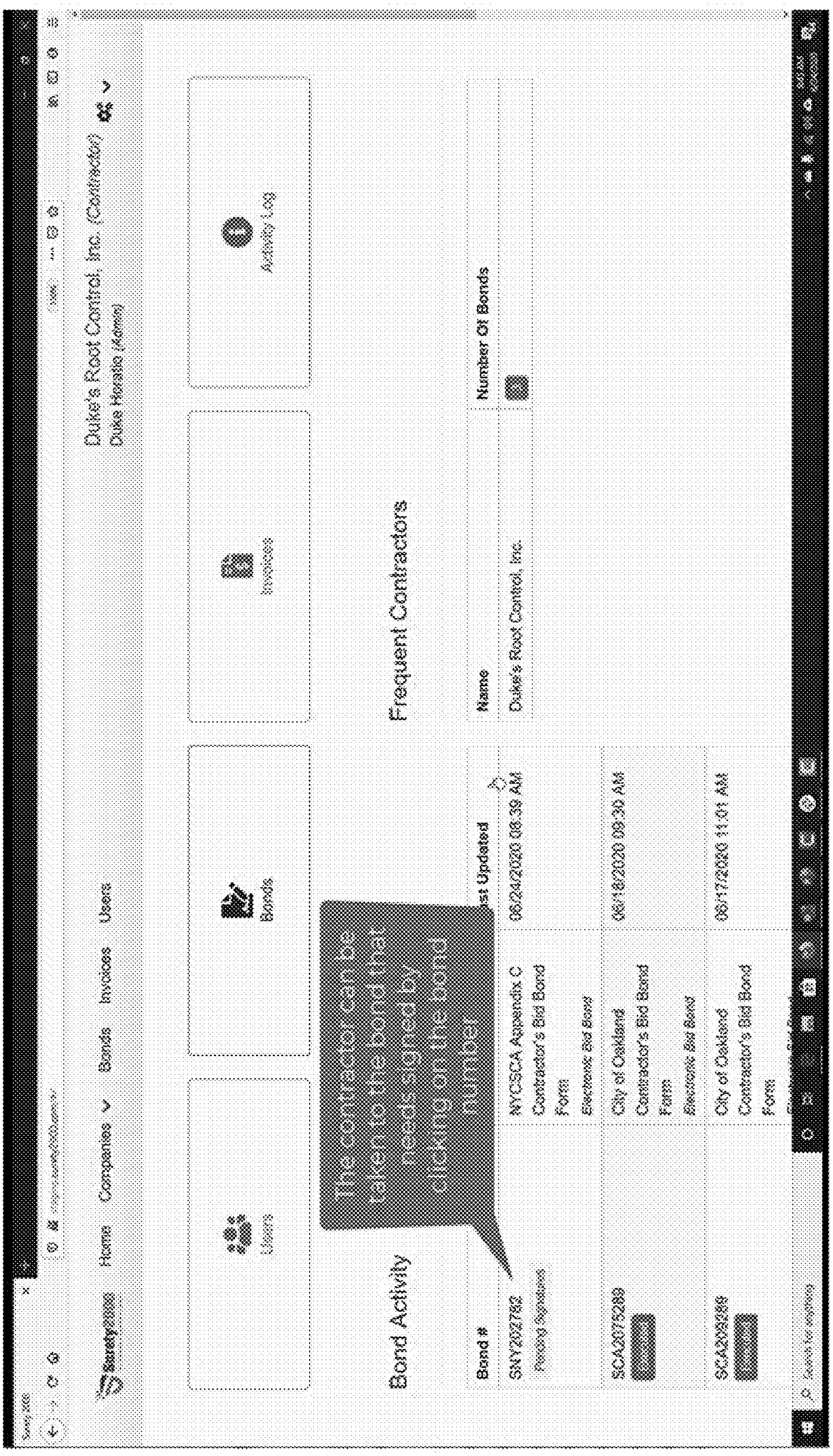
FIG. 97 shows the homepage GUI screen that is displayed once the contractor has logged in to the system, and shows highlighted in the "Bond Activity" section that Pending Signatures are required for the Bond #SNY202782.

FIG. 97 shows the homepage GUI screen that is displayed once the contractor has logged in to the system, and shows highlighted in the "Bond Activity" section that Pending Signatures are required for the Bond #SNY202782.

Figure 98:
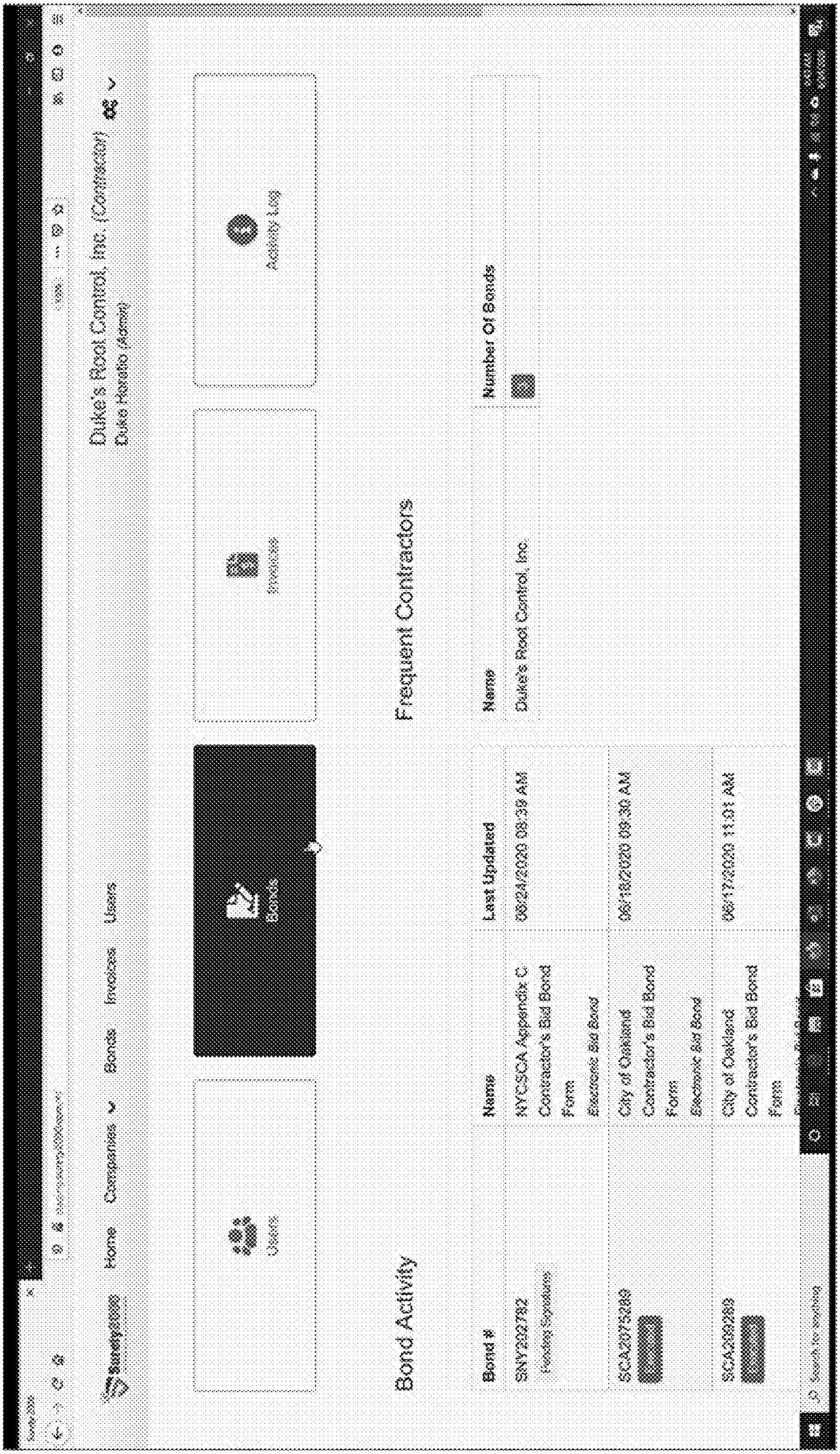
FIG. 98 shows the user toggling the "Bond" button in the homepage GUI screen of FIG. 97.

FIG. 98 shows the user toggling the "Bond" button in the homepage GUI screen of FIG. 97.

Figure 99:
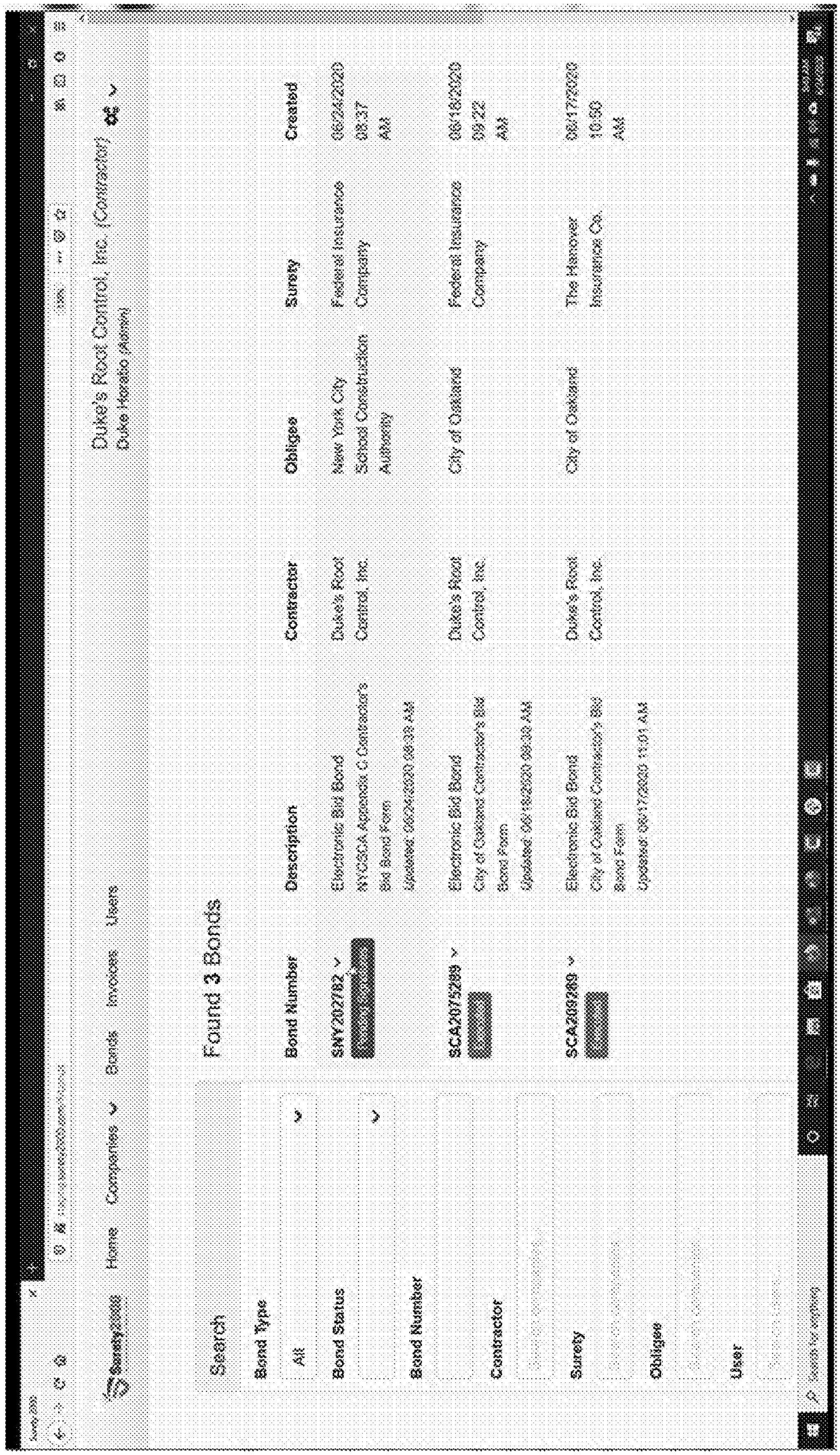
FIG. 99 shows the contractor's bond tab, which is shown after toggling the "Bond" button in the homepage GUI screen of FIG. 98, and in which the contractor can view executed bonds, and can view a pending bond, and is shown with the contractor hovering the cursor over a pending bond.

FIG. 99 shows the contractor's bond tab, which is shown after toggling the "Bond" button in the homepage GUI screen of FIG. 98, and in which the contractor can view executed bonds, and can view a pending bond, and is shown with the contractor hovering the cursor over a pending bond.

Figure 100:
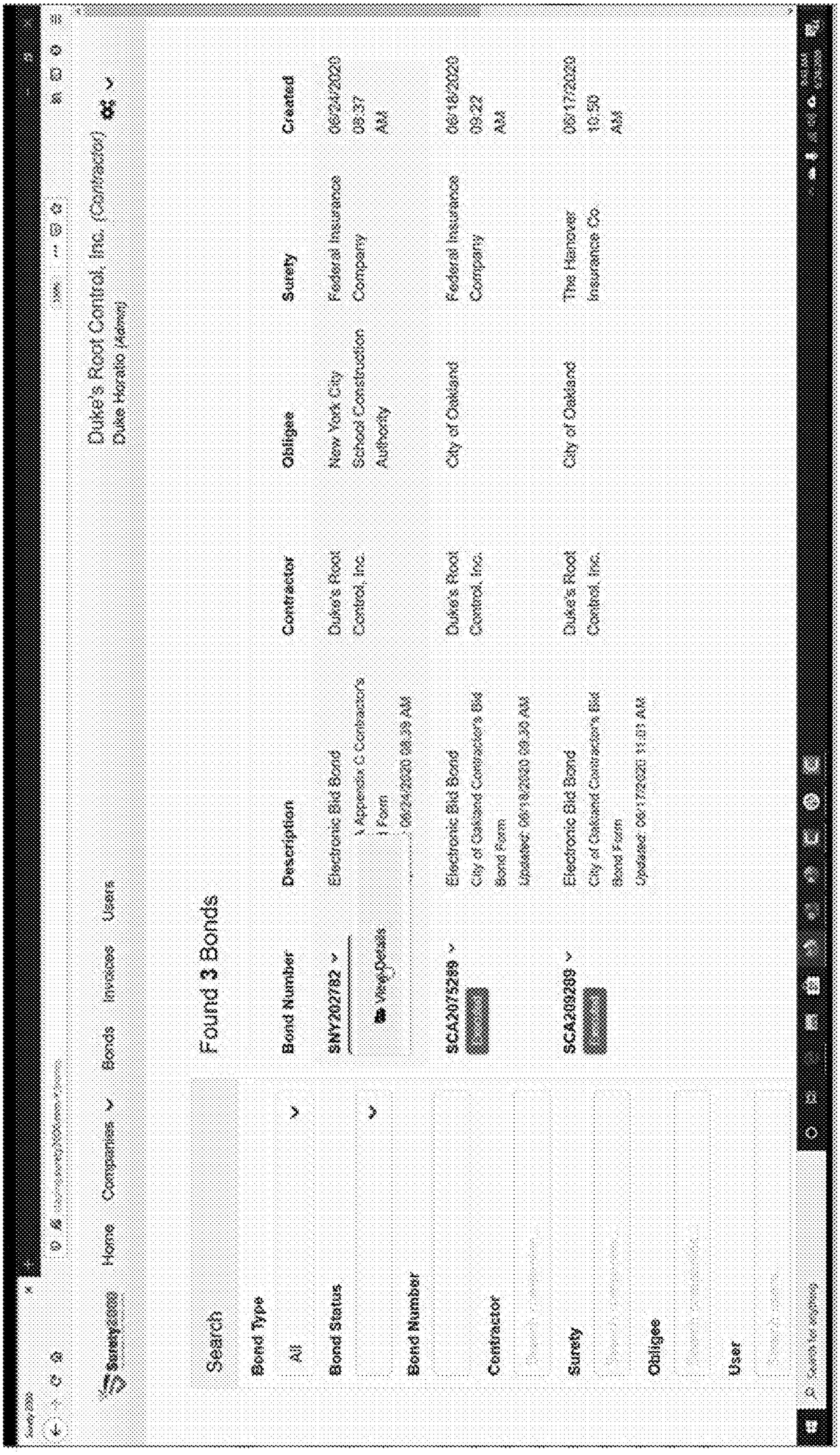
FIG. 100 shows the contractor's bond tab of the GUI screen of FIG. 99, with the contractor preparing to click on the "View Details" button in order to view the pending bond, which button appears after the cursor hovers over the pending bond for a moment.

FIG. 100 shows the contractor's bond tab of the GUI screen of FIG. 99, with the contractor preparing to click on the "View Details" button in order to view the pending bond, which button appears after the cursor hovers over the pending bond for a moment.

Figure 101A:
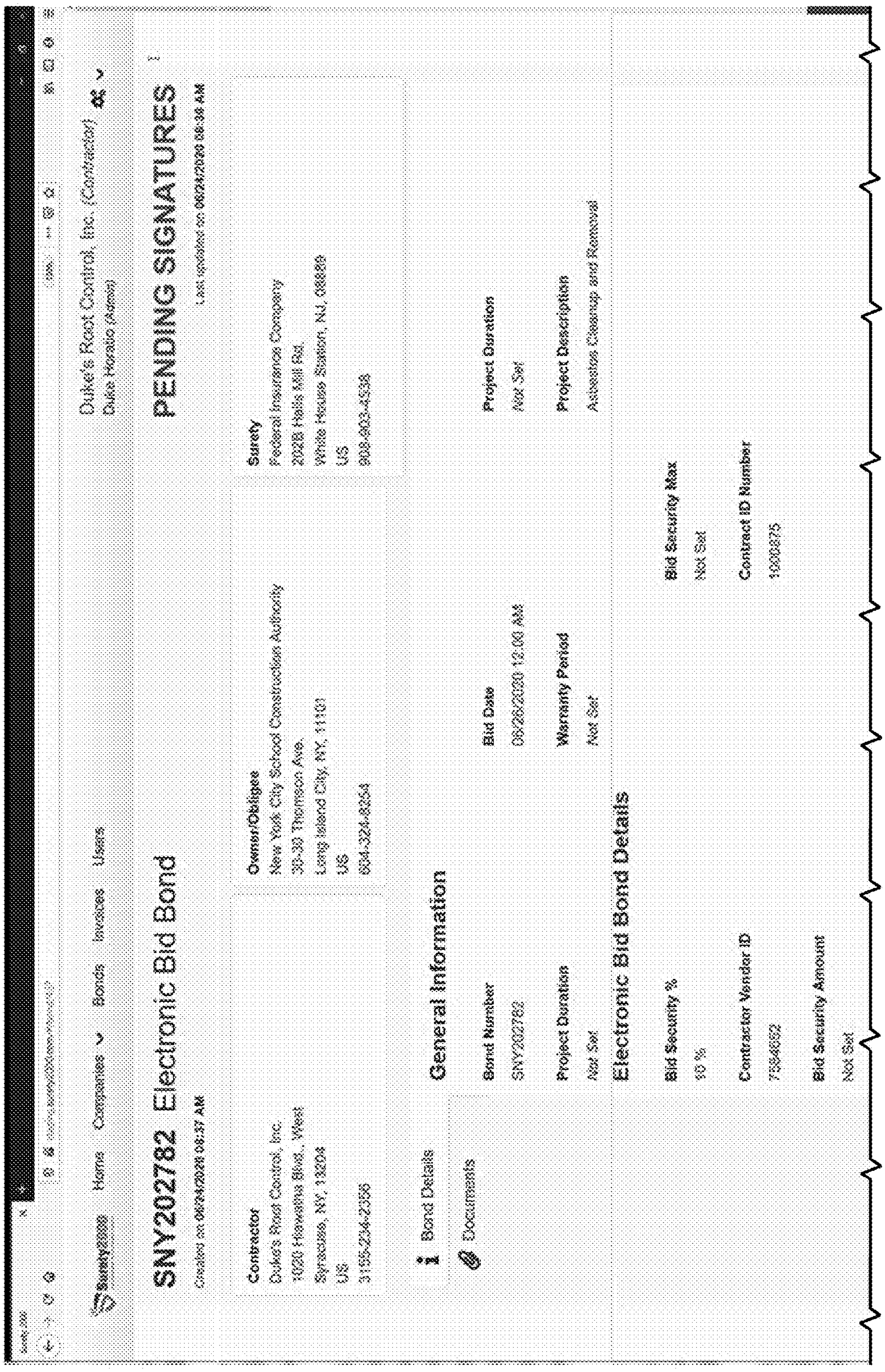
FIGS. 101A and 101B respectively show the upper and lower portions of the pending bond being displayed to the contractor, and with the contractor clicking on the "Sign Bond" button on the bottom of the GUI screen.
Figure 101B:
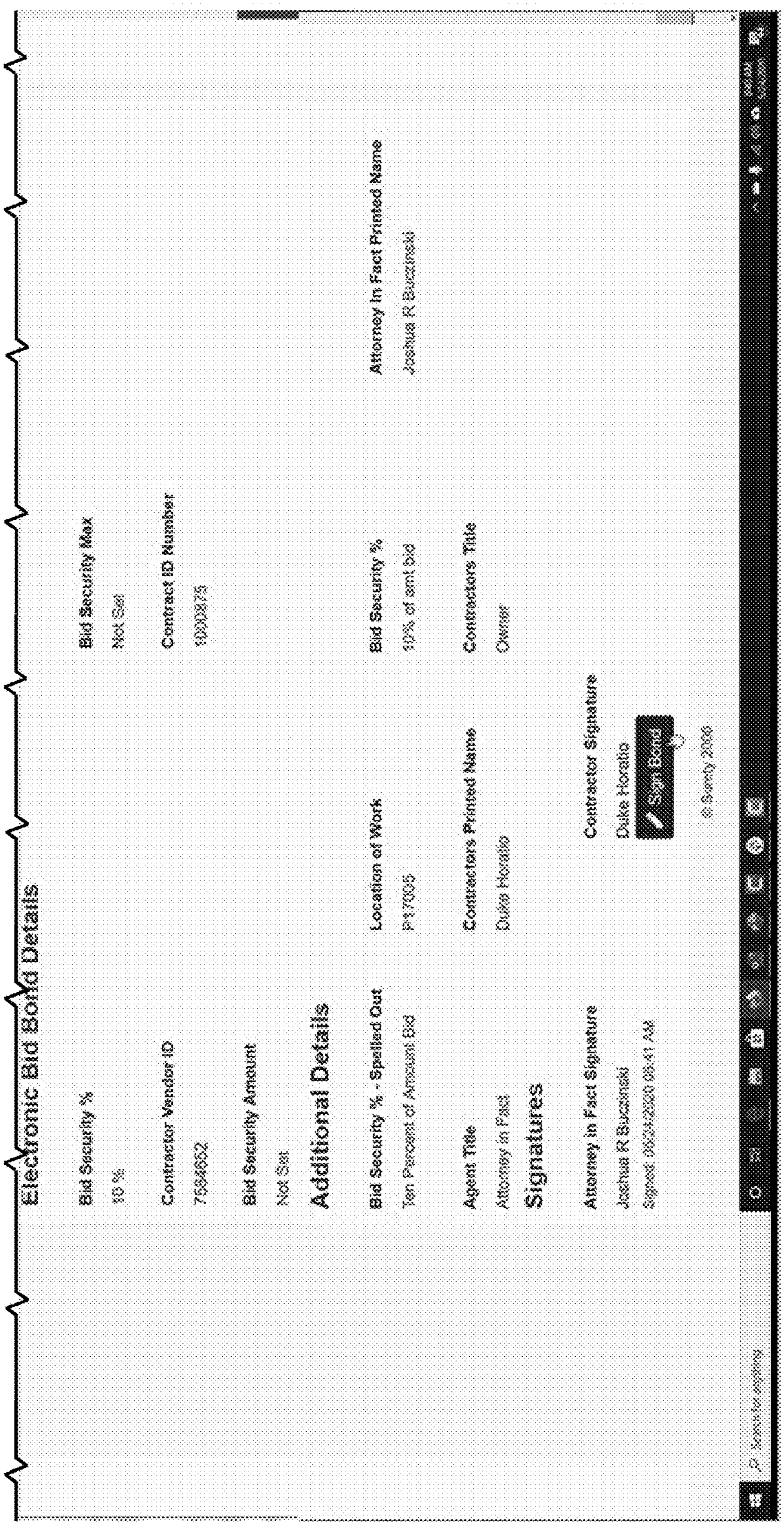

FIGS. 101A and 101B respectively show the upper and lower portions of the pending bond being displayed to the contractor, and with the contractor clicking on the "Sign Bond" button on the bottom of the GUI screen.

Figure 102:
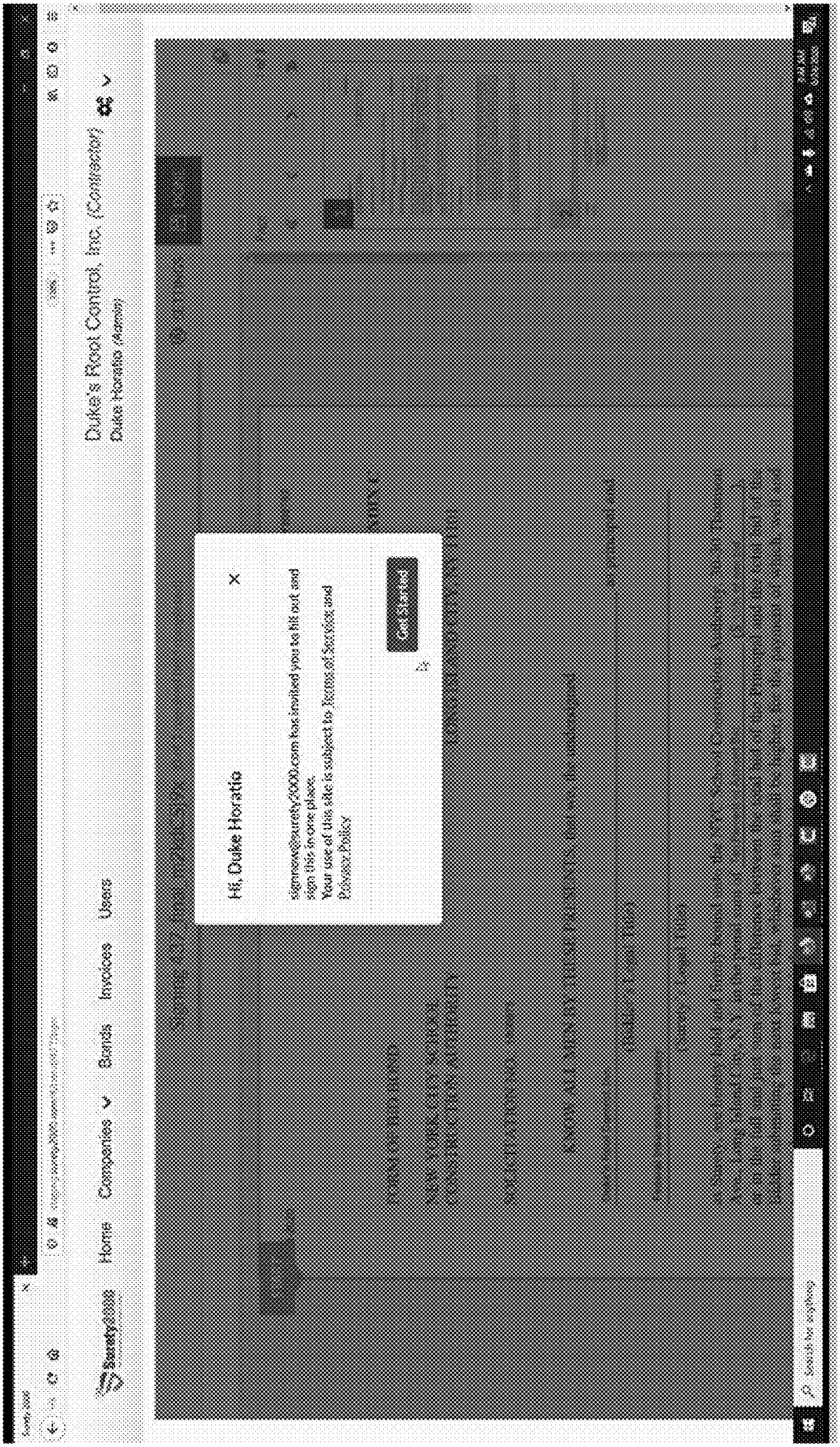
FIG. 102 shows a contractor bond signing page GUI screen, and with the system displaying a "Get started" button and a message for the contractor stating that he/she is invited to start the bond signing process, which is substantially the same as described for the agent.

FIG. 102 shows a contractor bond signing page GUI screen, and with the system displaying a "Get started" button and a message for the contractor stating that he/she is invited to start the bond signing process, which is substantially the same as described for the agent.

Figure 103:
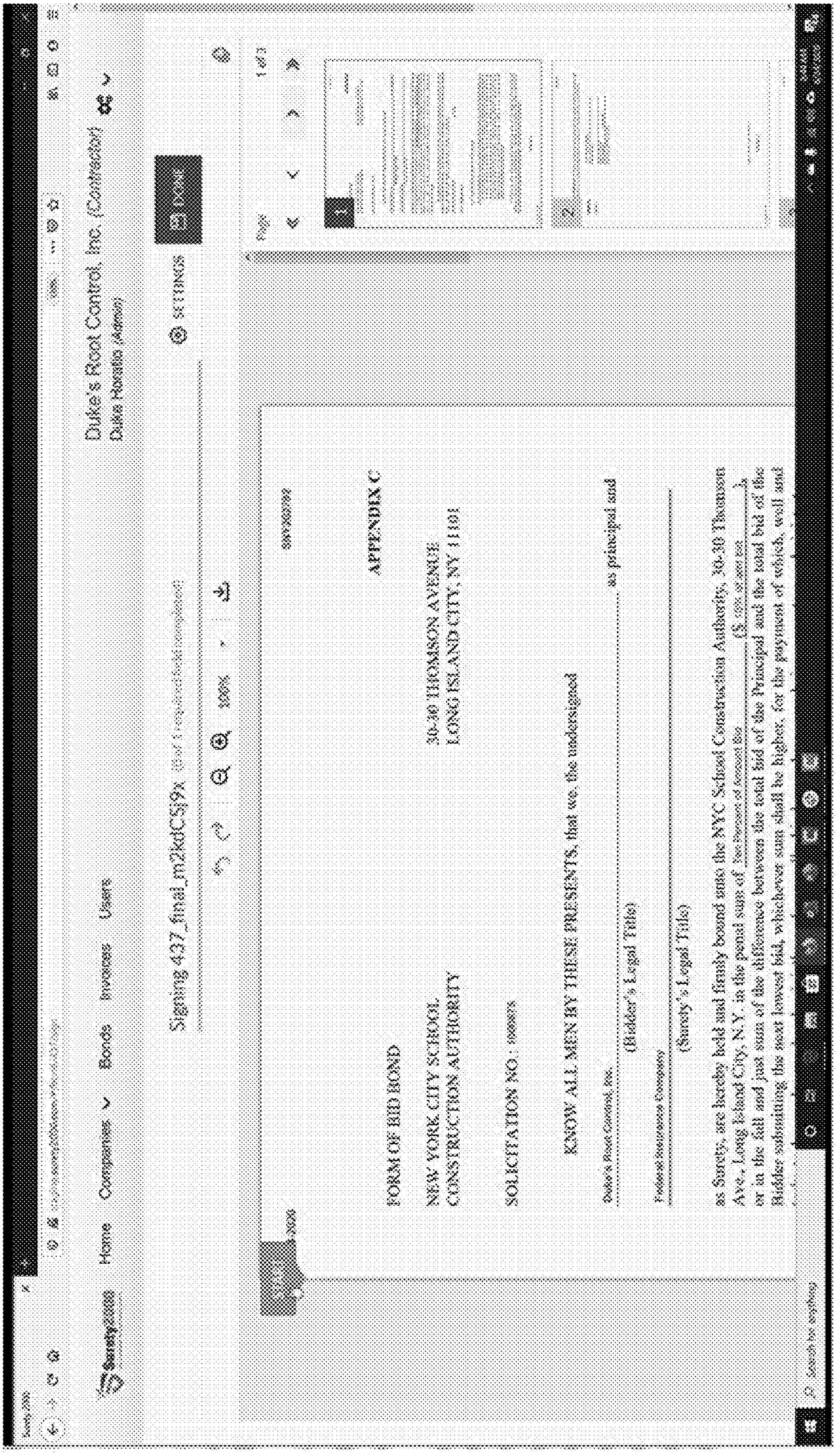
FIG. 103 shows the contractor bond signing page of FIG. 102, and with a "Start" button being displayed, which may be toggled to advance the bond page to the contractor's signature section.

FIG. 103 shows the contractor bond signing page of FIG. 102, and with a "Start" button being displayed, which may be toggled to advance the bond page to the contractor's signature section.

Figure 104:
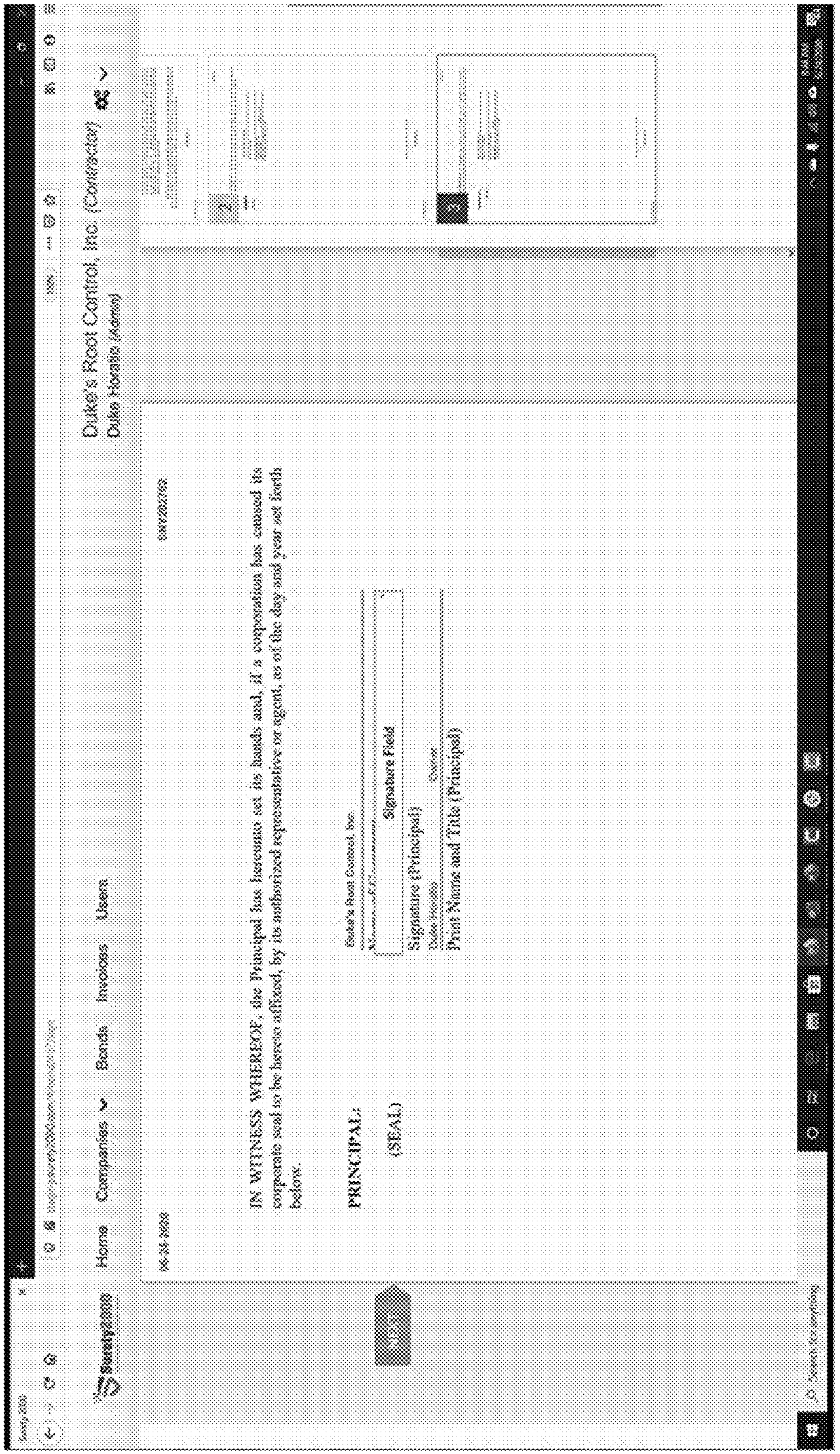
FIG. 104 shows the signature section of the contractor bond signing page GUI screen of FIG. 103, being shown after the "Start" button had been toggled, and which displays the "Signature Field" for the contractor.

FIG. 104 shows the signature section of the contractor bond signing page GUI screen of FIG. 103, being shown after the "Start" button had been toggled, and which displays the "Signature Field" for the contractor.

Figure 105:
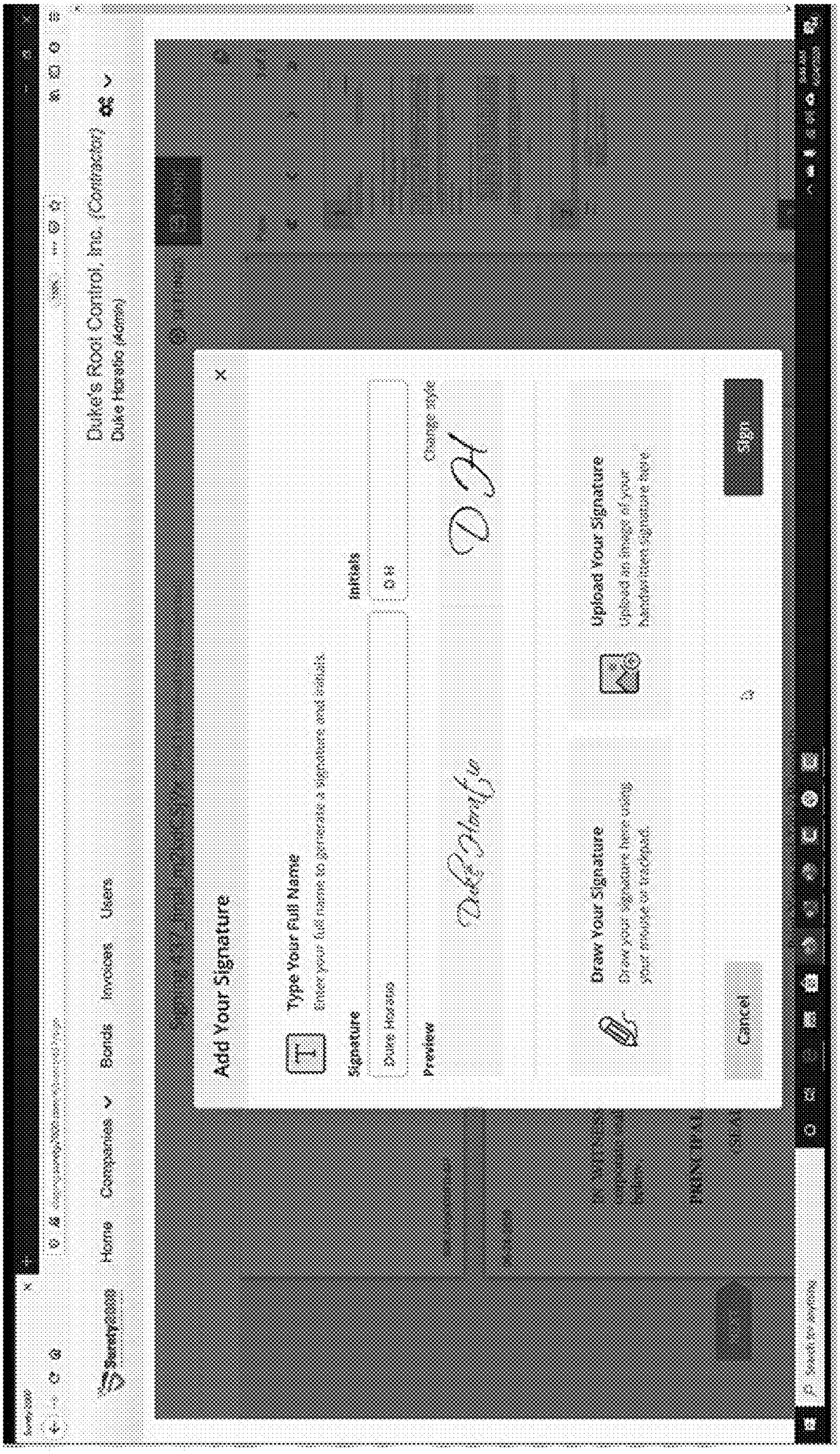
FIG. 105 shows an "Add Your Signature" window that is displayed when the logged in user—the contractor in this case—toggles the "Signature Field" of the bond signing page, but has not yet established a digital signature, with the window including text boxes for the user to type his/her name and initials, and preview boxes to show the digital signature and initials that will be created and used, along with a "Sign" button that may be toggled to utilize that digital signature in the "Signature Field"

FIG. 105 shows an "Add Your Signature" window that is displayed when the logged in user—the contractor in this case—toggles the "Signature Field" of the bond signing page, but has not yet established a digital signature, with the window including text boxes for the user to type his/her name and initials, and preview boxes to show the digital signature and initials that will be created and used, along with a "Sign" button that may be toggled to utilize that digital signature in the "Signature Field." The "Signature Field" of the bond signing page is different than merely using a commercial external e-signature program (e.g., Docusign®; signNow®; etc.) because it is integrated within the closed architecture of this system. Each digital signature made within the system will be time-stamped and unalterable.

Figure 106:
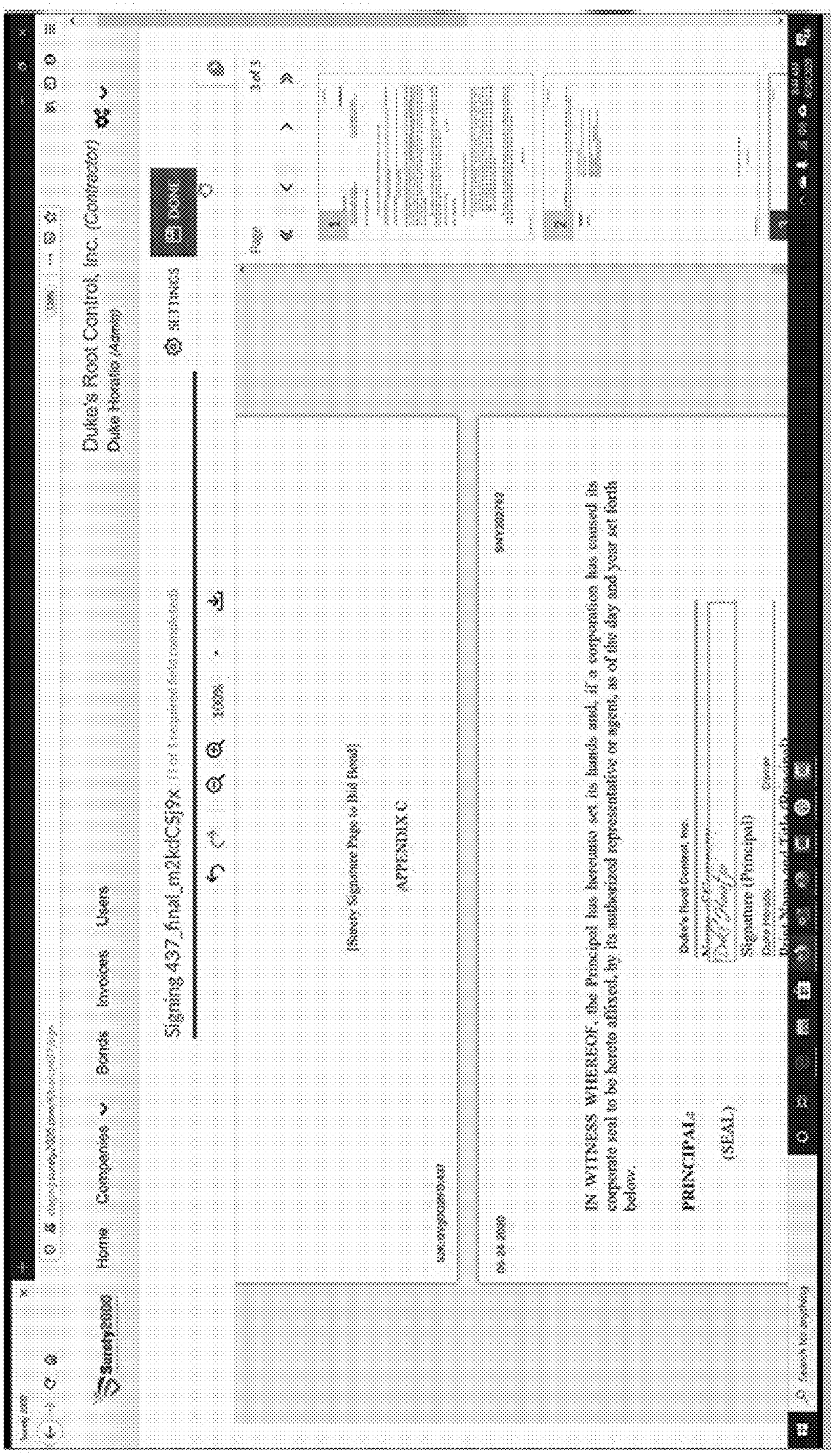
FIG. 106 shows the "Signature Field" in the contractor bond signing page GUI screen of FIG. 105, but is shown populated with the digital signature of FIG. 105 after the "Sign" button was toggled, and is also shown with the user preparing to toggle a "Done" button that is displayed in the upper right corner.

FIG. 106 shows the "Signature Field" in the contractor bond signing page GUI screen of FIG. 105, but is shown populated with the digital signature of FIG. 105 after the "Sign" button was toggled, and is also shown with the user preparing to toggle a "Done" button that is displayed in the upper right corner.

Figure 107:
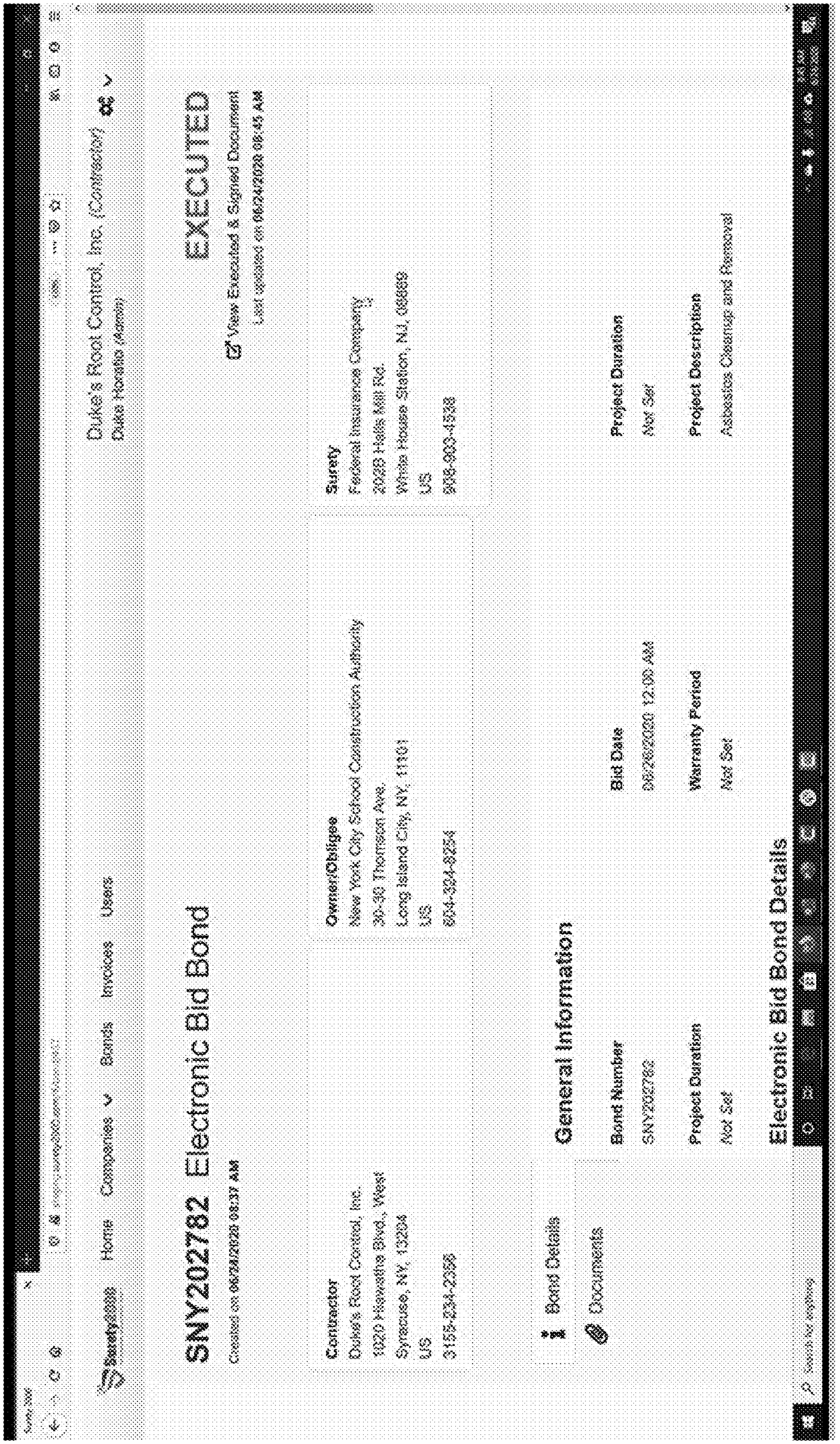
FIG. 107 shows the Electronic Bid Bond being displayed in the contractor bond screen with a status of "Executed," after it has been signed by both the agent and the contractor, and which may be sent by the system (e.g., via email) to the obligee for verification.

FIG. 107 shows the Electronic Bid Bond being displayed in the contractor bond screen with a status of "Executed,"

after it has been signed by both the agent and the contractor, and which may be sent by the system (e.g., via email) to the obligee for verification.

Figure 108:
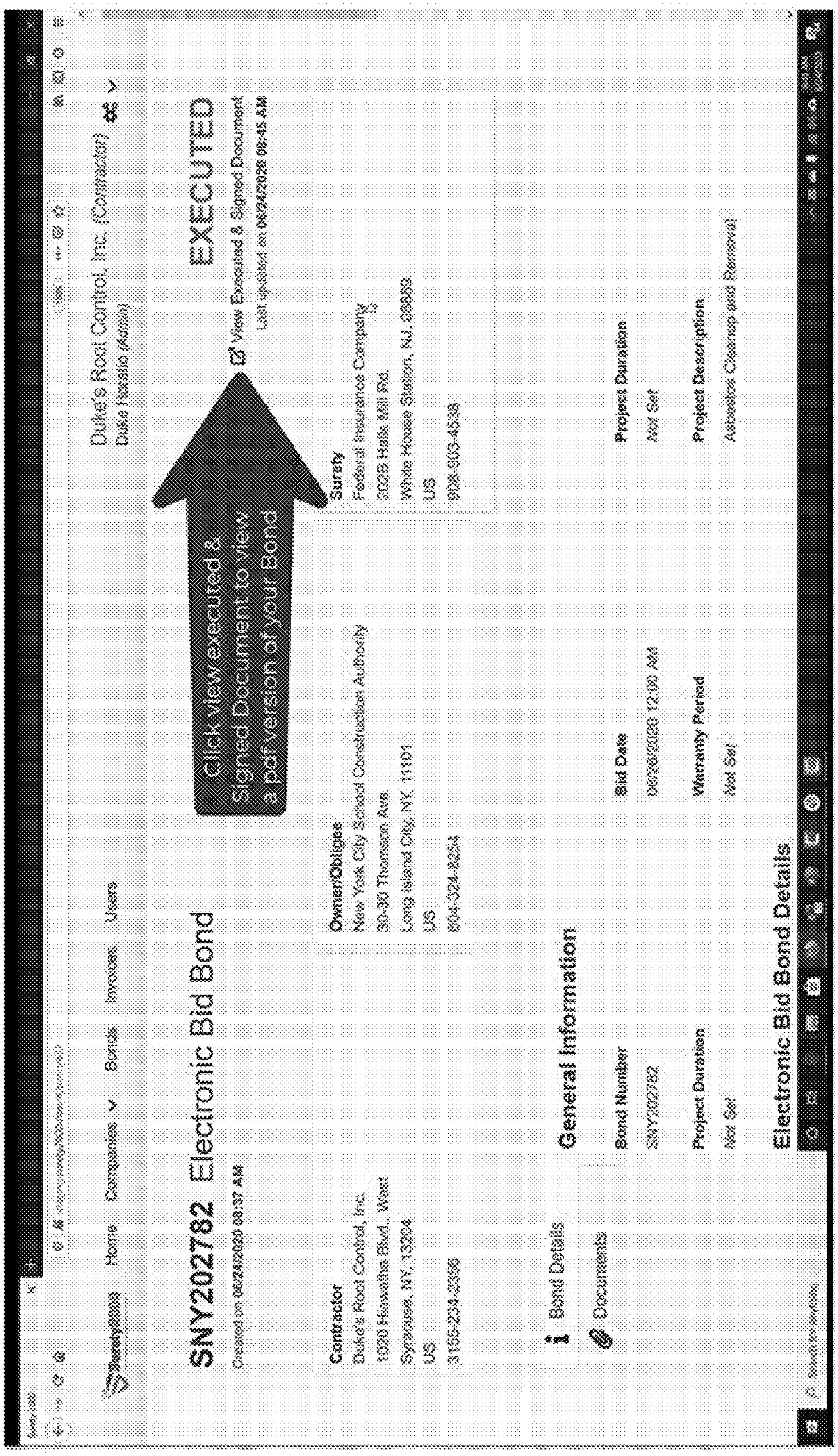
FIG. 108 shows GUI screen of FIG. 107, displaying the Electronic Bid Bond with a status of "Executed," and highlighting for the reader a link displayed therein that permits the contractor to view the executed bond when toggled.

FIG. 108 shows GUI screen of FIG. 107, displaying the Electronic Bid Bond with a status of "Executed," and highlighting for the reader a link displayed therein that permits the contractor to view the executed bond when toggled.

Figure 109:
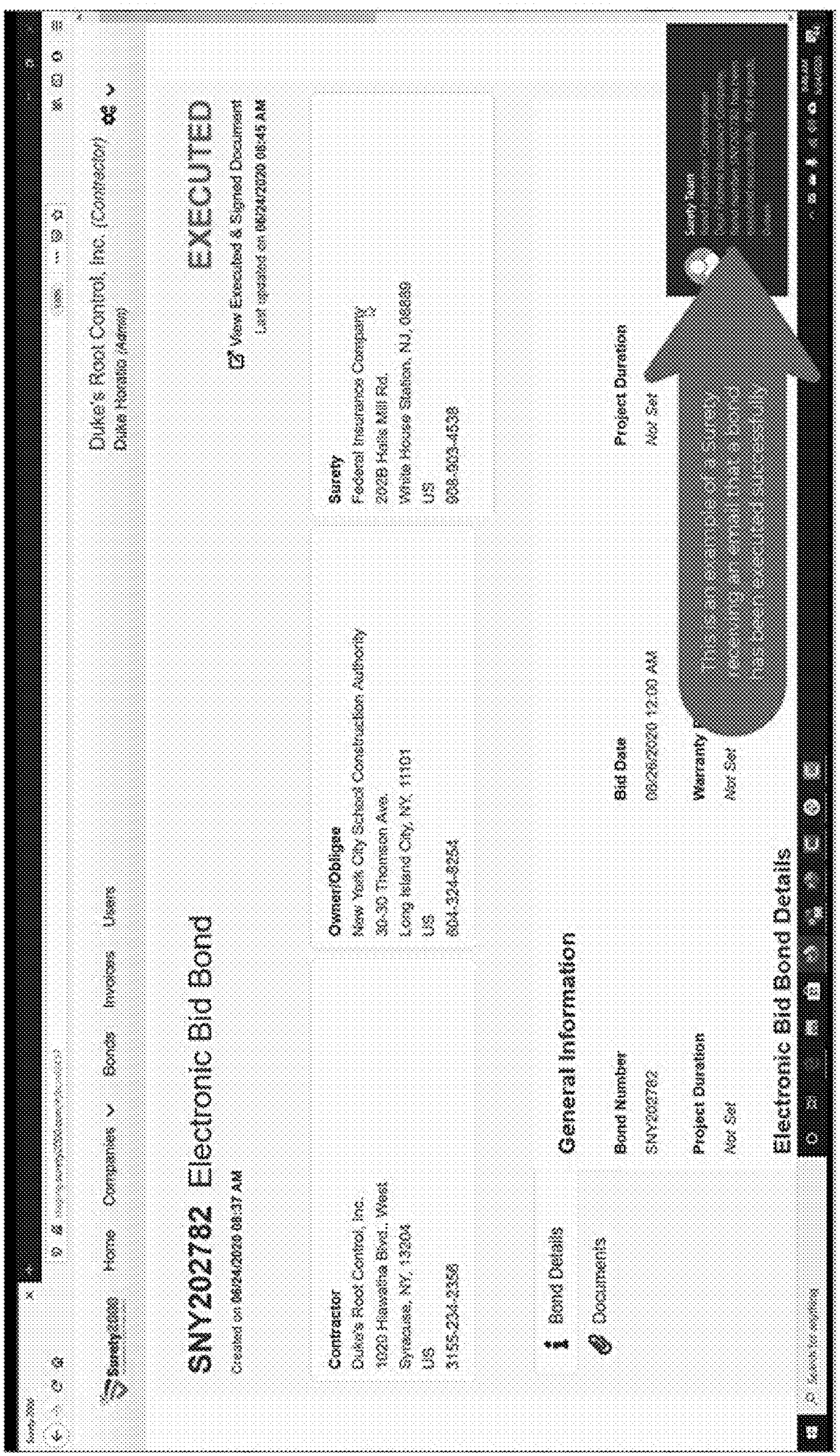
FIG. 109 illustrates, and highlights for the reader, that the system sends an email to the surety notifying the surety when the bond has been successfully executed by all parties—by the attorney in fact, and by the contractor.

FIG. 109 illustrates, and highlights for the reader, that the system sends an email to the surety notifying the surety when the bond has been successfully executed by all parties—by the attorney in fact, and by the contractor.

Figure 110:
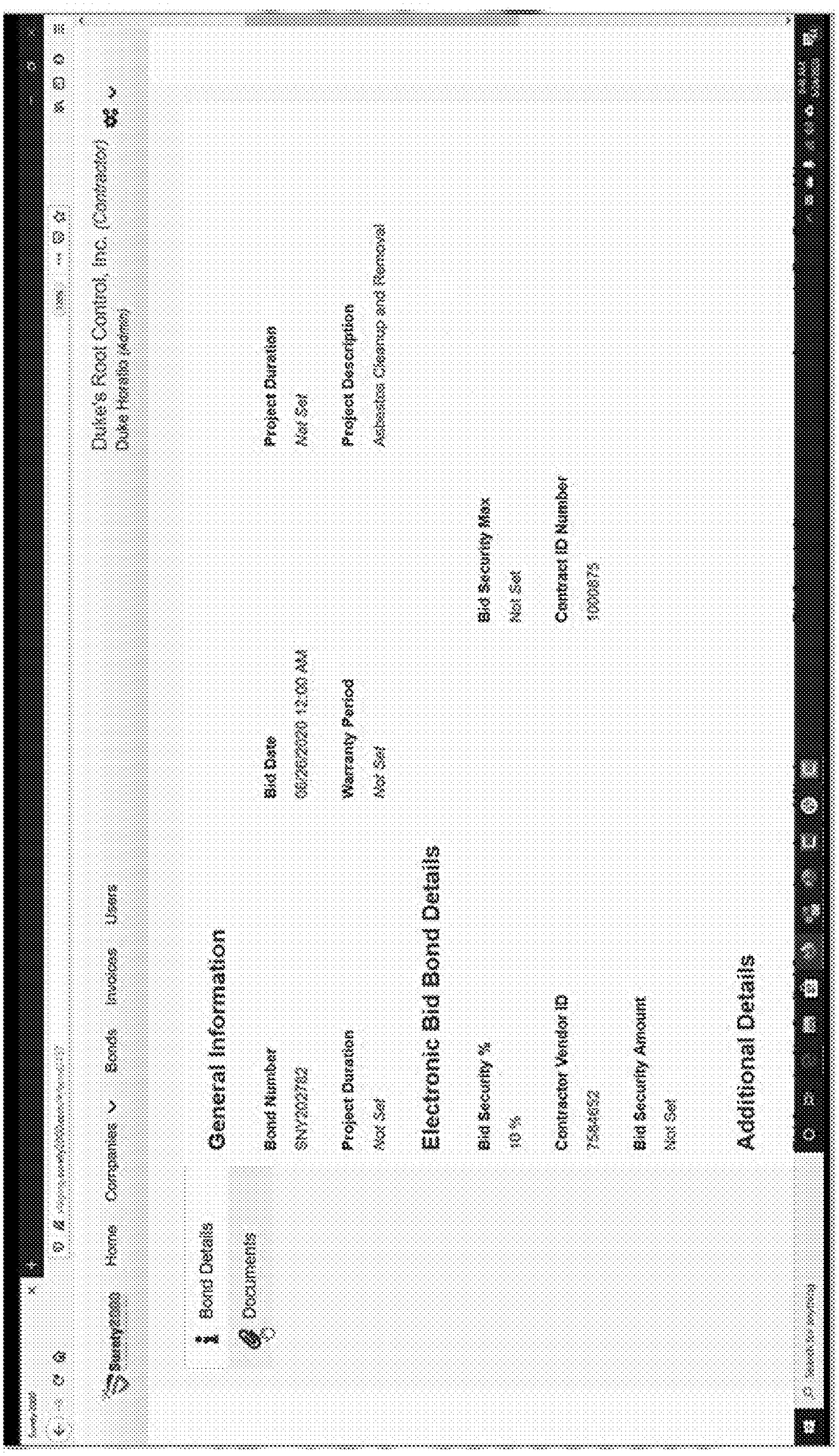
FIG. 110 shows the contractor hovering the cursor over the "Documents" link, which when toggled will permit the contractor to view the executed bond, the power of attorney, and any additional documents added to the bond.

FIG. 110 shows the contractor hovering the cursor over the "Documents" link, which when toggled will permit the contractor to view the executed bond, the power of attorney, and any additional documents added to the bond.

Figure 111:
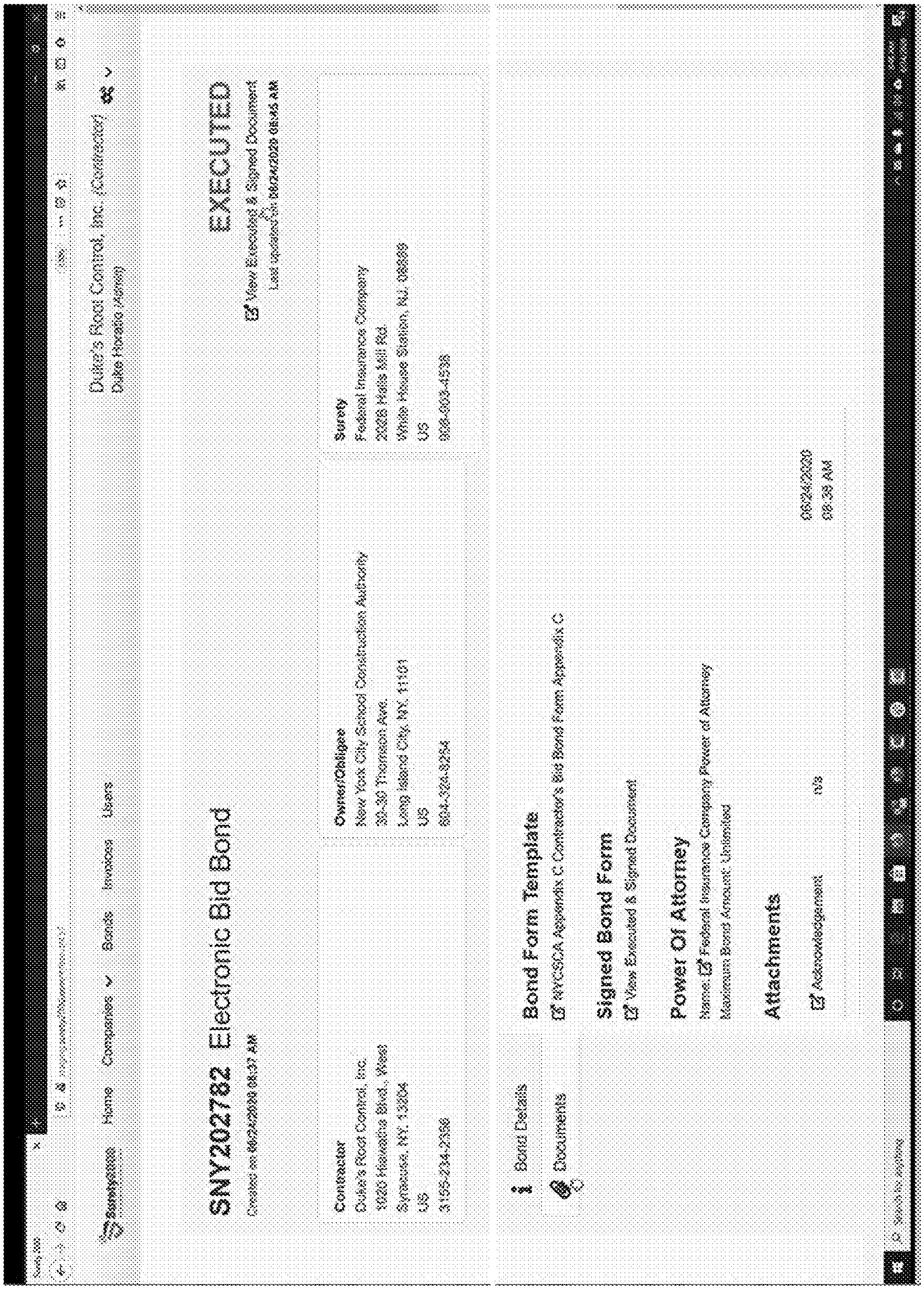
FIG. 111 shows the Documents tab, which is displayed after the contractor toggles the "Documents" link in the GUI screen of FIG. 110, and which Documents tab displays links for viewing at least the executed bond, the power of attorney, and any additional attachments that were added to the bond, and also shows the contractor hovering the cursor over the link in the upper right corner labeled as "View Executed & Signed Document"

FIG. 111 shows the Documents tab, which is displayed after the contractor toggles the "Documents" link in the GUI screen of FIG. 110, and which Documents tab displays links for viewing at least the executed bond, the power of attorney, and any additional attachments that were added to the bond, and also shows the contractor hovering the cursor over the link in the upper right corner labeled as "View Executed & Signed Document."

Figure 112:
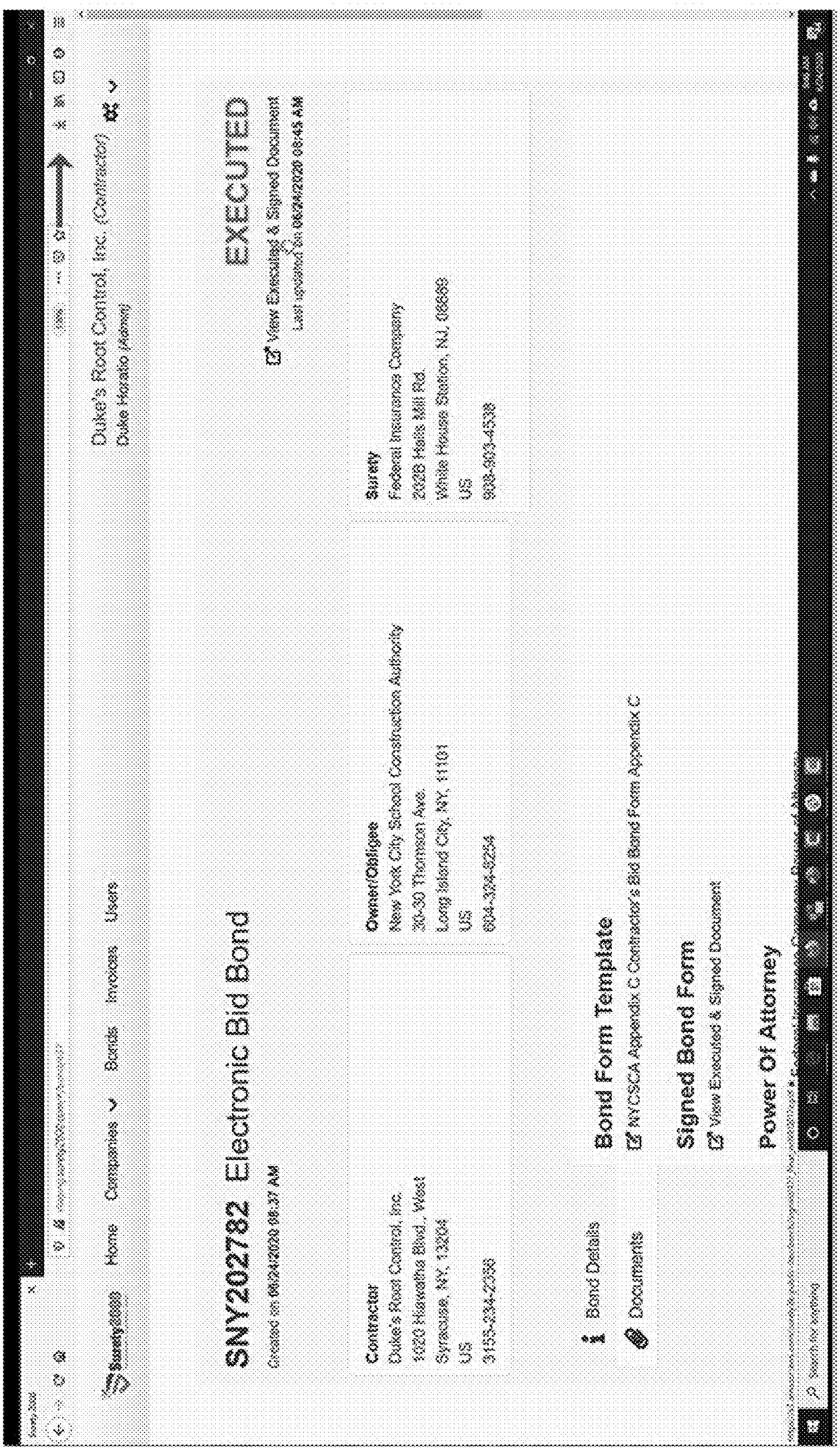
FIG. 112 shows the Documents Tab GUI screen of FIG. 111, but also shows and highlights a download symbol that, when toggled, will display a dropdown list that permits the downloading of a PDF version of the documents.

FIG. 112 shows the Documents Tab GUI screen of FIG. 111, but also shows and highlights a download symbol that, when toggled, will display a dropdown list that permits the downloading of a PDF version of the documents.

Figure 113:
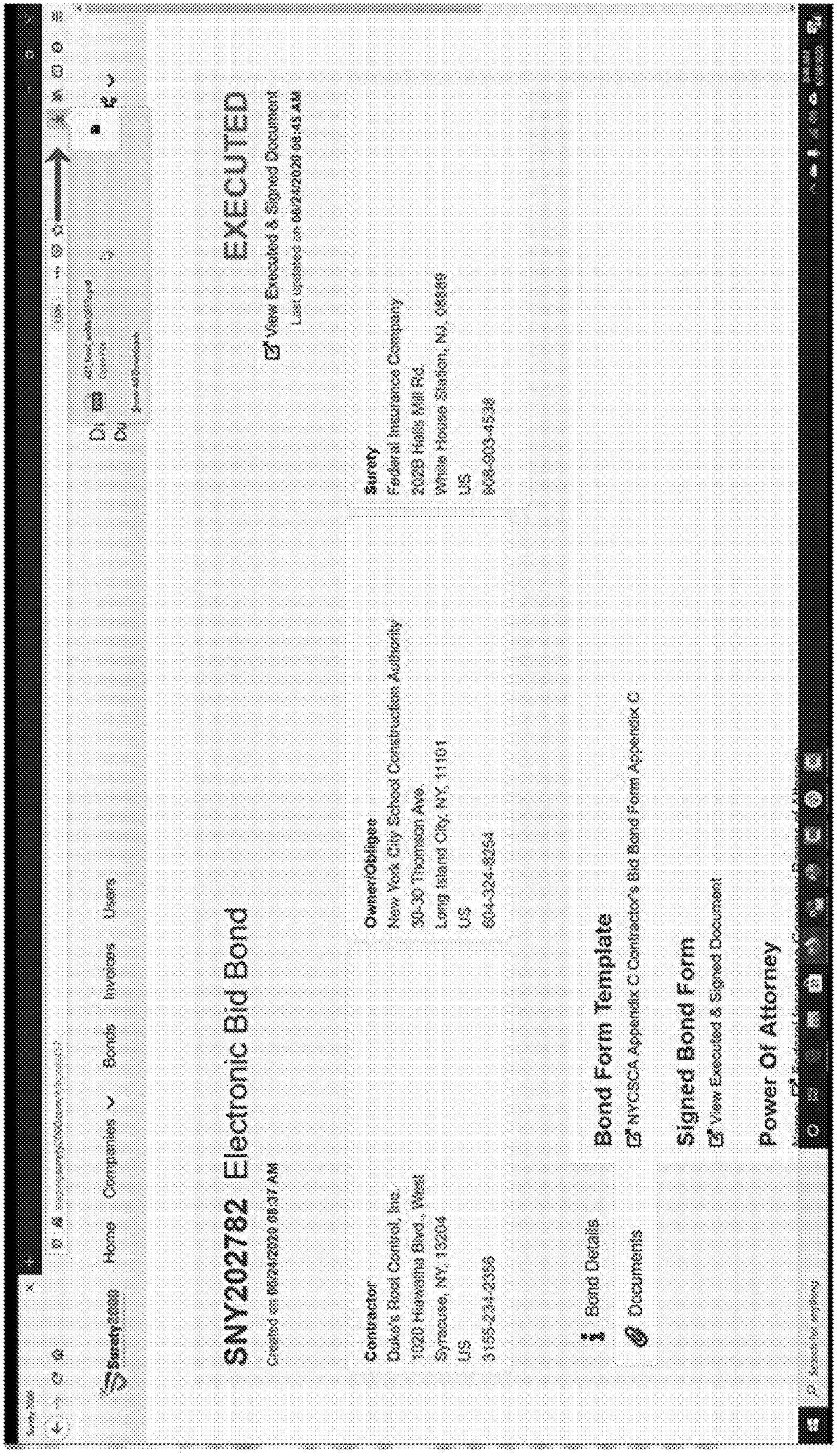
FIG. 113 shows the Documents Tab GUI screen of FIG. 112, but also shows the dropdown list being displayed to permit downloading of a PDF version of the documents.

FIG. 113 shows the Documents Tab GUI screen of FIG. 112, but also shows the dropdown list being displayed to permit downloading of a PDF version of the documents.

Figure 114:
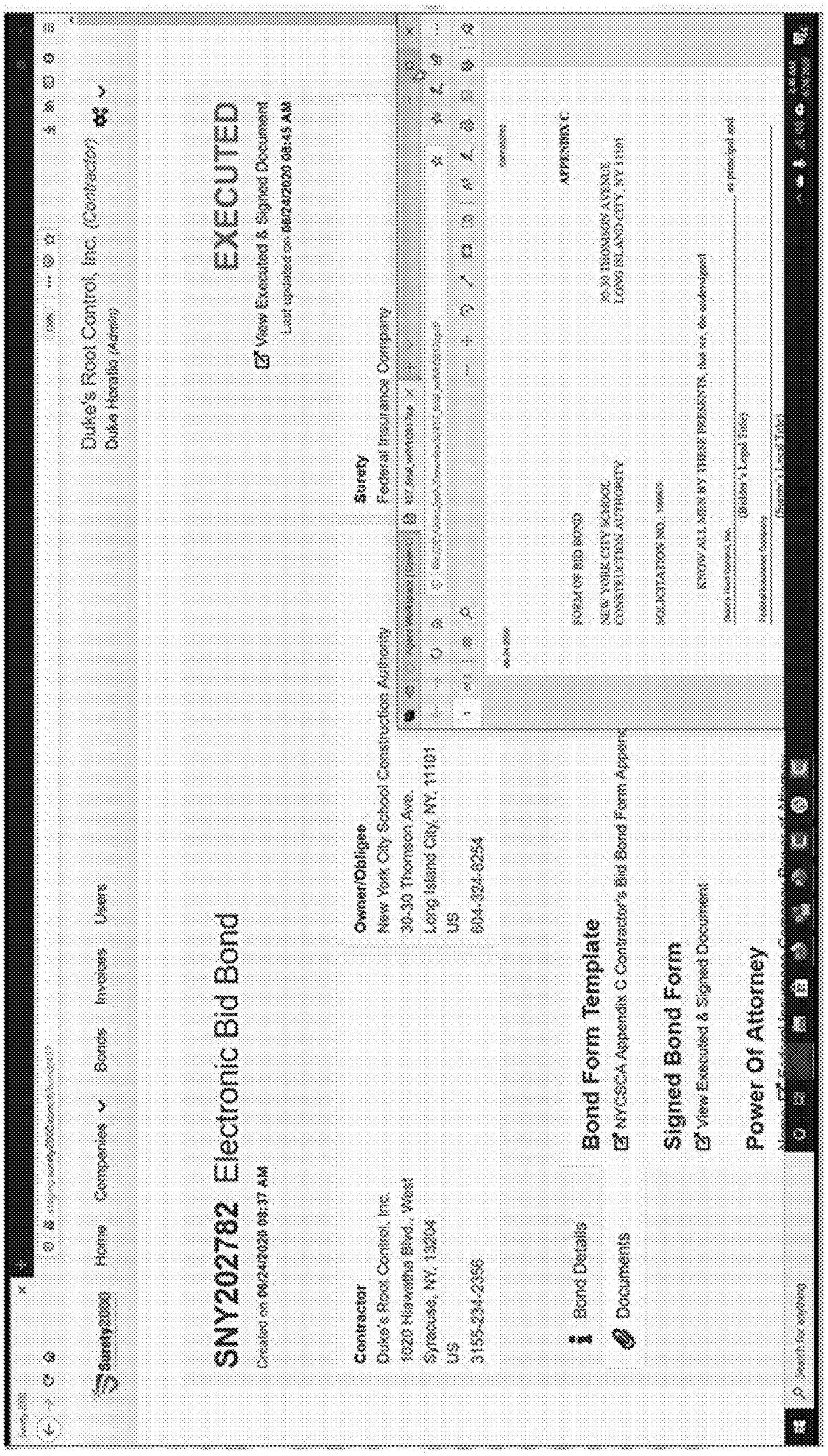
FIG. 114 shows a portion of the PDF version of the documents associated with the executed bond being displayed in a window, after being selected from the dropdown list of Documents Tab GUI screen of FIG. 113.

FIG. 114 shows a portion of the PDF version of the documents associated with the executed bond being displayed in a window, after being selected from the dropdown list of Documents Tab GUI screen of FIG. 113.

Figure 115:
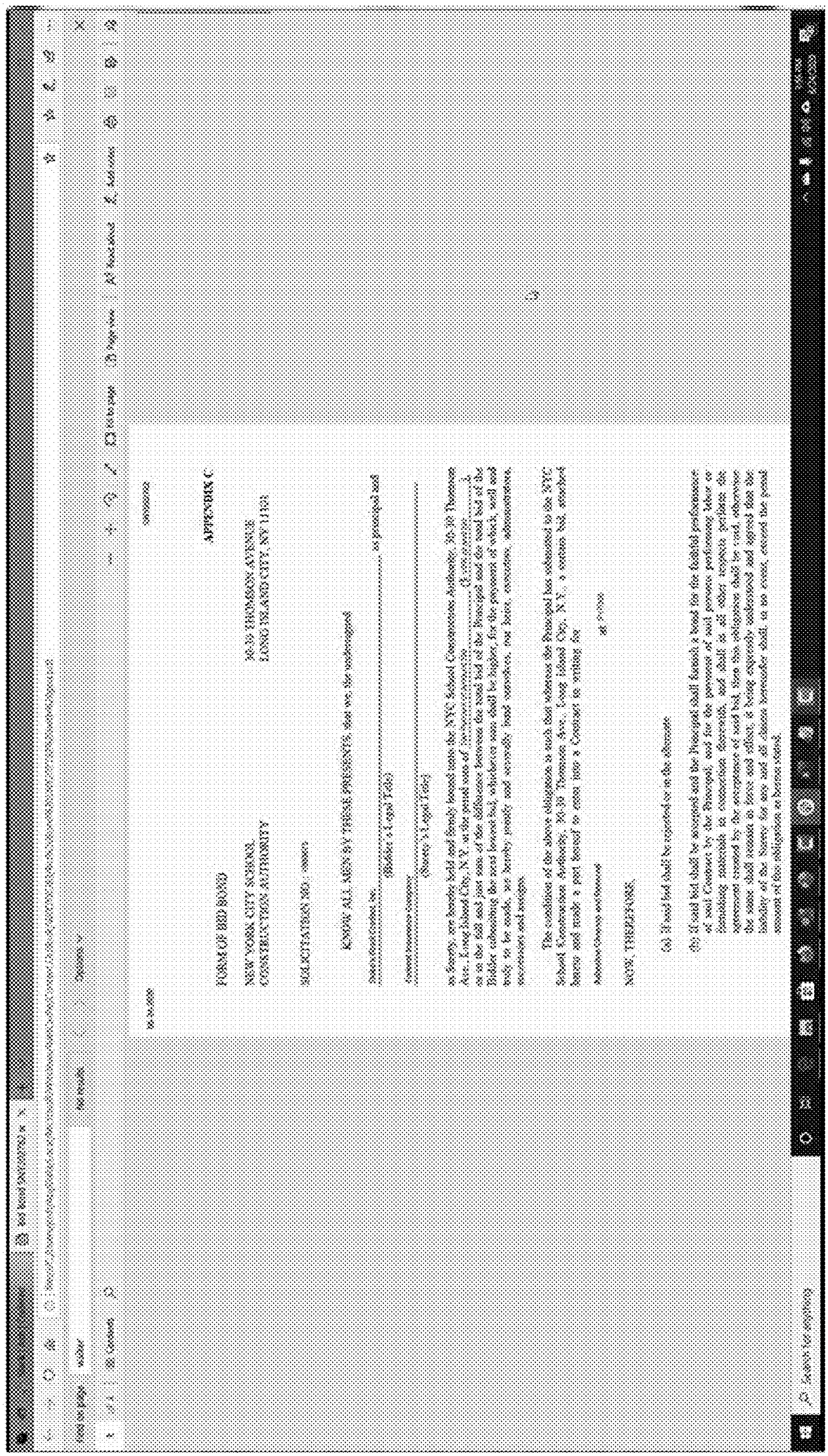
FIG. 115 shows the top portion of the PDF version of the documents associated with the executed bond being displayed full screen, after the maximize button is toggled in the window of the GUI screen of FIG. 114, showing the bond number at the top right corner of each page, which bond number also appears on the power of attorney.

FIG. 115 shows the top portion of the PDF version of the documents associated with the executed bond being displayed full screen, after the maximize button is toggled in the window of the GUI screen of FIG. 114, showing the bond number at the top right corner of each page, which bond number also appears on the power of attorney.

Figure 116:
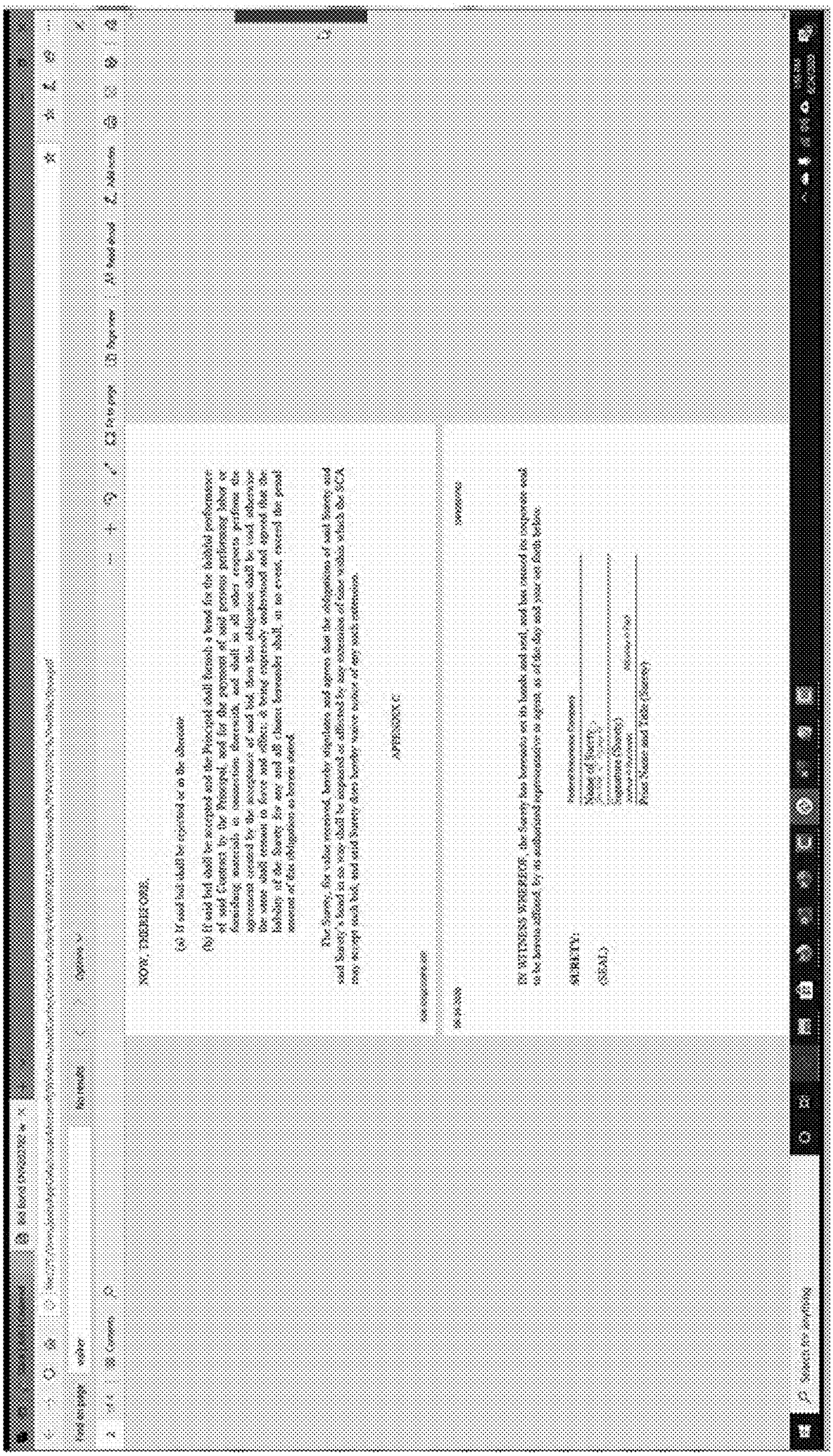
FIG. 116 shows the agent signature filled in on one page of the PDF version of the executed bond document, and with a unique identifier located at the bottom left corner of the page, which unique identifier is also placed on the power of attorney, linking and verifying authenticity of the documents and making them unalterable.

FIG. 116 shows the agent signature filled in on one page of the PDF version of the executed bond document, and with a unique identifier located at the bottom left corner of the page, which unique identifier is also placed on the power of attorney, linking and verifying authenticity of the documents and making them unalterable. The identifier is a unique and random number generated through proprietary technology, and which serves as an additional means of authenticating the surety bond document.

Figure 117:
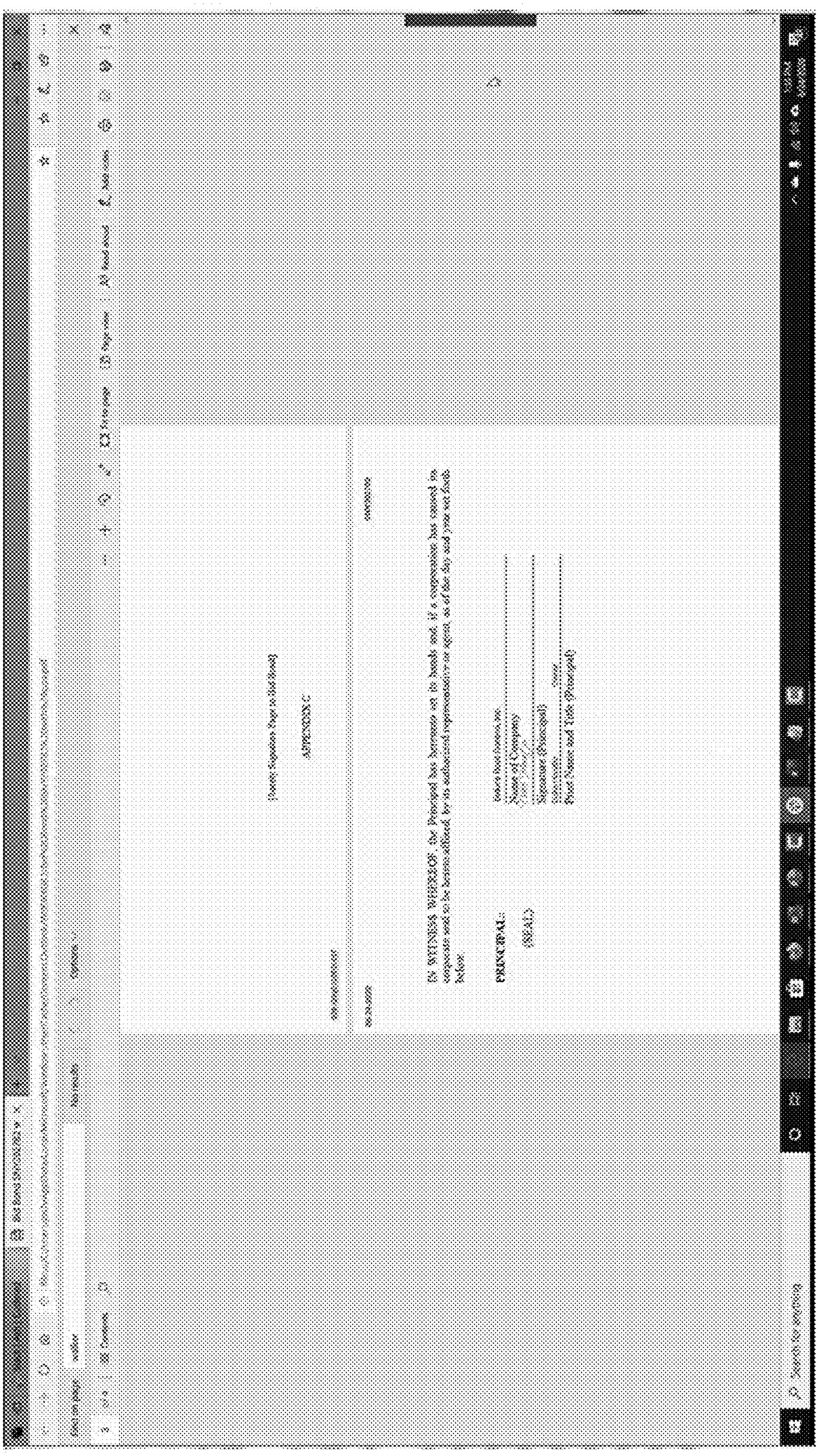
FIG. 117 shows the contractor (Principal) signature filled in on another page of the PDF version of the executed bond document, and with the same unique identifier located at the bottom left corner of the page, which unique identifier appears on each page of the executed bond.

FIG. 117 shows the contractor (Principal) signature filled in on another page of the PDF version of the executed bond document, and with the same unique identifier located at the bottom left corner of the page, which unique identifier appears on each page of the executed bond.

Figure 118:
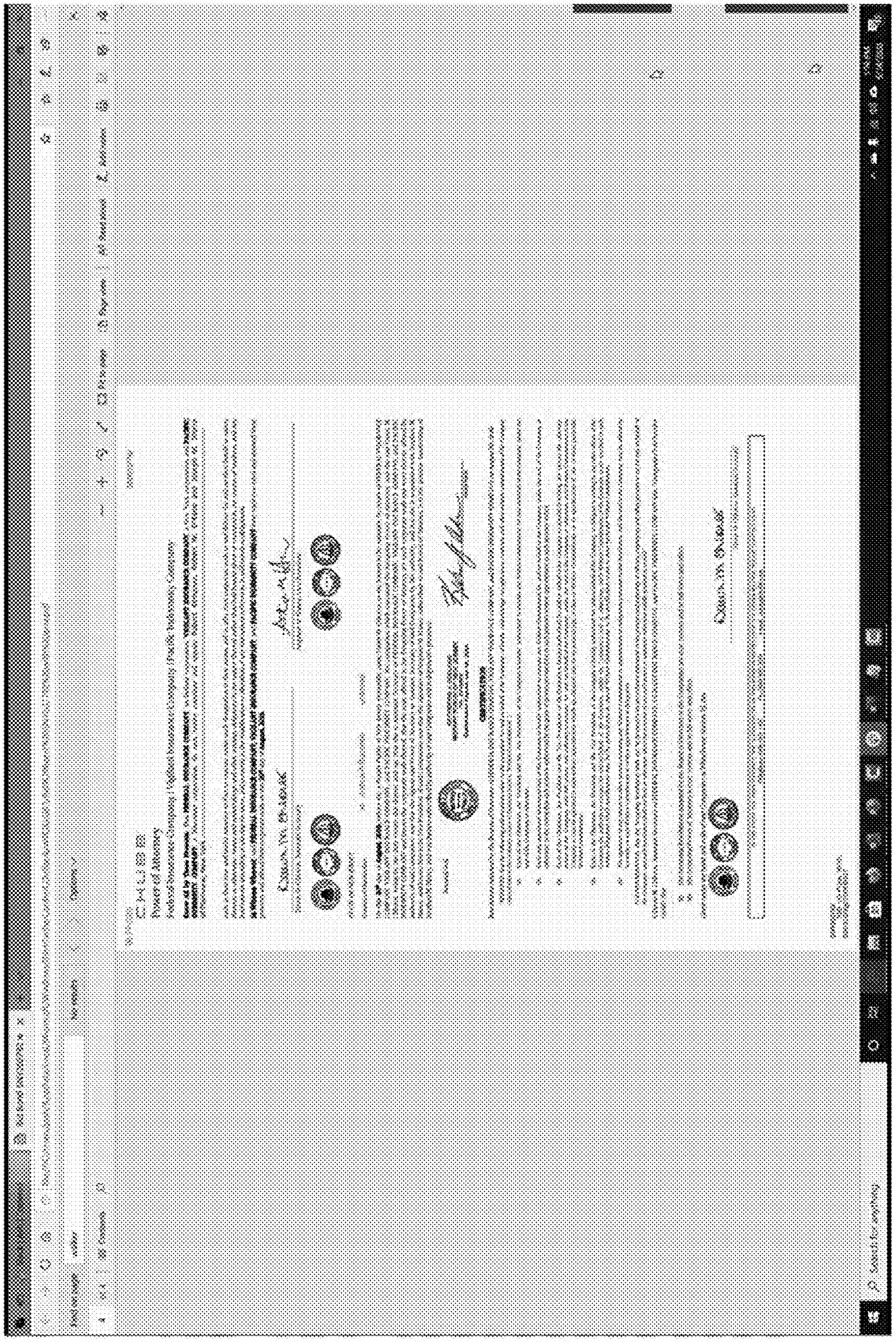
FIG. 118 shows the power of attorney portion of the downloaded PDF version of the documents associated with the executed bond.

FIG. 118 shows the power of attorney portion of the downloaded PDF version of the documents associated with the executed bond.

Figure 118A:
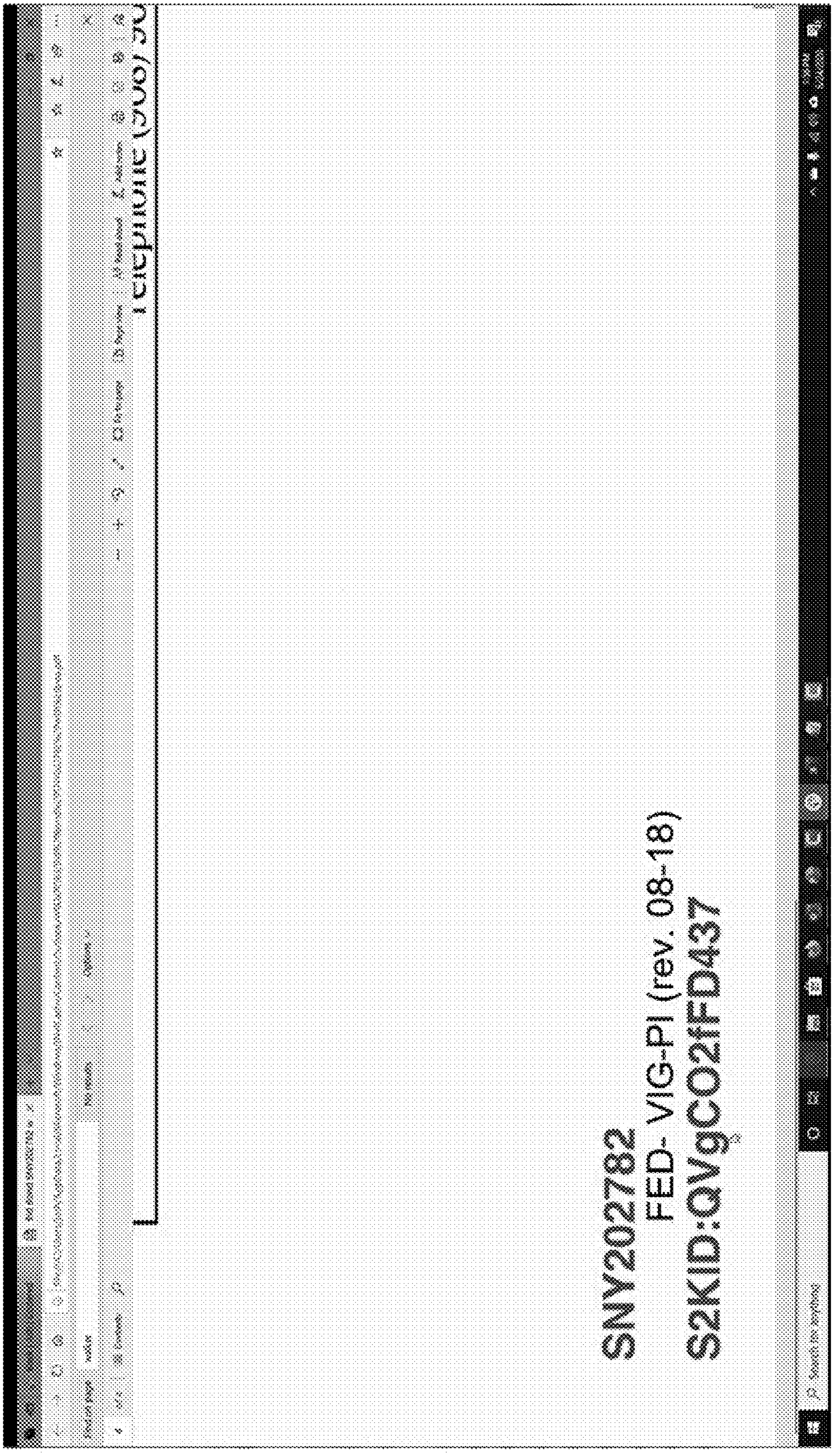
FIG. 118A shows an enlarged view of the bottom left corner of the downloaded PDF version of the documents associated with the executed bond, as shown in FIG. 118, in which the surety 2000 (S2K) unique identifier appears (i.e., "QVgCO2FD;437"), and which identifier may be labeled and shown in red.

FIG. 118A shows an enlarged view of the bottom left corner found on each of the documents associated with the executed bond (i.e., on the executed bond itself, on the corresponding power of attorney, on all attachments thereto, etc.), as shown in FIG. 118, and in which the surety 2000 (S2K) unique identifier appears (i.e., "QVgCO2FD;437"), and which identifier may be labeled and may be shown in red. This creates a unique power of attorney document for each bond issued. Having the unique identifier (e.g., "QVgCO2FD;437") being displayed on, associated with, and forming part of both the issued bond and the corresponding power of attorney that was used for that particular bond, serves as a virtual (digital) stapler. A problem in the prior art, non-electronic world is that a contractor would sometimes take a legitimately issued payer copy of a power attorney from an earlier bond that was submitted, but which was rejected by a first obligee for a first project, and physically staple it to another non-approved paper bond for use in another bid for a different project. The virtual (digital) stapler created by the unique identifier (e.g., "OVgCO2FD; 437") being placed on both documents eliminates that practice. Even if an unscrupulous contractor attempted to forge the same (bogus) identifier onto a bond and power of attorney so as to seemingly create outwardly matching documents, the obligee would be alerted of the fraud by the absence of those documents in the closed system described herein, when logging in to view the documents, and would also also be alerted by the absence of an email notification of the bond having been properly executed within the closed system. It is noted that the closed system also thereby eliminates the need for the signature of a witness or a notary, since only the parties to the bond will have access to their account and therefore the system.

Figure 119:
FIG. 119 shows an email GUI screen illustrating an email that is sent to notify the surety company that the pending bond was executed successfully.

FIG. 119 shows an email GUI screen illustrating an email that is sent to notify the surety company that the pending bond was executed successfully.

Figure 120:
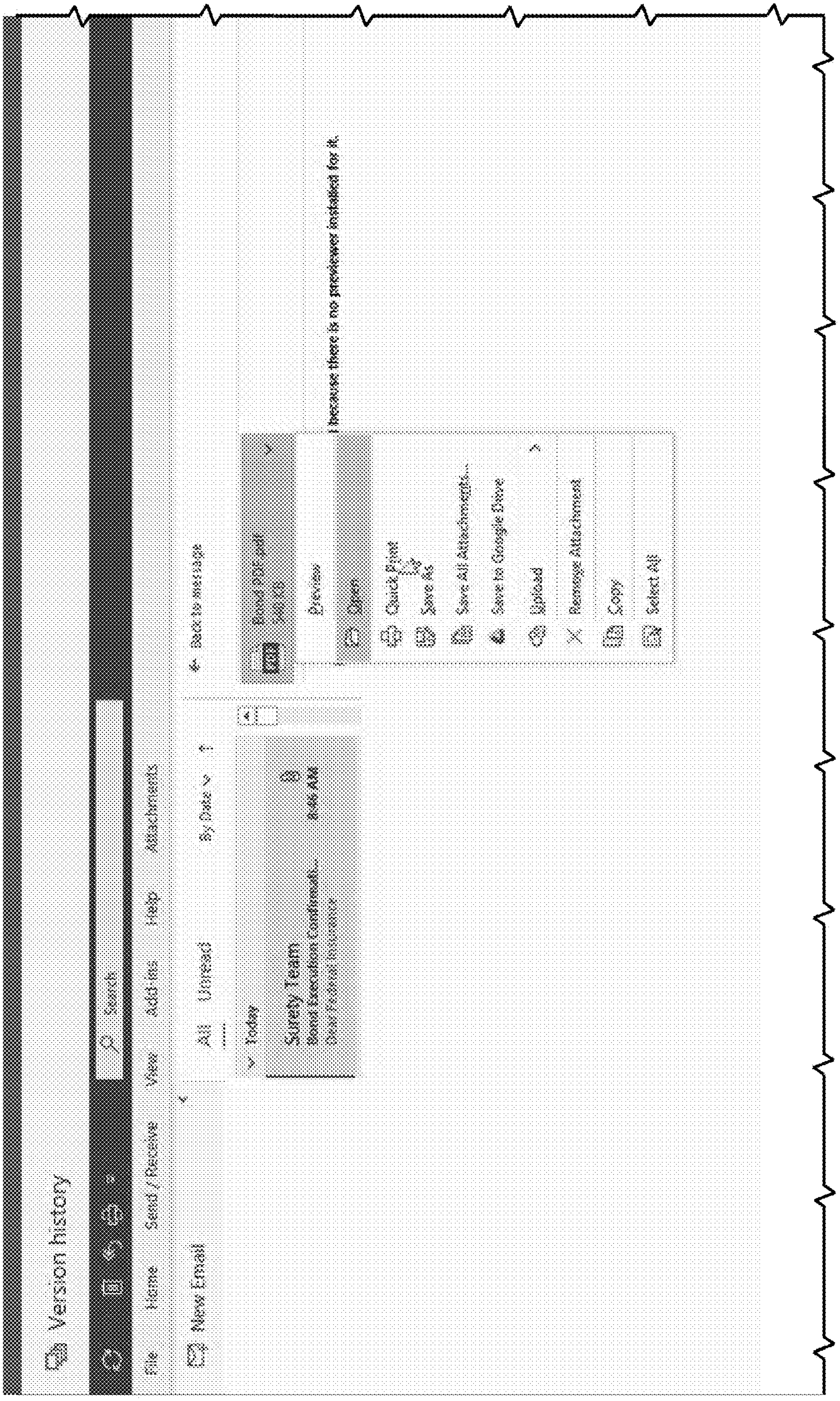
FIG. 120 shows the email GUI screen of FIG. 119, with the surety user having toggled the "open" dropdown list option for the PDF of the bond to open the document from within the surety's email system, and which may also be viewed by the user at the surety company logging into the system.

FIG. 120 shows the email GUI screen of FIG. 119, with the surety user having toggled the "open" dropdown list option for the PDF of the bond to open the document from within the surety's email system, and which may also be viewed by the user at the surety company logging into the system.

Figure 121:
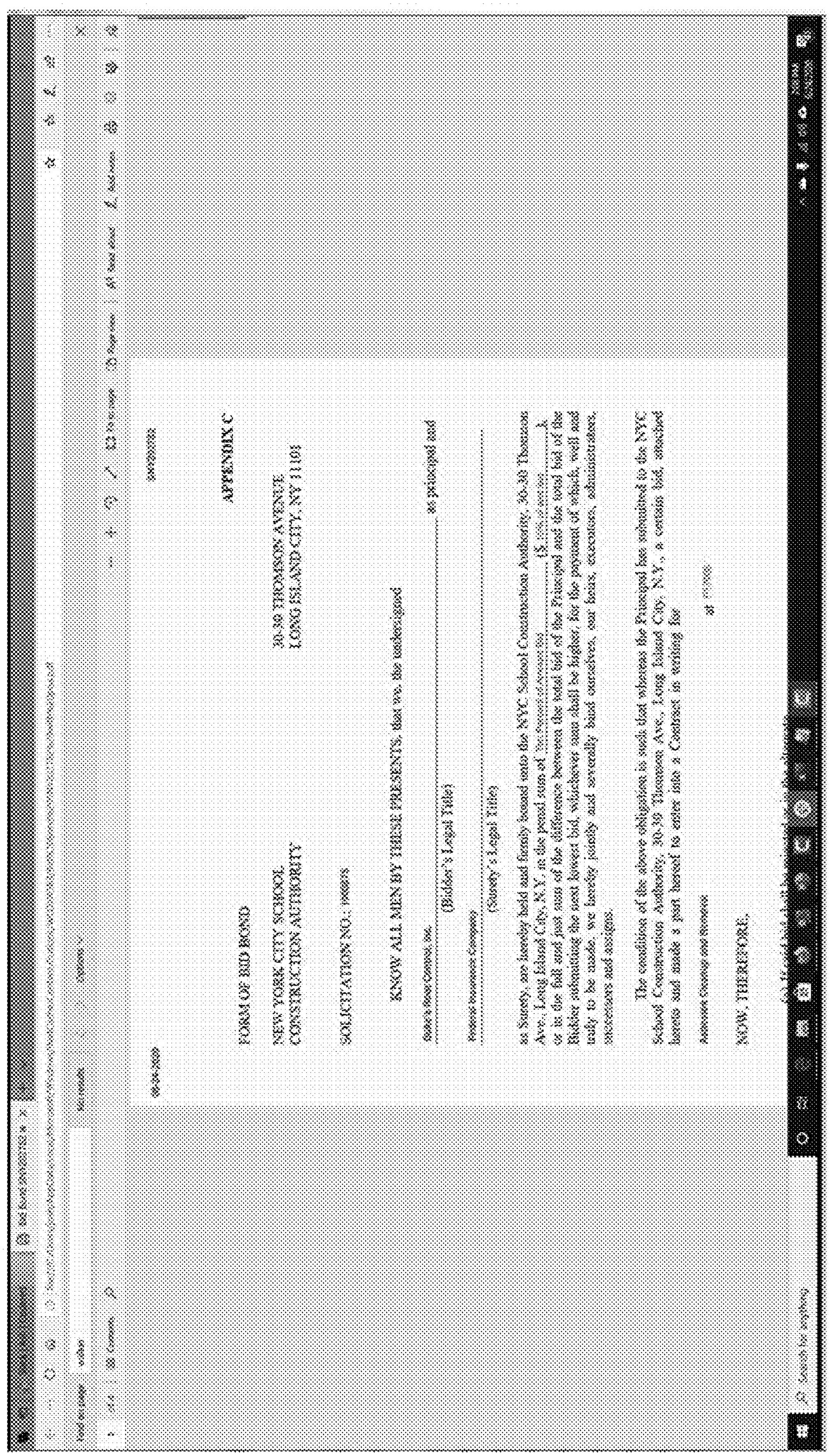
FIG. 121 shows the executed bond document after being opened using the surety's email system shown in the GUI screen of FIG. 120.

FIG. 121 shows the executed bond document after being opened using the surety's email system shown in the GUI screen of FIG. 120.

Figure 122:
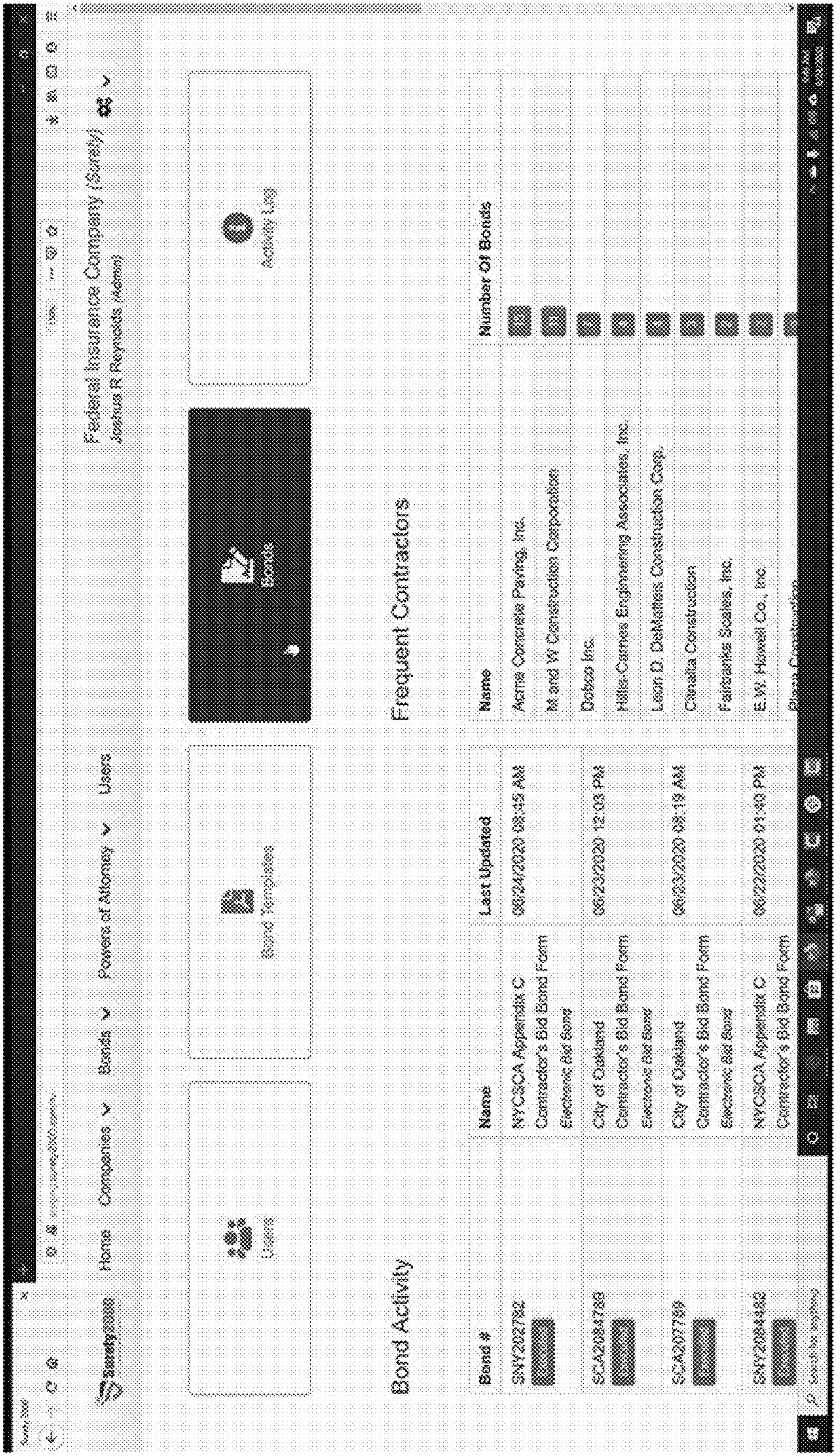

FIG. 122 shows the home page screen displayed when a user at the surety company is logged back into the system, and the surety user can see the newly executed bond in the bond activity on the left, or may also see the bond by clicking on the bond icon, which is shown therein with the user hovering the cursor thereon.

Figure 123:
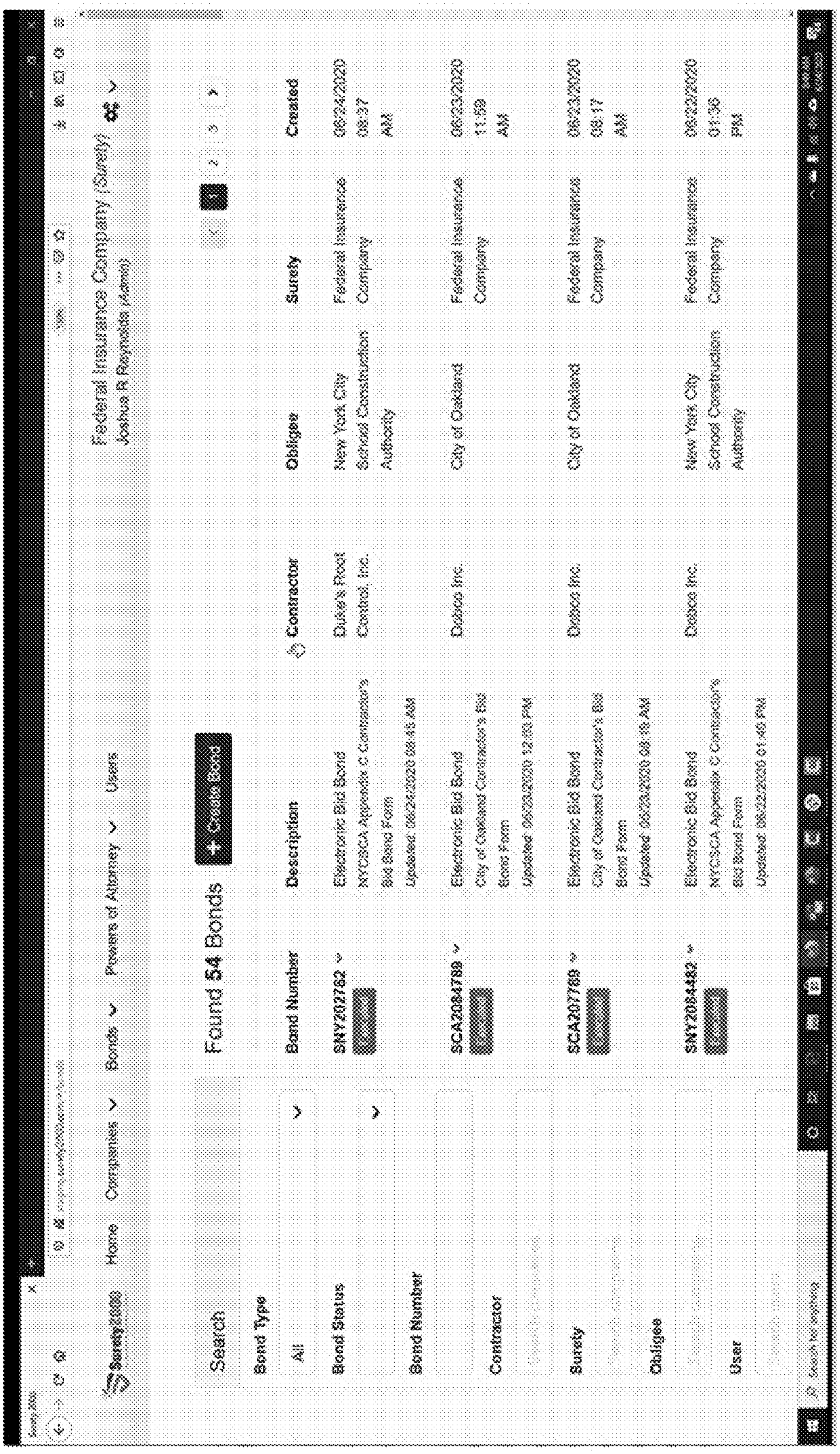

FIG. 123 shows the bonds page displayed after the user has clicked on the bond icon in the home page GUI screen of FIG. 122, which shows the newly executed bond, as well as any other bond that one of its agents has had executed/issued, and which includes a search tool on the left hand side that may be used to search for a specific bond.

Figure 124:
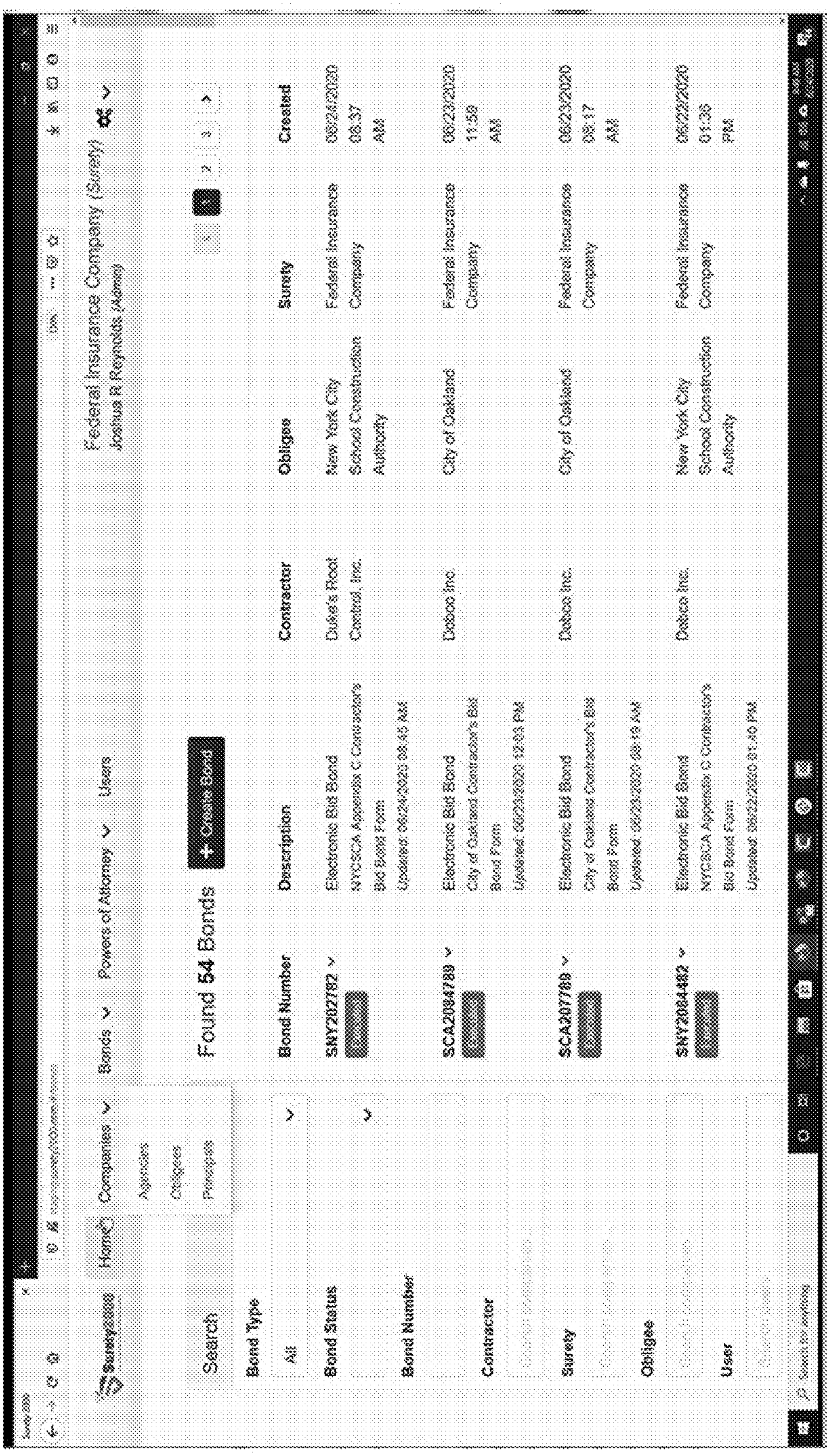

FIG. 124 shows the user hovering the cursor over the "Companies" menu item, which causes the display of a dropdown list that includes "Agencies," and "Obliges," and "Principals," indicating that a registered user of each can use that menu item to log into the system.

Figure 125:
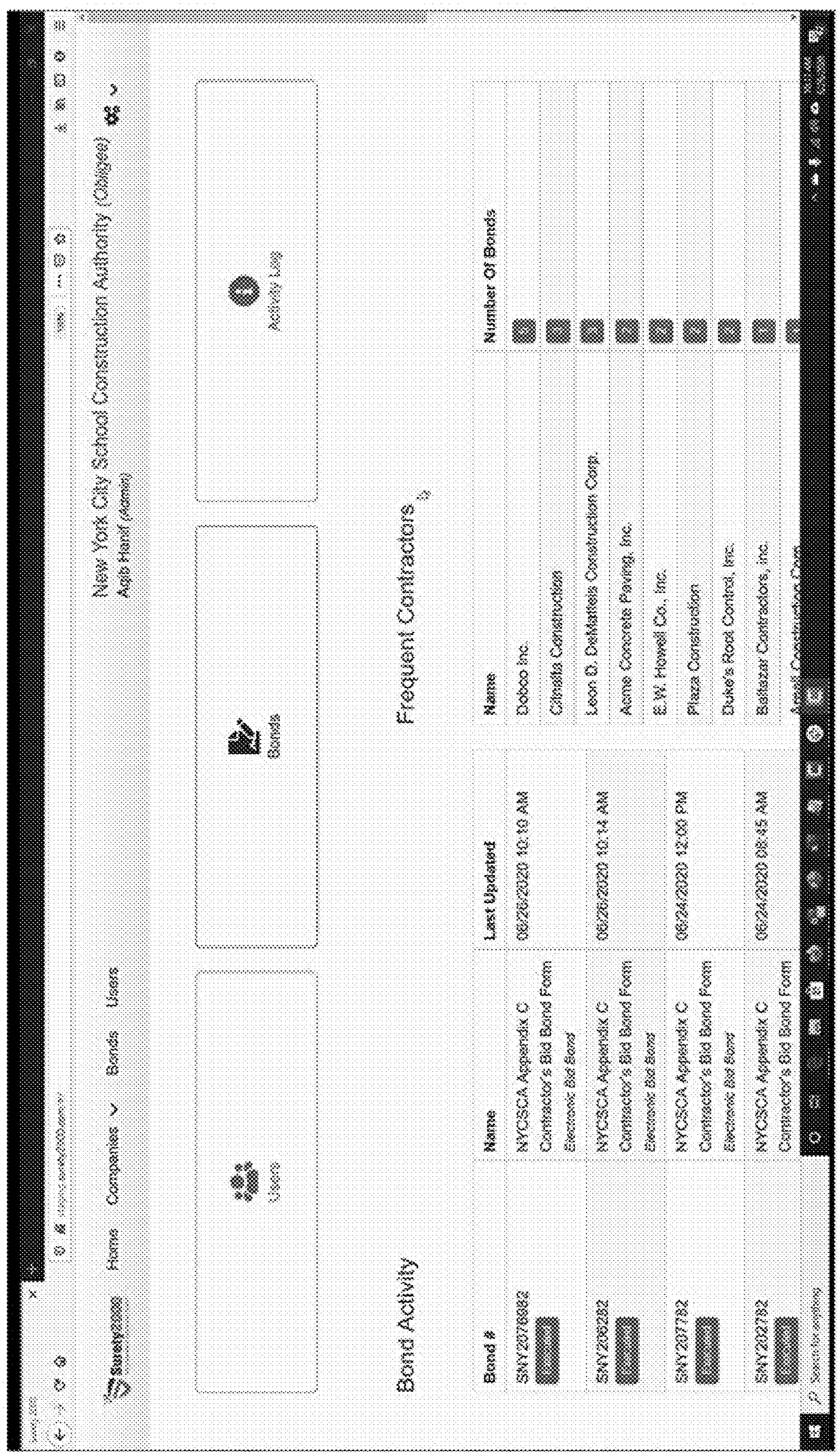

FIG. 125 shows the home page screen displayed when the obligee is logged into the system, permitting the obligee to see the most recently executed bonds, and the most frequent contractors that bid.

Figure 126:
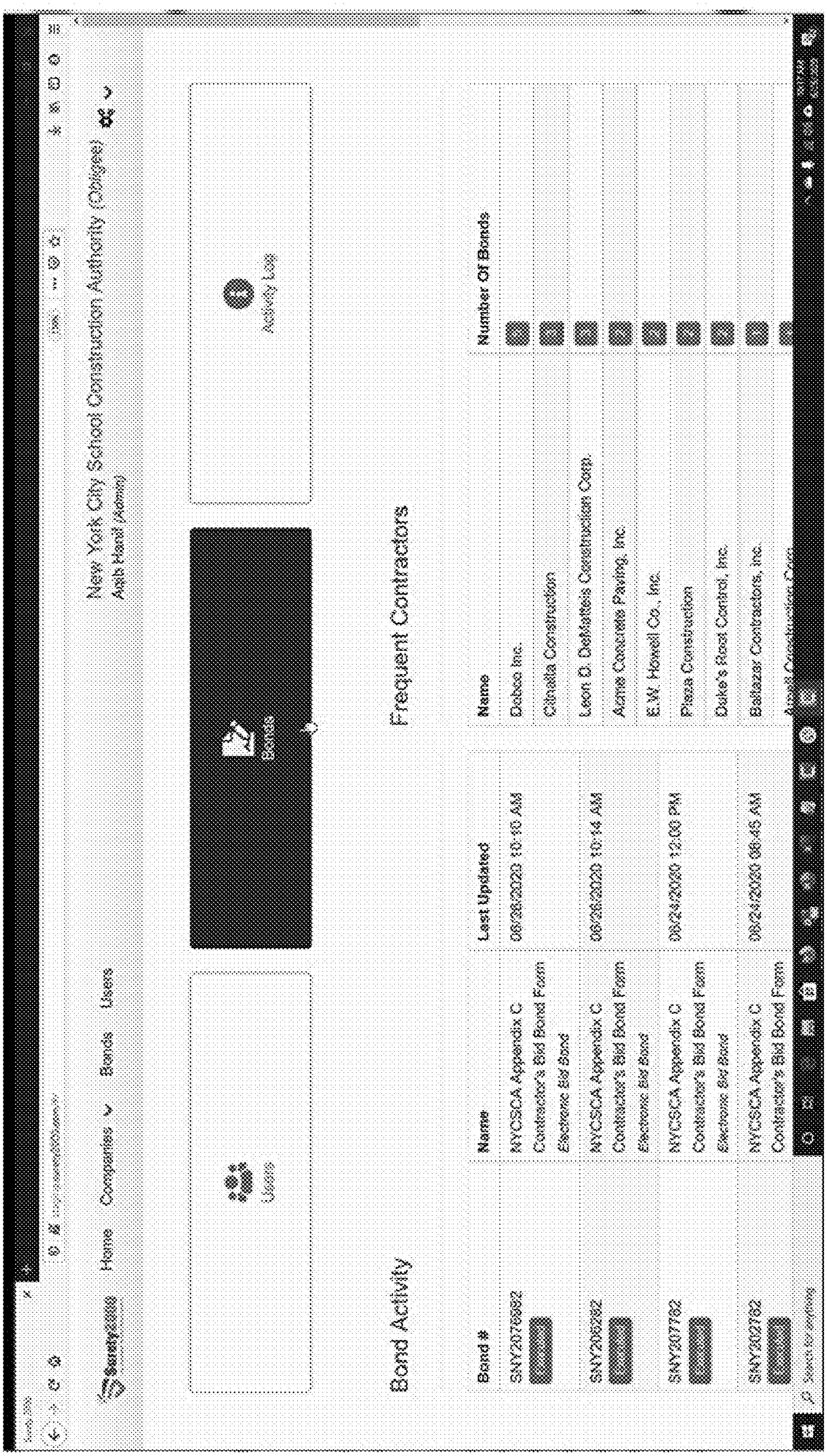

FIG. 126 shows the obligee clicking on the bonds icon in the home page GUI screen of FIG. 125 in order to see a full list of bonds.

Figure 127:
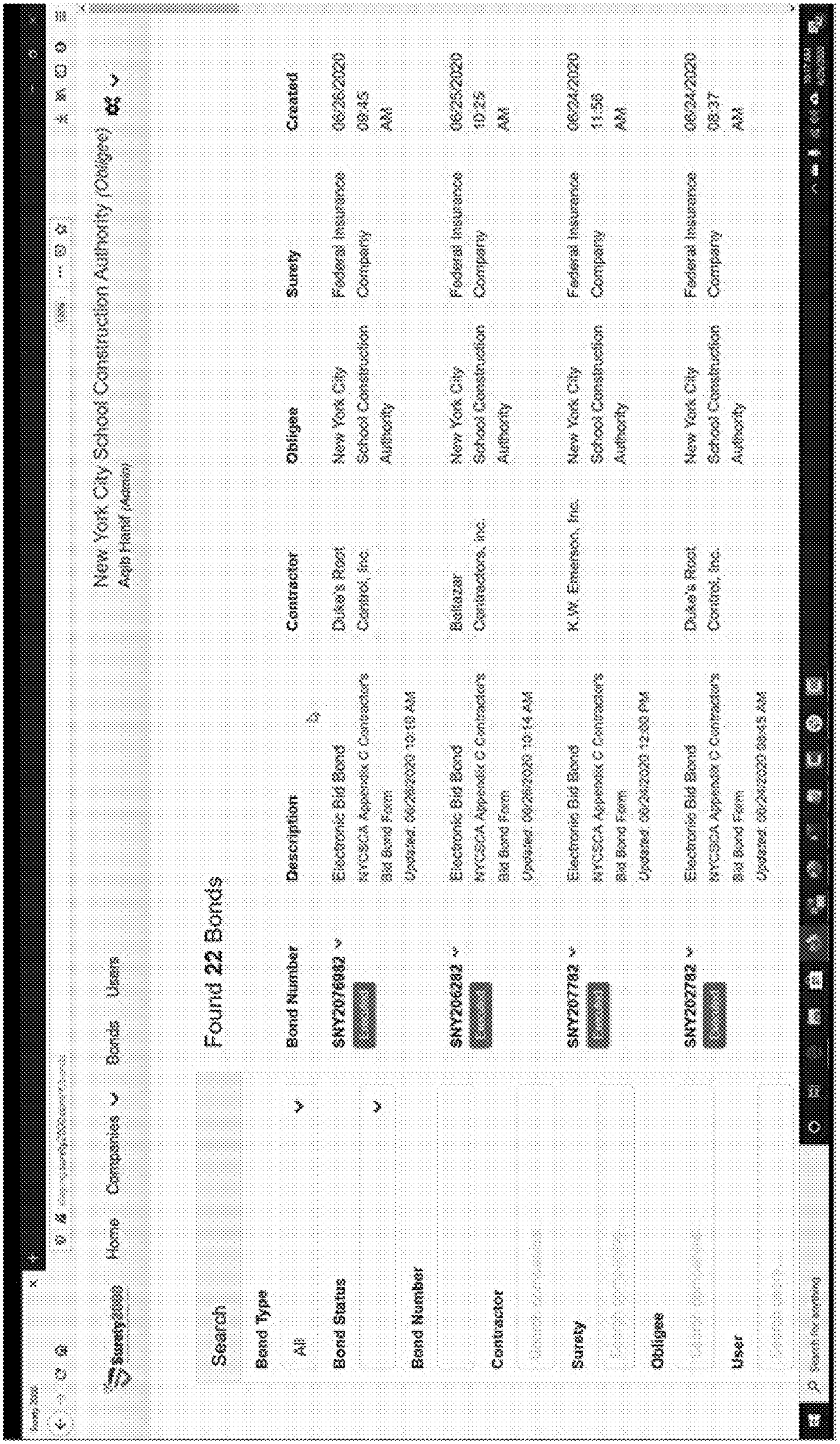

FIG. 127 shows the full list of bonds (i.e., 22 bonds) being displayed to the obligee after clicking on the bonds icon in the home page GUI screen of FIG. 125.

Figure 128:
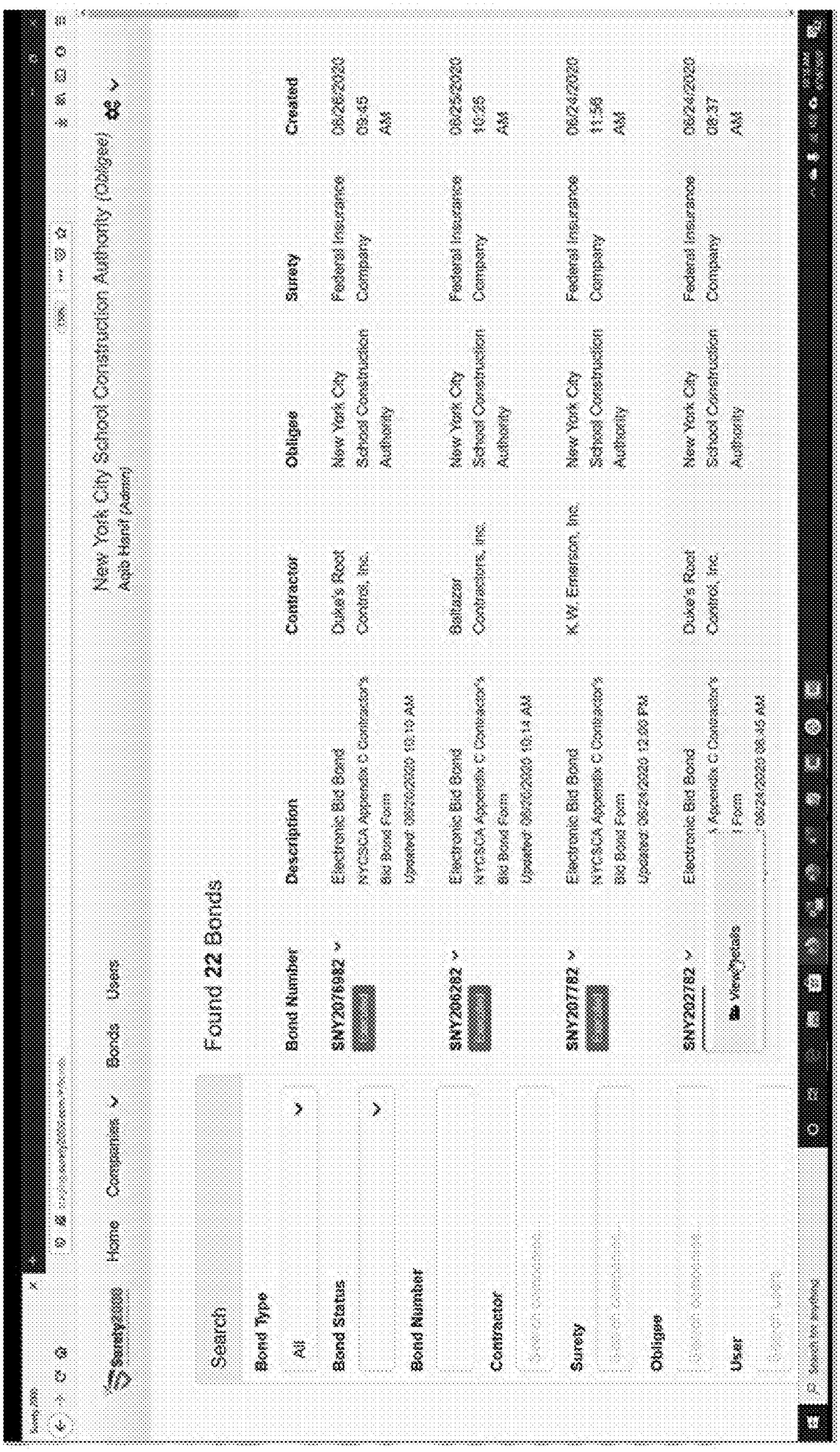

FIG. 128 shows the obligee hovering the cursor over one of the bonds in the GUI screen of FIG. 127, and clicking on the "View Details" dropdown list option that is subsequently displayed.

Figure 129A:
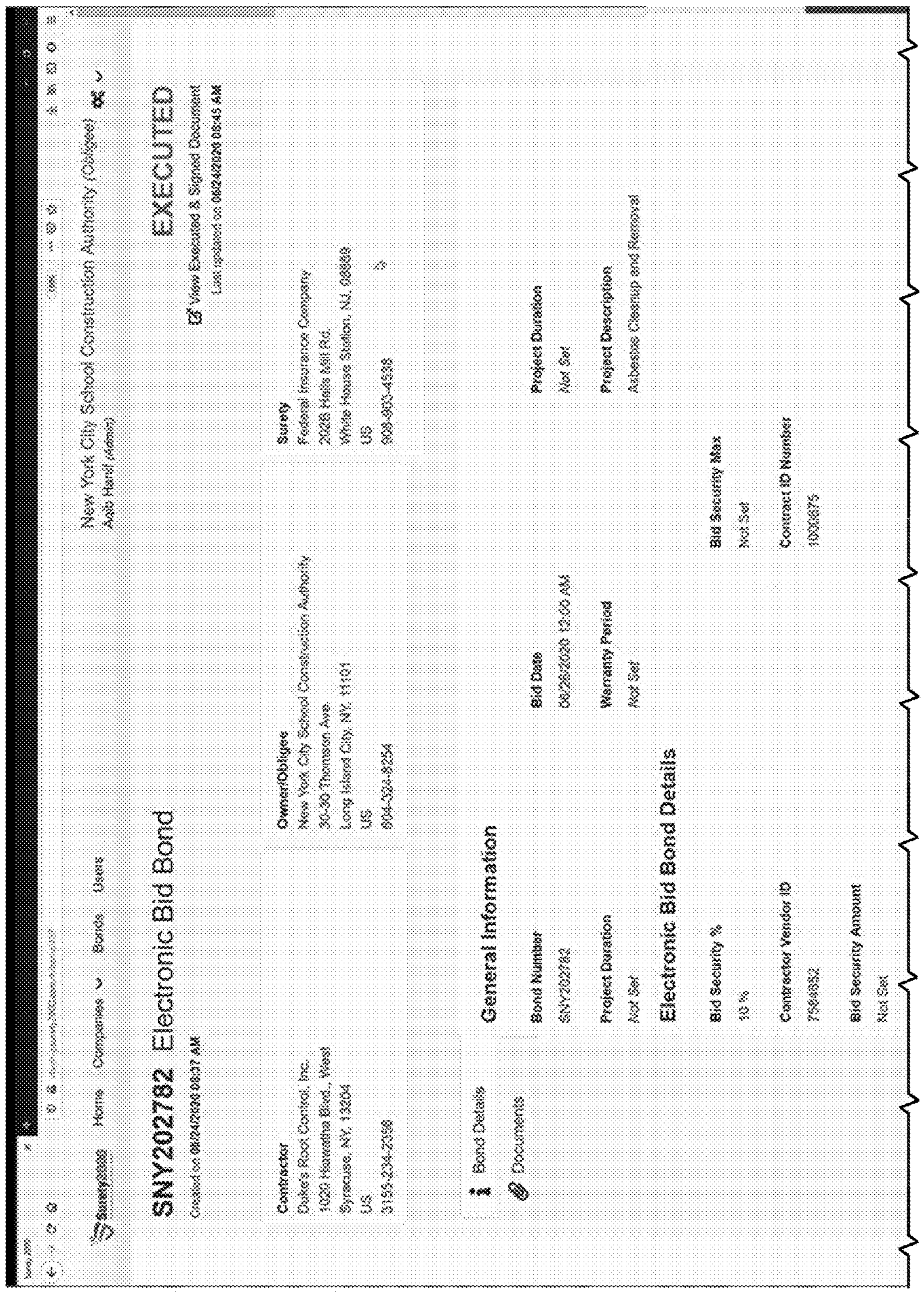
Figure 129B:
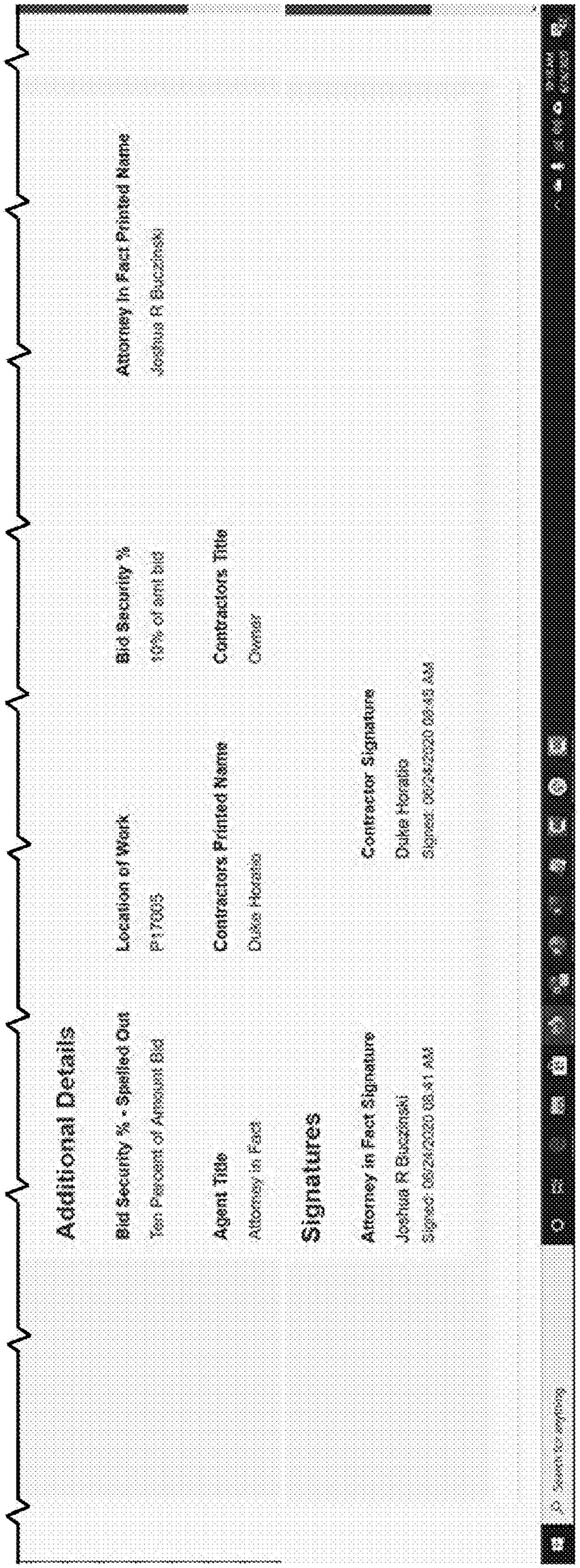

FIGS. 129A and 129B show respective upper and lower GUI screen portions that display descriptive portions of the information that is on the Bond that was selected in the GUI screen of FIG. 127, and which upper screen portion includes a "View Executed & Signed Document" link for viewing of the actual bond and associated documents.

Figure 130:
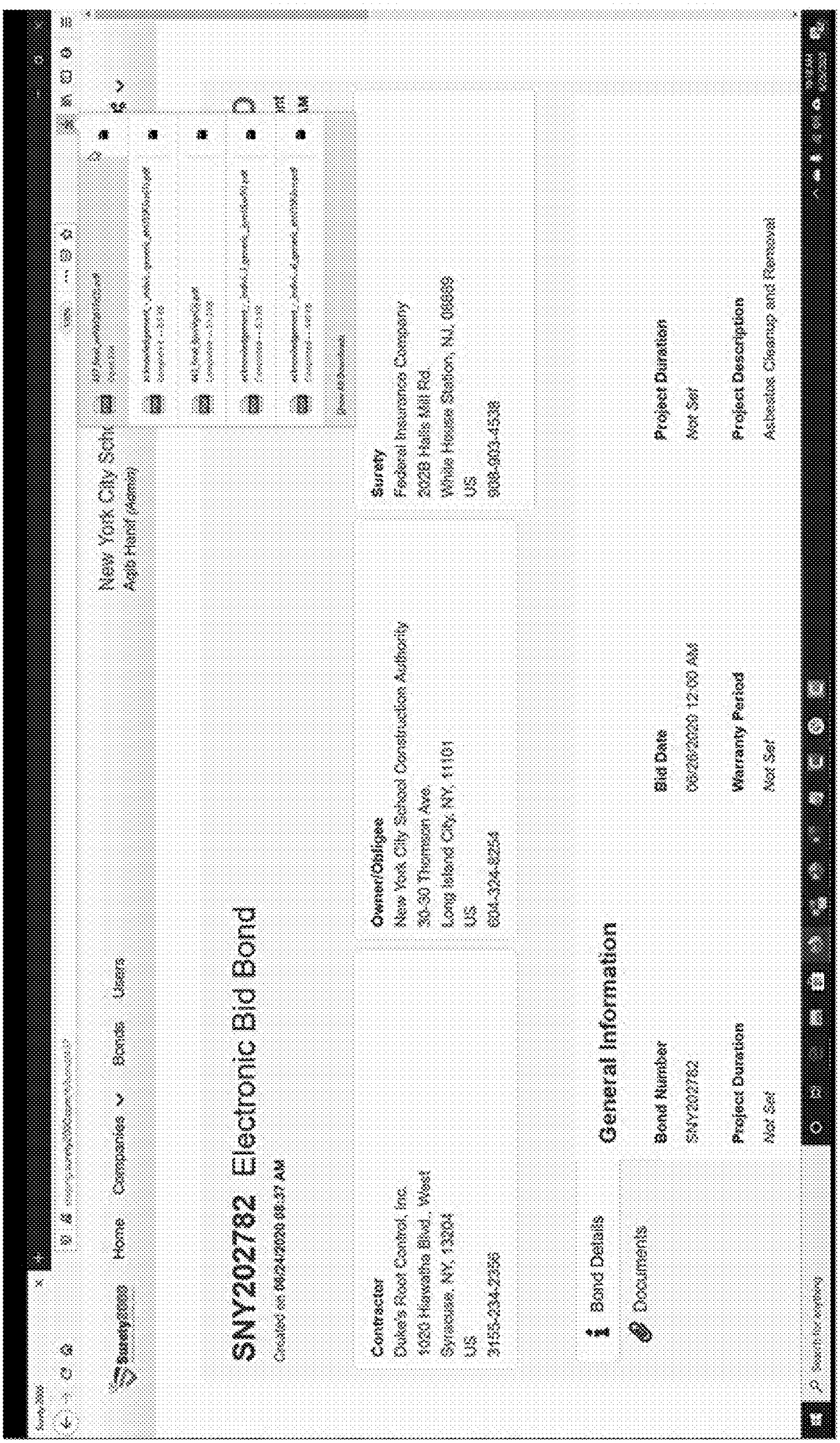

FIG. 130 shows the upper GUI screen portion of FIG. 129A, with the user clicking on the download button to exposed a dropdown list of the documents associated with the executed bond.

Figure 131:
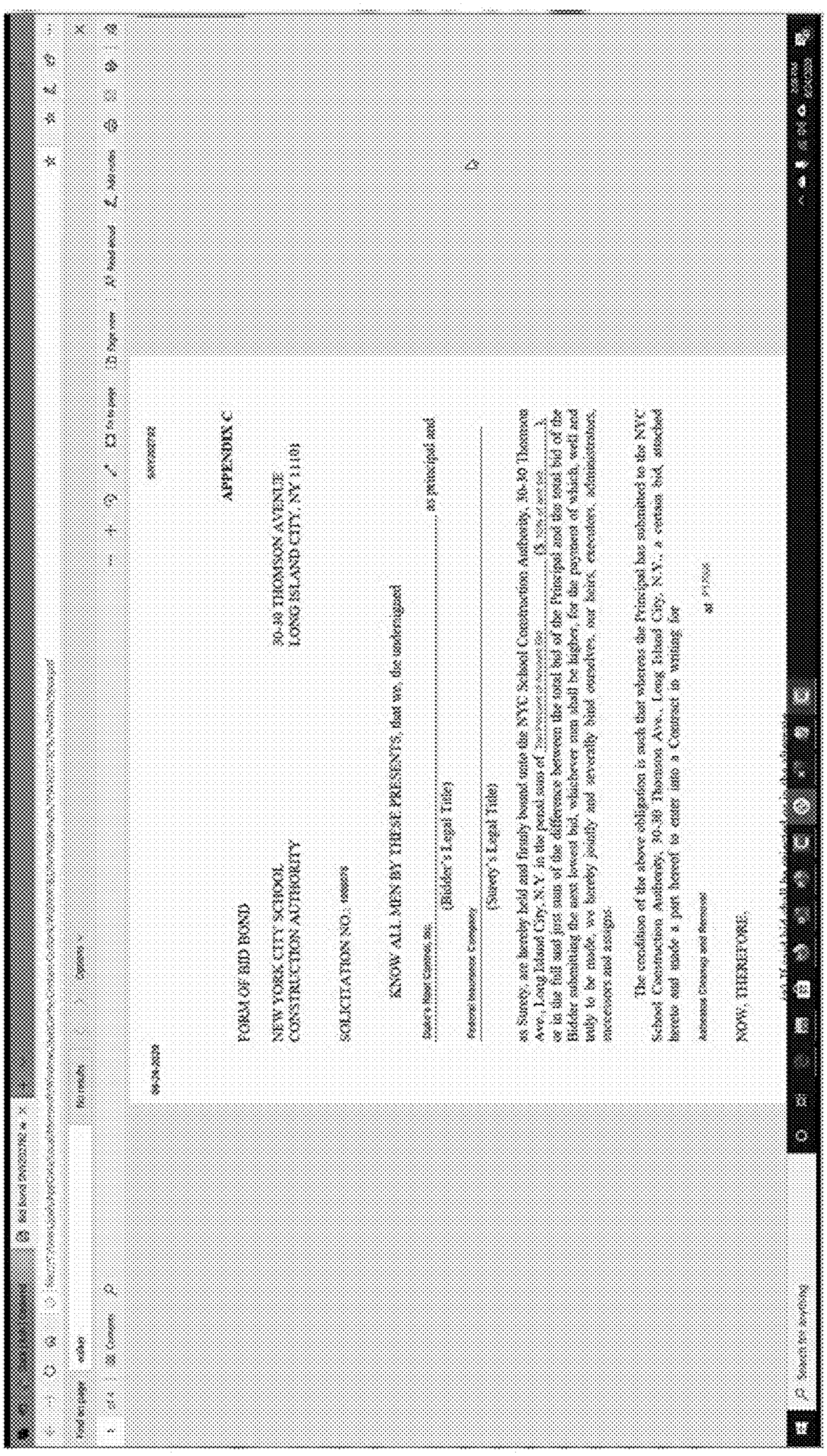

FIG. 131 shows a PDF version of the executed bond that was selected in the dropdown list of the GUI screen of FIG. 130.

Figure 132:

An embodiment of the system may also utilize and embed data that may provide an audit trail, which may be visually presented in the form of a Seal of Authenticity, as seen in FIG. 132, which may be displayed on the fully executed electronic bond and on the powers of attorney attached to that specific bond. Alternatively, there may simply be a hyperlink to permit any of the parties involved with the bond to review the audit trail. Any authorized user of the system who is a party to the bond will be able to click on the digital seal and/or hyperlink and view the following:

1. Attorney in Fact: Name of Agency and Agent that electronically signed the bond and their license Number. And view the digital signature info which includes; the name of the signer, date signed, the IP Address of the computer with which they performed the electronic signing of the documents. It will also display the surety company name, NAIC number, AM Best Rating and Financial Category for surety company.
2. Principal (Contractor): It will display the Name of the Contracting Company, Principal's name who electronically signed it, Fed Tax ID # for the contracting firm, the date signed, and IP address of the computer with which Principal signed it.
3. Surety 2000 unique code will be present when clicking this seal within power of attorney and in within the bond.

The purpose of this seal is to provide proof of authentication of all of the parties who signed the bond with one click and to prevent the powers used for this specific bond to be used for another bond.

The system disclosed herein may be configured to cooperate with the ratings agency AM Best, to display the rating information for the surety company, which is important because so many Obliges don't verify the surety company actually exists and that it has a rating that meets the minimum standards that are required of the Obligee. The federal tax ID number for the Principal that is used herein shows that the contracting company performing the work for the obligee is a "real" company. This is a vetting process that is rarely performed by an Obligee, but should be conducted. Those Obliges that are diligent in their vetting, do research and look up the AM Best rating and look up the fed tax ID #'s using an archaic and very cumbersome process, which may involve calling the surety company directly and/or looking up ratings information in a physical book provided by AM Best.

The Seal of Authenticity will contain that surety company's NAIC number within it that will function as a hyperlink to the AM Best where the rating and financial category can be verified. The Seal of Authenticity for contract bidders will contain within it a Federal Tax ID number for the specific contract bidder. It will function as a hyperlink to a reputable third party credit service to verify the corporate existence of the contract bidder.

FIG. 133 shows a printed copy of an issued bid bond prepared using the system disclosed herein; and FIG. 134 shows a printed copy of a power of attorney that is associated with the issued bid bond of FIG. 133.

In an embodiment, system requirements for the surety bond delivery system may include one or more of the following:

The Platform must be an independent third party provider—the system platform provider cannot be a party to the surety bond document being executed.

The Platform must be available to all licensed parties of a surety bond (including, but not limited to):

a) All Licensed surety carriers
b) All Licensed surety agencies
c) All contracting bidders
d) All Owner/Obligees (e.g. government agencies, construction managers, etc.)

The System:

- may provide delivery of an authenticated surety bond by means of: one, single secure system—if any element of the execution process is conducted outside of the secure platform it is vulnerable to fraud and cannot be reasonable authenticated;
- may have the ability in this secure system to sign the surety instrument with an electronic signature from the surety carrier and/or the surety agent;
- may enable surety company to grant powers of attorney electronically within the system;
- may have the electronic power of attorney from the surety company to the surety agent containing the designated agent/broker name on the power of attorney—this name must also match the name on the surety bond (instrument);
- may provide within the system an electronic signature available to the contract bidder (principal of the bond) to sign the surety instrument;
- may also provide for the Owner/Obligee (e.g. government agency, construction manager, etc.) to retrieve the executed surety bond within the system;
- may permit the Surety company access within the system to all records of surety bonds executed directly or on their behalf by designated attorney-in-fact;
- may have the executed surety bond and power of attorney contain a matching unique code generated by the third party system that can be used to verify the authenticity of the surety bond by the Owner/Obligee (e.g. government agency, construction manager, etc.);
- may provide the ability for the surety carrier and/or the surety agent to upload a surety bond form that will be in compliance with the Owner/Obligee (e.g. government agency, construction manager, etc.)
- may provide the ability of the Owner/Obligee (e.g. government agency, construction manager, etc.) to view, print, and file the electronic bond;
- may send an electronic notification (email) to the surety carrier of the issuance of bond electronically thereby notifying the carrier of its obligation under the bond. (This is an option for the carrier).
- Must include an unalterable time-stamp for the electronic signatures of the surety agent or surety company, and contract bidder (principal);

Forms attached within the system may include:

- Surety document with electronic signatures of the surety agent or surety carrier, Power of attorney of the carrier to the signatory on the bond which could be an individual from the carrier or a designated surety agent; and The most recent financial statement of the surety.

As seen in FIG. 133, a quick response (OR) bar code may be placed on an issued bond, so that a person who may have access to the printed copy of the bond shown, could scan the bar code with his or her smart phone, and access the bond online, after which he/she can log into the system to use tools therein to verify its authenticity (e.g., using the audit trail provided by the features described above).

The documents (bond, power of attorney, attachments, etc.) that are produced by the system disclosed herein may also be integrated with an online bidding system, whereby the contractor can unload the bond, the power of attorney, and the attached documents direct from the system.

The present system therefore provides multiple layers of security, as follows: transparency; a closed system architecture in which the digital records are accessible only by each of the parties to the bond; the virtual (digital) stapler created by the unique identifier that appears on the bond, and on the power of attorney making it unique to that particular bond, the email notifications; and the audit chain associated with the Seal of Authenticity and/or the hyperlinks.

Software to provide the herein disclosed GUI functionality may run on a suitable computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 135, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static non-transitory storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of non-transitory computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A computer implemented system configured for issuance of a surety bond and corresponding power of attorney to eliminate fraud with multiple layers of security, said computer-implemented system comprising:
- a server, said server configured to communicate with a plurality of client devices;
- one or more client devices for each of: one or more surety companies, one or more agents, one or more contractors, and one or more obligees; each of said client devices configured to communicate with said server,
- wherein said server is configured to provide said client devices of the one or more surety companies with a surety company user interface screen configured to grant a power of attorney to authorize an agent to issue surety bonds on behalf of the surety company;
- wherein said server is configured to provide said client devices of the one or more agents with an agent user interface screen: said agent user interface screen comprising:
  - an information box configured for selection of a contractor requiring a bond for a project;
  - an information box configured for selection of a power of attorney granted by a surety company to the agent;
  - an information box configured for selection of an obligee soliciting bids for the project;
  - a list box configured for selection of a bond type;
  - one or more information boxes configured for entry into, or selection therein, of one or more of:
    - a bid date for the project;
    - a bid security percentage;
    - a description of the project; and
    - a digital signature of the agent; and
  - a button configured to submit a draft of the bond to the contractor,
- wherein said server is configured to provide said client devices of the one or more contractors with a contractor user interface screen configured for entry of a digital signature of the contractor onto the draft of the bond;
- wherein said server is configured to generate and to display a unique alpha and/or numeric identifier on both the executed bond and the associated power of attorney, to create a digital stapler to prevent subsequent fraudulent use of the power of attorney independent of the executed bond; and
- wherein said server is configured to provide said client devices of the obligee with an obligee user interface screen configured to provide access to view the executed bond.

2. The computer implemented system according to claim 1, wherein said multiple layers of security of said computer implemented system further comprises:
- said server configured to send an email notification of execution of the bond to the surety company; and
- a seal of authenticity on the executed bond configured to provide an audit trail of the executed bond, said audit trail comprising: one or more hyperlinks being configured, when toggled, to respectively display one or more of:
  - a time-date stamp of the digital signature of the agent;
  - a time-date stamp of the digital signature of the contractor;
  - an IP Address of the client device used by the agent to make the digital signature of the agent; and
  - an IP Address of the client device used by the contractor to make the digital signature of the contractor.

3. The computer implemented system according to claim 2, wherein said surety company user interface screen is further configured to permit creation of a customized power of attorney.

4. The computer implemented system according to claim 3, wherein the surety company user interface screen is configured to create a customized power of attorney template, being configured to permit the agent to:
- upload a PDF of a generic power of attorney form as a starting template;
- name the power of attorney template;
- enter a description for the power of attorney template; and
- add a plurality of text fields at respective desired locations of the PDF starting template, to customize a size of each of the plurality of text fields; and to enter a placeholder name for each of the plurality of text fields.

5. The computer implemented system according to claim 4, wherein said added plurality of text fields comprises: a text field and a respective placeholder name for each of: a number of the bond to be issued, a date of execution of the bond to be issued, a name of the agent selling the bond to be issued, and a maximum amount for which the agent is permitted to sell bonds.

6. The computer implemented system according to claim 5, wherein said surety company user interface screen comprises: one or more radio buttons configured to alter a power of attorney assigned to one of its agents, being configured to do one or more of:
- revoke a power of attorney for one of its agents;
- inactivate, temporarily, a power of attorney for one of its agents;
- edit a power of attorney for one of its agents; and
- grant a new power of attorney to one or more agents.

7. The computer implemented system according to claim 6, wherein said agent user interface screen is configured to permit the agent to do one or more of:
- view each power of attorney and maximum bond amount granted to the agent;
- view all bonds issued by the agent; and
- view all frequently used contractors.

8. The computer implemented system according to claim 7, wherein said surety company user interface screen comprises: a dropdown list to permit the surety company to do one or more of:
- view all bonds issued bonds by its agents; and
- view each power of attorney granted to its agents.

9. The computer implemented system according to claim 8, wherein said agent user interface screen is configured to provide:
- a contractor authorization screen to add information of a new contractor into a database, to permit the agent to sell a bond to the new contractor, said information comprising: a contractor name; and a contractor taxID.

10. The computer implemented system according to claim 9, wherein said agent user interface screen is configured to permit the agent to do one or more of:
- view of all contractors in said database; and
- view all contractors previously issued a bond by the agent.

11. The computer implemented system according to claim 10, wherein the contractor user interface screen is further configured to permit the contractor to view all bonds singed by the contractor.

12. The computer implemented system according to claim 11, wherein said server is configured to display the unique and random alpha and/or numeric identifier on the executed bond in a red color.

13. The computer implemented system according to claim 12, wherein said one or more hyperlinks of said seal of authenticity is configured to communicate with a ratings agency, to retrieve and display a rating of the surety company.

14. The computer implemented system according to claim 13, wherein said server is configured to send an email notification to the contractor when the draft bond is ready for a contractor signature.

15. The computer implemented system according to claim 14, wherein said server is configured to send an email notification to the surety company when the bond is executed.

16. A computer implemented system configured for issuance of a surety bond and a particularly associated power of attorney to eliminate fraud with multiple layers of security, said computer-implemented system comprising:

a server, said server configured to communicate with a plurality of client devices;

one or more client devices for each of: one or more surety companies, one or more agents, one or more contractors, and one or more obligees; each of said client devices configured to communicate with said server;

wherein said server is configured to provide said client devices of the one or more surety companies with a surety company user interface screen configured to grant a power of attorney to authorize an agent to issue surety bonds on behalf of the surety company;

wherein said server is configured to provide said client devices of the one or more agents with an agent user interface screen: said agent user interface screen comprising:

one or more boxes configured for entry into, or selection therein, of: bid-specific information, and a digital signature of the agent;

a button configured to submit a draft of the bond to the contractor, wherein said server is configured to provide said client devices of the one or more contractors with a contractor user interface screen configured for entry of a digital signature of the contractor onto the draft of the bond;

wherein said server is configured to generate and to display a unique alpha and/or numeric identifier on both the executed bond and the associated power of attorney, to create a digital stapler to prevent subsequent fraudulent use of the power of attorney independent of the executed bond;

wherein said server is configured to provide said client devices of the obligee with an obligee user interface screen configured to provide access to view the executed bond; and wherein said server is configured to create a seal of authenticity on the executed bond, said seal of authenticity configured to provide an audit trail of the executed bond comprising: one or more hyperlinks configured, when toggled, to display:

a time-date stamp of the digital signature of the agent;

a time-date stamp of the digital signature of the contractor, an IP Address of the client device used by the agent to enter the digital signature of the agent; and an IP Address of the client device used by the contractor to enter the digital signature of the contractor.

17. The computer implemented system according to claim 16, wherein said one or more boxes configured for entry into, or selection therein, of bid-specific information in said agent user interface screen comprises:

an information box configured for selection of a contractor requiring a bond for a project;

an information box configured for selection of a power of attorney granted by a surety company to the agent;

an information box configured for selection of an obligee soliciting bids for the project; and a list box configured for selection of a bond type.

18. The computer implemented system according to claim 17, wherein said server is configured to send an email notification of execution of the bond to the surety company.

* * * * *